(12) United States Patent
Kondo

(10) Patent No.: US 7,071,990 B2
(45) Date of Patent: Jul. 4, 2006

(54) DISPLAY APPARATUS, DISPLAY METHOD, PROGRAM, STORAGE MEDIUM, AND DISPLAY SYSTEM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 10/330,970

(22) Filed: Dec. 27, 2002

(65) Prior Publication Data

US 2003/0210347 A1 Nov. 13, 2003

(30) Foreign Application Priority Data

Dec. 28, 2001 (JP) ............... 2001-399866
Dec. 28, 2001 (JP) ............... 2001-399868

(51) Int. Cl.
H04N 5/66 (2006.01)
H04N 5/74 (2006.01)
H04N 9/12 (2006.01)
H04N 9/64 (2006.01)
H04N 9/74 (2006.01)

(52) U.S. Cl. ............... 348/383; 348/580; 348/588; 348/721; 345/1.1

(58) Field of Classification Search ............... 348/383, 348/580–582, 588, 721, 739, 750, 758, 778; 345/1.1–1.3, 619; 382/173, 238
See application file for complete search history.

(56) References Cited

U.S. PATENT DOCUMENTS

| | | | |
|---|---|---|---|
| 4,734,779 A | | 3/1988 | Levis et al. |
| 5,956,000 A | * | 9/1999 | Kreitman et al. ............ 345/1.3 |
| 6,219,011 B1 | * | 4/2001 | Aloni et al. ................. 345/1.3 |
| 6,262,695 B1 | * | 7/2001 | McGowan ................... 345/1.1 |
| 6,323,854 B1 | | 11/2001 | Knox et al. |
| 6,323,905 B1 | | 11/2001 | Kondo et al. |
| 6,611,241 B1 | * | 8/2003 | Firester et al. .............. 345/1.3 |
| 6,636,222 B1 | * | 10/2003 | Valmiki et al. ............. 345/505 |
| 6,646,684 B1 | * | 11/2003 | Kondo et al. ............... 348/447 |
| 6,864,894 B1 | * | 3/2005 | Lefebvre et al. ............ 345/506 |
| 6,864,921 B1 | * | 3/2005 | Kaneda et al. ............. 348/383 |
| 6,900,844 B1 | * | 5/2005 | Itaki et al. .................. 348/383 |
| 2001/0030649 A1 | * | 10/2001 | Mamiya et al. ............ 345/530 |
| 2002/0021259 A1 | * | 2/2002 | Itaki et al. .................. 345/1.1 |

FOREIGN PATENT DOCUMENTS

| | | |
|---|---|---|
| EP | 0 892 558 | 1/1999 |
| EP | 1 054 379 | 11/2000 |
| GB | 2 274 225 | 7/1994 |

* cited by examiner

Primary Examiner—Brian P. Yenke
(74) Attorney, Agent, or Firm—Frommer Lawrence & Haug LLP; William S. Frommer; Paul A. Levy

(57) ABSTRACT

An enlarged image is displayed using a plurality of television sets. A television set serving as a master device and television sets serving as slave devices convert an input image into partial enlarged images and display the resultant partial enlarged images so that the partial enlarged images displayed on the respective television sets form, as a whole, a complete enlarged full image. The master device and slave devices perform mutual authentication with each other. If the authentication is successfully passed, the operation mode is set so that displaying of an enlarged image is allowed.

27 Claims, 59 Drawing Sheets

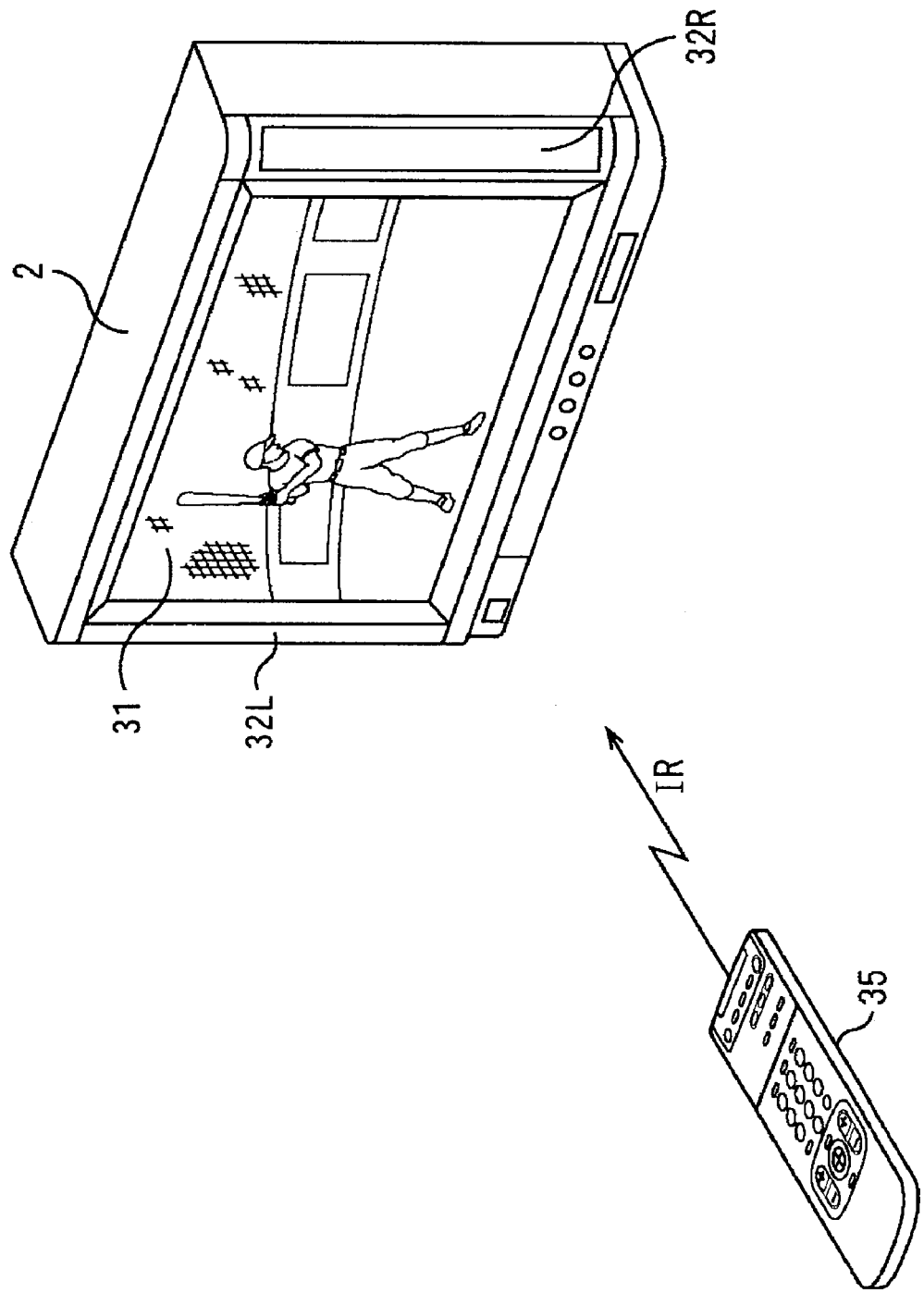

FIG. 14

| OFFSET | NAME | FUNCTION |
|---|---|---|
| 000h | STATE_CLEAR | STATE AND CONTROL INFORMATION |
| 004h | STATE_SET | SET A STATE-CLEAR BIT |
| 000h | NODE_IDs | INDICATE A 16-BIT NODE ID |
| 008h | RESET_START | START COMMAND RESET |
| 00Ch | SPLIT_TIMEOUT | DEFINE THE MAXIMUM SPLIT TIME |
| 018h-01Ch | CYCLE_TIME | CYCLE TIME |
| 200h | BUSY_TIMEOUT | DEFINE LIMITATION ON RETRYING |
| 210h | BUS_MANAGER | BUS MANAGER ID |
| 21Ch | BANDWIDTH_AVAILABLE | BANDWIDTH AVAILABLE FOR ISOCHRONOUS COMMUNICATION |
| 224h-228h | CHANNELS_AVAILABLE | INDICATE THE STATUS OF CHANNELS |

FIG. 16

| 400h | 04h | crc_length | rom_crc_value |
|---|---|---|---|

Bus_info_block

| 404h | "1394" | | |
|---|---|---|---|
| 408h | irmc cmc isc bmc reserved | cyc_clk_acc | max_rec | reserved |
| 40Ch | Company_ID | | Chip_ID_hi |
| 410h | Chip_ID_lo | | |

Root_directory

| 414h | root_length | CRC |
|---|---|---|
| 418h | 03h | module_vender_id |
| 41Ch | 0Ch | node_capabilities |
| 420h | 8Dh | node_unique_id offset |
| 424h | D1h | unit_directory offset |
| 428h ⋮ | Optional. | |

Unit_directory

| unit_directory_length | CRC |
|---|---|
| 12h | unit_spec_id |
| 13h | unit_sw_version |
| ⋮ Optional. | |

FIG. 17

| Addr | Register |
|---|---|
| 900h | Output Master Control Register |
| 904h | Output Plug Control Register #0 |
| 908h | Output Plug Control Register #1 |
| ⋮ | ⋮ |
| 97Ch | Output Plug Control Register #30 |
| 980h | Input Master Control Register |
| 984h | Input Plug Control Register #0 |
| 988h | Input Plug Control Register #1 |
| ⋮ | ⋮ |
| 9FCh | Input Plug Control Register #30 | oMPR

| data rate capability | broadcast channel base | non-persistent extension field | persistent extension field | reserved | number of output plugs |
|---|---|---|---|---|---|
| 30 | 5 | 8 | 8 | 6 | 5 (bits) |

FIG. 18A oPCR[n]

| on-line | broadcast connection counter | point-to-point connection counter | reserved | channel number | reserved | data rate | overhead ID | payload |
|---|---|---|---|---|---|---|---|---|
| 1 | 6 | 6 | 2 | 6 | 2 | 2 | 4 | 10 (bits) |

FIG. 18B iMPR

| data rate capability | reserved | non-persistent extension field | persistent extension field | reserved | number of input plugs |
|---|---|---|---|---|---|
| 2 | 6 | 8 | 8 | 3 | 5 (bits) |

FIG. 18C iPCR[n]

| on-line | broadcast connection counter | point-to-point connection counter | reserved | channel number | reserved |
|---|---|---|---|---|---|
| 1 | 1 | 6 | 2 | 6 | 16 (bits) |

| ctype/response | | |
|---|---|---|
| Command | 0000 | CONTROL |
| | 0001 | STATUS |
| | 0010 | SPECIFIC INQUIRY |
| | 0011 | NOTIFY |
| | 0100 | GENERAL INQUIRY |
| | 0101 | |
| | ~ | (reserved for future specification) |
| | 0111 | |
| Response | 1000 | NOT IMPLEMENTED |
| | 1001 | ACCEPTED |
| | 1010 | REJECTED |
| | 1011 | IN TRANSITION |
| | 1100 | IMPLEMENTED STABLE |
| | 1101 | CHANGED |
| | 1110 | (reserved for future specification) |
| | 0111 | INTERM |

FIG. 20B

| subunit_type | |
|---|---|
| 00000 | Video monitor |
| ~ | (reserved) |
| 00011 | Disc recorder/Player |
| 00100 | Tape recorder/Player |
| 00101 | Tuner |
| 00111 | Video Camera |
| ~ | (reserved) |
| 11100 | Vendor unique |
| 11101 | reserved |
| 11110 | Subunit type extended to next byte |
| 11111 | Unit |

FIG. 20C

| opcode : Operation Code | |
|---|---|
| 00h | VENDER-DEPENDENT |
| 50h | SEARCH MODE |
| 51h | TIMECODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | |

FIG. 21A

| AV/C | control | tape recoder/player | | PLAY | FORWARD |
|---|---|---|---|---|---|
| CTS=0000 | ctype=0000 | subunit type=00100 | id=000 | opcode=C3h | operand=75h |

FIG. 21B

| AV/C | accepted | tape recoder/player | | PLAY | FORWARD |
|---|---|---|---|---|---|
| CTS=0000 | response=0000 | subunit type=00100 | id=000 | opcode=C3h | operand=75h |

ENLARGE

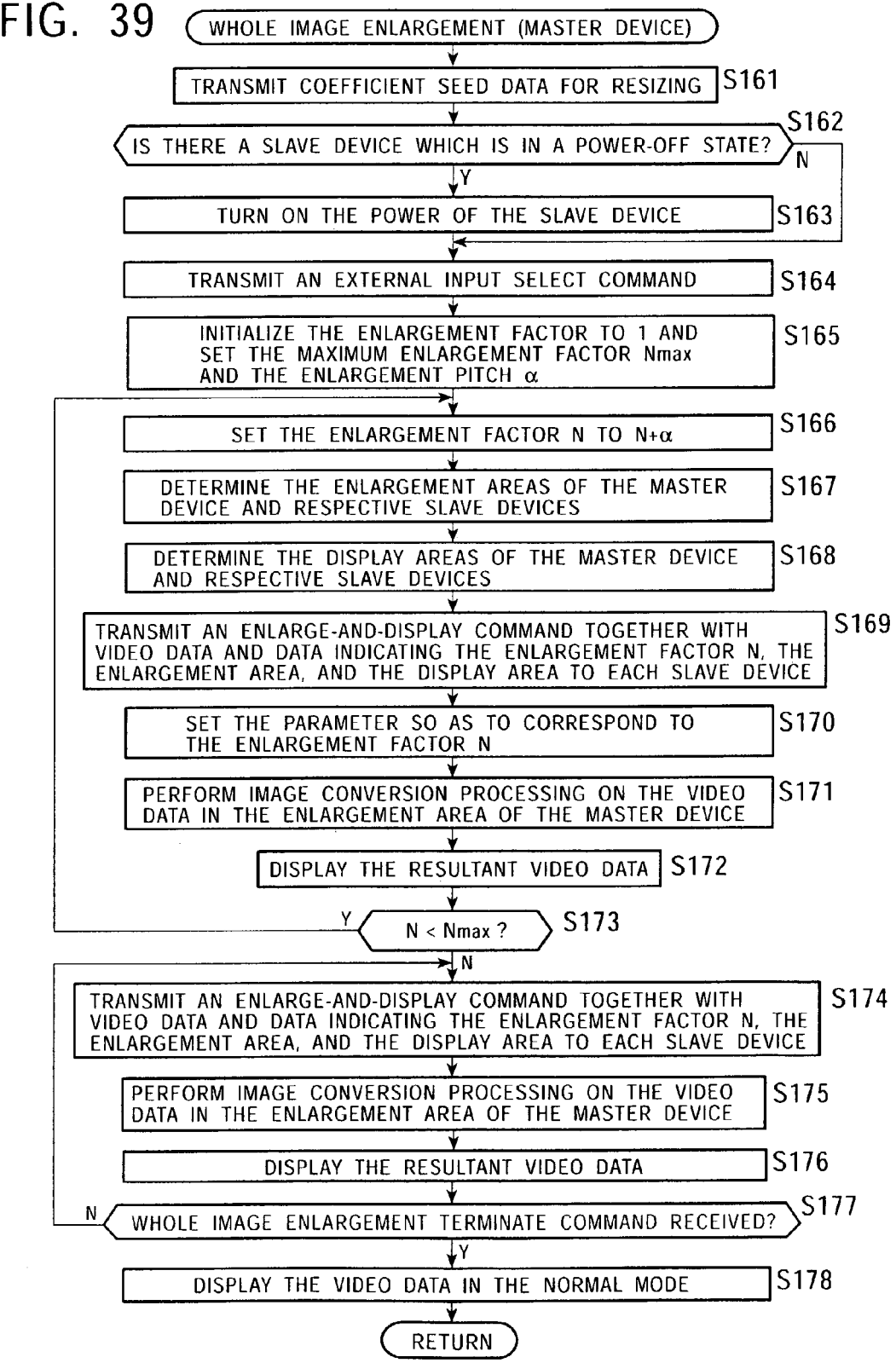

IMAGE Q    ENLARGED IMAGE Q'

DISPLAY APPARATUS, DISPLAY METHOD, PROGRAM, STORAGE MEDIUM, AND DISPLAY SYSTEM

BACKGROUND OF THE INVENTION

1. Field of the Invention

The present invention relates to a display apparatus, a method of controlling a display device, a program, a storage medium, and a display system, and more particularly, to a display apparatus, a method of controlling a display device, a program, a storage medium, and a display system, which allow a plurality of display apparatuses so as to achieve a higher capability than can be achieved by a single display apparatus.

2. Description of the Related Art

In television sets, an image and an associated sound/voice are output in accordance with a received television broadcast signal.

The conventional television sets are designed on the assumption that each television set is used separately from other television sets. If a user purchases a new television set, an old television set possessed by the user becomes unnecessary and, in many cases, the old television set is thrown out.

When a plurality of television sets are used together, if a higher capability is achieved than can be achieved by a single television set, old television sets can be used usefully without being thrown out.

In view of the above, an object of the present invention is to provide a technique of combining a plurality of television sets or display apparatuses so as to achieve a higher capability than can be achieved by a single television set or a single display apparatus.

SUMMARY OF THE INVENTION

The present invention provides a first display apparatus, connectable with one or more other display apparatuses and having display means for displaying an image in accordance with an input video signal, comprising: classifying means for determining a class corresponding to a pixel of interest such that plural class reference pixels in the vicinity of the pixel of interest to be predicted are extracted from the input video signal and the class corresponding to the pixel of interest is determined from the extracted class reference pixels; prediction coefficient generation means for generating a prediction coefficient corresponding to the class determined by the classifying means; pixel prediction means for predicting the pixel of interest such that plural prediction reference pixels in the vicinity of the pixel of interest are extracted from the input video signal, and the pixel of interest is predicted by means of a prediction operation using the extracted plural prediction reference pixels and the prediction coefficient; and display control means for displaying an image including at least the pixel of interest on display means such that images displayed on the present display apparatus and said one or more other display apparatuses form, as a whole, a complete enlarged image of the image corresponding to the input video signal.

The present invention provides a first display method for a display apparatus, connectable with one or more other display apparatuses, to display an image in accordance with an input video signal, comprising: a classification step, of determining a class corresponding to a pixel of interest such that plural class reference pixels in the vicinity of the pixel of interest to be predicted are extracted from the input video signal and the class corresponding to the pixel of interest is determined from the extracted class reference pixels; a prediction coefficient generation step for generating a prediction coefficient corresponding to the class determined in the classification step; a pixel prediction step for predicting the pixel of interest such that plural prediction reference pixels in the vicinity of the pixel of interest are extracted from the input video signal, and the pixel of interest is predicted by means of a prediction operation using the extracted plural prediction reference pixels and the prediction coefficient; and a display control step, of displaying an image including at least the pixel of interest on display means such that images displayed on the present display apparatus and said one or more other display apparatuses form, as a whole, a complete enlarged image of the image corresponding to the input video signal.

The present invention provides a first program for causing a computer to control a display apparatus, which is connectable with one or more other display apparatuses, so as to display an image in accordance with an input video signal, said program comprising: a classification step, of determining a class corresponding to a pixel of interest such that plural class reference pixels in the vicinity of the pixel of interest to be predicted are extracted from the input video signal and the class corresponding to the pixel of interest is determined from the extracted class reference pixels; a prediction coefficient generation step for generating a prediction coefficient corresponding to the class determined in the classification step; a pixel prediction step for predicting the pixel of interest such that plural prediction reference pixels in the vicinity of the pixel of interest are extracted from the input video signal, and the pixel of interest is predicted by means of a prediction operation using the extracted plural prediction reference pixels and the prediction coefficient; and a display control step, of displaying an image including at least the pixel of interest on display means such that images displayed on the present display apparatus and said one or more other display apparatuses form, as a whole, a complete enlarged image of the image corresponding to the input video signal.

The present invention provides a first storage medium including a program stored thereon for causing a computer to control a display apparatus so as to display an image in accordance with an input video signal input from the outside, said program comprising: a classification step, of determining a class corresponding to a pixel of interest such that plural class reference pixels in the vicinity of the pixel of interest to be predicted are extracted from the input video signal and the class corresponding to the pixel of interest is determined from the extracted class reference pixels; a prediction coefficient generation step for generating a prediction coefficient corresponding to the class determined in the classification step; a pixel prediction step for predicting the pixel of interest such that plural prediction reference pixels in the vicinity of the pixel of interest are extracted from the input video signal, and the pixel of interest is predicted by means of a prediction operation using the extracted plural prediction reference pixels and the prediction coefficient; and a display control step, of displaying an image including at least the pixel of interest on display means such that images displayed on the present display apparatus and said one or more other display apparatuses form, as a whole, a complete enlarged image of the image corresponding to the input video signal.

The present invention provides a first display system including at least a first display apparatus and a second display apparatus connected with each other, the first display apparatus comprising: display means for displaying an image; classifying means for determining a class corresponding to a pixel of interest such that plural class reference pixels in the vicinity of the pixel of interest to be predicted are extracted from the input video signal and the class corresponding to the pixel of interest is determined from the extracted class reference pixels; prediction coefficient generation means for generating a prediction coefficient corresponding to the class determined by the classifying means; pixel prediction means for predicting the pixel of interest such that plural prediction reference pixels in the vicinity of the pixel of interest are extracted from the input video signal, and the pixel of interest is predicted by means of a prediction operation using the extracted plural prediction reference pixels and the prediction coefficient; display control means for displaying an image including at least the pixel of interest such that images displayed on the present display apparatus and the second display apparatus form, as a whole, a complete enlarged image of the image corresponding to the input video signal; and transmission means for transmitting at least part of the predicted pixel of interest; the second display apparatus comprising: input means for inputting at least part of the predicted pixel of interest; and display means for displaying the enlarged image including at least the pixel of interest.

The present invention provides a second display apparatus, connectable with one or more other display apparatuses and including display means for displaying an image, comprising: input means for inputting video signal output from one of other display apparatuses; image enlarging means for generating, from the input video signal, an enlarged image of the image corresponding to the input video signal; authentication means for performing mutual authentication with said one of other display apparatuses; and display control means for, if the authentication has been successfully passed, displaying an enlarged image generated by the image enlarging means on the display means such that images displayed on the display apparatus and said one or more other display apparatuses form, as a whole, a complete enlarged image.

The present invention provides a second display method for a display apparatus, connectable with one or more other display apparatuses and including display means for displaying an image, to display an image, comprising: an input step, of inputting video signal output from one of other display apparatuses; an image enlarging step, of generating, from the input video signal, an enlarged image of the image corresponding to the input video signal; an authentication step, of performing mutual authentication with said one of other display apparatuses; and display control means for, if the authentication has been successfully passed, displaying an enlarged image generated by the image enlarging means on the display means such that images displayed on the display apparatus and said one or more other display apparatuses form, as a whole, a complete enlarged image.

The present invention provides a second program for causing a computer to control a display apparatus connectable with one or more display apparatuses and including display means for displaying an image, said program comprising: an image enlarging step, of generating, from the input video signal, an enlarged image of the image corresponding to the input video signal; an authentication step, of performing mutual authentication with said one of other display apparatuses; and a display control step of, if the authentication has been successfully passed, displaying an enlarged image generated by the image enlarging means on the display means such that images displayed on the display apparatus and said one or more other display apparatuses form, as a whole, a complete enlarged image.

The present invention provides a second storage medium including a program stored thereon for causing a computer to control a display apparatus connectable with one or more other display apparatuses and including display means for displaying an image, said program comprising: an image enlarging step, of generating, from the input video signal, an enlarged image of the image corresponding to the input video signal; an authentication step, of performing mutual authentication with said one of other display apparatuses; and a display control step of, if the authentication has been successfully passed, displaying an enlarged image generated by the image enlarging means on the display means such that images displayed on the display apparatus and said one or more other display apparatuses form, as a whole, a complete enlarged image.

The present invention provides a second display system comprising at least a first display apparatus and a second display apparatus, the first display apparatus comprising: display means for displaying an image; and output means for outputting a video signal to be used by the second display apparatus to display an enlarged image, the second display apparatus comprising: input means for inputting the video signal output from the first display apparatus; image enlarging means for generating, from the input video signal, an enlarged image of the image corresponding to the input video signal; authentication means for performing mutual authentication with the first display apparatus; display means for displaying an image; and display control means for, if the authentication has been successfully passed, displaying an enlarged image generated by the image enlarging means on the display means such that images displayed on the first and second display apparatuses form, as a whole, a complete enlarged image.

In the first display apparatus, display method, program, and storage medium, a prediction tap used to predict a pixel of interest selected from pixels constituting an image enlarged from an input image, and a class tap used to classify the pixel of interest into one of classes are extracted from the input image, and the pixel of interest is classified on the basis of the class tap. The pixel value of the pixel of interest is then predicted using the prediction tap and a tap coefficient which corresponds to the class of the pixel of interest and which is selected from tap coefficients which have been prepared by means of learning for each class. An enlarged image made up of predicted pixels is displayed on the display means so that images displayed on the present display apparatus and other display apparatus form, as a whole, a complete enlarged image.

In the first display system, a prediction tap used to predict a pixel of interest selected from pixels constituting an image enlarged from an input image, and a class tap used to classify the pixel of interest into one of classes are extracted from the input image, and the pixel of interest is classified on the basis of the class tap. The pixel value of the pixel of interest is then predicted using the prediction tap and a tap coefficient which corresponds to the class of the pixel of interest and which is selected from tap coefficients which have been prepared by means of learning for each class. An enlarged image made up of predicted pixels is displayed on the display means so that the images displayed over the entire screen areas of the present display apparatus and other display apparatus form, as a whole, a complete enlarged image.

In the second display apparatus, display method, program, and storage medium, an input image is converted into an enlarged image similar to the input image. If mutual authentication performed between the present display apparatus and one or more other display apparatuses has been successfully passed, enlarged images are displayed on the present display apparatus and the one or more other display apparatus so that the images displayed on the respective display apparatus form, as a whole, a complete enlarged image.

In the second display system, an input image is converted into an enlarged image similar to the input image. If mutual authentication performed between the present display apparatus and one or more other display apparatuses has been successfully passed, enlarged images are displayed on the present display apparatus and the one or more other display apparatus, over the entire their screen areas, so that the images displayed on the respective display apparatus form, as a whole, a complete enlarged image.

BRIEF DESCRIPTION OF THE DRAWINGS

FIG. 4 is a perspective view showing an example of the external structure of a slave device;

FIG. 14 is a table showing offset addresses, names, and operations of a CSR;

FIG. 16 is a diagram showing details of bus_info_block, root_directory, and unit_directory;

FIG. 17 is a diagram showing the structure of a PCR;

FIGS. 18A to 18D are diagrams showing structures of oMPR, oPCR, iMPR, and iPCR, respectively;

FIGS. 20A to 20C are diagrams showing specific examples of AV/C commands;

FIGS. 21A and 21B are diagrams showing specific examples of an AV/C command and a response thereto;

FIG. 39 is a flow chart showing a full image enlarging process performed by the master device;

DESCRIPTION OF THE PREFERRED EMBODIMENTS

Figure 1B:
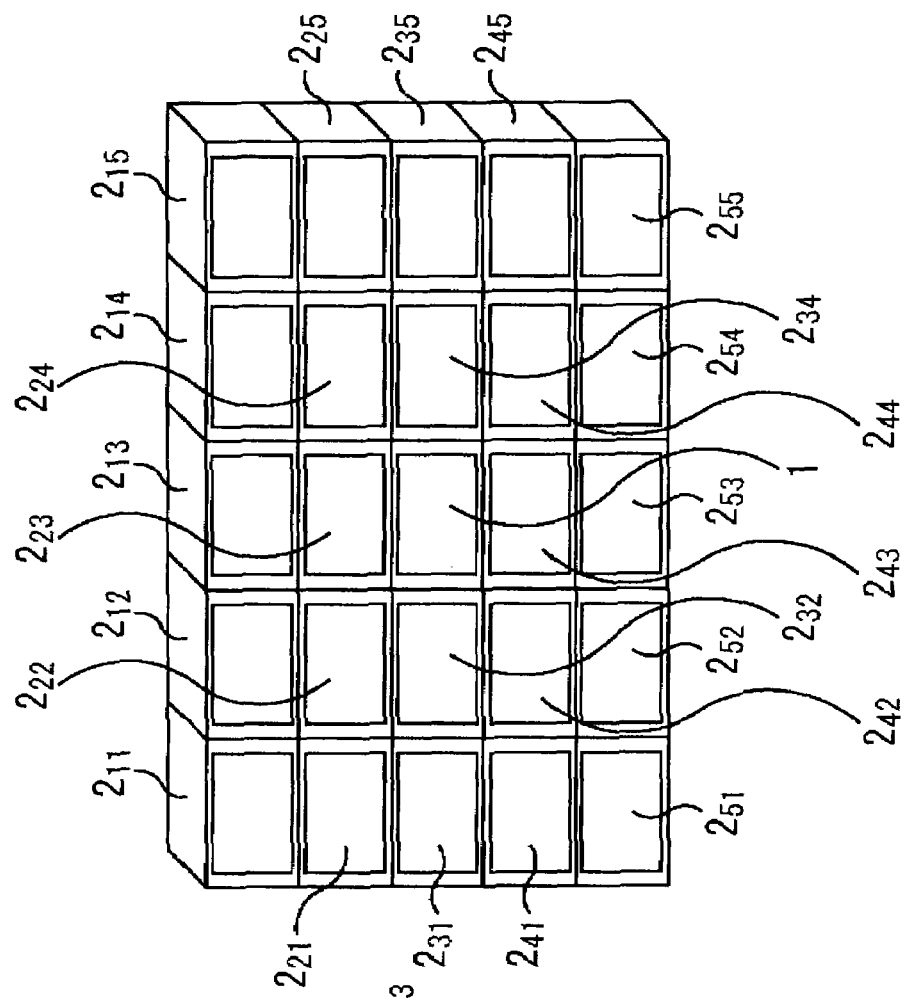
FIGS. 1A and 1B are perspective views showing examples of constructions of a scalable TV system according to the present invention.

FIG. 1 is a perspective view showing an example of a construction of a scalable TV (Television) system (the term "system" is used in the present description to express a collection of a plurality of apparatuses logically coupled with each other, in which the apparatuses may or may not be located in a single case) according to the present invention.

Figure 1A:
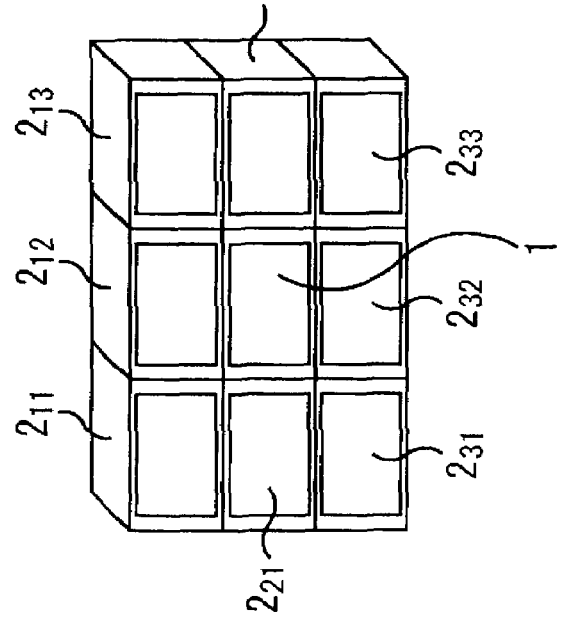

In an embodiment shown in FIG. 1A, a scalable TV system includes nine television sets 1, $2_{11}$, $2_{12}$, $2_{13}$, $2_{21}$, $2_{23}$, $2_{31}$, $2_{32}$, and $2_{33}$. In an embodiment shown in FIG. 1B, a scalable TV system includes twenty five television sets 1, $2_{11}$, $2_{12}$, $2_{13}$, $2_{14}$, $2_{15}$, $2_{21}$, $2_{22}$, $2_{23}$, $2_{24}$, $2_{25}$, $2_{31}$, $2_{32}$, $2_{34}$, $2_{35}$, $2_{41}$, $2_{42}$, $2_{43}$, $2_{44}$, $2_{45}$, $2_{51}$, $2_{52}$, $2_{53}$, $2_{54}$, and $2_{55}$.

Note that the number of television sets included in the scalable TV system is not limited to either 9 or 25. That is, the number of television sets included in the scalable TV system may be set to an arbitrary number equal to or greater than 2. The arrangement of television sets of the scalable TV system is not limited to either a 3×3 arrangement or a 5×5 arrangement shown in FIG. 1A or 1B. That is, television sets in the scalable TV system may be arranged in various fashions. For example, 1×2, 2×1, 2×3, or other arrangements may be employed. Furthermore, the positional arrangement of television sets in the scalable TV system is not limited to a matrix arrangement such as that shown in FIG. 1. For example, a pyramid-shaped arrangement may also be employed.

In the scalable TV system, an arbitrary number of television sets may be arranged in horizontal and vertical directions. In this sense, the system is "scalable".

The scalable TV system includes two types of television sets: a master device which can control other television sets; and slave devices which can be controlled by another television set but which cannot control any other television set.

In order that the scalable TV system has various capabilities which will be described later, it is required that the television sets in the scalable TV system should have a capability of operating as a member of the scalable TV system (hereinafter, a television set having such a capability will be referred to simply as a scalable device) and it is also required that at least one of members is a master device. In the embodiments shown in FIGS. 1A and 1B, one of television sets of the scalable TV system (one located at the center, for example) is selected to be a master device 1.

As can be understood from the above description, if a system includes a television set which does not have the scalable capability, the system cannot operate as a scalable TV system. Furthermore, even when all television sets included in a system have the scalable capability, if they are all slave devices, the system cannot function as a scalable TV system.

Therefore, to enjoy functions provided by a scalable TV system, a user has to purchase at least one or more master devices, or one master device and one or more slave devices.

A master device can also operate as a slave device. Therefore, the scalable TV system can include a plurality of master devices.

In the embodiment shown in FIG. 1A, a master device 1 is located at the center (at a second place as counted from the left end and at a second place as counted from the top) of the 3×3 arrangement and the other eight television sets $2_{11}$, $2_{12}$, $2_{13}$, $2_{21}$, $2_{23}$, $2_{31}$, $2_{32}$, and $2_{33}$ are of the slave type. In the example shown in FIG. 1B, a scalable TV system includes 5×5 television sets, in which a television set 1 located at the center (at a third place as counted from the left end and at a third place as counted from the top) serves as a master device, and the other twenty four television sets $2_{11}$, $2_{12}$, $2_{13}$, $2_{14}$, $2_{15}$, $2_{21}$, $2_{22}$, $2_{23}$, $2_{24}$, $2_{25}$, $2_{31}$, $2_{32}$, $2_{34}$, $2_{35}$, $2_{41}$, $2_{42}$, $2_{43}$, $2_{44}$, $2_{45}$, $2_{51}$, $2_{52}$, $2_{53}$, $2_{54}$, and $2_{55}$ serve as slave devices.

Although in the example shown in FIG. 1, the master device 1 is placed at the center of the arrangement of television sets of the scalable TV system, the location of the master device 1 is not limited to the center of the arrangement of television sets, but the master device 1 may be placed at an arbitrary location such as the top left or bottom right location.

In any case in which a master device 1 is located at an arbitrary place, a television set located as the center of the arrangement of the scalable TV system can be regarded as a master device in various processed described below.

Hereinafter, for simplicity, the scalable TV system includes 3×3 television sets as shown in FIG. 1A, and the master device 1 is assumed to be located at the center of the arrangement of television sets of the scalable TV system.

The location of each slave device 2 in the scalable TV system is denoted by a suffix following "slave device 2". For example, a slave device $2_{ij}$ denotes a slave device located in an ith row and a jth column (at an ith place as counted from the left end and at a jth place as counted from the top.

Hereinafter, when it is not necessary to distinguish slave devices $2_{ij}$ from each other, a simple expression of "slave device(s) 2" will be used.

Figure 2:
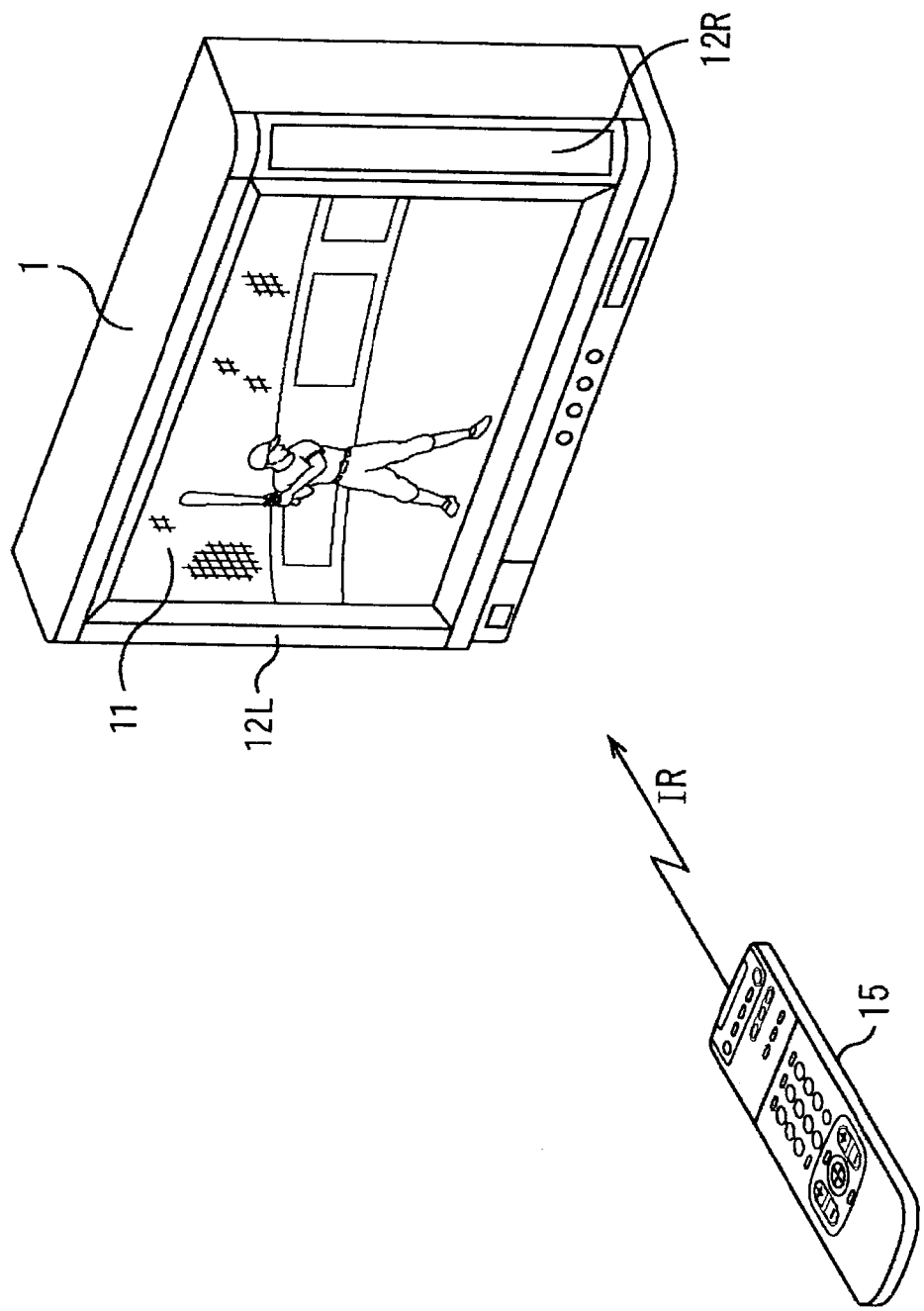
FIG. 2 is a perspective view showing an example of the external structure of a master device.

FIG. 2 is a perspective view showing an example of a structure of a television set serving as a master device 1.

The television set used as the master device 1 has a display screen with a size of, for example, 14 inches or 15 inches. The master device 1 includes a CRT (Cathode Ray Tube) 11 for displaying an image, located at the center of the front panel. Speaker units 12L and 12R for outputting a sound/voice are located on the left side and right side, respectively, of the front panel.

An image is displayed on the CRT 11 in accordance with a television broadcasting signal received via an antenna (not shown). L (Left)-channel and R (Right)-channel voices/sounds associated with the image are output from speaker units 12L and 12R, respectively.

A remote commander 15 for emitting an IR (Infrared Ray) is used in conjunction with the master device 1. By operating the remote commander 15, a user can issue various commands such as a channel selection command, a volume setting command, and the like to the master device 1.

The remote commander 15 is not limited to the one which communicates with the master device 1 via an infrared ray, but other types of wireless remote commanders such as that based on the BlueTooth (trademark) technology may also be employed.

The remote commander 15 can control not only the master device 1 but also slave devices 2.

FIG. 3 shows an example of the structure of the master device 1 shown in FIG. 2, viewed from six different sides.

Figure 3B:
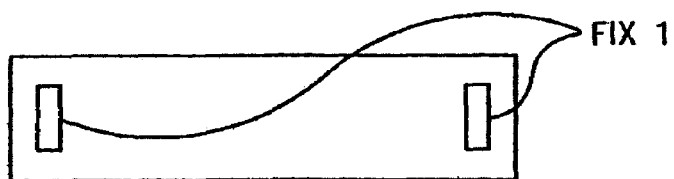
FIGS. 3A to 3F are views, seen from different six sides, of the external structure of the master device.
Figure 3D:
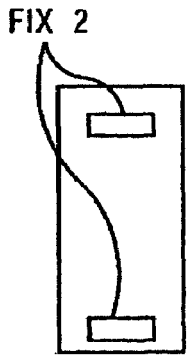
Figure 3A:
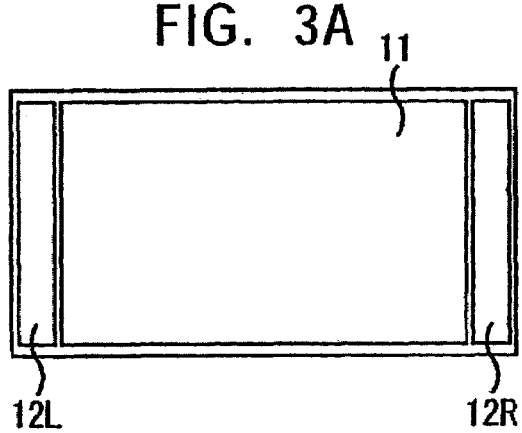
Figure 3E:
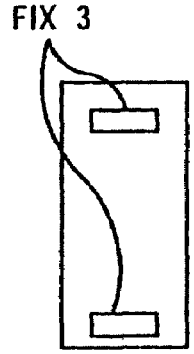
Figure 3C:
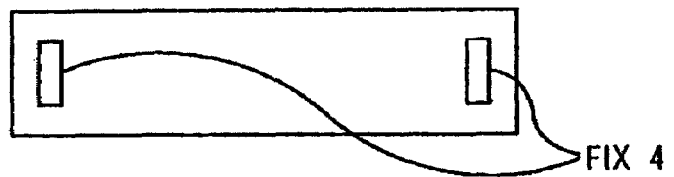
Figure 3F:
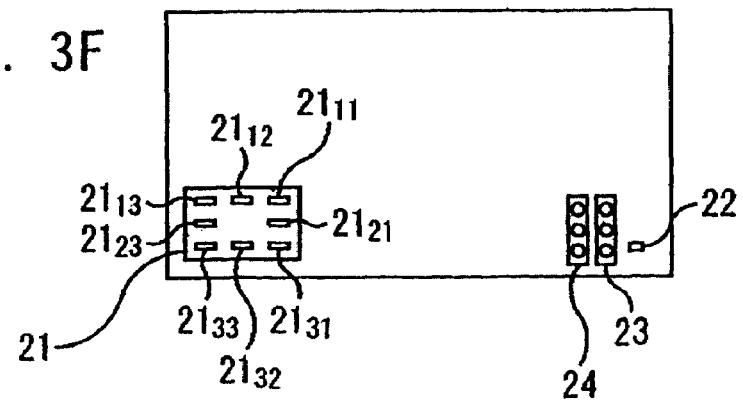

That is, the structure of the master device 1 viewed from the front side is shown in FIG. 3A, the structure viewed from the upper side is shown in FIG. 3B, the structure viewed from the bottom side is shown in FIG. 3C, the structure viewed from the left side is shown in FIG. 3D, the structure viewed from the right side is shown in FIG. 3E, and the structure viewed from the back side is shown in FIG. 3F.

Fixing mechanisms FIX-1 to FIX-4 are formed on the upper side (FIG. 3B), the bottom side (FIG. 3C), the left side (FIG. 3D), and the right side (FIG. 3E), respectively, of the master device 1. As will be described later, similar fixing mechanisms FIX-5 to FIX-8 are also formed on the upper side, the bottom side, the left side, and the right side of each television set serving as a slave device 2 so that when slave devices 2 or another master device 1 are placed on the upper side, below the bottom side, on the left side, or the on the right side of the master device 1, the fixing mechanisms formed on the upper side, the bottom side, the left side, and the right side of the master device 1 fit with the fixing mechanisms with corresponding fixing mechanisms formed on the sides of the slave devices 2 or another master device 1 thereby ensuring that the master device 1 and the slave devices 2 or another master device are securely coupled with each other. This prevents the television sets in the scalable TV system from moving from their correct positions.

Each fixing mechanism may be realized by means of a mechanical structure or another means such as a magnet.

As shown in FIG. 3F, a terminal panel 21, an antenna terminal 22, an input terminal 23, and an output terminal 24 are disposed on the back side of the master device 1.

On the terminal panel 21, there are disposed eight IEEE (Institute of Electrical and Electronics Engineers) 1394 terminals $21_{11}$, $21_{12}$, $21_{13}$, $21_{21}$, $21_{23}$, $21_{31}$, $21_{32}$, and $21_{33}$ for electrical connection with eight slave devices $2_{11}$, $2_{12}$, $2_{13}$, $2_{21}$, $2_{23}$, $2_{31}$, $2_{32}$, and $2_{33}$ in the scalable TV system shown in FIG. 1A.

In the example shown in FIG. 3F, in order to make it possible for the master device 1 to recognize the locations of the slave devices $2_{ij}$ in the scalable TV system shown in FIG. 1A, IEEE1394 terminals $21_{ij}$ connected to the respective slave devices $2_{ij}$ are formed on the terminal panel 21 such that the locations of the IEEE1394 terminals $21_{ij}$ on the terminal panel 21 correspond, when viewed from the back side, to the locations of the respective slave devices $2_{ij}$ in the scalable TV system shown in FIG. 1A.

That is, in the example of the scalable TV system shown in FIG. 1A, a user connects the master device 1 with the slave devices $2_{11}$ via the IEEE1394 terminal $21_{11}$, the slave device $2_{12}$ via the IEEE1394 terminal $21_{12}$, the slave device $2_{13}$ via the IEEE1394 terminal $21_{13}$, the slave device $2_{21}$ via the IEEE1394 terminal $21_{21}$, the slave device $2_{23}$ via the IEEE1394 terminal $21_{23}$, the slave device $2_{31}$ via the IEEE1394 terminal $21_{31}$, the slave device $2_{32}$ via the IEEE1394 terminal $21_{32}$, and the slave device $2_{33}$ via the IEEE1394 terminal $21_{33}$.

In the scalable TV system shown in FIG. 1A, there is no specific limitation on which one of the IEEE1394 terminals on the terminal panel 21 should be used to connect a slave device $2_{ij}$. However, when a slave device $2_{ij}$ is connected via a IEEE1394 terminal other than the IEEE1394 terminal $21_{ij}$, it is required to perform setting (by a user) so that the master device 1 can recognize that the slave device $2_{ij}$ is located in the ith row and jth column in the scalable TV system shown in FIG. 1A.

Although in the example shown in FIG. 3F, the master device 1 is connected with eight slave devices $2_{11}$ to $2_{33}$ in a parallel fashion via eight IEEE1394 terminals $21_{11}$ to $21_{33}$ formed on the terminal panel 21, the master device 1 may by connected with eight slave devices $2_{11}$ to $2_{33}$ in a serial fashion. In this case, a slave device $2_{ij}$ is connected with the master device 1 via another slave device $2_{i'j'}$. However, also in this case, it is required to perform setting such the master device 1 can recognize that the slave device $2_{ij}$ is located in the ith row and jth column in the arrangement of the scalable TV system shown in FIG. 1A. Thus, the number of IEEE1394 terminals disposed on the terminal panel 21 is not limited to 8.

Furthermore, the technique of the electrical connection between television sets in the scalable TV system is not limited to that based on the IEEE1394 standard, but the electrical connection may also be accomplished using other techniques such as a LAN (according to the IEEE802 standard). Furthermore, in the electrical connection between television sets in the scalable TV system, wireless transmission may be employed instead of cable transmission.

An antenna (not shown) is connected to the antenna terminal 22 via a cable so that a television broadcasting signal received by the antenna is supplied to the master device 1. The input terminal 23 is used to make connection with, for example, a VTR (Video Tape Recorder) to receive video data and audio data output from the VTR. Video data and audio data of, for example, a television broadcasting signal being received by the master device 1 are output from the output terminal 24.

FIG. 4 is a perspective view showing the structure of a television set serving as a slave device 2.

The slave device 2 is a television set having the same screen size as that of the master device 1 shown in FIG. 2. The slave device 2 includes a CRT (Cathode Ray Tube) 31 for displaying an image, located at the center of the front panel. Speaker units 32L and 32R for outputting a sound/voice are located on the left side and right side, respectively, of the front panel. The screen size is not necessarily needed to be equal for the master device 1 and the slave devices 2.

An image is displayed on a CRT 31 in accordance with a television broadcasting signal received via an antenna (not shown), and L-channel and R-channel audio signals associated with the image are output from speaker units 32L and 32R, respectively.

There is also a remote commander 35, similar to that for use with the master device 1, for emitting an infrared ray IR to control the slave device 2. A user can transmit various commands such as channel selection command or a volume control command to the slave device 2 by operating the remote commander 35.

The remote commander 35 can control not only the slave device 2 but also the master device 1.

In order to realize the scalable TV system shown in FIG. 1A, a user has to purchase one master television system 1 and eight slave devices $2_{11}$ to $2_{33}$. If a remote commander 15 comes with the master device 1 and remote commanders 35 come with the respective eight slave devices $2_{11}$ to $2_{33}$, the user will have nine remote commanders, which will cause the user to have to make a troublesome job to manage the remote commanders.

To avoid the above problem, the remote commander 35 of each slave device 2 may be sold as an optional part separately from the slave device 2. Similarly, the remote commander 15 of the master device 1 may be sold as an optional part separately from the master device 1.

Because both remote commanders 15 and 35 are capable of controlling the master devices 1 and the slave devices 2, the user can control the master device 1 and any slave device 2 using a single remote commander 15 or 35.

FIG. 5 shows an example of the structure of the slave device 2 shown in FIG. 4, viewed from six different sides.

Figure 5B:
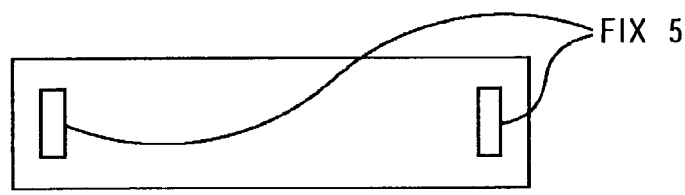
FIGS. 5A to 5F are views, seen from different six sides, of the external structure of the slave device.
Figure 5D:
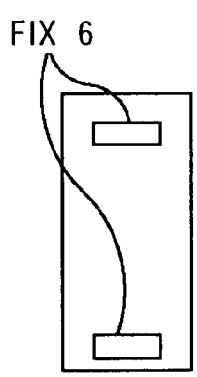
Figure 5A:
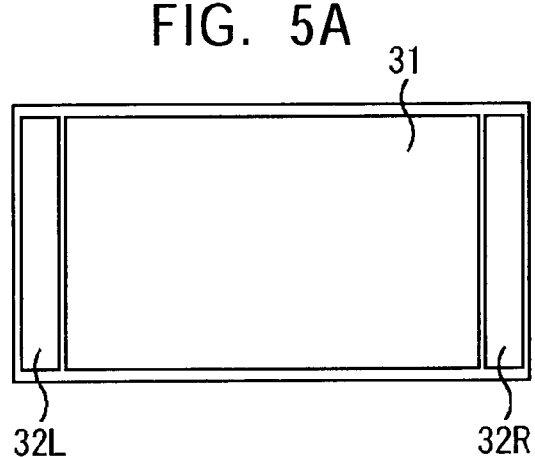
Figure 5E:
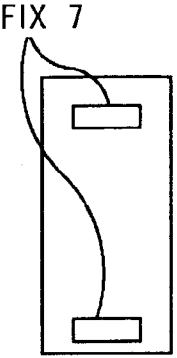
Figure 5C:
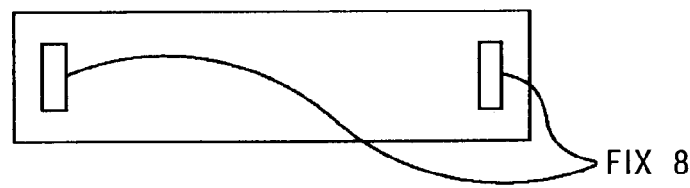
Figure 5F:
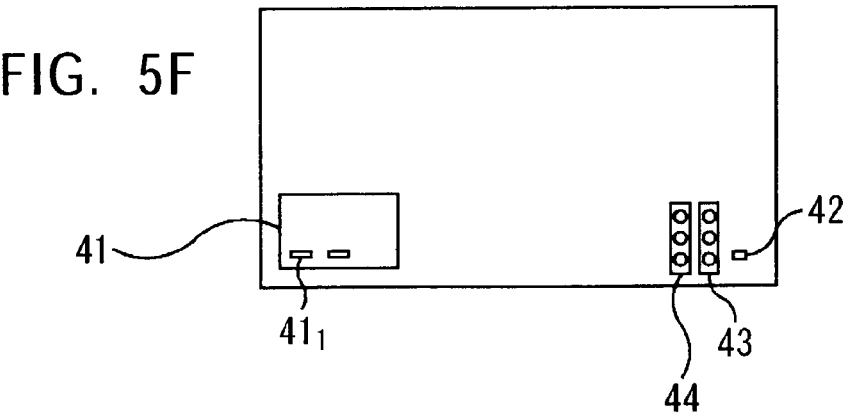

That is, the structure of the slave device 2 viewed from the front side is shown in FIG. 5A, the structure viewed from the upper side is shown in FIG. 5B, the structure viewed from the bottom side is shown in FIG. 5C, the structure viewed from the left side is shown in FIG. 5D, the structure viewed from the right side is shown in FIG. 5E, and the structure viewed from the back side is shown in FIG. 5F.

Fixing mechanisms FIX-5 to FIX-8 are formed on the upper side (FIG. 5B), the bottom side (FIG. 5C), the left side (FIG. 5D), and the right side (FIG. 5E), respectively, of the slave device 2 so that when the master device 1 or other slave devices are placed on the upper side, below the bottom side, on the left side, or the on the right side of the slave device 2, the fixing mechanisms formed on the upper side, the bottom side, the left side, and the right side of the slave device 2 fit with the fixing mechanisms with corresponding fixing mechanisms formed on the sides of the master device 1 or other slave devices thereby ensuring that the slave device 2 and other slave devices 2 or the master device 1 are securely coupled with each other.

As shown in FIG. 5F, a terminal panel 41, an antenna terminal 42, an input terminal 43, and an output terminal 44 are disposed on the back side of the slave device 2.

On the terminal panel 41, there is disposed an IEEE1394 terminal $41_1$ for electrically connecting the slave device 2 with the master device 1. In the case in which the slave device 2 is used, for example, as a slave device $2_{11}$ placed at the upper left location in the arrangement of the scalable TV system shown in FIG. 1A, the IEEE1394 terminal $4_{11}$ on the terminal panel 41 is connected to the IEEE1394 terminal $21_{11}$ on the terminal panel 21 shown in FIG. 3F via an IEEE1394 cable (not shown).

The number of IEEE1394 terminals on the terminal panel 41 is not limited to 1.

An antenna (not shown) is connected to the antenna terminal 42 via a cable (not shown) so that a television broadcast signal received by the antenna is applied to the slave device 2. The input terminal 43 is used to make connection with, for example, a VTR so as to receive video data and audio data output from the VTR. Video data and audio data of, for example, a television broadcast signal being received by the slave device 2 are output from the output terminal 44.

As described above, the scalable TV system shown in FIG. 1A is constructed by placing a total of nine television sets including one master device 1 and eight slave devices $2_{11}$ to $2_{33}$ in a 3×3 array fashion.

Figure 6:
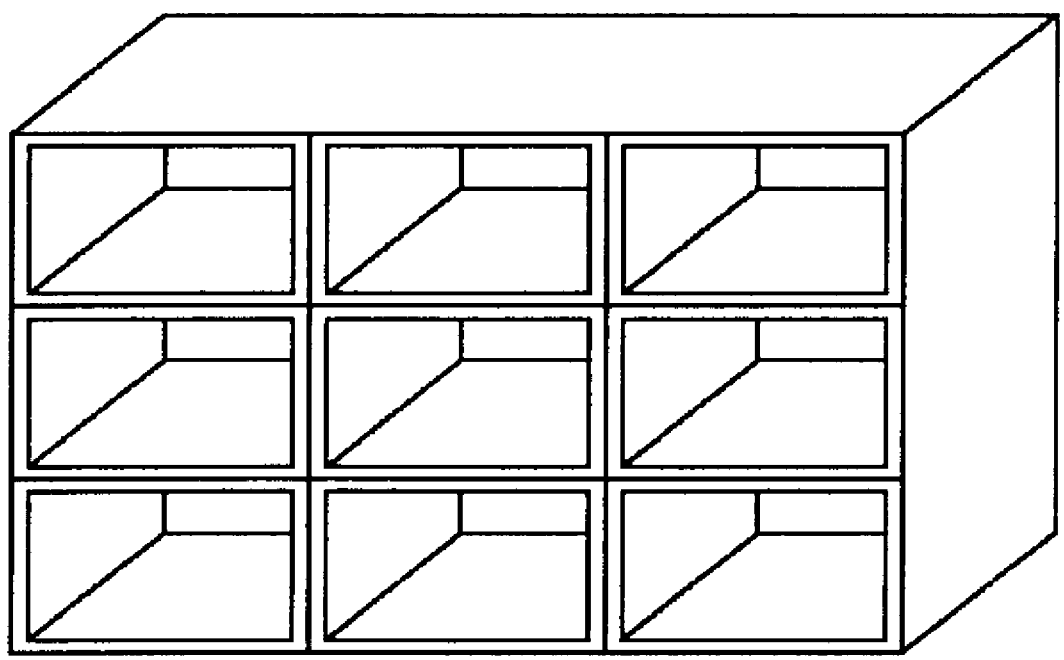
FIG. 6 is a perspective view showing an example of an external structure of a dedicated rack for installing master device and slave devices of a scalable TV system.

Although in the above-described example, the scalable TV system shown in FIG. 1A is constructed by placing television sets serving as a master device or slave devices side by side in the horizontal and vertical directions such that adjacent television sets are directly connected with each other without being spaced, television sets may also be placed on a rack such as that shown in FIG. 6 designed for use in the scalable TV system. Use of such a rack designed for use in the scalable TV system makes it possible to prevent the television sets in the scalable TV system from moving from their correct positions in a more secure fashion.

In the case in which the scalable TV system is constructed by placing television sets serving as a master device or slave devices side by side in the horizontal and vertical directions such that they are directly connected with each other without being spaced, it is impossible to place, for example, the master device 1 in the second row and in the second column as shown in FIG. 1A unless there is at least a slave device $2_{32}$. In contrast, in the case in which the rack, such as that shown in FIG. 6, designed for use in the scalable TV system is used, the master device 1 can be placed in the second row and in the second column even when there is no slave device $2_{32}$ placed in the third row in the second column.

Figure 7:
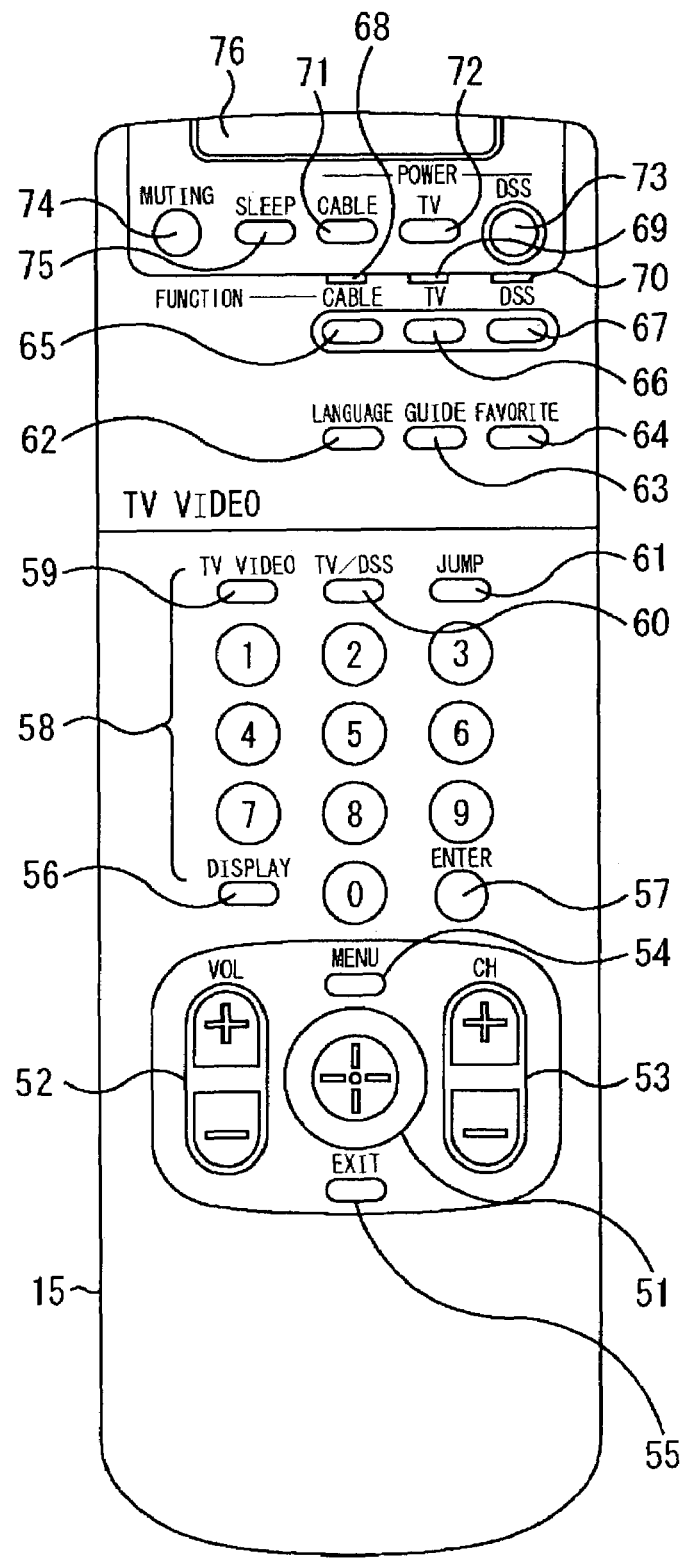
FIG. 7 is a plan view showing an example of an external structure of a remote commander 15.

FIG. 7 is a plan view showing an example of the structure of the remote commander.

A select button switch 51 accepts operations in an upward direction, a downward direction, a leftward direction, and a rightward diction, and also in four slanting directions between adjacent two directions of the former four directions. The select button switch 51 also accepts an operation (selection) performed in a direction (select direction) perpendicular to the upper surface of the remote commander 15. If a menu button switch 54 is pressed, a menu screen is displayed on the CRT 11 of the master device 1 (or the CRT 31 of the slave device 2) thereby allowing a user to perform various kinds of setting (such as specifying of the location of a particular slave device in the arrangement of the scalable TV system) or input commands to request various kinds of processing.

When the menu screen is displayed, a cursor for pointing to a particular item in the menu is also displayed on the CRT 11. The cursor can be moved by operating the select button switch 51. More specifically, the cursor moves in a direction corresponding to a direction in which the select button switch 51 is operated. When the cursor is on a particular item, if the select button switch 51 is operated in the select direction, the item pointed to by the cursor is selected. In the present embodiment, as will be described in further detail later, items displayed in the menu include icons. A desired icon can be clicked by operating the select button switch 51 in the select direction.

An exit button switch 55 is used to exit the menu screen to return to an original normal screen.

Volume button switches 52 are used to increase or decrease the sound volume. Channel up/down button switches 53 are used to increase or decrease the channel number of a broadcast channel to be received.

If one of numerical button switches (ten-key switches) 58 labeled numerals 0 to 9 is pressed, a numeral labeled on the pressed numerical button switch is input. If an enter button switch 57 is pressed after completion of inputting one or more numerals using numerical button switches 58, a command indicating the end of inputting of numerals is input. When the channel is switched, a new channel number or the like is displayed in the OSD (On Screen Display) fashion on the CRT 11 of the master device 1 (or the CRT 31 of the slave device 2) for a predetermined period of time. A display button 56 is used to turn on/off the displaying of the channel number being currently selected or the volume level being currently selected.

A TV/video button switch 59 is used to switch the input applied to the master device 1 (or the slave device 2) between the input given by a tuner 121 which is disposed in the master device 1 and which will be described later with reference to FIG. 10 (or the input given by a tuner 141 which will be described later with reference to FIG. 11) and the input given via the input terminal 23 shown in FIG. 3 (or the input terminal 43 shown in FIG. 5). A TV/DSS button switch 60 is used to switch the reception mode between a TV mode in which ground wave broadcast is received via the tuner 121 and a DSS (Digital Satellite System (trademark of Hughes Communications, Inc.) mode in which satellite broadcast is received. If the channel is switched by operating one or more numerical button switches 58, data indicating the previous channel is retained. If a jump button switch 61 is pressed, the channel is switched to the previous channel.

A language button 62 is used to select a desired language when two or more languages are available in the broadcast being received. When video data being displayed on the CRT 11 includes closed caption data, if a guide button switch 63 is operated, the closed caption data is displayed. A favorite button switch 64 is used to select a favorite channel which has been selected by a user in advance.

A cable button switch 65, a TV switch 66, and a DSS button switch 67 are used to select a device category to be controlled by command codes transmitted via an infrared ray emitted from the remote commander 15. That is, the remote commander 15 (and also the remote commander 35) is capable of remotely controlling not only television sets serving as the master device 1 or slave devices 2 but also an STB (Set Top Box) or an IRD (Integrated Receiver and Decoder) (not shown), and the cable button switch 65, the TV switch 66, and the DSS button switch 67 are used to select a device to be controlled. For example, if the cable button switch 65 is pressed, the STB for receiving a signal via a CATV network is selected as a device to be controlled by the remote commander. In the sate in which the STB is selected, if the remote commander 15 is operated, an infrared array carrying one of command codes associated with the STB is emitted from the remote commander 15. Similarly, if the TV button switch 66 is pressed, the master device 1 (or the slave device 2) is selected as a device to be controlled by the remote commander 15. The DSS button switch 67 is used to select the IRD for receiving a signal transmitted from a satellite as a device to be controlled by the remote commander 15.

LEDs (Light Emitting Diodes) 68, 69, and 70 are lit when the cable button switch 65, the TV button switch 66, or the DSS button switch 67 is pressed so that a user can know which device category is currently selected as a device category to be controlled by the remote commander 15. The LEDs (Light Emitting Diodes) 68, 69, and 70 are turned off when the cable button switch 65, the TV button switch 66, or the DSS button switch 67 is turned off.

A cable power button switch 71, a TV power button switch 72, and a DSS power button switch 73 are used to turn on/off the power of the STB, the master device 1 (or the slave device 2), or the IRD.

A muting button switch 74 is used to set or release the master device 1 (or the slave device 2) into or from a muted state. A sleep button switch 75 is used to set or reset the sleep mode in which electric power is automatically turned off at a specified time or when a specified period of time has elapsed.

An infrared ray emitter 76 emits an infrared ray in response to an operation performed on the remote commander 15.

Figure 8:
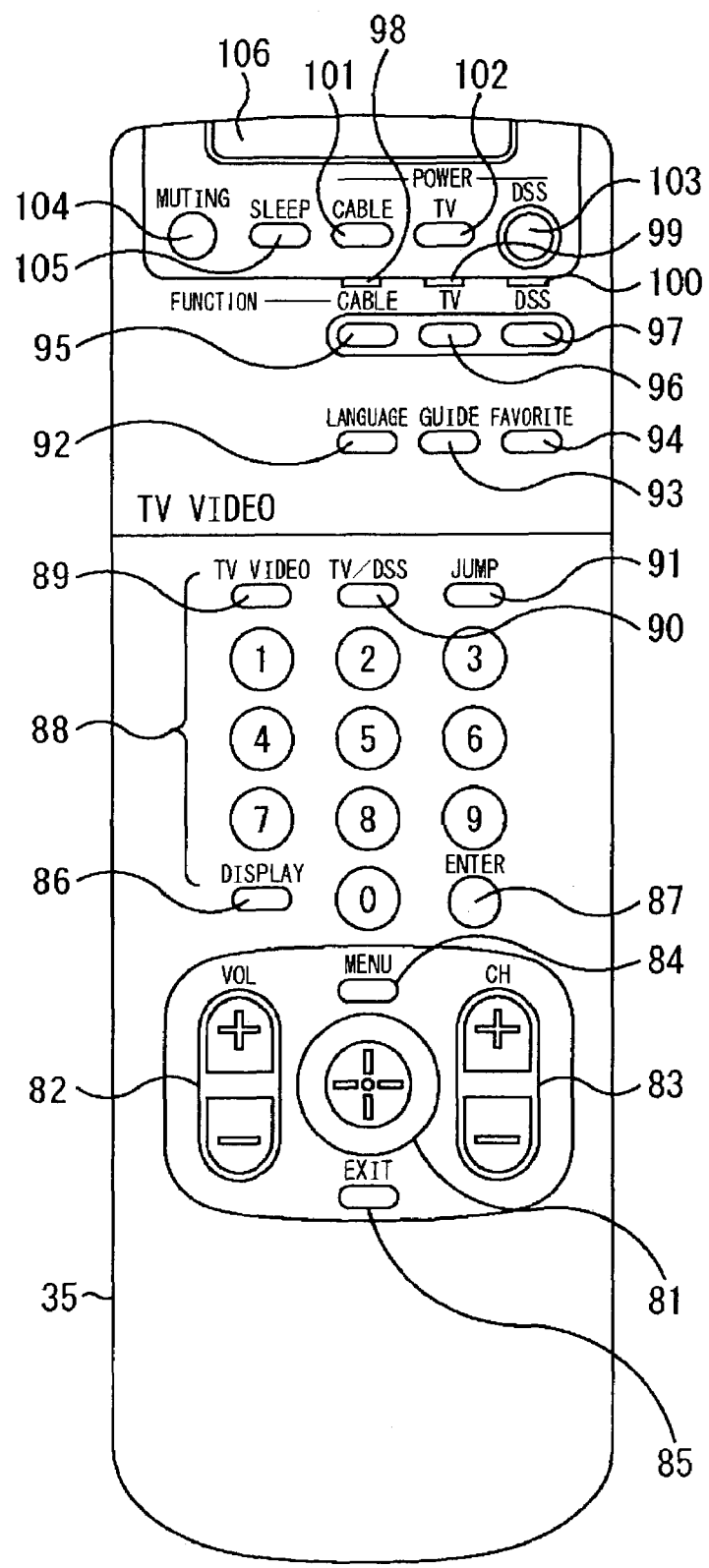
FIG. 8 is a plan view showing an example of an external structure of another remote commander.

FIG. 8 is a plan view showing an example of the structure of the remote commander 35 for use with the slave device 2.

The remote commander 35 is made up of parts such as a select button switch 81, . . . , and an infrared ray emitter 106 similar to those such as the select button switch 51, . . . , and the infrared ray emitter 76 of the remote commander 15 shown in FIG. 7, and thus further description is not provided herein.

Figure 9:
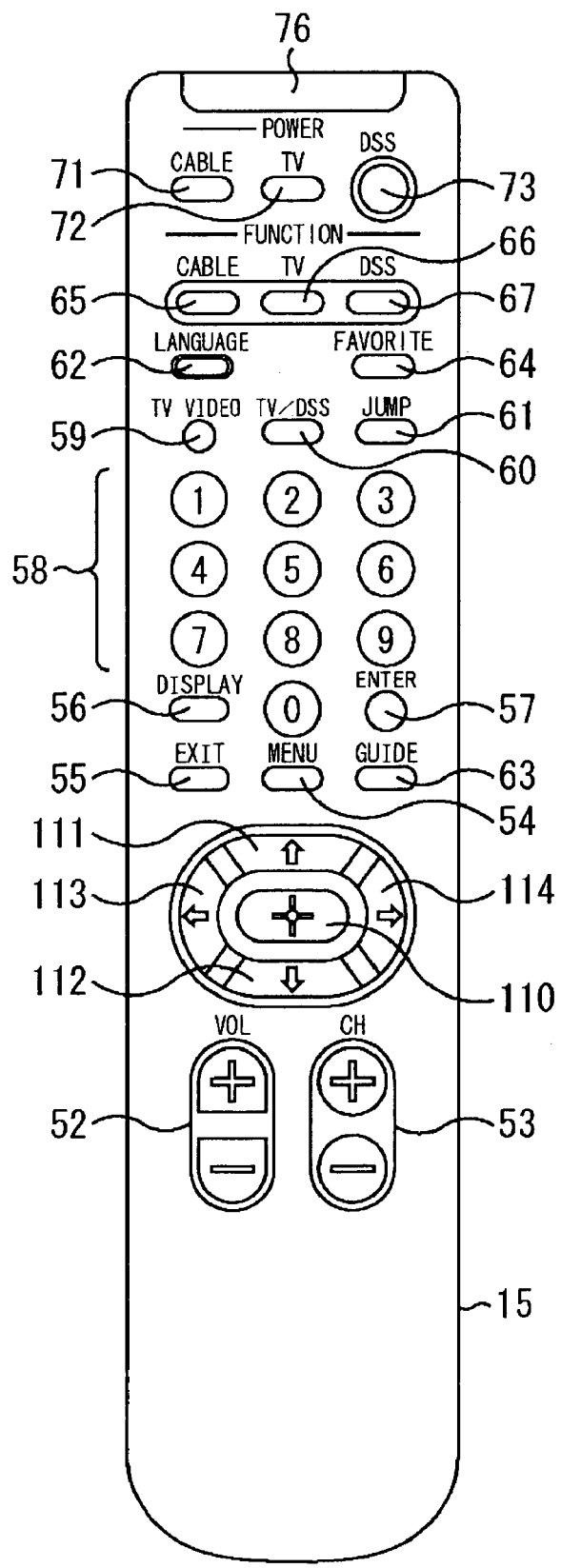
FIG. 9 is a plan view showing another example of an external structure of the remote commander.

FIG. 9 is a plan view showing another example of the structure of the remote commander 15 used to control the master device 1.

In the example shown in FIG. 9, instead of the select button switch 51, shown in FIG. 7, capable of being operated in eight directions, there are provided four arrow buttons 111, 112, 113, and 114 pointed in up, down, left, and right directions, respectively, and a select button switch 110. Furthermore, in the example shown in FIG. 9, a cable button switch 65, a TV button switch 66, and a DSS button switch 67 are of the self-lit type, and thus the LEDs 68 to 70 employed in the example shown in FIG. 7 are not provided. LEDs (not shown) are placed on the rear side of the restive button switches 65 to 67 so that when one of button switches 65 to 67 is pressed, an LED corresponding to the pressed button switch is turned on or off.

The other buttons are substantially similar to those shown in FIG. 7, although their locations are different.

The remote commander 35 used to control the slave device 2 may also be constructed in a similar manner to that shown in FIG. 9.

The remote commander 15 may include a gyroscope for detecting the movement of the remote commander 15. This makes it possible for the remote commander 15 to detect the moving direction and the moving distance of the remote commander 15, using the gyroscope disposed in the remote commander 15, and move the cursor displayed on the menu screen in a direction by a distance corresponding to the detected direction and distance. In the case in which the remote commander 15 includes such a gyroscope, it becomes unnecessary for the select button switch 51 in the example shown in FIG. 7 to have the capability of detecting the eight directions in which the select button switch 51 is operated, while it becomes unnecessary for the example shown in FIG. 9 to include the arrow button switches Ill to 114. The remote commander 35 may also include a similar gyroscope.

Figure 10:
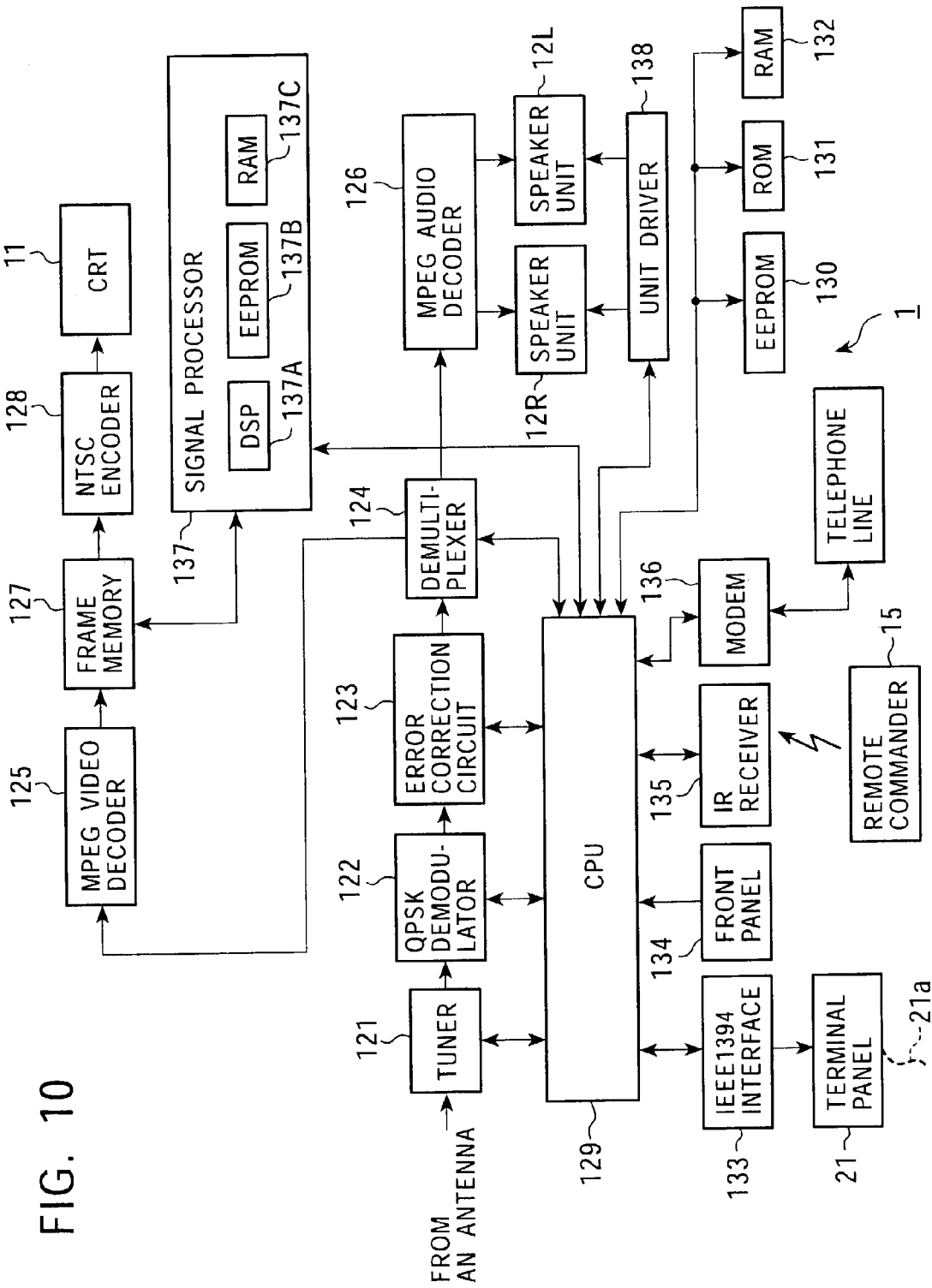
FIG. 10 is a block diagram showing an example of an electrical configuration of the master device.

FIG. 10 shows an example of an electrical configuration of the master device 1.

A television broadcasting signal received by the antenna (not shown) is applied to a tuner 121. The tuner 121 detects and demodulates the television broadcasting signal under the control of a CPU 129. The output of the tuner 121 is applied to a QPSK (Quadrature Phase Shift Keying) demodulator 122. The QPSK demodulator 122 QPSK-demodulates the applied signal under the control of the CPU 129 and outputs the resultant QPSK-demodulated signal to an error correction circuit 123. The error correction circuit 123 detects and corrects an error under the control of the CPU 129 and outputs the resultant corrected signal to a demultiplexer 124.

Under the control of the CPU 129, the demultiplexer 124 descrambles, if required, the signal received from the error correction circuit 123 and then extracts TS (Transport Stream) packets of a particular channel. The demultiplexer 124 supplies TS packets associated with video data to an MPEG (Moving Picture Experts Group) video decoder 125 and also supplies TS packets associated with audio data to an MPEG audio decoder 126. The demultiplexer 124 supplies TS packets included in the output of the error correction circuit 123 to the CPU 129, as required. The demultiplexer 124 also receives video data or audio data (which may be in the form of TS packets) from the CPU 129 and supplies the received video data or audio data to the MPEG video decoder 125 or the MPEG audio decoder 126.

The MPEG video decoder 125 performs MPEG-decoding on the video data in the form of TS packets received from the demultiplexer 124 and supplies the resultant decoded data to a frame memory 127. The MPEG audio decoder 126 performs MPEG-decoding on the audio data in the form of TS packets received from the demultiplexer 124. L-channel audio data and R-channel audio data obtained as a result of decoding performed by the MPEG audio decoder 126 are supplied to the speaker units 12L and 12R, respectively.

The frame memory 127 temporarily stores the video data received from the MEPG video decoder 125. After temporarily storage, the frame memory 127 outputs the video data to an NTSC (National Television System Committee) encoder 128. The NTSC encoder 128 converts the video data received from the frame memory 127 into video data in the NTSC format and the outputs the resultant NTSC video data to the CRT 11. The CRT 11 displays an image in accordance with the received video data.

The CPU 129 performs various processes in accordance with programs stored in an EEPROM (Electrically Erasable Programmable Read Only Memory) 130 or a ROM (Read Only Memory) 131 to control the tuner 121, the QPSK demodulator 122, the error correction circuit 123, the demultiplexer 124, the IEEE1394 interface 133, the modem 136, the signal processor 137, and the unit driver 138. The CPU 129 supplies the data received from the demultiplexer 124 to the IEEE1394 interface 133, and the data received from the IEEE1394 interface 133 to the demultiplexer 124 or the signal processor 137. Furthermore, the CPU 129 performs a process in response to a command received from the front panel 134 or the IR receiver 135. Furthermore, the CPU 129 controls the modem 136 to access a server (not shown) via a telephone line and acquires an updated program or necessary data.

The EEPROM 130 is used to store data or a program which is necessary to be retained even after electrical power is turned off. The ROM 131 stores a program such as an TPL (Initial Program Loader). The data or the program stored in the EEPROM 130 can be updated by means of overwriting.

The RAM 132 is used to temporarily store a program or data which is necessary in the operation performed by the CPU 129.

The IEEE1394 interface 133 serves as a communication interface according to the IEEE1394 standard and is connected with the terminal panel 21 (more specifically, with the IEEE1394 terminals $21_{11}$ to $21_{33}$ of the terminal panel 21). That is, the IEEE1394 interface 133 transmits data supplied from the CPU 129 to the outside in accordance with the IEEE1394 standard and transfers data transmitted from the outside in accordance with the IEEE1394 standard to the CPU 129. An external device can be connected to the terminal panel 21 via an IEEE1394 cable 21a.

The front panel 134 is disposed in a partial area of the front surface of the master device 1, although it is not shown in FIG. 2 or 3. On the front panel 134, buttons switches similar to some of buttons switches of the remote commander 15 (FIG. 7 or 9). If one of button switches on the front panel 134 is operated, a command corresponding to the operation performed on the button is supplied to the CPU 129. In response, the CPU 129 performs an operation in accordance with the operation signal received from the front panel 134.

The IR receiver 135 receives an infrared ray transmitted from the remote commander 15 in response to an operation performed on the remote commander 15. The IR receiver 135 converts the received infrared ray into an electrical signal and supplies the resultant electrical signal to the CPU 129. In response, the CPU 129 performs a process in accordance with the signal received from the IR receiver 135. That is, the CPU 129 performs a process corresponding to the operation performed on the remote commander 15.

The modem 136 controls the communication performed via the telephone line such that data supplied from the CPU 129 is transmitted over the telephone line and such that data received via the telephone line is transferred to the CPU 129.

The signal processor 137 includes a DSP (Digital Signal Processor 137A, an EEPROM 137B, and a RAM 137C, and performs various kinds of digital signal processing on video data stored in the frame memory 127, under the control of the CPU 129.

More specifically, the DSP 137A performs various kinds of signal processing using data stored in the EEPROM 137B as required, in accordance with a program stored in the EEPROM 137B. The EEPROM 137B stores a program and/or data used by the DSP 137A in performing various processes. The RAM 137C is used to temporarily store a program and/or used by the DSP 137A in performing various processes.

The data or the program stored in the EEPROM 137B can be updated by means of overwriting.

The signal processing performed by the signal processor 137 includes, for example, decoding of closed caption data, superimposing of closed caption data onto video data stored in the frame memory 127, scaling of video data stored in the frame memory 127, and removing of noise. The signal processor 137 also generates OSD data to be OSD-displayed and superimposes it onto video data stored in the frame memory 127.

The unit driver 138 drives, under the control of the CPU 129, the speaker units 12L and 12R so that the principal axis of the directivity of the speaker system including the speaker units 12L and 12R is directed in a desired direction.

In the master device 1 constructed in the above-described manner, an image and a sound/voice associated with a television broadcasting program are output as described below.

That is, a television broadcasting signal in the form of a transport stream received by the antenna is supplied to the demultiplexer 124 via the tuner 121, the QPSK demodulator 122, and the error correction circuit 123. The demultiplexer 124 extracts TS packets of a program from the transport stream and supplies TS packets of video data and audio data to the MPEG video decoder 125 and the MPEG audio decoder 126, respectively.

The MPEG video decoder 125 performs MPEG-decoding on the TS packets received from the demultiplexer 124. The video data obtained as the result of the MPEG-decoding is supplied from the MPEG video decoder 125 to the CRT 11 via the frame memory 127 and the NTSC encoder 128.

On the other hand, the MPEG audio decoder 126 performs MPEG-decoding on the TS packets received from the demultiplexer 124 and the audio data obtained as the result of the MPEG-decoding is supplied from the MPEG video decoder 126 to the speaker units 12L and 12R.

Figure 11:
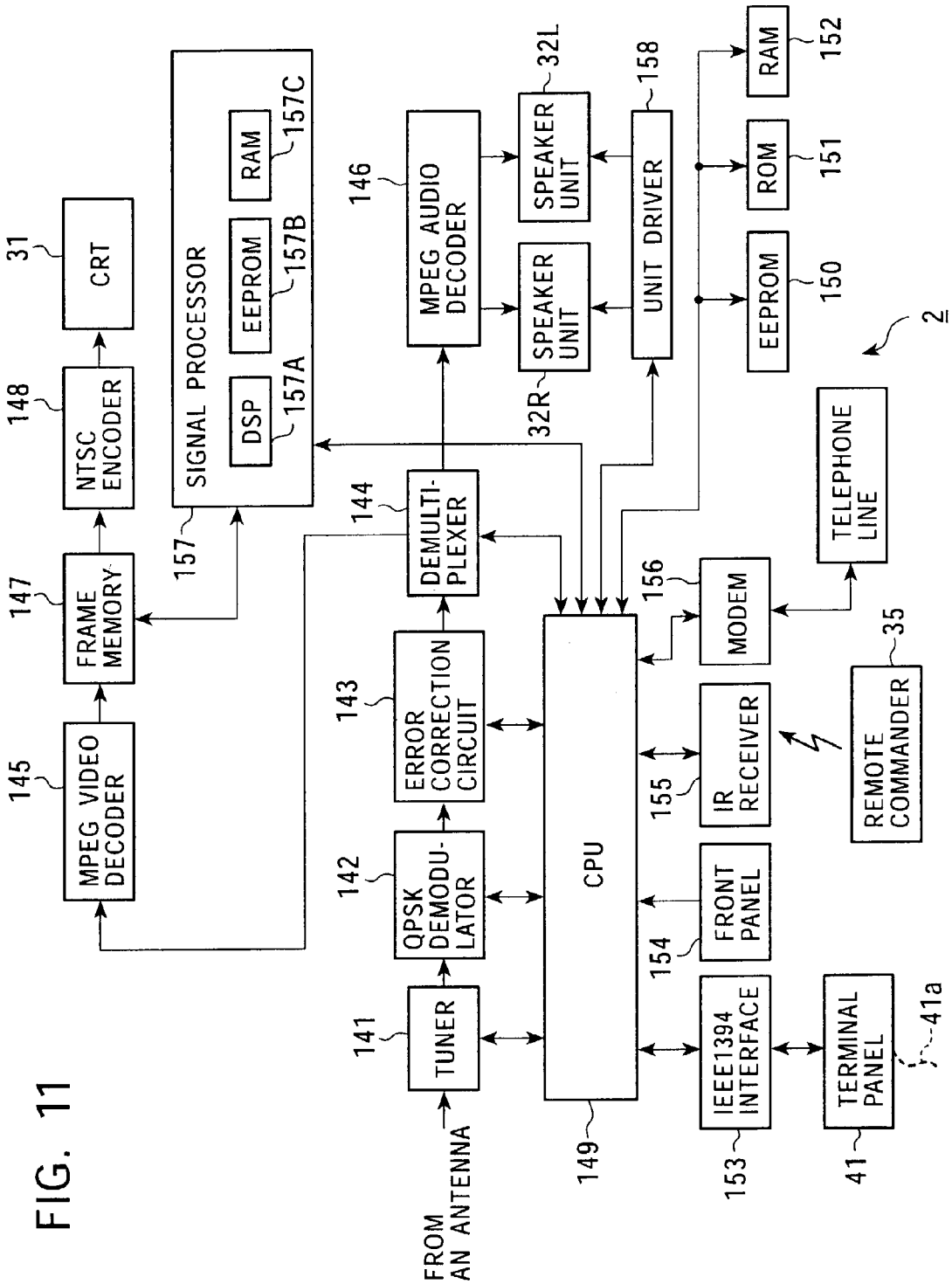
FIG. 11 is a block diagram showing an example of an electrical configuration of the slave device.

FIG. 11 shows an example of an electrical configuration of a slave device 2.

The slave device 2 is made up of parts such as a tuner 141, . . . , and a unit driver 158 similar to the tuner 121, . . . , and the unit driver 138 shown in FIG. 10, and thus a further description is not provided herein.

The master device 1 and the slave device 2 both have their own antenna terminals 22 and 42 as shown in FIGS. 3F and 5F. Therefore, the antenna can be connected (via cables) to the master device 1 and the slave devices 2 of the scalable TV system shown in FIG. 1. However, if the antenna is connected to the master device 1 and all slave devices 2, the connection becomes complicated. In the present scalable TV system, to avoid such complexity, the antenna may be connected to only one of the television sets of the scalable TV system, and a television broadcasting signal received by that television set may be distributed to the other television sets by means of IEEE1394 transmission.

In the present embodiment, the IEEE1394 terminal $21_{ij}$ (FIG. 3) on the terminal panel 21 of the master device 1 and the IEEE1394 terminal 411 (FIG. 5) on the terminal panel 41 of the slave device $2_{ij}$ are connected to each other via an IEEE1394 cable thereby electrically connecting the master device 1 and the slave device 2 to each other so as to allow the master device 1 and the slave device 2 to transmit various data to each other by means of IEEE1394 transmission (according to the IEEE1394 standard).

The IEEE1394 transmission process is described below with reference to FIGS. 12 to 21.

The IEEE1394 standard is one of standards for serial buses. According to the IEEE1394 standard, data is allowed to be transmitted isochronously, and thus this technology is suitable for transmission of data such as image data or audio data which is necessary to be played back in real time.

The IEEE1394 transmission allows data to be transferred isochronously at intervals of 125 μs using an up to 125 μs transmission band (called so although it is actually time). Within the transmission band described above, a plurality of channels can be used for isochronous transmission.

Figure 12:
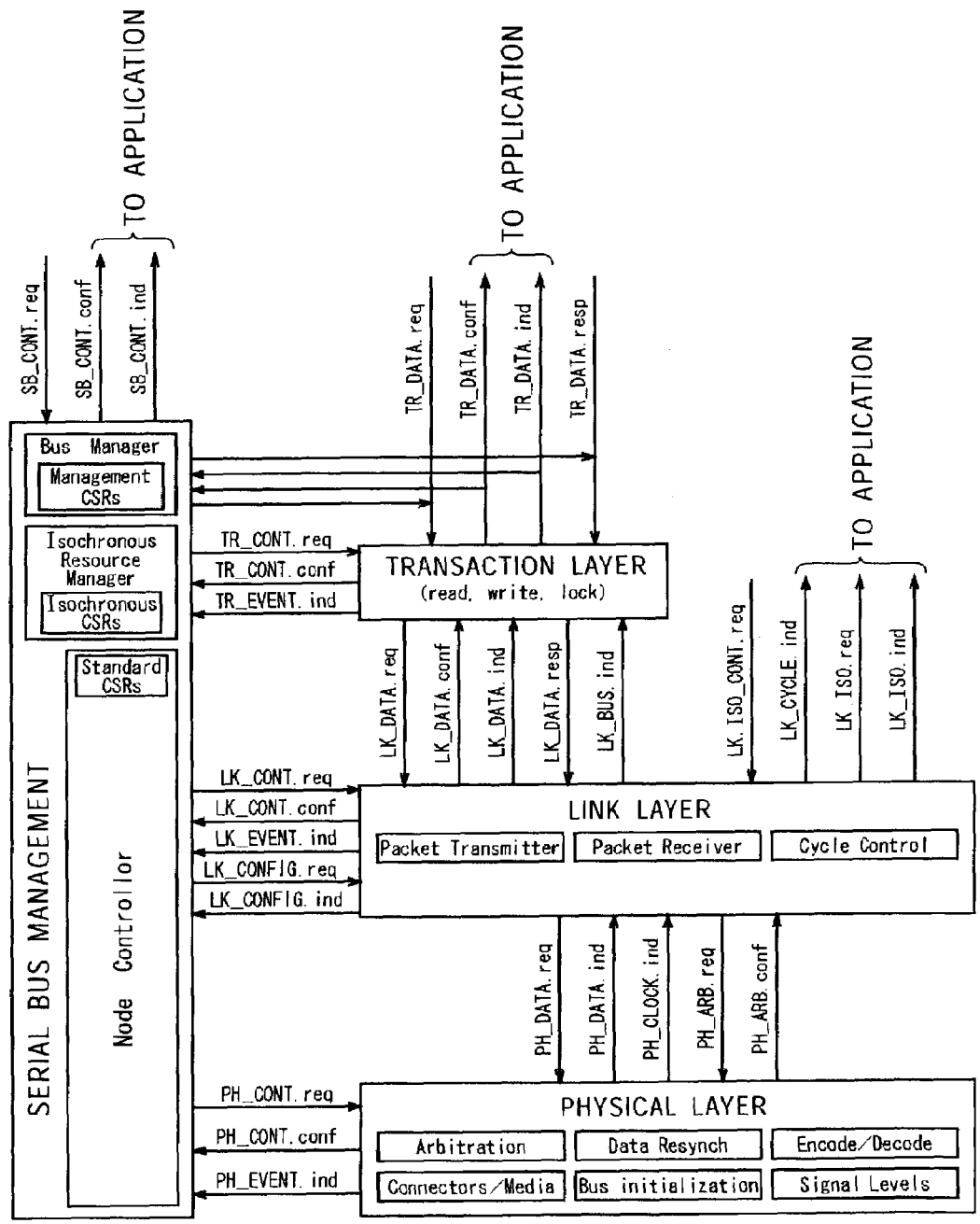
FIG. 12 is a diagram showing the layer structure of the IEEE1394 communication protocol.

FIG. 12 shows the layer structure of the IEEE1394 communication protocol.

The IEEE1394 communication protocol has a 3-layer structure including a transaction layer, a link layer, and a physical layer. The respective layers communicate with each other and also with serial bus management. The transaction layer and the link layer also communicate with an application at a higher level. In the communication, 4 types of messages are transmitted (received). They are request, indication, response, and confirmation messages. In FIG. 12, arrows denote messages in communication.

In FIG. 12, each arrow is labeled a message name. Message names with a suffix ".req" denote request messages, and message names with a suffix ".ind" denote indication messages. Message names with a suffix ".resp" denote response messages, and message names with a suffix ".conf" denote confirmation messages. For example, TR_CONT.req is a request message transmitted from the serial bus manager to the transaction layer.

In response to a request from an application, the transaction layer provides asynchronous transmission service to allow data communication with another IEEE1394 device (having an IEEE1394 interface) on the basis of the request/response protocol according to the ISO/IEC13213 standard. In data transmission schemes according to the IEEE1394 standard, in addition to the isochronous transmission, asynchronous transmission is also allowed, and asynchronous transmission is dealt with in the transaction layer. In asynchronous transmission, data is transmitted between IEEE1394 devices via three transactions which are units processed by the transaction layer: a read transaction; a write transaction; and a lock transaction.

The link layer provides data transmission service using an acknowledge message and performs address processing, data error detection, and data framing. Transmission of a packet performed by the link layer is called a subaction. There are two types of subactions: asynchronous subactions and isochronous subactions.

In asynchronous subactions, data it transmitted to a specified address in a node (unit accessible in IEEE1394) identified by physical ID (identification). In response to receiving the data, the node returns an acknowledge message. However, in the case of asynchronous broadcast subactions, in which data is transmitted to all nodes on an IEEE1394 serial bus, nodes do not return an acknowledge message in response to receiving the data.

On the other hand, in isochronous subactions, data is transmitted at fixed intervals (of 125 μs) to a specified channel number. In the case of, isochronous subactions, no acknowledge message is returned.

The physical layer converts logical symbols used by the link layer into electrical signals. Furthermore, the physical layer performs processing in response to an arbitration request issued by the link layer (when there are two or more nodes which are requesting IEEE1394 communication). When the IEEE1394 serial bus is reset, the physical layer performs reconfiguration of the IEEE1394 serial bus and automatically performs physical ID assignment.

In the management of the serial bus, basic bus control capabilities are achieved in accordance with the ISO/IEC13212 CSR (Control and Status Register) architecture. More specifically, the capabilities of the serial bus management include a node controller, an isochronous resource manager, and a bus manager. The node controller controls the status and physical ID of each node and also controls the transaction layer, the link layer, and the physical layer. The isochronous resource manager provides information about availability of resources used in isochronous communication. To perform isochronous communication, it is required that devices connected to the IEEE1394 serial bus include at least one IEEE1394 device having the isochronous resource manager. The bus manager performs optimization of use of the IEEE1394 serial bus, which is the highest-level capability of those provided by the serial bus management. The isochronous resource manager and the bus manager may or may not exit.

In connection among IEEE1394 devices, both a branching-at-node connection and a node daisy chain connection are allowed. However, if a new IEEE1394 device is connected, bus resetting is performed to detect a tree structure and determine a root node, physical IDs, an isochronous resource manager, a cycle master, and a bus manager.

In the detection of the tree structure, parent-child relationships among IEEE1394 devices are determined. The root node specifies a node permitted, via arbitration, to use the IEEE1394 serial bus. Physical IDs are determined by transmitting packets called self-ID packets to the respective nodes. Each self-ID packet transmitted to a node includes information indicating the data transmission rate of that node and information indicating whether the node can act as an isochronous resource manager.

The isochronous resource manager is, as described earlier, a node which provides information about the status of availability of resources used in isochronous communication. The isochronous resource manager includes a BANDWIDTH_AVAILABLE register and a CHANNELS_AVAILABLE register, which will be described later. The isochronous resource manager also includes a register for storing data indicating the physical ID of a node serving as the bus manager. In a case in which there is no bus manager in IEEE1394 devices connected as nodes to the IEEE1394 serial bus, the isochronous resource manager also serves as a simplified bus manager.

The cycle master transmits a cycle start packet over the IEEE1394 serial bus at isochronous transmission intervals of 125 μs. To this end, the cycle master includes a CYCLE_TIME register serving as a cycle time counter to determine the transmission timing at intervals of 125 μs. The root node serves as the cycle master. However, when the root node does not have the capability of cycle master, the bus manger changes the root node.

The bus manager manages the power of the IEEE1394 serial bus and changes the root node if required.

If the bus is reset and if further setting associated with the isochronous manage is performed, it becomes possible to perform data transmission via the IEEE1394 serial bus.

In isochronous transmission, which is one of data transmission schemes according to the IEEE1394 standard, a transmission band and a transmission channel are first assigned, and then data is transmitted in the form of packets (isochronous packets).

That is, in isochronous transmission, the cycle master first broadcasts a cycle start packet at intervals of 125 μs over the IEEE1394 serial bus. If the cycle start packet has been broadcasted, it becomes possible to transmit isochronous packets.

To perform isochronous transmission, it is required to declare the use of resource for isochronous transmission by rewriting the BANDWIDTH_AVAILABLE register to assign a transmission bandwidth provided by the isochronous resource manager and rewriting the CHANNELS_AVAILABLE register to assign a channel.

Each of the BANDWIDTH_AVAILABLE register and the CHANNELS_AVAILABLE register is assigned as a CSR (Control and Status Register) having a 64-bit address space according to the ISO/IEC13213 standard (the CSR will be described in further detail later).

The BANDWIDTH_AVAILABLE register is a register for storing 32-bit data whose lower-order 13 bits is used to indicate a currently available transmission bandwidth (bw_remaining).

The BANDWIDTH_AVAILABLE register is initially set to 00000000000000000001001100110011B (where B denotes that the value preceding B is represented in a binary notation) (=4915), for the following reason. In IEEE1394, the unit of time is defined as a time needed to transmit 32 bits at 1572.864 Mbps (bit per second). Therefore, 125 μs corresponds to 00000000000000000001100000000000B (=6144). However, in IEEE1394, the bandwidth available for isochronous transmission is 80% of one cycle period of 125 μs, and thus the maximum bandwidth available for isochronous transmission is 100 μs. Therefore, the BANDWIDTH_AVAILABLE register is initially set to 00000000000000000001001100110011B (=4915).

The rest of the bandwidth, that is 25 μs remaining after 100 μs of 125 μs is used for isochronous transmission, is used for asynchronous transmission, which is performed to read data stored in the BANDWIDTH_AVAILABLE register or the CHANNELS_AVAILABLE register.

To start isochronous transmission, it is required that a transmission bandwidth for use in the isochronous transmission has been made available. For example, in a case in which a transmission bandwidth of 10 μs in the total bandwidth of 125 μs is used for isochronous transmission, it is required that a transmission bandwidth of 10 μs be assigned for isochronous transmission. The assignment of the transmission bandwidth is performed by rewriting the value stored in the BANDWIDTH_AVAILABLE register. More specifically, in the case in which a bandwidth of 10 μs is assigned for isochronous transmission, 492 corresponding to 10 μs is subtracted from the value stored in the BANDWIDTH_AVAILABLE register and the resultant value is set into the BANDWIDTH_AVAILABLE register. For example, when the current value of the BANDWIDTH_AVAILABLE register is 4915 (in the case in which isochronous transmission is not performed at all), a bandwidth of 10 μs is assigned for isochronous transmission by rewriting the current value of 4915 of the BANDWIDTH_AVAILABLE register into 4423 (00000000000000000001000101000111B) which is obtained by subtracting 492 corresponding to 10 μs from 4915.

If the result of subtraction of a transmission bandwidth to be assigned (used) from the current value of the BANDWIDTH_AVAILABLE register becomes smaller than 0, the transmission bandwidth cannot be assigned, and thus the BANDWIDTH_AVAILABLE register is not rewritten. In this case, isochronous transmission cannot be performed.

To perform isochronous transmission, it is also required to assign a transmission channel, in addition to a transmission bandwidth. The assignment of a transmission channel is performed by rewriting the CHANNELS_AVAILABLE register.

The CHANNELS_AVAILABLE register is a 64-bit register, each bit of which corresponds to a channel. When an nth bit (as counted from the least significant bit) is equal to 1, an (n−1)th channel is not used, while when the nth bit is equal to 0, the (n−1)th channel is being used. Therefore, when any channel is not used, the CHANNELS_AVAILABLE register has a value 1111111111111111111111111111111111111111111111111111111111111111B. For example, when a first channel is assigned, the CHANNELS_AVAILABLE register is rewritten into 1111111111111111111111111111111111111111111111111111111111111101B.

Because the CHANNELS_AVAILABLE register has a storage capacity of 64 bits as described earlier, it is possible to assign 64 channels from 0th to 63rd channels. Note that the 63rd channel is a special channel used to broadcast an isochronous packet.

Because isochronous transmission is performed after assigning a transmission bandwidth and a transmission channel as described above, the transmission rate in the isochronous transmission can be guaranteed. Therefore, isochronous transmission is suitable in particular for transmission of data such as video data or audio data needed to play back in real time.

As described above, IEEE1394 transmission is based on the CSR architecture using a 64-bit address space according to the ISO/IEC13213 standard.

Figure 13:
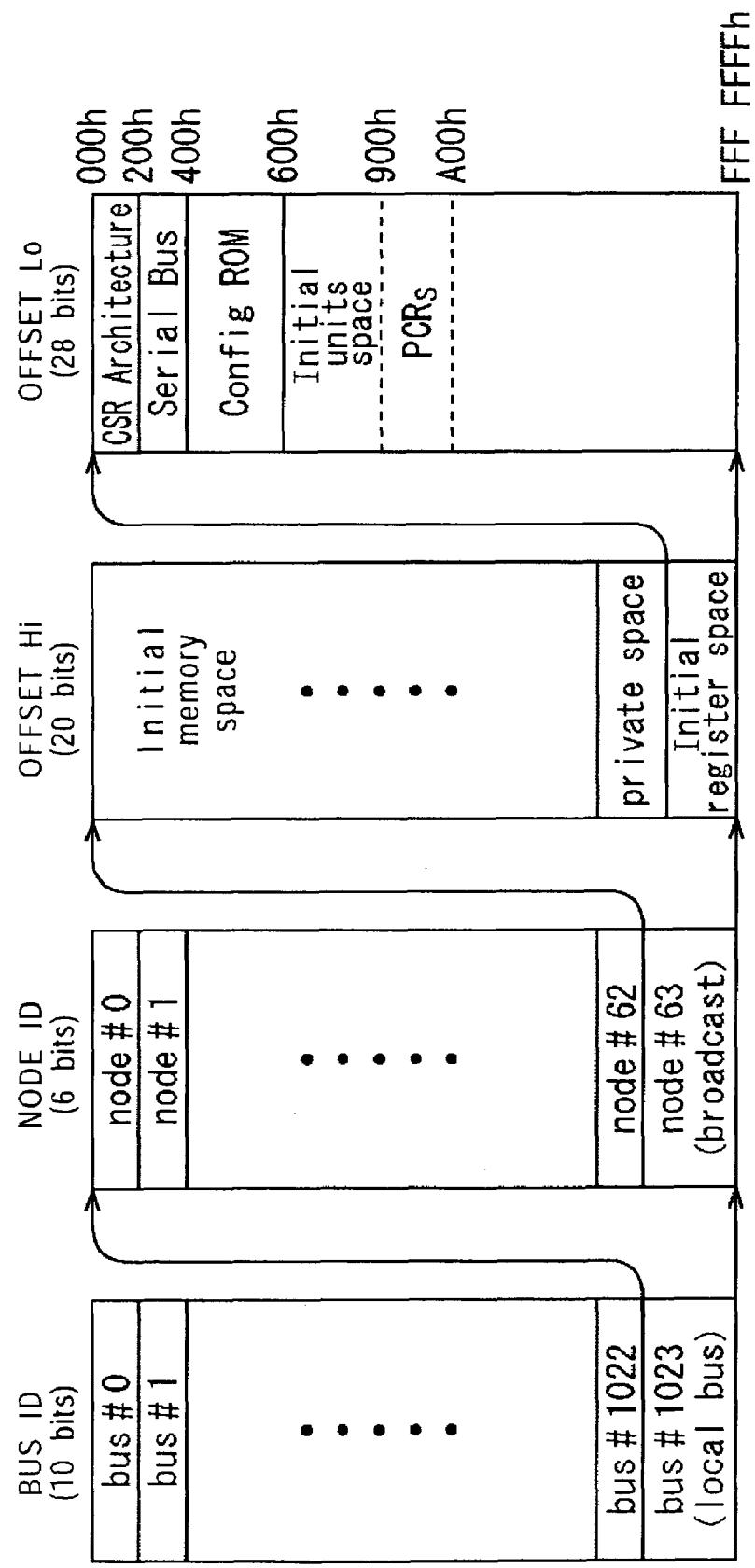
FIG. 13 is a diagram showing an address space according the CSR architecture.

FIG. 13 shows an address space of based on the CSR architecture.

High-order 16 bits of the CSR are used to represent a node ID of a node, and the remaining 48 bits are used to specify an address space assigned to the node. The high-order 16 bits are divided into a 10-bit part indicating a bus ID and a 6-bit part indicating a physical ID (node ID in a narrow sense). A value whose all bits are equal to 1 is used for a special purpose, and thus 1023 buses and 63 nodes can be specified.

In the 256-terabytes address space defined by lower-order 48 bits of the CSR, a space defined by higher-order 20 bits is divided into spaces including an initial register space used by a 2048-byte CSR register or an IEEE1394 register, a private space, and an initial memory space. In the case in which the space defined by the high-order 20 bits is used as the initial register space, the space defined by the lower-order 28 bits is used as a configuration ROM, an initial unit space used for a purpose specific to a node, or plug control registers (PCRs).

FIG. 14 shows offset addresses, names, and functions of main CSRs.

In FIG. 14, "offset" fields are used to describe offset addresses with respect to an address of FFFFF0000000h (h denotes that a value preceding h is represented in a hexadecimal notation) from which the initial register space begins. As for the BANDWIDTH_AVAILABLE register at an offset address of 220h, used to indicate the bandwidth assignable to isochronous communication as described earlier, only the value stored in the BANDWIDTH_AVAILABLE register of a node serving as the isochronous resource manager is valid. That is, although CSRs shown in FIG. 13 are possessed by each node, only the BANDWIDTH_AVAILABLE register possessed by the isochronous resource manager is valid. This means that, in effect, the BANDWIDTH_AVAILABLE register is possessed only by the isochronous resource manager.

The bits of the CHANNELS_AVAILABLE register at offset addresses of 224h to 228h correspond to respective channel numbers from 0 to 63, as described earlier. When a particular bit is equal to 0, a corresponding channel is already assigned. Also in the case of the CHANNELS_AVAILABLE register, only the CHANNELS_AVAILABLE register of a node serving as the isochronous resource manager is valid.

Referring again to FIG. 13, in accordance with the general ROM format, a configuration ROM is placed at addresses of 400h to 800h in the initial register space.

Figure 15:
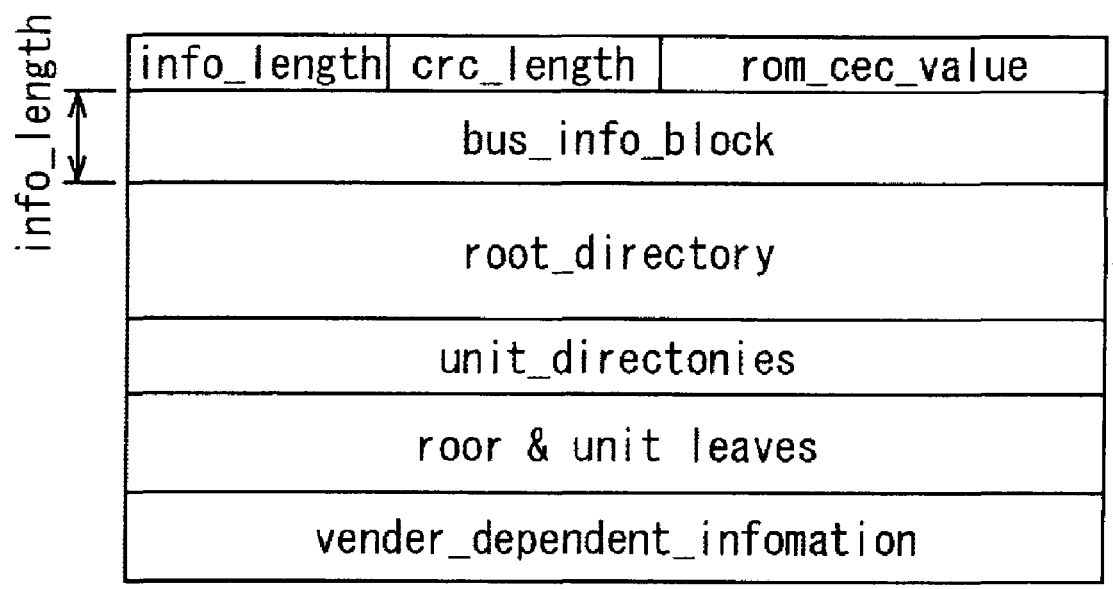
FIG. 15 is a diagram showing a general ROM format.

FIG. 15 shows the general ROM format.

Nodes, which are units accessible on the IEEE1394 serial bus, may include plural units which use in common the same address space but operate independently. A parameter unit_directories indicates the version and the location of software associated with such units. Parameters bus_info_block and root_directory are stored at fixed locations. However, locations of the other blocks are specified by offset addresses.

FIG. 16 shows details of bus_info_block, root_directory, and unit_directries.

In bus_info_block, Company_ID is a parameter indicating an ID number of a manufacturer of a device. Chip_ID is a parameter indicating an ID which is uniquely assigned to the device and which is not used by any other device in the world. In accordance with the IEC1833 standard, unit_spec_id in unit_directory of a device, which satisfies the IEC1833 standard, is rewritten such that 00h is rewritten in a first octet, A0h in a second octet, and 2Dh in a third octet. On the other hand, unit_sw_version is rewritten such that 01h is rewritten in a first octet and 1 is rewritten at a LSB (Least Significant Bit) of a third octet.

Each node has a PCR (Plug Control Register) placed, in accordance with the IEC1883 standard, at addresses of 900h to 9FFh in the initial register space shown in FIG. 13. The PCR is a register for logically forming a signal path analogous to an analog interface. That is, a concept of plug is realized by the PCR.

FIG. 17 shows the structure of the PCR.

The PCR includes an oPCR (output Plug Control Register) for indicating an output plug and an iPCR (input Plug Control Register) for indicating an input plug. The PCR also includes an oMPR (output Master Plug Register) for representing information associated with the output plug of the specific device and an iMPR (input Master Plug Register) for representing information associated with the input plug. Any IEEE1394 device can have only a single oMPR and a single iMPR but cannot have plural oMPRs or plural iMPRs. However, an IEEE1394 device may have plural oPCRs and iPCRs depending on the capacity of the IEEE1394 device. In the example shown in FIG. 17, the PCR includes 31 oPCRs #0 to #30 and 31 iPCRs #0 to #30. The flow of isochronous data is controlled by controlling a register corresponding to a plug.

FIG. 18 shows the structures of an oMPR, an oPCR, an iMPR, and an iPCR.

Wherein the structure of the oMPR is shown in FIG. 18A, the structure of the oPCR in FIG. 18B, the structure of the iMPR in FIG. 18C, and the structure of the iPCR in FIG. 18D.

In a 2-bit field of "data rate capability" located on the MSB-side of the oMPR and in that of the iMPR, a code indicating the maximum isochronous data rate, at which the device is allowed to transmit or receive data, is described. In a "broadcast channel base" field of the oMPR, a channel number used to output broadcast data is described.

In a 5-bit field of "number of output plugs" located on the LSB-side of the oMPR, a value indicating the number of output plugs, that is, oPCRs possessed by the device is described. In a 5-bit field of "number of input plugs" located on the LSB-side of the iMPR, a value indicating the number of input plugs, that is, iPCRs possessed by the device is described. A "non-persistent extension" field and a "persistent extension" field are reserved so that extension can be performed using these fields in the future.

An "on-line" bit located at the MSB of the oPCR and an "on-line" bit located at the MSB of the iPCR indicate whether the plug is being used or not. If the "on-line" bit is equal to 1, the corresponding plug is in a ON-LINE state, while the plug is in an OFF-LINE state when the "on-line" bit is equal to 0. A broadcast connection counter of the oPCR and that of the iPCR indicate whether there is a broadcast connection (1) or there is not broadcast connection (0). The value of a 6-bit point-to-point connection counter of the oPCR and that of the iPCR indicate the number of point-to-point connections associated with the corresponding plug.

The value of a 6-bit channel number of the oPCR and that of the iPCR indicate the isochronous channel number to which the corresponding plug is connected. The value of a 2-bit data rate of the oPCR indicates the actual data rate at which packets of isochronous data is output from the corresponding plug. The code of a 4-bit overhead ID of the oPCR indicates the overhead bandwidth of isochronous communication. The value of a 10-bit payload of the oPCR indicates the maximum value of data included in an isochronous packet, which can be handled by the corresponding plug.

In the IEEE1394 standard, an AV/C command set for controlling an IEEE1394 device is defined. Thus, in the present embodiment, the master device 1 controls slave devices 2 using the AV/C command set. However, the master device 1 may also control slave devices 2 using a command set other than the AV/C command set.

The AV/C command set is briefly described below.

Figure 19:
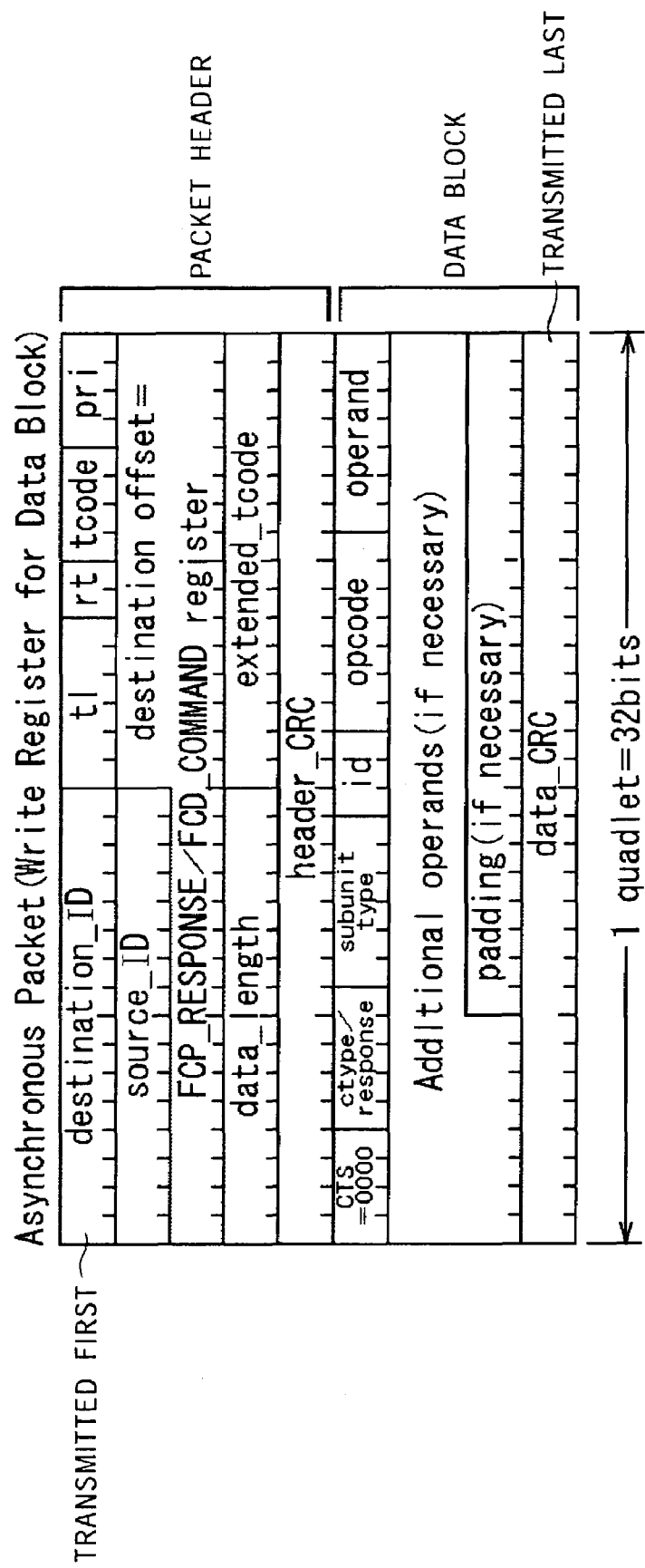
FIG. 19 is a diagram showing a data structure of a packet of an AV/C command transmitted in an asynchronous transmission mode.

FIG. 19 shows the data structure of AV/C command set packet data transmitted in the asynchronous transmission mode.

The AV/C command set is a command set for controlling an AV (Audio Visual) device. In a control system using the AV/C command set, an AV/C command frame and a response frame are transmitted between nodes in accordance with the FCP (Function Control Protocol). In order not to impose a large load on a bus and/or AV devices, a response to a command is returned in 100 ms.

As shown in FIG. 19, asynchronous packet data includes 32 bits (1 quadlet) in the horizontal direction. A packet header of a packet is shown on the upper side of FIG. 19, and a data block is shown on the lower side. The destination of the data is indicated by destination_ID.

CTS denotes the ID of a command set. In the case of the AV/C command set, CTS="0000". When a packet is a command, the function type of the command is indicated by ctype/response. On the other hand, in the case in which a packet is a response, ctype/response indicates the result of a process performed in accordance with the command. Commands are generally classified into the following four types: (1) a command (CONTROL command) for controlling a function from the outside; (2) a command (STATUS command) for issuing a query about the status from the outside; (3) commands (GENERAL INQUIRY command and SPECIFIC INQUIRY command) for inquiring from the outside as to whether a CONTROL command is supported (wherein the GENERAL INQUIRY command is used to inquiry as to whether an opcode is supported, and the SPECIFIC INQUIRY command is used to inquiry as to whether an opcode and an operands are supported); and (4) commands (NOTIFY commands) for requesting transmission of a notification of a change in status to the outside.

A response is returned depending on the type of a command. Responses which are returned in response to the control command include a NOT IMPLEMENTED response, an ACCEPTED response, a REJECTED response, and an INTERIM response. Responses which are returned in response to the STATUS command include a NOT IMPLEMENTED response, a REJECTED response, an IN TRANSITION response, and a STABLE response. Responses which are returned in response to the GENERAL INQUIRY command or the SPECIFIC INQUIRY command include an IMPLEMENTED response and a NOT IMPLEMENTED response. Responses which are returned in response to the NOTIFY command include a NOT IMPLEMENTED response, a REJECTED response, an INTERIM response, and a CHANGED response.

A parameter "subunit type" is used to indicate the function of a device, such as a tape recorder/player or a tuner. When there two or more subunits of the same type, each subunit is identified by a subunit id (placed after "subunit type"), and addressing is performed using a subunit id. In a field of "opcode", a command is placed, and a parameter associated with the command is placed in a filed of "operand". In a field of "Additional operands", an additional operands are placed In a field of "padding", dummy data is placed so that the packet length is adjusted to a predetermined number of bits. In a field of "data CRC (Cyclic Redundancy Check)", CRC for checking an error which can occur during transmission is placed.

FIG. 20 shows specific examples of AV/C commands.

FIG. 20A shows specific examples of ctype/response, wherein commands are shown on the upper side of the figure and responses are shown on the lower side. The CONTROL command is assigned "0000", and the STATUS command is assigned "0001". The SPECIFIC INQUIRY command is assigned "0010", and the NOTIFY command is assigned "0011". The GENERAL INQUIRY command is assigned "0100". "0101" to "0111" are reserved for future usage. The NOT IMPLEMENTED response is assigned "1000", and the ACCEPTED response is assigned "1001". The REJECTED response is assigned "1010", and the IN TRANSITION response is assigned "1011". The IMPLEMENTED/STABLE response is assigned "1100", and the CHANGED response is assigned "1101". The INTERIM response is assigned "1111". "1110" is reserved for future usage.

FIG. 20B shows specific examples of subunit types. "Video Monitor" is assigned "00000", and "Disk Recorder/Player" is assigned "00011". "Tape Recorder/Player" is assigned "00100", and "Tuner" is assigned "00101". "Video Camera" is assigned "00111", and "Vender unique" is assigned "11100". "Subunit type extended to next byte" is assigned "11110". "111111" is assigned "unit", which is used when a packet is transmitted to a device, for example, in order to turn on/off the power of the device.

FIG. 20C shows specific examples of opcodes. There are opcode tables for respective subunit types, and opcodes for a device whose subunit type is Tape Recorder/Player are shown in FIG. 20C. An operand is defined for each opcode. In the examples shown in FIG. 20C, VENDOR-DEPENDENT is assigned "00h", SEARCH MODE is assigned "50h". TIME CODE is assigned "51h", and ATN is assigned "52h". OPEN MIC is assigned "60h", and READ MIC is assigned "61h". WRITE MIC is assigned "62h", and LOAD MEDIUM is assigned C1h". RECORD is assigned "C2h", PLAY is assigned "C3h", and WIND is assigned "C4h".

FIG. 21 shows specific examples of an AV/C command and a response thereto.

For example, to command a target device (consumer device, to be controlled) such as a playback device to perform a playback operation, a command shown in FIG. 21A is transmitted from a controller (device which controls the target device) to the target device. In this case, the command is expressed using the AV/C command set, and thus CTS="0000". Herein, ctype="0000", because a CONTROL command is used to control the target device from the outside (FIG. 20A). Furthermore, subunit type="00100", because the device is a Tape Recoder/Player (FIG. 20B). In the specific example, ID is #0 and thus id="000". Furthermore, the opcode is "C3h" specifying PLAY (FIG. 20C) and the operand is "75h" specifying FORWARD. If the playback operation is performed, the target device returns a response such as that shown in FIG. 21B to the controller. In this specific example, the response is an "accepted" response indicating that the command is accepted, and thus response="1001" (see FIG. 20A). The other parameters are the same as those shown in FIG. 21A, and thus they are not described in further detail herein.

In the scalable TV system, using the AV/C command set described above, various control operations are performed between the master device 1 and slave devices 2. Among control operations performed between the master device 1 and slave devices 2, those which are not supported by the AV/C command set are performed using commands and responses which are additionally defined.

Further detailed information about IEEE1394 communication and the AV/C command set may be found, for example, in "WHITE SERIES No. 181 IEEE1394 MULTIMEDIA INTERFACE" published by Triceps.

In the signal processor 137 of the master device 1 shown in FIG. 10 (and also in the signal processor 157 of a slave device 2 shown in FIG. 11), various kinds of digital signal processing are performed by the DSP 137A in accordance with programs, as described earlier. One of such digital signal processing is to convert first video data into second video data.

In this video data conversion, in a case in which the first video data has a low resolution and the second video data has a high resolution, the video data conversion can be regarded as a process of increasing the resolution. In a case in which first video data with a low signal-to-noise ratio is converted into second video data with a high signal-to-noise ratio, the video data conversion can be regarded as a noise reduction process. Furthermore, in a case in which first video data with a particular image size is converted into second video data with a greater or smaller image size, the video data conversion can be regarded as a resizing process of resizing (enlarging or reducing) the image.

Thus, various kinds of processing can be realized by the video data conversion, depending on the types of first and second video data.

Figure 22:
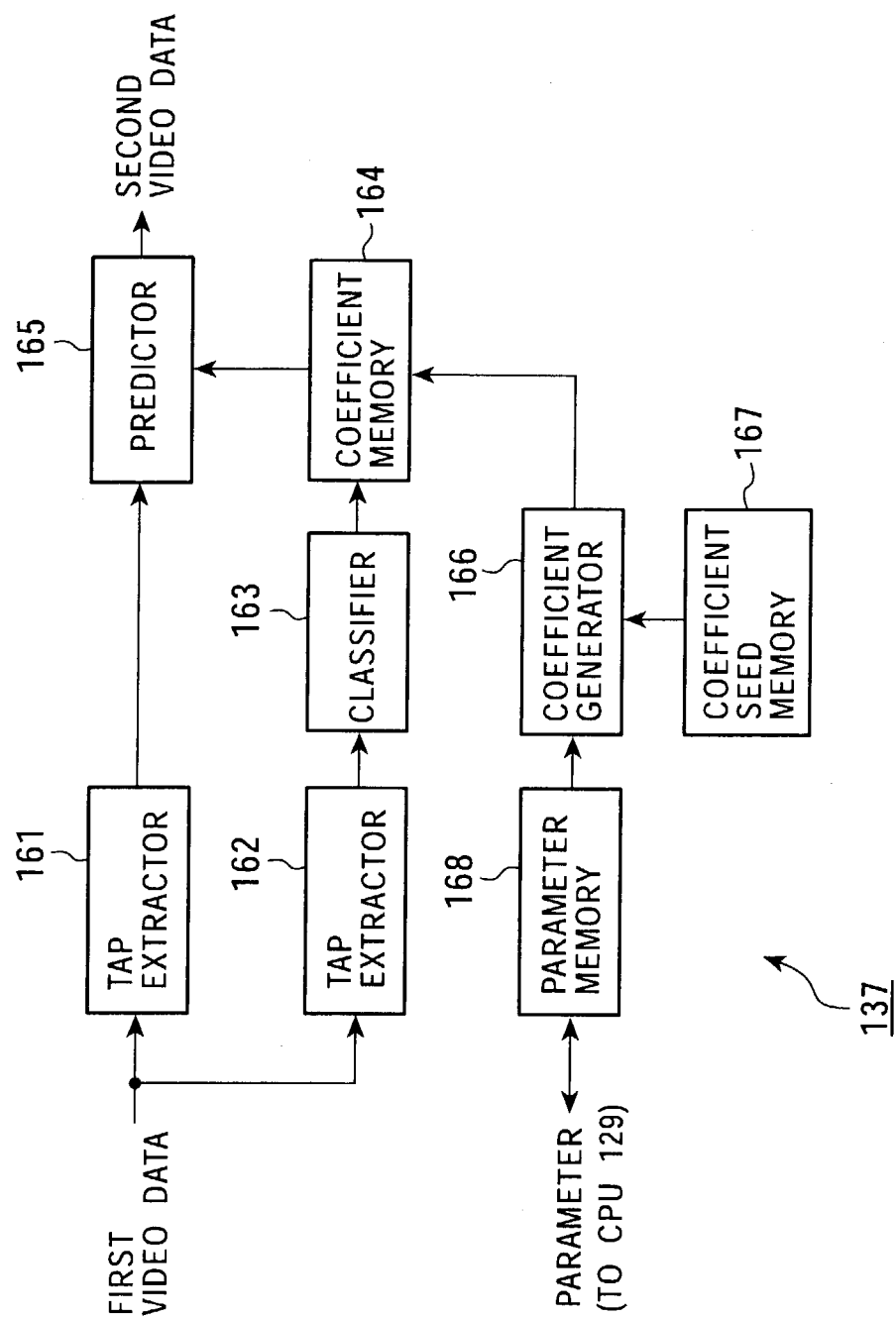
FIG. 22 is a block diagram showing an example of a detailed structure of a signal processor.

FIG. 22 shows an example of the functional structure of the signal processor 137 for performing the video data conversion. The functional structure shown in FIG. 22 may be implemented by means of a software program stored in the EEPROM 137B, that is, the functional structure may be realized by executing the software program by the DSP 137A of the signal processor 137.

In the signal processor 137 (FIG. 10), video data stored in the frame memory 127 or video data supplied from the CPU 129 is given as first video data to tap extractors 161 and 162.

The tap extractor 161 employs pixels constituting second video data as a pixel of interest one by one and extracts, as prediction taps, some of pixels constituting first video data, to be used to predict the pixel value of the pixel of interest.

More specifically, the tap extractor 161 extracts, as prediction taps, a plurality of pixels spatially or temporally close to a pixel, corresponding to a pixel of interest, of the first video data (for example, the pixel, corresponding to the pixel of interest, of the first video data and pixels spatially or temporally adjacent to that pixel are extracted).

The tap extractor 162 extracts, as class taps, some pixels from the first video data, to be used to classify the pixel of interest.

Hereinafter, for simplicity, the prediction taps and the class taps are assumed to have the same tap structure, although the prediction taps and the class taps may have different tap structures.

The prediction taps extracted by the tap extractor 161 are supplied to a predictor 165, while the class taps extracted by the tap extractor 162 are supplied to a classifier 163.

The classifier 163 classifies the pixel of interest on the basis of the class taps received from the tap extractor 162 and supplies a class code indicating the determined class to a coefficient memory 164.

The classification may be performed, for example, in accordance with an ADRC (Adaptive Dynamic Range Coding) algorithm.

In the case in which the ADRC algorithm is used, pixel values of pixels extracted as class taps are subjected to the ADRC processing, and the class of the pixel of interest is determined in accordance with an ADRC code obtained via the ADRC processing.

In a case in which K-bit ADRC is employed, the maximum value MAX and the minimum value MIN of the pixels values of pixels extracted as class taps are detected, and the local dynamic range of the set of pixels is determined as DR=MAC−MIN. The pixel values of the class taps are then requantized on the basis of the dynamic range DR. More specifically, the minimum value MIN is extracted from the pixel values of pixel of the class taps, and the resultant respective values are divided (quantized) by $DR/2^K$. The resultant K-bit pixel values of pixels of the class taps are arranged in a predetermined order into a bit string, and the resultant bit string is output as an ADRC code. For example, in a case in which 1-bit ADRC is employed, the minimum value MIN is subtracted from the pixel values of respective pixels of class taps, and the resultant values are divided by the mean value of the maximum value MAX and the minimum value MIN (the fractional portions are dropped), thereby converting the respective pixel values into 1-bit values (two-level values). The resultant 1-bit pixel values are then arranged in the predetermined order into a bit string, and the result is output as an ADRC code.

Alternatively, the classifier 163 may directly output a level distribution pattern of pixel values of pixels of class taps as a class code. However, in this case, when class taps include pixel values of N pixels each represented in K bits, a class code output from the classifier 163 is selected from as many class codes as $(2^N)^K$, which is very huge.

Thus, it is desirable that the classifier 163 perform classification after reducing the amount of information of class taps by means of the ADRC processing or vector quantization.

Tap coefficients of respective classes, supplied from coefficient generator 166, are stored in the coefficient memory 164. Of those tap coefficients stored in the coefficient memory 164, a tap coefficient stored at an address corresponding to the class code supplied from the classifier 163 (a tap coefficient represented by the class code supplied from the classifier 163) is supplied to the predictor 165.

The tap coefficients correspond to coefficients which are multiplied, in a digital filter, by input data at taps.

The predictor 165 acquires the prediction taps output from the tap extractor 161 and the tap coefficients output from the coefficient memory 164 and determines a predicted value corresponding to the real value of the pixel of interest, using the prediction taps and the tap coefficients according to a predetermined prediction algorithm. Thus, the predictor 165 determines the pixel value (the predicted value) of the pixel of interest, that is, the pixel value of a pixel of the second video data, and outputs the result.

The coefficient generator 166 generates tap coefficients for respective classes on the basis of the coefficient seed data stored in a coefficient seed data memory 167 and a parameter stored in a parameter memory 168. The resultant tap coefficients are overwritten in the coefficient memory 164.

The coefficient seed data memory 167 stores coefficient seed data for each class, wherein the coefficient seed data is obtained via learning of coefficient seed data as will be described later. The coefficient seed data refers to data serving as a seed in generating tap coefficients.

When a parameter is supplied to the parameter memory 168 from the CPU 129 (FIG. 10) in response to an operation performed by a user on the remote commander 15, the parameter memory 168 stores the received parameter in the overwriting fashion.

Figure 23:
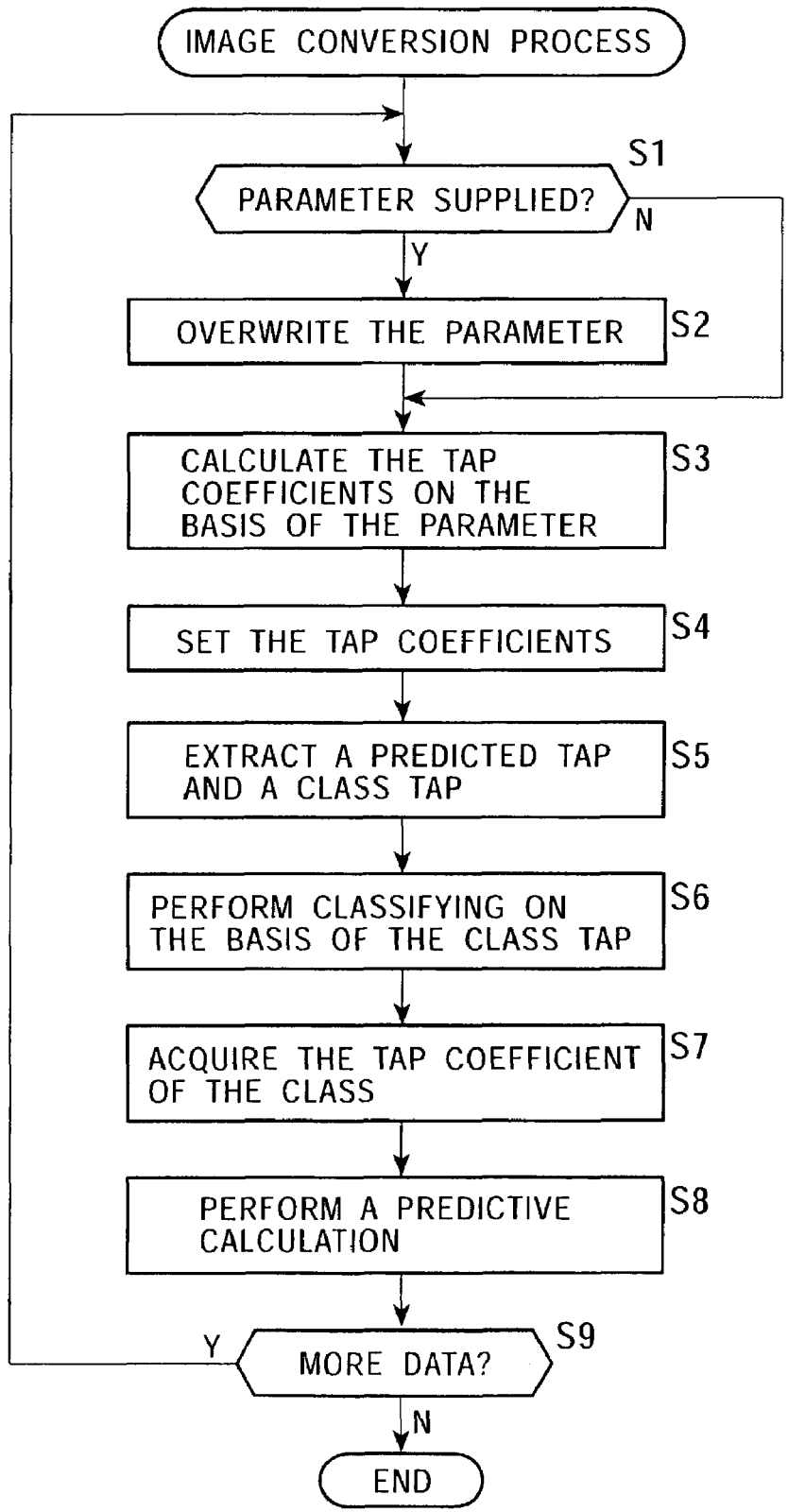
FIG. 23 is a flow chart showing a video data conversion performed by the signal processor.

Now, referring to a flow chart shown in FIG. 23, video data conversion performed by the signal processor 137 shown in FIG. 22 is described.

The tap extractor 161 sequentially employs pixels constituting second video data, corresponding to first video data, as pixel of interest on a one-by-one basis. In step S1, parameter memory 168 determines whether a parameter has been supplied from the CPU 129. If it is determined that the parameter has been supplied, the process proceeds to step S2. In step S2, the parameter memory 168 stores the received parameter in an overwriting fashion. After completion of storing the parameter, the process proceeds to step S3.

In the case in which it is determined in step S1 that the parameter has not been supplied from the CPU 129, the process jumps to step S3 without performing step S2.

If the parameter from the CPU 129 is supplied to the parameter memory 168, that is, if a parameter input by a user by operating the remote commander 15, or if the parameter is set by the CPU 129, the content currently stored in the parameter memory 168 is replaced with the parameter supplied to the parameter memory 168.

In step S3, the coefficient generator 166 reads coefficient seed data associated with each class from the coefficient seed data memory 167 and also reads a parameter from the parameter memory 168. The coefficient generator 166 then determines tap coefficients for each class on the basis of the coefficient seed data and the parameter. The process then proceeds to step S4. In step S4, the coefficient generator 166 supplies the tap coefficients associated with each class to the coefficient memory 164, which stores the received tap coefficients in an overwriting fashion. The process then proceeds to step S5.

In step S5, the tap extractors 161 and 162 extract prediction taps and class taps associated with the pixel of interest, respectively, from the first video data supplied to the tap extractors 161 and 162. The extracted prediction taps are supplied to the predictor 165 from the tap extractor 161, and the extracted class taps are supplied to the classifier 163 from the tap extractor 162.

If the classifier 163 receives the class taps associated with the pixel of interest from the tap extractor 162, the classifier 163 classifies, in step S6, the pixel of interest on the basis of the class taps. Furthermore, the classifier 163 outputs a class code indicating the determined class of the pixel of interest to the coefficient memory 164. Thereafter, the process proceeds to step S7.

In step S7, the coefficient memory 164 reads a tap coefficient stored at an address corresponding to the class code supplied from the classifier 163 and outputs it. Furthermore, in step S7, the predictor 165 acquires the tap coefficient output from the coefficient memory 164. Thereafter, the process proceeds to step S8.

In step S8, the predictor 165 performs a prediction operation according to a predetermined algorithm using the prediction taps output from the tap extractor 161 and the tap coefficient acquired from the coefficient memory 164. Thus, the predictor 165 then determines the pixel value of the pixel of interest and stores the resultant pixel value into the frame memory 127 (FIG. 10). Thereafter, the process proceeds to step S9.

In step S9, the tap extractor 161 determines whether the second video data includes one or more pixels which have not yet been taken as a pixel of interest. If it is determined in step S9 that the second video data includes such pixels, one of such pixels is taken as a next pixel of interest. The processing flow then returns to step S1 to repeat the process described above.

On the other hand, if it is determined in step S9 that the second video data include no more such pixels which have not yet been taken as a pixel of interest, the process is ended.

Steps S3 and S4 shown in FIG. 23 may be performed only when a new parameter value is overwritten in the parameter memory 168, and steps S3 and S4 may otherwise be skipped.

Now referring to FIG. 22, the predicting operation performed by the predictor 165, the generation of tap coefficients by the coefficient generator 166, and the learning of coefficient seed data stored in the coefficient seed data memory 167 are described below.

Herein we assume that video data having a high resolution (high-resolution video data) is employed as second video data, first video data having a low resolution (low-resolution video data) is produced by reducing the resolution of the high-resolution video data by means of filtering using a LPF (Low Pass Filter), and pixel values of high-resolution pixels are determined (predicted) by means of a prediction algorithm using prediction taps extracted from the low-resolution video data and using tap coefficients.

In a case in which the prediction is performed in accordance with a linear prediction algorithm, the pixel value y of a high-resolution pixel may be determined, for example, by the following linear equation.

$$y = \sum_{n=1}^{N} w_n x_n \qquad (1)$$

where $x_n$ denotes the pixel value of an nth pixel, of prediction taps associated with the high-resolution pixel y, in low-resolution video data (hereinafter, such a pixel will be referred to as a low-resolution pixel), and $w_n$ denotes an nth tap coefficient multiplied by the nth low-resolution pixel (more strictly, the pixel value of the nth low-resolution pixel). In equation (1), it is assumed that the prediction tap includes N low-resolution pixels $x_1, x_2, \ldots, x_n$.

Alternatively, the pixel value y of a high-resolution pixel may be determined using a quadratic formula or a higher-order formula instead of the linear formula (1).

In the example shown in FIG. 22, the coefficient generator 166 generates a tap coefficient $w_n$ from coefficient seed data stored in the coefficient seed data memory 167 and a parameter stored in the parameter memory 168. Herein, it is assumed that the coefficient generator 166 generates the tap coefficient $w_n$ in accordance with the following formula using the coefficient seed data and the parameter.

$$w_n = \sum_{m=1}^{M} \beta_{m,n} z^{m-1} \qquad (2)$$

wherein $\beta_{m,n}$ denotes mth coefficient seed data used to determine the nth tap coefficient $w_n$, and z denotes the parameter. According to equation (2), the tap coefficient $w_n$ is determined using M coefficient seed data $\beta_{n,1}, \beta_{n,2}, \ldots, \beta_{n,M}$.

Note that the equation used to determine the tap coefficients $w_n$ from the coefficient seed data $\beta_{m,n}$ and the parameter z is not limited to equation (2).

Herein, let us introduce a new variable $t_m$ which is given by $z^{m-1}$. That is, variable $t_m$ is defined by the equation (3) using the parameter z appearing in equation (2).

$$t_m = z^{m-1} (m=1, 2, \ldots, M) \qquad (3)$$

Substituting equation (3) into equation (2) yields the following equation.

$$w_n = \sum_{m=1}^{M} \beta_{m,n} t_m \qquad (4)$$

According to equation (4), the tap coefficient $w_n$ can be determined by a linear formula of the coefficient seed data $\beta_{n,m}$ and variable $t_m$.

Herein, let $y_k$ be the true value of a kth sample of a high-resolution pixel, and $y_k'$ be a predicted value, of the true value $y_k$, obtained using equation (1). The prediction error $e_k$ is given by the following equation.

$$e_k = y_k - y_k' \qquad (5)$$

In equation (5), the predicted value $y_k'$ is determined in accordance with equation (1), and thus equation (5) can be rewritten as described below by replacing $y_k'$ in accordance with equation (1).

$$e_k = y_k - \left( \sum_{n=1}^{N} w_n x_{n,k} \right) \tag{6}$$

where $x_{n,k}$ denotes an nth low-resolution pixel of prediction taps associated with the kth sample of the high-resolution pixel.

By substituting equation (4) into $w_n$ in equation (6), the following equation is obtained.

$$e_k = y_k - \left( \sum_{n=1}^{N} \left( \sum_{m=1}^{M} \beta_{m,n} t_m \right) x_{n,k} \right) \tag{7}$$

In an ideal case in which the prediction error $e_k$ given by equation (7) becomes 0, an optimum high-resolution pixel can be given using the coefficient seed data $\beta_{n,m}$. However, in general, it is difficult to determine such coefficient seed data $\beta_{n,m}$ for all high-resolution pixels.

The goodness of the coefficient seed data $\beta_{n,m}$ can be evaluated, for example, by means of the least square method. That is, optimum coefficient seed data $\beta_{n,m}$ can be obtained by minimizing the sum of squares of errors, E, given by the following equation.

$$E = \sum_{k=1}^{K} e_k^2 \tag{8}$$

where K denotes the number of samples (used in learning) of sets of a high-resolution pixel $y_k$ and low-resolution pixels $x_{1,k}, x_{2,k}, \ldots, x_{n,k}$ constituting a prediction tap associated with the high-resolution pixel $y_k$.

The smallest (minimum) value of the sum of the squares of errors, E, given by equation (8) is obtained when the partial derivative of the sum E with respect to the coefficient seed data $\beta_{n,m}$ becomes equal to 0 as shown in equation (9).

$$\frac{\partial E}{\partial \beta_{m,n}} = \sum_{k=1}^{K} 2 \cdot \frac{\partial e_k}{\partial \beta_{m,n}} \cdot e_k = 0 \tag{9}$$

By substituting equation (6) into equation (9), the following equation is obtained.

$$\sum_{k=1}^{K} t_m x_{n,k} e_k = \sum_{k=1}^{K} t_m x_{n,k} \left( y_k - \left( \sum_{n=1}^{N} \left( \sum_{m=1}^{M} \beta_{m,n} t_m \right) x_{n,k} \right) \right) = 0 \tag{10}$$

Herein, $X_{i,p,j,q}$ and $Y_{i,p}$ defined by equation (11) and (12), respectively, are introduced.

$$X_{i,p,j,q} = \sum_{k=1}^{K} x_{i,k} t_p x_{j,k} t_q \tag{11}$$

$(i = 1, 2, \cdots, N: j = 1, 2, \cdots, N: p = 1, 2, \cdots, M: q = 1, 2, \cdots, M)$ $$Y_{i,p} = \sum_{k=1}^{K} x_{i,k} t_p y_k \tag{12}$$

Thus, equation (10) can be rewritten into a normal equation using $X_{i,p,j,q}$ and $Y_{i,p}$ as shown in (13).

$$\begin{bmatrix} X_{1,1,1,1} & X_{1,1,1,2} & \cdots & X_{1,1,1,M} & X_{1,1,2,1} & \cdots & X_{1,1,N,M} \\ X_{1,2,1,1} & X_{1,2,1,2} & \cdots & X_{1,2,1,M} & X_{1,2,2,1} & \cdots & X_{1,2,N,M} \\ \vdots & \vdots & \ddots & \vdots & \vdots & & \vdots \\ X_{1,M,1,1} & X_{1,M,1,2} & \cdots & X_{1,M,1,M} & X_{1,M,2,1} & \cdots & X_{1,M,N,M} \\ X_{2,1,1,1} & X_{2,1,1,2} & \cdots & X_{2,1,1,M} & X_{2,1,2,1} & \cdots & X_{2,1,N,M} \\ \vdots & \vdots & & \vdots & \vdots & \ddots & \vdots \\ X_{N,M,1,1} & X_{N,M,1,2} & \cdots & X_{N,M,1,M} & X_{N,M,2,1} & \cdots & X_{N,M,N,M} \end{bmatrix} \begin{bmatrix} \beta_{1,1} \\ \beta_{2,1} \\ \vdots \\ \beta_{M,1} \\ \beta_{1,2} \\ \vdots \\ \beta_{M,N} \end{bmatrix} = \begin{bmatrix} Y_{1,1} \\ Y_{1,2} \\ \vdots \\ Y_{1,M} \\ Y_{2,1} \\ \vdots \\ Y_{N,M} \end{bmatrix} \tag{13}$$

The normal equation (13) can be resolved with respect to the coefficient see data $\beta_{n,m}$ by means of, for example, the sweeping out method (Gauss-Jordan elimination method).

In the signal processor 137 shown in FIG. 22, the coefficient seed data memory 167 stores coefficient seed data $\beta_{n,m}$ obtained via learning of solving equation (13), in which a large number of high-resolution pixels $y_1, y_2, \ldots, y_k$ are used as teacher data, and low-resolution pixels $x_{1,k}, x_{2,k}, \ldots, x_{n,k}$ constituting a prediction tap associated with each high-resolution pixel $y_k$. The coefficient generator 166 generates the tap coefficient $w_n$ from the coefficient seed data $\beta_{n,m}$ and the parameter z stored in the parameter memory 168 in accordance with the equation (2). The predictor 165 determines the pixel value (predicted value close to the true pixel value) of the pixel of interest of high-resolution pixels by calculating equation (1) using the generated tap coefficient $w_n$ and a low-resolution pixel (pixel of the first video data) $x_n$ of prediction taps associated with the pixel of interest.

Figure 24:
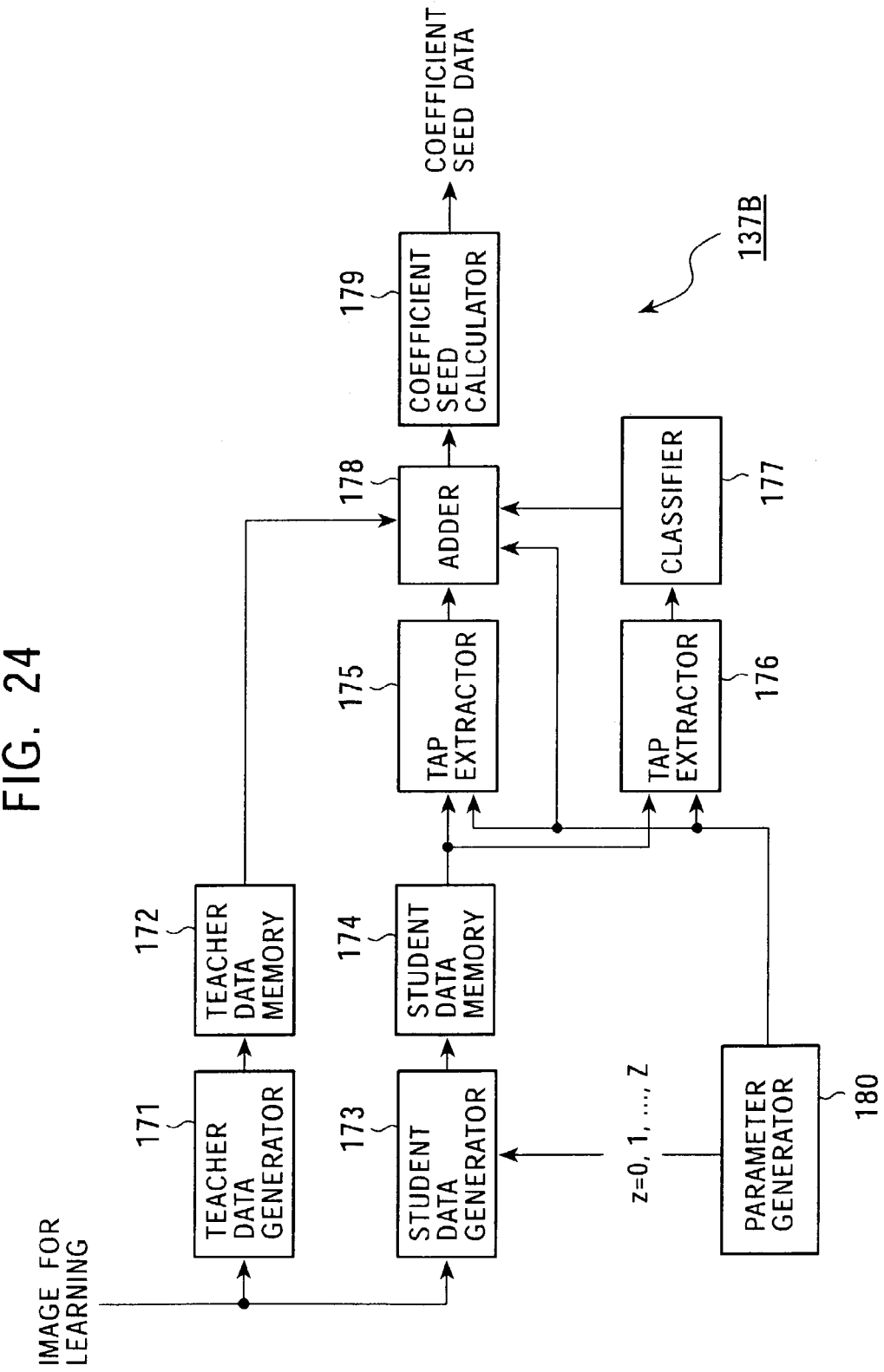
FIG. 24 is a block diagram showing an example of the configuration of a learning apparatus.

FIG. 24 shows an example of the structure of a learning apparatus 137b for learning determining the coefficient seed data $\beta_{n,m}$ by solving the normal equation given by (13).

Video data used in learning of the coefficient seed data $\beta_{n,m}$ is input to the learning apparatus 137b. As for the video data for learning, for example, high-resolution video data may be employed.

In the learning apparatus 137b, the video data for learning is supplied to a teacher data generator 171 and a student data generator 173.

The teacher data generator 171 generates teacher data from the received video data for learning and supplies the generated teacher data to a teacher data memory 172. That is, in this case, the teacher data generator 171 directly transfers, as the teacher data, the high-resolution video data given as the video data for learning to the teacher data memory 172.

The teacher data memory 172 stores the high-resolution video data supplies as the teacher data from the teacher data generator 171.

The student data generator 173 generates student data from the video data for learning and supplies the generated student data to a student data memory 174. More specifically, the student data generator 173 reduces the resolution of the high-resolution video data given as the video data for learning by means of filtering thereby generating low-resolution video data. The resultant low-resolution video data is supplied as the student data to the student data memory 174.

To the student data generator 173, in addition to the video data for learning, some values, which the parameter to be supplied to the parameter memory 168 shown in FIG. 22 can take, are also supplied from the parameter generator 180. For example, when the parameter z can take a real number in the range from 0 to Z, $z=0, 1, 2, \ldots, Z$ are supplied from the parameter generator 180 to the student data generator 173.

The student data generator 173 generates low-resolution video data to be used as the student data by passing the high-resolution video data given as the video data for learning through a LPF (lowpass filter) with a cutoff frequent corresponding to each value of the parameter z.

Figure 25:
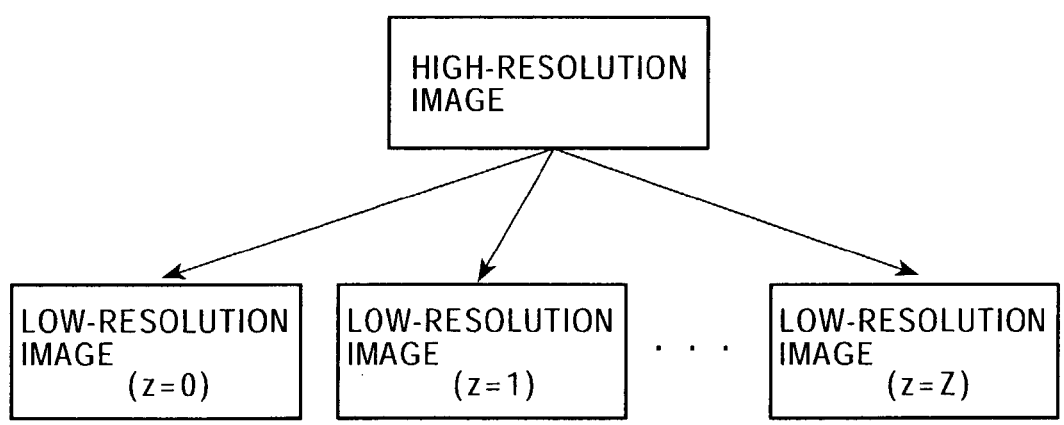
FIG. 25 is a diagram showing a process performed by a student data generator.

Thus, in this case, the student data generator 173 generates Z+1 low-resolution video data with different resolutions to be used as the student data from the high-resolution video data given as the video data for learning, as shown in FIG. 25.

In the present example, the cutoff frequency of the LPF, through which the high-resolution video data is passed to generate the low-resolution video data used as the student data, increases with the value of the parameter z. Therefore, the resolution of the generated low-resolution video data increases with the value of the parameter z.

In the present embodiment, for simplicity, it is assumed that the student data generator 173 generates low-resolution video data by reducing the resolution of high-resolution video data by a factor corresponding to the parameter z in both horizontal and vertical directions.

Referring again to FIG. 24, the student data memory 174 stores the student data supplied from the student data generator 173.

The tap extractor 175 sequentially takes pixels of the high-resolution video data serving as the teacher data stored in the teacher data memory 172 and employs each pixel as a teacher pixel of interest on a one-by-one basis. For each teacher pixel of interest, the tap extractor 175 extracts low-resolution pixels of low-resolution video data from those stored as the student data in the student data memory 174 and produce prediction taps having the same tap structure as that produced by the tap extractor 161 shown in FIG. 22. The resultant prediction taps are supplied to an adder 178.

For each teacher pixel of interest, the tap extractor 176 extracts low-resolution pixels of low-resolution video data from those stored as the student data in the student data memory 174 and produce class taps having the same tap structure as that produced by the tap extractor 162 shown in FIG. 22. The resultant class taps are supplied to a classifier 177.

A parameter z generated by the parameter generator 180 is supplied to both tap extractors 175 and 176. Using generated student data corresponding to the parameter z supplied from the parameter generator 180 (more specifically, low-resolution video data produced, as the student data, using the LPF having a cutoff frequency corresponding to the parameter z), the tap extractors 175 and 176 produce prediction taps and class taps.

The classifier 177 performs classification on the basis of the class taps output from the tap extractor 176, in a similar manner to the classifier 163 shown in FIG. 22. A class code indicating the determined class is output to the adder 178.

The adder 178 reads a teacher pixel of interest from the teacher data memory 172 and performs addition processing on the teacher pixel of interest, the student data produced as the prediction taps associated with the teacher pixel of interest supplied from the tap extractor 175, and the parameter z applied in the production of the student data, for each class code supplied from the classifier 177.

That is, the adder 178 acquires teacher data $y_k$ from the teacher data memory 172, a prediction tap $x_{i,k}(x_{j,k})$ from the tap extractor 175, a class code from the classifier 177, and a parameter z, employed in production of student data used to produce the prediction tap, from the parameter generator 180.

In order to determine components $X_{i,p,j,q}$ of a matrix on the left side of equation (13), for each class indicated by the class code supplied from the classifier 177, the adder 178 determines the product, $x_{i,k}t_p x_{j,k}t_q$, of the prediction tap (student data) $x_{i,k}$ ($x_{j,k}$) and the parameter z and then determines the sum of products thereby determining components $X_{i,p,j,q}$ according to equation (11). In this calculation, $t_p$ and $t_q$ in equation (11) are determined from the parameter z according to equation (3).

Furthermore, to determine components $Y_{i,p}$ of a vector on the right side of equation (13), for each class indicated by the class code supplied from the classifier 177, the adder 178 determines the product, $x_{i,k}t_p y_k$, of the prediction tap (student data) $x_{i,k}$ and the teacher data $y_k$ and then determines the sum of products thereby determining components $Y_{i,p}$ according to equation (12). In this calculation, $t_p$ in equation (12) is determined from the parameter z according to equation (3).

The adder 178 stores, in its internal memory (not shown), the calculated components $X_{i,p,j,q}$ of the matrix on the left side of equation (13), determined for teacher data employed as the teacher pixel of interest and also stores the calculated components $Y_{i,p}$ of the vector on the right side of equation (13). The adder 178 then calculates components $x_{i,k}t_p x_{j,k}t_q$ and $x_{i,k}t_p y_k$, respectively, for teacher data newly employed as the teacher pixel of interest, using the teacher data $y_k$, the student data $x_{i,k}$ ($x_{j,k}$), and the parameter z (summing is performed to determine components $X_{i,p,j,q}$ according to equation (11) and summing is performed to determine components $Y_{i,p}$ according to equation (12)), and the adder 178 adds the calculated components to the components $X_{i,p,j,q}$ of the matrix and the components $Y_{i,p}$ of the vector, respectively, currently stored in the memory.

The adder 178 performs the addition processing described above by employing all teacher data stored in the teacher data memory 172 as the teacher pixel of interest for all values, 0, 1, . . . , Z, of the parameter z thereby creating the normal equation shown in (13) for each class, and the adder 178 supplies the resultant normal equation to a coefficient seed data calculator 179.

The coefficient seed data calculator 179 solves the normal equation supplied from the adder 178 for each class thereby determining the coefficient seed data $\beta_{m,n}$ for each class. The determined coefficient seed data $\beta_{m,n}$ is output.

The parameter generator 180 generates parameter values, z, in the allowable range, to be supplied to the parameter memory 168 shown in FIG. 22. For example, z=0, 1, 2, . . . , Z are generated and supplied to the student data generator 173. The parameter generator 180 also supplies the generated parameter z to the tap extractors 175 and 176 and the adder 178.

Figure 26:
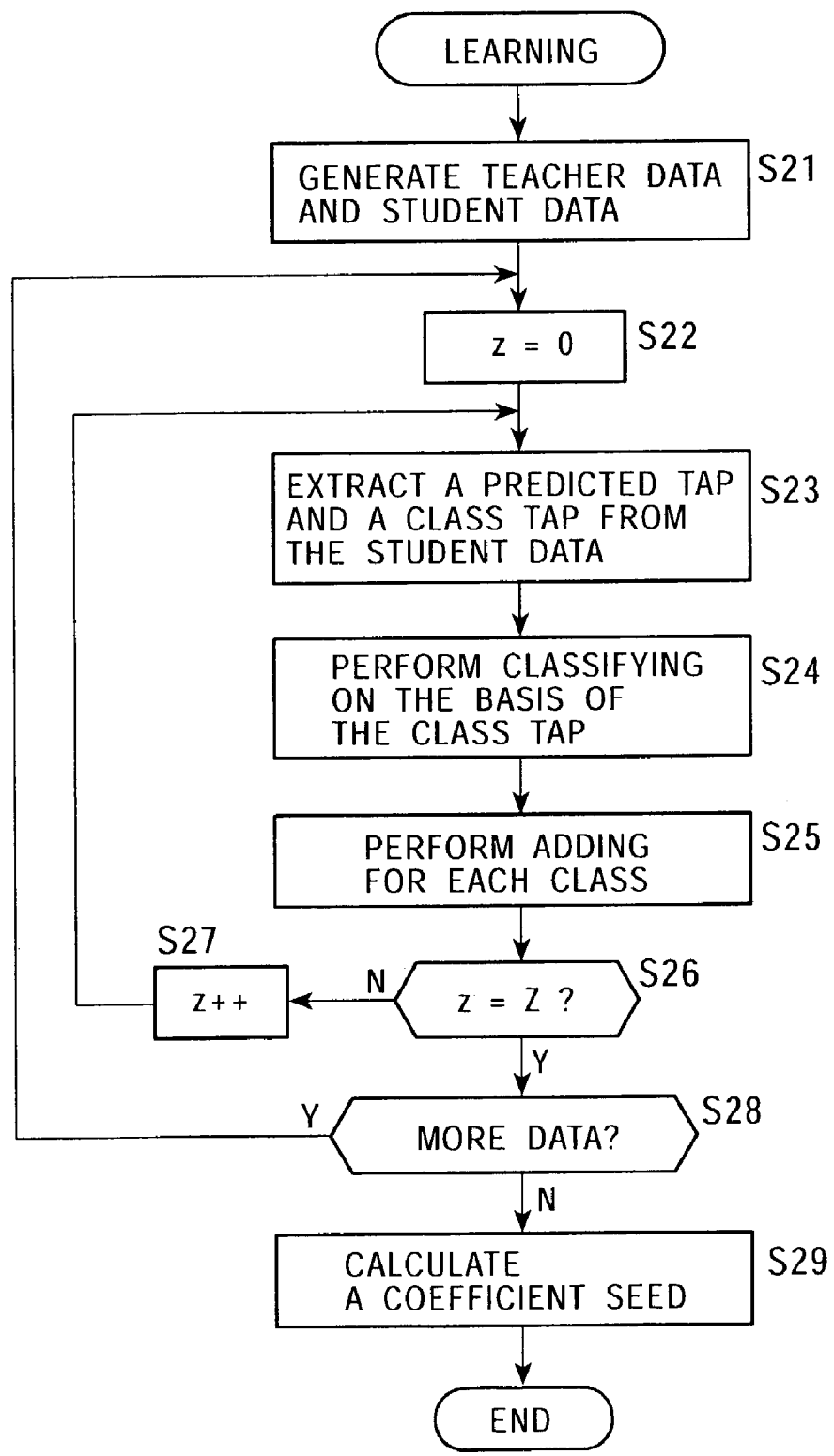
FIG. 26 is a flow chart showing a learning process in terms of coefficient seed data, performed by the learning apparatus.

Now, referring to a flow chart shown in FIG. 26, the process (learning process) performed by the learning apparatus shown in FIG. 24 is described below.

First in step S21, the teacher data generator 171 and the student data generator 173 generate teacher data and student data, respectively, from the video data for learning and output the resultant teacher data and student data. In this case, the teacher data generator 171 directly outputs the video data for learning as the teacher data without performing any processing on it. The student data generator 171 receives the parameter z having Z+1 values generated by the parameter generator 180 and passes the video data for learning through LPFs having cutoff frequencies corresponding to Z+1 values (0, 1, . . . , Z) of the parameter z supplied from the parameter generator 180 thereby generating Z+1 student data associated with the teacher data (video data for learning) for each frame.

The teacher data output from the teacher data generator 171 is supplied to the teacher data memory 172 and stored therein. The student data output from the student data generator 173 is supplied to the student data memory 174 and stored therein.

Thereafter, the process proceeds to step S22. In step S22, the parameter generator 180 sets the parameter z to an initial value, such as 0 and supplies it to the tap extractors 175 and 176 and the adder 178. The process then proceeds to step S23. In step S23, the tap extractor 175 reads teacher data, which has not yet been employed as the teacher pixel of interest, from the teacher data memory 172 and employs it as a new teacher pixel of interest. Furthermore, in this step S23, the tap extractor 175 generates a prediction tap associated with teacher pixel of interest from student data which corresponds to the parameter z output from the parameter generator 180 and which is read from the student data memory 174 (that is, from student data generated by passing the video data for learning corresponding to the teacher data employed as the teacher pixel of interest through an LPF with a cutoff frequency corresponding to the parameter z), and the tap extractor 175 supplies the generated prediction tap to the adder 178. Still furthermore, in this step S23, the tap extractor 176 generates a class tap associated with the teacher pixel of interest from the student data which corresponds to the parameter z output from the parameter generator 180 and which is read from the student data memory 174, and the extractor 176 supplies the generated class tap to the classifier 177.

In the next step S24, the classifiers 177 classifies the teacher pixel of interest on the basis of the class tap associated with the teacher pixel of interest and outputs a class code indicating the determined class to the adder 178. The process then proceeds to step S25.

In step S25, the adder 178 reads a teacher pixel of interest from the teacher data memory 172 and calculates the components $x_{i,k}t_p x_{j,k}t_q$ of the matrix on the left side of equation (13) and the components $x_{i,k}t_p y_k$ of the vector on the right side, using the teacher pixel of interest, the prediction tap supplied from the tap extractor 175, and the parameter z output from the parameter generator 180. The adder 178 then adds the components $x_{i,k}t_p x_{j,k}t_q$ of the matrix and the components $x_{i,k}t_p y_k$ of the vector, calculated from the pixel of interest, the prediction tap, and the parameter z, to the components of the matrix and the components of the vector, corresponding to the class code supplied from the classifier 177, of those which have already been obtained. The process then proceeds to step S26.

In step S26, the parameter generator 180 determines whether the parameter z output from the parameter generator 180 is equal to the maximum allowable value Z. If it is determined in step S26 that the parameter z output from the parameter generator 180 is not equal to the maximum value Z (that is, the parameter z is smaller than the maximum value Z), the process proceeds to step S27. In step S27, the parameter generator 180 increments the parameter z by 1 and outputs the resultant parameter z having the new value to the tap extractors 175 and 176 and the adder 178. The processing flow then returns to step S23 to repeat the process descried above.

In the case in which it is determined in step S26 that the parameter z is equal to the maximum value Z, the process proceeds to step S28. In step S28, the tap extractor 175 determines whether all teacher data stored in the teacher data memory 172 have been employed as the teacher pixel of interest. If it is determined in step S28 that the teacher data stored in the teacher data memory 172 include data which has not yet been employed as the teacher pixel of interest, the tap extractor 175 employs teacher data, which has not yet been employed as the teacher pixel of interest, as a new teacher pixel of interest. The process flow then returns to step S22 to repeat the process described above.

In the case in which it is determined in step S28 that there is no more teacher data which has not yet been employed as the teacher pixel of interest, in the teacher data memory 172, the adder 178 supplies the matrix on the left side and the vector on the right side of equation (13), obtained via the process described above for each class, to the coefficient seed data calculator 179. The process then proceeds to step S29.

In step S29, the coefficient seed data calculator 179 solves the normal equation (13) including the matrix on the left side and the vector on the right side supplied from the adder 178, for each class, thereby determining the coefficient seed data $\beta_{m,n}$ for each class. The determined coefficient seed data $\beta_{m,n}$ is output, and thus process is completed.

There is a possibility that a sufficient number of normal equations needed to determine coefficient seed data are cannot be obtained for some classes, because of an insufficient number of video data for learning or for other reasons. As for such a class, the coefficient seed data calculator 179 outputs default coefficient seed data.

In the learning apparatus shown in FIG. 24, high-resolution video data is employed as teacher data for learning and low-resolution video data produced by reducing the resolution of the high-resolution video data to a resolution corresponding to the parameter z is employed as student data, as shown in FIG. 25, and learning is performed to directly determine coefficient seed data $\beta_{m,n}$, which results in a minimum value for the sum of squares of errors of predicted value y given by the linear formula (1), from the student data $x_n$ and the tap coefficient $w_n$ represented by the coefficient seed data $\beta_{m,n}$ and the variable $t_m$ corresponding to the parameter z according to equation (4). Alternatively, the learning of the coefficient seed data $\beta_{m,n}$ may be performed as described below with reference to FIG. 27.

Figure 27:
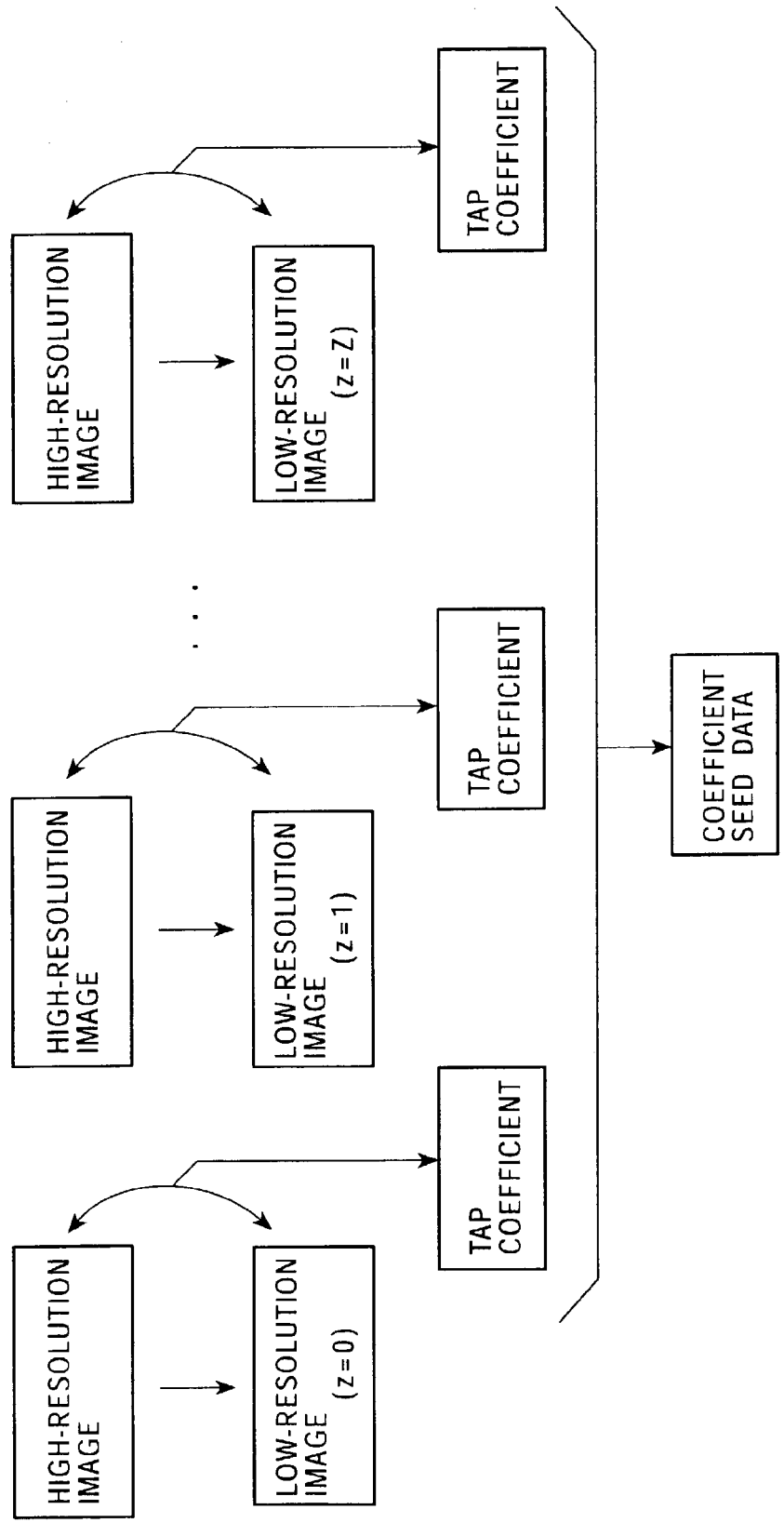
FIG. 27 is a diagram showing a method of learning in terms of coefficient seed data.

Also in the example shown in FIG. 27, as in the example shown in FIG. 25, high-resolution video data is employed as teacher data for learning and low-resolution video data produced by reducing the horizontal and vertical resolutions of the high-resolution video data by passing the high-resolution video data through an LPF with a cutoff frequency corresponding to the parameter z is employed as student data. First, for each value of the parameter z (z=0, 1, . . . , Z), tap coefficients $w_n$ are determined, which result in zero for the sum of squares of errors of predicted values y of teacher data predicted using a linear formula (1) including tap coefficients $w_n$ and student data $x_n$. Furthermore, in the example shown in FIG. 27, the determined tap coefficients $w_n$ are employed as teacher data and the parameter z is employed as student data, and learning is performed so as to determine coefficient seed data $\beta_{m,n}$ which results in a minimum value for the sum of squares of errors of predicted values y of the tap coefficients $w_n$ employed as the teacher data, predicted using the coefficient seed data $\beta_{m,n}$ and the parameter z employed as the student data according to equation (4).

More specifically, the tap coefficients $w_n$ which result in the smallest (minimum) value for the sum E, given by equation (8), of squares of errors of predicted values y of teacher data predicted using a linear prediction formula (1) can be obtained when the partial differential of the sum E with respect to the tap coefficient $w_n$ is equal to zero. That is, the following equation should be satisfied.

$$\frac{\partial E}{\partial w_n} = e_1 \frac{\partial e_1}{\partial w_n} + e_2 \frac{\partial e_2}{\partial w_n} + \ldots + e_k \frac{\partial e_n}{\partial w_n} = 0 \ (n = 1, 2, \ldots, N) \quad (14)$$

If equation (6) is partially differentiated with respect to the tap coefficient $w_n$, the following equation is obtained.

$$\frac{\partial e_k}{\partial w_1} = -x_{1,k}, \frac{\partial e_k}{\partial w_2} = -x_{2,k}, \ldots, \frac{\partial e_k}{\partial w_N} = -X_{N,k}, \ (k = 1, 2, \ldots, K) \quad (15)$$

From equations (14) and (15), the following equation is obtained.

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (16)$$

By substituting equation (6) into $e_k$ in equation (16), equation (16) can be rewritten into a normal equation (17).

$$\begin{bmatrix} \left(\sum_{k=1}^{K} x_{1,k}x_{1,k}\right) & \left(\sum_{k=1}^{K} x_{1,k}x_{2,k}\right) & \cdots & \left(\sum_{k=1}^{K} x_{1,k}x_{N,k}\right) \\ \left(\sum_{k=1}^{K} x_{2,k}x_{1,k}\right) & \left(\sum_{k=1}^{K} x_{2,k}x_{2,k}\right) & \cdots & \left(\sum_{k=1}^{K} x_{2,k}x_{N,k}\right) \\ \vdots & \vdots & \ddots & \vdots \\ \left(\sum_{k=1}^{K} x_{N,k}x_{1,k}\right) & \left(\sum_{k=1}^{K} x_{N,k}x_{2,k}\right) & \cdots & \left(\sum_{k=1}^{K} x_{N,k}x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k}y_k\right) \\ \left(\sum_{k=1}^{K} x_{2,k}y_k\right) \\ \vdots \\ \left(\sum_{k=1}^{K} x_{N,k}y_k\right) \end{bmatrix} \quad (17)$$

As with the normal equation (13), the normal equation (17) can be solved for the tap coefficient $w_n$ by means of, for example, the sweeping out method (Gauss-Jordan elimination method).

Thus, by solving the normal equation (17), the optimum tap coefficients $w_n$ (which result in the smallest value for the sum E of squares of errors) are determined for respective values of the parameter z (z=0, 1, . . . , Z).

In the present embodiment in which the tap coefficient is determined from the coefficient seed data $\beta_{m,n}$ and the parameter $t_m$ corresponding to the parameter z in accordance with the equation (4), if the tap coefficient determined in such a manner is denoted by $w_n'$, the optimum tap coefficient $w_n$ is given by the coefficient seed data $\beta_{n,m}$ which results in zero in the error $e_n$ between the optimum tap coefficient $w_n$ given by equation (18) and the tap coefficient $w_n'$ given by equation (4). However, in general, it is difficult to determine such coefficient seed data $\beta_{n,m}$ for all tap coefficients $w_n$.

$$e_n = w_n - w_n' \quad (18)$$

Equation (18) can be rewritten as follows, using equation (4).

$$e_n = w_n - \left(\sum_{m=1}^{M} \beta_{m,n} t_m\right) \quad (19)$$

If the goodness of the coefficient seed data $\beta_{n,m}$ is expressed by the means of the least square method, the optimum coefficient seed data $\beta_{n,m}$ can be determined by minimizing the sum E of squares of errors represented in the following equation.

$$E = \sum_{n=1}^{N} e_n^2 \quad (20)$$

The smallest (minimum) value of the sum E of squares of errors expressed in equation (20) is given by $\beta_{n,m}$ which results in zero in the partial differential of the sum E with respect to the coefficient seed data $\beta_{n,m}$, as shown in equation (21).

$$\frac{\partial E}{\partial \beta_{m,n}} = \sum_{m=1}^{M} 2 \frac{\partial e_n}{\partial \beta_{m,n}} \cdot e_n = 0. \quad (21)$$

Substituting equation (19) into equation (21) yields the following equation.

$$\sum_{m=1}^{M} t_m \left( w_n - \left(\sum_{m=1}^{M} \beta_{m,n} t_m\right)\right) = 0 \quad (22)$$

Herein, $X_{ij}$ and $Y_i$ defined by equation (23) and (24) are introduced.

$$X_{i,j} = \sum_{z=0}^{Z} t_i t_j \; (i = 1, 2, \ldots, M : j = 1, 2, \ldots, M) \quad (23)$$

$$Y_i = \sum_{z=0}^{Z} t_i w_n \quad (24)$$

Equation (22) can be rewritten into a normal equation (25) using $X_{ij}$ and $Y_i$.

$$\begin{bmatrix} X_{1,1} & X_{1,2} & \cdots & X_{1,M} \\ X_{2,1} & X_{2,1} & \cdots & X_{2,2} \\ \vdots & \vdots & \ddots & \vdots \\ X_{M,1} & X_{M,2} & \cdots & X_{M,M} \end{bmatrix} \begin{bmatrix} \beta_{1,n} \\ \beta_{2,n} \\ \vdots \\ \beta_{M,n} \end{bmatrix} = \begin{bmatrix} Y_1 \\ Y_2 \\ \vdots \\ Y_M \end{bmatrix} \quad (25)$$

The normal equation (25) can be resolved with respect to the coefficient see data $\beta_{n,m}$ by means of, for example, the sweeping out method (Gauss-Jordan elimination method).

Figure 28:
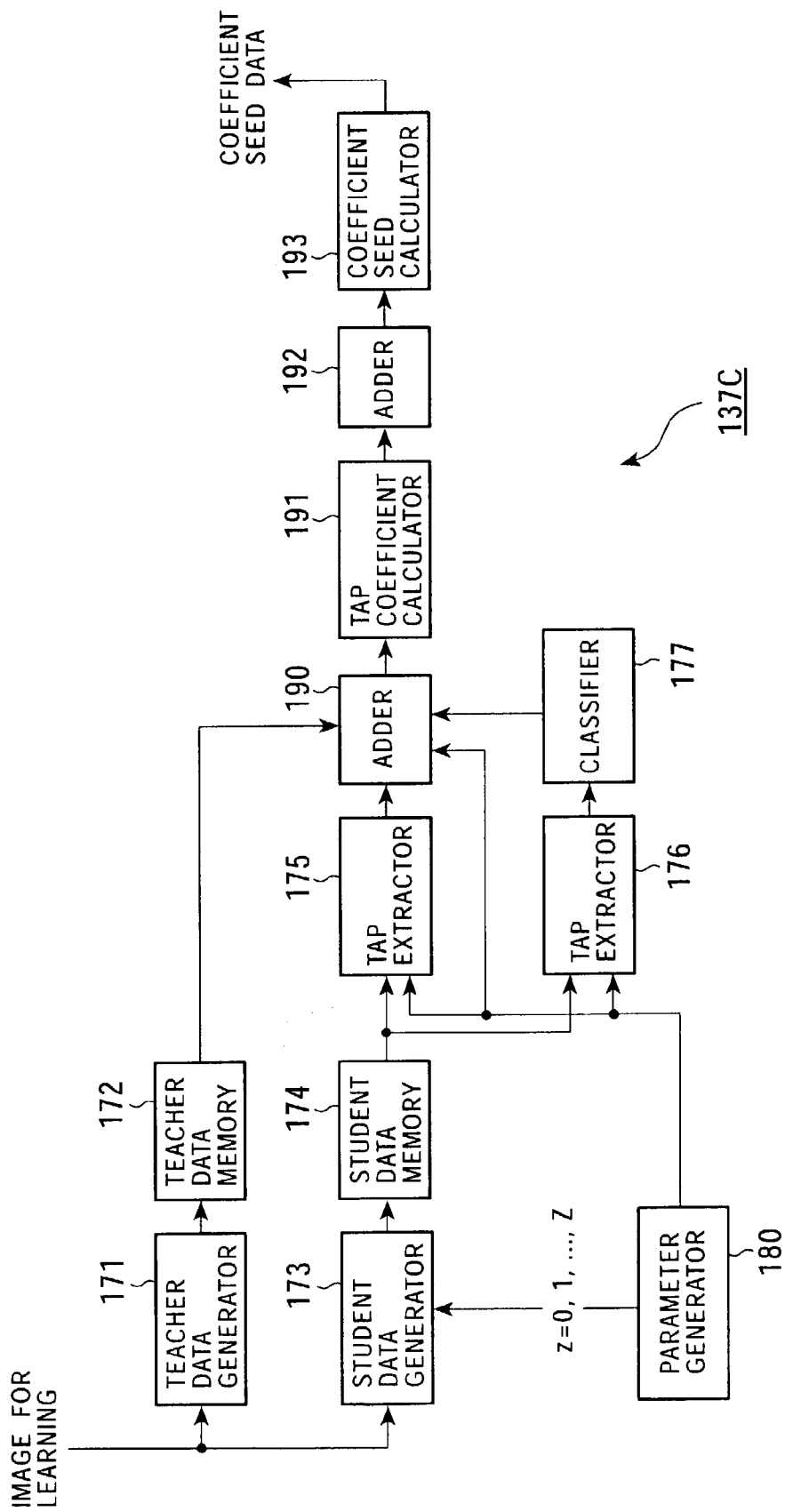
FIG. 28 is a block diagram showing another example of the configuration of the learning apparatus.

FIG. 28 shows an example of the configuration of a learning apparatus for learning determining the coefficient seed data $\beta_{n,m}$ by solving the normal equation (25). In FIG. 24, similar parts to those in FIG. 24 are denoted by similar reference numerals, and similar parts are not described herein in further detail.

An adder 190 receives a class code associated with a teacher pixel of interest from a classifier 177 and a parameter z from a parameter generator 180. The adder 190 reads a teacher pixel of interest from a teacher data memory 172 and performs addition processing in terms of the teacher pixel of interest and the student data produced as the prediction taps associated with the teacher pixel of interest supplied from the tap extractor 175, for each class code supplied from the classifier 177 and for each value of the parameter z output from the parameter generator 180.

That is, the adder 190 acquires teacher data $y_k$ from the teacher data memory 172, a prediction tap $x_{n,k}$ from the tap extractor 175, a class code from the classifier 177, and a parameter z, employed in production of student data used to produce the prediction tap $x_{n,k}$, from the parameter generator 180.

The adder 190 determines the product, $x_{n,k} x_{n',k}$, of the student data and then determines the sum of the products thereby determining components of the matrix on the left side of equation (17), for each class indicated by the class code supplied from the classifier 177 and for each value of the parameter z output from the parameter generator 180, using the prediction tap (student data) $x_{n,k}$.

Furthermore, for each class indicated by the class code supplied from the classifier 177 and for each value of the parameter z output from the parameter generator 180, using the prediction tap (student data) $x_{n,k}$ and the teacher data $y_k$, the adder 190 determines the product, $x_{n,k} y_k$, of the student data $x_{n,k}$ and the teacher data $y_k$ and further determines the sum of the products thereby determining components of the vector on the right side of equation (17).

The adder 190 stores, in its internal memory (not shown), the calculated components ($\Sigma x_{n,k} x_{n',k}$) of the matrix on the left side of equation (17), determined for teacher data employed previously as the teacher pixel of interest and also stores the calculated components ($\Sigma x_{n,k} y_k$) of the vector on the right side of equation (17). The adder 190 then adds (determines the sum in equation (17)) those components ($\Sigma x_{n,k} x_{n',k}$) of the matrix and the components ($\Sigma x_{n,k} y_k$) of the vector with the corresponding ($\Sigma x_{n,k+1} x_{n',k+1}$) of the matrix and the components ($\Sigma x_{n,k} y_{k+1}$) of the vector, respectively, calculated, using the teacher data $y_{k+1}$ and the student data $x_{n,k+1}$, for teacher data newly employed as the teacher pixel of interest.

The adder 190 performs the addition processing described above by employing all teacher data stored in the teacher data memory 172 as the teacher pixel of interest thereby creating the normal equation shown in (17) for each class and for each value of the parameter z, and the adder 190 supplies the resultant normal equation to a coefficient seed data calculator 191.

The coefficient seed data calculator 191 solves the normal equation supplied from the adder 190 for each class and for value of the parameter z thereby determining the optimum tap coefficients $w_n$ for each value of the parameter z and for each class. The resultant optimum tap coefficients $w_n$ are supplied to the adder 192.

The adder 192 performs the addition in terms of the parameter z (variable $t_m$ corresponding to the parameter z) and the optimum tap coefficients $w_n$, for each class.

That is, using the variable $t_i$ ($t_j$) determined from the parameter z according to equation (3), the adder 192 determines the products ($t_i t_j$) of variables $t_i$ and $t_j$ corresponding to the parameter z to be used to determine the components $X_{ij}$, defined by equation (23), of the matrix on the left side of equation (25), and the adder 192 further determines the sum of the products, for each class.

The components $X_{ij}$ depend on only the parameter z and do not depend on the class. Therefore, in practice, it is not necessary to calculate the components $X_{ij}$ for each class. That is, the calculation of the components $X_{ij}$ is performed only once.

Furthermore, using the variable $t_i$ determined from the parameter z according to equation (3) and also using the optimum tap coefficients $w_n$, the adder 192 determines the products ($t_i w_n$) of the variable $t_i$ corresponding to the parameter z and the optimum tap coefficient $w_n$, to be used to determine the components $Y_i$, defined by equation (24), of the vector on the right side of equation (25), and the adder 192 further determines the sum of the products, for each class.

If the components $X_{ij}$ defined by equation (23) and the components $Y_i$ defined by equation (24) have been determined thereby creating the normal equation (25), the adder 192 supplies the resultant normal equation to the coefficient seed data calculator 193.

The coefficient seed data calculator 193 solves the normal equation (25) supplied from the adder 192 for each class thereby determining the coefficient seed data $\beta_{m,n}$ for each class. The determined coefficient seed data $\beta_{m,n}$ is output.

The coefficient seed data $\beta_{m,n}$ determined in the above-described manner may be stored in the coefficient seed data memory 167 of the signal processor 137 shown in FIG. 22.

Alternatively, the signal processor 137 shown in FIG. 22 may not include the coefficient seed data memory 167 but the signal processor 137 may store the optimum tap coefficients $w_n$ output from the tap coefficient calculator 191 shown in FIG. 28 for each value of the parameter, select an optimum tap coefficient depending on the parameter z stored in the parameter memory 168, and set the selected optimum tap coefficient into the coefficient memory 164. However, in this case, the signal processor 137 has to have a memory having a large capacity proportional to the number of values the parameter z can take. In contrast, in the case in which the coefficient seed data memory 167 is provided to store the coefficient seed data, the required storage capacity of the coefficient seed data memory 167 does not depends on the number of values the parameter z can take, and thus a memory having a small storage capacity can be employed as the coefficient seed data memory 167. In the case in which the coefficient seed data $\beta_{m,n}$ is stored, the tap coefficient $w_n$ can be generated from the coefficient seed data $\beta_{m,n}$ and the value of the parameter z in accordance with equation (2). This makes it possible to obtain a continuous value for the tap coefficient $w_n$ depending on the value of the parameter z, and thus it becomes possible to continuously adjust the image quality of the high-resolution video data, output as the second video data from the predictor 165 shown in FIG. 22.

In the case described above, because learning of the coefficient seed data is performed by employing the video data for learning as the teacher data corresponding to second video data and also employing the low-resolution video data obtained by reducing the resolution of the video data for learning as the student data corresponding to first video data, the coefficient seed data can be used in the video data conversion from the first video data having low resolution to the second video data having improved resolution. That is, the coefficient seed data can be used in video data conversion for improving the resolution.

Therefore, if the coefficient seed data is stored in the EEPROM 137A in the signal processor 137 of the master device 1, and if the functions shown in FIG. 22 are realized, and furthermore if the program for the video data conversion according to the flow chart shown in FIG. 23 is stored, the signal processor 137 has the capability of improving the horizontal resolution and the vertical resolution of given video data depending on the parameter z.

By properly selecting the student data corresponding to the first video data and the video data employed as the teacher data corresponding to the second video data, it is possible to obtain coefficient seed data optimized for use in various kinds of video data conversion.

For example, if learning is performed by employing high-resolution video data as the teacher data and also employing, as the student data, video data obtained by superimposing noise corresponding to the parameter z on the high-resolution video data employed as the teacher data, it is possible to obtain coefficient seed data optimized for use in the video data conversion for converting first video data including noise to second video data including no noise (low noise). That is, coefficient seed data optimized for use in reducing noise is obtained.

For example, if learning is performed by employing certain video data as the teacher data and employing, as the student data, video data obtained by reducing the number of pixels of the video data employed as the teacher data at a reduction rate corresponding to the parameter z, or if learning is per formed by employing video data with an image size corresponding to the parameter z and employing, as the teacher data, data obtained by reducing the number of pixels of the video data employed as the student data, at a particular reduction rate, coefficient seed data optimized for use in video data conversion for converting first video data into second video data with an increased or reduced image size is obtained. That is, coefficient seed data optimized for use in resizing is obtained.

That is, by storing coefficient seed data for use in removing noise or coefficient seed data for use in resizing in the EEPROM 137A of the signal processor 137 of the master device 1, it becomes possible for the signal processor 137 to have the capability of removing noise from video data or resizing (enlarging or reducing) video data, in accordance with the parameter z.

Although in the example described above, the tap coefficient $w_n$ is defined as $\beta_{1,n}z^0+\beta_{2,n}z^1+, \ldots, \beta_{m,n}z^{m-1}$ as shown in (2), and the tap coefficient $w_n$ for use in improving the horizontal resolution and the vertical resolution depending on the parameter z is determined in accordance equation (2), the tap coefficient $w_n$ may be determined separately for use in improving the horizontal resolution and for use in improving the vertical resolution depending on independent parameters zx and zy.

For example, the tap coefficient $w_n$ is defined not according to equation (2) but as $\beta_{1,n}z_x^0z_y^0+\beta_{2,n}z_x^1z_y^0+\beta_{3,n}z_x^2z_y^0+\beta_{4,n}z_x^3z_y^0+\beta_{5,n}z_x^0z_y^1+\beta_{6,n}z_x^0z_y^2+\beta_{7,n}z_x^0z_y^3+\beta_{8,n}z_x^1z_y^1+\beta_{9,n}z_x^2z_y^1+\beta_{10,n}z_x^1z_y^2$, and the variable $t_m$ is defined not according to equation (3) but as $t_1=zx^0zy^0$, $t_2=zx^1zy^0$, $t_3=zx^2zy^0$, $t_4=zx^3zy^0$, $t_5=zx^0zy^1$, $t_6=zx^0zy^2$, $t_7=zx^0zy^3$, $t_8=zx^1zy^1$, $t_9=zx^2zy^1$, and $t_{10}=zx^1zy^2$. Also in this case, the tap coefficient $w_n$ can be finally expressed by equation (4). Therefore, if, learning is performed in the learning apparatus (FIG. 24 or 28) by employing, as the student data, video data produced by reducing the horizontal resolution and the vertical resolution of teacher data depending on the parameter zx and zy, respectively, thereby determining coefficient seed data $\beta_{m,n}$, the resultant coefficient seed data $\beta_{m,n}$ can be used to determine the tap coefficients $w_n$ for use in independently improving the horizontal resolution and the vertical resolution depending on the independent parameters zx and zy.

Furthermore, for example, if a parameter zt corresponding to temporal resolution is introduced in addition to the parameters zx and zy corresponding to the horizontal resolution and the vertical resolution, respectively, tap coefficients $w_n$ for use in independently improving the horizontal resolution, the vertical resolution, and the temporal resolution, depending on the independent parameters zx, zy, and zt.

Furthermore, for use in resizing, as in improving the resolution, not only the tap coefficients $w_n$ for use in enlarging (or reducing) video data by the same factor corresponding to the parameter z in both horizontal and vertical direction but also tap coefficients $w_n$ for use in enlarging video data in the horizontal direction and in the vertical direction, independently, depending on the parameter zx and zy, respectively, can be obtained.

Furthermore, if learning is performed in the learning apparatus (FIG. 24 or 28) by employing, as the student data, video data produced by reducing the horizontal resolution and the vertical resolution of teacher data depending on a parameter zx and further adding noise to the teacher data depending on a parameter zy thereby determining coefficient seed data $\beta_{m,n}$, the resultant coefficient seed data $\beta_{m,n}$ can be used to determine the tap coefficients $w_n$ for use in improving the horizontal resolution and the vertical resolution depending on the parameter zx and removing noise depending on the parameter zy.

The above-described capability of performing video data conversion is possessed by not only the master device but also slave devices 2.

Figure 29:
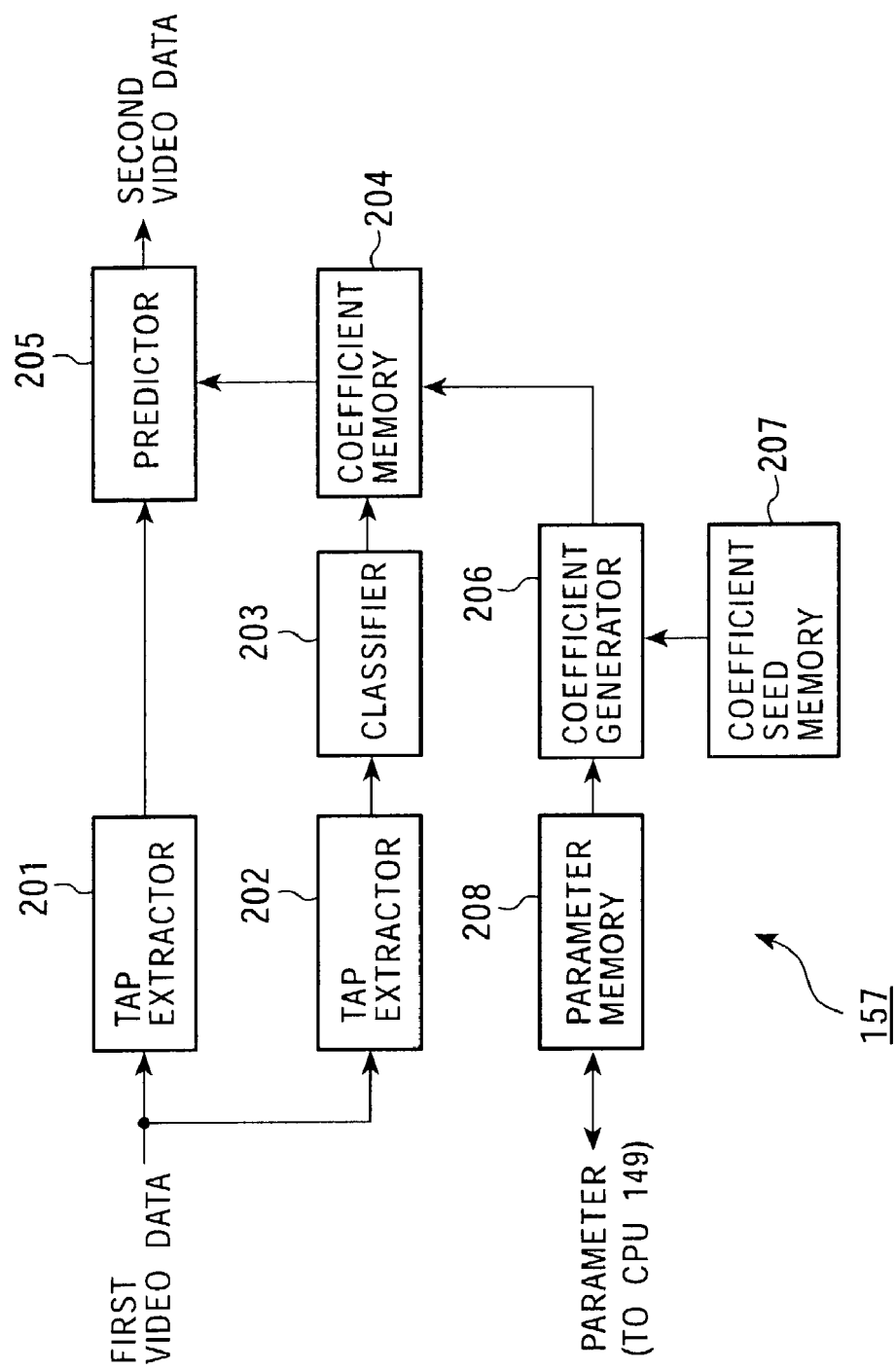
FIG. 29 is a block diagram showing an example of the configuration of the signal processor.

FIG. 29 shows an example of a functional configuration of the signal processor 157 for performing video data conversion in a slave device 2 (FIG. 11). As with the signal processor 137 shown in FIG. 22, the functions shown in FIG. 29 can be realized by executing a program stored in the EEPROM 157B using the DSP 157A in the signal processor 157.

In FIG. 29, the signal processor 157 of the slave device 2 is made up of parts including a tap extractor 201, . . . , and a parameter memory 208 similar to the tap extractor 161, . . . , and the parameter memory 168 in the signal processor 137 (FIG. 22) of the master device 1, and thus further description is not provided herein.

In the present embodiment, the coefficient seed data stored in the signal processor 137 of the master device 1 and the coefficient seed data stored in the signal processor 157 of the slave device 2 are different, at least partially, from each other, although the same coefficient seed data may be stored in both the signal processor 137 of the master device 1 and the signal processor 158 of the slave device 2.

For example, coefficient seed data for use in resizing and coefficient seed data for use in improving the resolution are stored in the-signal processor 137 of the master device 1, while coefficient seed data for use in resizing and coefficient seed data for use in removing noise are stored in the signal processor 157 of the slave device 2.

Alternatively, coefficient seed data for use in resizing may be stored in the signal processor 137 of the master device 1, while coefficient seed data for use in removing noise may be stored in the signal processor 157 of a certain slave device $2_{ij}$ and coefficient seed data for use in improving the resolution may be stored in the signal processor 157 of another slave device $2_{pq}$.

It is also possible to store a plurality of coefficient seed data for use in various kinds of processing in both the signal processor 137 of the master device 1 and the signal processor 157 of the slave device 2. However, in this case, it is needed to store the coefficient seed data for use in various kinds of processing in both the EEPROM 137B and EEPROM 157B. This causes the EEPROM 137B and the EEPROM 157B to need to have a high storage capacity, which results in an increase in cost of the master device 1 or the slave device 2.

In the scalable TV system according to the present embodiment, because the master device 1 and the slave device 2 are connected to each other so that IEEE1394 communication is possible between them, it is possible to transfer coefficient seed data from the master device 1 to the slave device 2 or from the slave device 2 to the master device 1 by means of IEEE1394 communication. For example, in a case in which a slave device 2 having coefficient seed data for use in removing noise is connected to a master device 1, the master device 1 can perform noise reduction by using the coefficient seed data for use removing noise acquired from the slave device 2, even if the master device 1 does not have the coefficient seed data for use in removing noise.

Thus, the number of processes executable by the master device 1 (and also the slave device 2) with the number of slave devices connected in the scalable TV system. That is, the performance of the master device 1 (and also the capability of the slave device 2) becomes higher with the number of slave devices.

This makes it possible to use a low-capacity memory as the EEPROM 137B or the EEPROM 157B, and thus it is possible to reduce the cost of the master device 1 or the slave device 2. Furthermore, this motivates users to purchase not only a master device 1 but also additional slave devices 2 to enhance the total performance of the scalable TV system by increasing the number of slave devices 2. When a user purchases a new additional slave device, existing slave devices 2 possessed by the user is necessary to perform processes using coefficient seed data of the slave devices 2. This prevents the existing slave devices 2 from being thrown out by the user, and thus the present technique contributes effective use of resources.

In the present embodiment, the signal processor 157 of a slave device 2 does not perform any independent process, but, when the signal processor 157 of the slave device 2 receives a command via the CPU 149 (FIG. 11) from the master device 1 by means of IEEE1394 communication, the signal process 157 performs a process in accordance with the received command.

Therefore, although the slave device 2 has not only a capability (TV capability) of displaying an image on the CRT 31 in accordance with a television broadcast signal received by the antenna and output an associated audio signal from the speaker units 32L and 32R and also a capability (special capability) of performing a process achieved by the signal processor 157, only the TV capability can be used when the slave device 2 is singly operated, but the special capability cannot be used. That is, in order to use the special capability of the slave device 2, it is required that the slave device 2 is connected with the master device 1 so as to form a scalable TV system.

Figure 30:
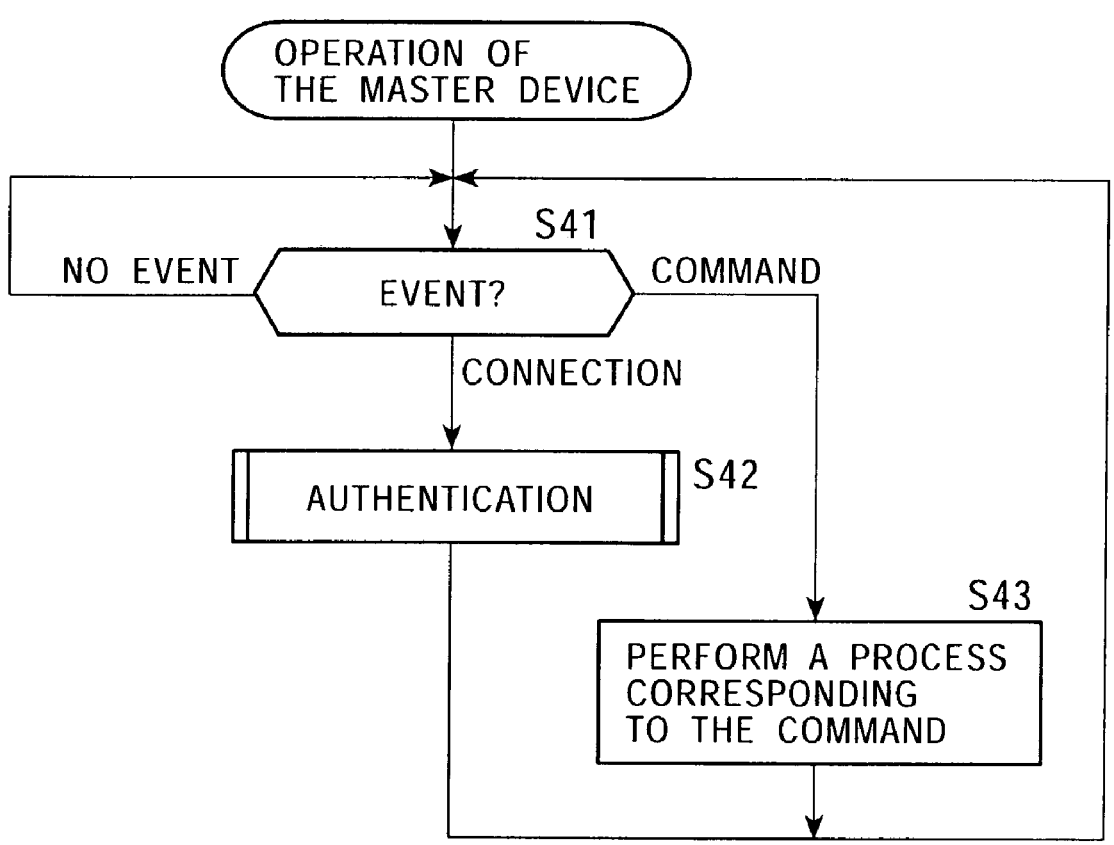
FIG. 30 is a flow chart showing a process performed by the master device.

Now, referring to a flow chart shown in FIG. 30, a process performed by the master device 1 shown in FIG. 10 is described below.

First, in step S41, the CPU 129 determines whether connection of some device to the terminal panel 21 or reception of some command from the IEEE1394 interface 133 or the IR receiver 135 has occurred as an event. If it is determined that no event has occurred, the process returns to step S41.

In the case in which it is determined in step S41 that connection of a device to the terminal panel 21 has occurs as an event, the process proceeds to step S42. In step S42, the CPU 129 performs authentication as will be described later with reference to FIG. 31. The process then returns to step S41.

To determine whether some device has been connected to the terminal panel 21, it is needed to detect connection of the device to the terminal panel 21. The detection can be performed, for example, as described below.

If a device is connected (via a IEEE1394 cable) to an IEEE1394 terminal $21_{ij}$ provided on the terminal panel 21 (FIG. 3), the terminal voltage of the IEEE1394 $21_{ij}$ changes. If the IEEE1394 interface 133 detects the change in the terminal voltage, the IEEE1394 interface 133 informs the CPU 129 that the terminal voltage has changed. In response to receiving the notification of the change in the terminal voltage from the IEEE1394 interface 133, the CPU 129 determines that a new device has been connected to the terminal panel 21. The CPU 129 can also detect disconnection of some device from the terminal panel 21 in a similar manner.

On the other hand, in the case in which it is determined in step S41 that reception of some command from the IEEE1394 interface 133 or the IR receiver 135 has occurred as an event, the process proceeds to step S43. In step S43, the master device 1 performs processing corresponding to the received command. The process then returns to step S41.

Referring to a flow chart shown in FIG. 31, authentication performed, in step S42 shown in FIG. 30, by the master device 1 is described below.

In the authentication performed by the master device 1, verification as to whether the device newly connected to the terminal panel 21 (hereinafter, referred to simply as a connected device) is an authorized IEEE1394 device and verification as to whether the IEEE1394 device is a television set capable of operating as a master device or a slave device (as to whether the IEEE1394 device is a scalable television set) are performed.

That is, in the authentication performed by the master device 1, first, in step S51, the CPU 129 controls the IEEE1394 interface 133 so as to transmit an authentication request command to request mutual authentication to a device connected to the master device 1. The process then proceeds to step S52.

In step S52, the CPU 129 determines whether a response to the authentication request command has been returned from the connected device. If it is determined in step S52 that a response to the authentication request command has not been returned from the connected device, the process proceeds to step S53. In step S53, the CPU 129 determines whether a timeout has occurred, that is, whether a predetermined period of time has elapsed since the authentication request command was transmitted.

If it is determined in step S53 that a timeout has occurred, that is, if no response is returned from the connected device within the predetermined period of time after the transmission of the authentication request command to the connected device, the process proceeds to step S54. In step S54, the CPU 129 determines that the authentication has failed because the connected device is not an authorized IEEE1394 device. In this case, the CPU 129 sets the operation mode to a single device mode in which no data is transmitted between the master device 1 and the connected device. The process exits the authentication routine.

In this case, no further transmission of either IEEE1394 communication data or other data is performed between the master device 1 and the connected device which is not an authorized IEEE1394 device.

On the other hand, in the case in which it is determined in step S53 that timeout has not occurred, the process flow returns to step S52 to repeat the process described above.

If it is determined in step S52 that a response to the authentication request command has been returned from the connected device, that is, if the response from the connected device has been received by the IEEE1394 interface 133 and then transferred to the CPU 129, the process proceeds to step S55. In step S55, the CPU 129 generates a random (pseudorandom) number R1 in accordance with a predetermined algorithm and transmits it to the connected device via the IEEE1394 interface 133.

Thereafter, the process proceeds to step S56. In step S56, the CPU 129 determines whether an encrypted random number E' (R1) produced by encrypting the random number R1 transmitted in step S55 in accordance with a predetermined encryption algorithm (for example, a secret-key encryption algorithm such as DES (Data Encryption Standard) or FEAL (Fast data Encipherment Algorithm), or RC5) has been received from the connected device.

If it is determined in step S56 that the encrypted random number E' (R1) has not been received from the connected device, the process proceeds to step S57. In step S57, the CPU 129 determines whether a timeout has occurred, that is, whether a predetermined period of time has elapsed since the random number R1 was transmitted.

If it is determined in step S57 that a timeout has occurred, that is, if the encrypted random number E' (R1) has not been received within a predetermined period of time after the transmission of the random number R1 to the connected device, the process proceeds to step S54. In step S54, the CPU 129 determines that the connected device is not an authorized IEEE1394 device, and the CPU 129 sets the operation mode to the single-device mode. The process then exits the authentication routine.

On the other hand, in the case in which it is determined in step S57 that timeout has not occurred, the process flow returns to step S56 to repeat the process described above.

On the other hand, if it is determined in step S56 that the encrypted random number E' (R1) has been received fro the connected device, that is, if the encrypted random number E' (R1) transmitted from the connected device has been received by the IEEE1394 interface 133 and then transferred to the CPU 129, the process proceeds to step S58. In step S58, the CPU 129 encrypts the random number R1 generated in step S55 according to a predetermined encryption algorithm thereby generating an encrypted random number E(R1). The process then proceeds to step S59.

In step S59, the CPU 129 determines whether the encrypted random number E' (R1) received from the connected device is identical to the encrypted random number E(R1) generated, in step S58, by the master device.

If it is determined in step S59 that the encrypted random numbers E' (R1) and E(R1) are not identical to each other, that is, if the encryption algorithm (and also the private key used in the encryption, if necessary) employed by the connected device is different from the encryption algorithm encrypted by the CPU 129, the process proceeds to step S54. In step S54, the CPU 129 determines that the connected device is not an authorized IEEE1394 device, and the CPU 129 sets the operation mode to the single-device mode. The process then exits the authentication routine.

In the case in which it is determined in step S59 that the encrypted random numbers E' (R1) and E(R1) are identical to each other, that is, when the encryption algorithm employed by the connected device is identical to the encryption algorithm encrypted by the CPU 129, the process proceeds to step S60. In step S60, the CPU 129 determines whether a random number R2 generated by the connected device to authenticate the master device 1 has been received from the connected device.

If it is determined in step S60 that the random number R2 has not been received, the process proceeds to step S61. In step S61, the CPU 129 determines whether a timeout has occurred, that is, whether a predetermined period of time has elapsed since the encrypted random numbers E' (R1) and E(R1) were determined, in step S59, to be identical to each other.

If it is determined in step S61 that a timeout has occurred, that is, if the random number R2 has not been received from the connected device within a predetermined period of time, the process proceeds to step S54. In step S54, the CPU 129 determines that the connected device is not an authorized IEEE1394 device, and the CPU 129 sets the operation mode to the single-device mode. The process then exits the authentication routine.

On the other hand, in the case in which it is determined in step S61 that timeout has not occurred, the process flow returns to step S60 to repeat the process described above.

On the other hand, if it is determined in step S60 that the random number R2 transmitted from the connected device has been received, that is, if the random number R2 transmitted from the connected device has been received by the IEEE1394 interface 133 and then transferred to the CPU 129, the process proceeds to step S62. In step S62, the CPU 129 encrypts the random number R2 according to a predetermined encryption algorithm thereby generating an encrypted random number E(R1), and the CPU 129 transmits it to the connected device via the IEEE1394 interface 133.

At the time at which the random number R2 is received, in step S60, from the connected device, the connected device is authenticated as an authorized IEEE1394 device.

Thereafter, the process proceeds to step S63. In step S63, the CPU 129 controls the IEEE1394 interface 133 so as to transmit a capability information request command to request capability information and the device ID of the connected device, together with the device ID and the capability information of the master device itself, to the connected device.

The device ID refers to a unique ID identifying a television set such as a master device 1 or a slave device 2.

The capability information refers to information about the capability of a device. More specifically, the capability information includes information indicating the type of coefficient seed data (the type of video conversion for which the coefficient seed data can be used), information indicating external commands the device can accept (such as a power on/off command, a volume adjustment command, channel selection command, a brightness control command, and a sharpness control command), information indicating whether the device has an OSD (On-Screen Display) capability, information indicating whether muting is possible, and information indicating whether sleeping is possible. The capability information also includes information whether the device can operate as a master device or a slave device.

In the master device 1, the device ID and the capability information may be stored in the EEPROM 130 or in vendor_dependent_information of the configuration ROM shown in FIG. 15.

Thereafter, the process proceeds to step S64. In step S64. The CPU 129 receives, via the IEEE1394 interface 133, the device ID and the capability information transmitted by the connected device in response to the capability information request command transmitted in step S63 to the connected device. The received device ID and capability information are stored into the EEPROM 130. The process then proceeds to step S65.

In step S65, the CPU 129 determines whether the connected device is a slave device, on the basis of the capability information stored in the EEPROM 130. If it is determined in step S65 that the connected device is a slave device, that is, if the connected device is authenticated as a slave device, the process jumps to step S68 without performing steps S66 and S67. In step S68, the CPU 129 sets the operation mode into the special-capability-available mode in which the special capability is enabled, that is, a control command is transmitted to a slave device to make the slave device perform a process by means of the special capability. The process flow then returns from the current routine.

On the other hand, if it is determined in step S65 that the connected device is not a slave device, the process proceeds to step S66. In step S66, the CPU 129 determines whether the connected device is a master device, on the basis of the capability information stored in the EEPROM 130. If it is determined in step S66 that the connected device is a master device, that is, if the connected device is authenticated as a master device, the process proceeds to step S67. In step S67, the CPU 129 performs master-slave arbitration with the connected device having the capability of serving as a master device.

That is, in this case, a device capable of serving as a master device is connected to the master device 1, and thus, of the television sets included in the scalable TV system, two television sets have the capability of serving as a master device. However, in the scalable TV system according to the present embodiment of the invention, it is required that only one television set should operate as a master device. In step S67, to meet the above requirement, the master-slave arbitration is performed to determine whether the master device 1 or the connected device having the capability of serving as a master device is to operate as a master device.

For example, a master device which was incorporated into the scalable TV system at an earlier point of time, that is, the master device 1 in this specific example, is selected as the master device of the scalable TV system. The other device having the capability of serving as a master device is set to operate as a slave device.

After completion of the master-slave arbitration in step S67, the process proceeds to step S68, in which the CPU 129 sets the operation mode to the special-capability-available mode. The process then exits the present routine.

On the other hand, if it is determined in step S66 that the connected device is not a master device, that is, if the connected device is neither a master device nor a slave device, and thus if the connected device is authenticated as neither a master device nor a slave device, the process proceeds to step S69. In step S69, the CPU 129 sets the operation mode into an ordinary-capability-only mode in which control commands for performing operations of special capability are not allowed although ordinary AV/C commands can be transmitted between the master device and slave devices. Thereafter, the process returns from the present routine.

In this case, because the connected device is neither a master device nor a slave device, the special capability is not provided to the device connected to the master device 1. However, in this case, because the connected device is an authorized IEEE1394 device, transmission of ordinary AV/C commands between the master device 1 and the connected device is allowed. That is, in this case, any one of the master device 1 and the connected device can be controlled by the other device (or by another IEEE1394 device connected to the master device 1) using an ordinary AV/C command.

Figure 32:
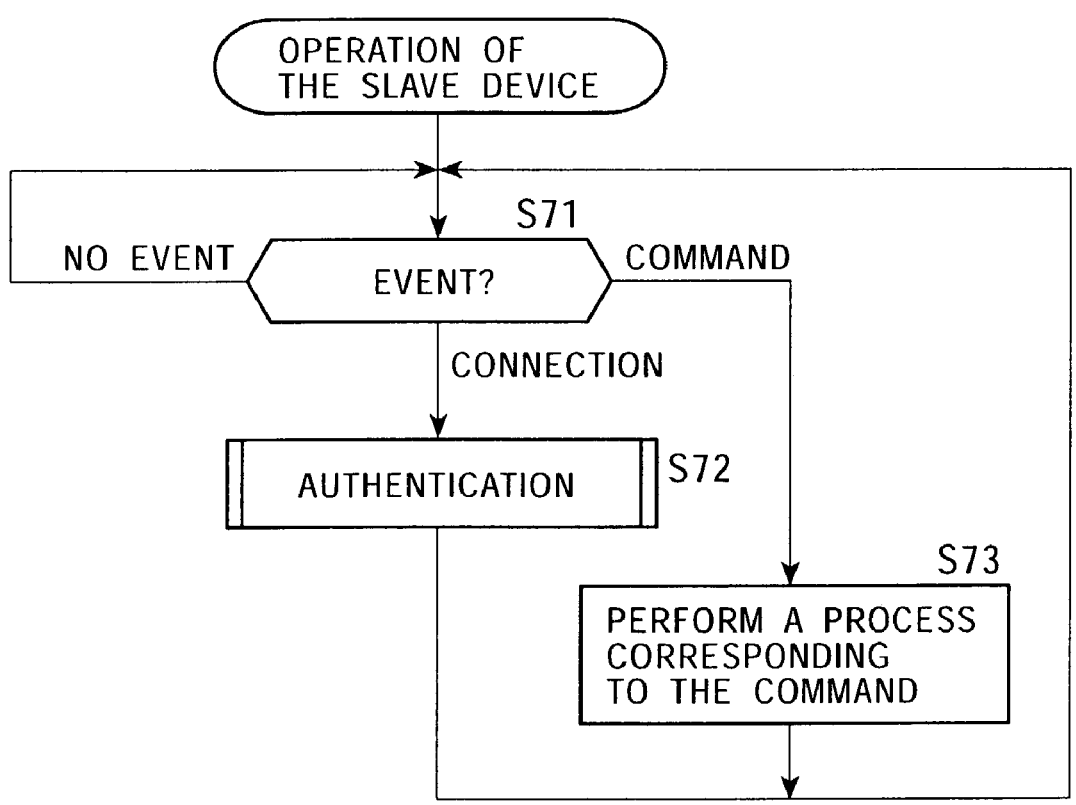
FIG. 32 is a flow chart showing a process performed by the slave device.

The operation of the slave device 2 shown in FIG. 11 is described below with reference to a flow chart shown in FIG. 32.

First, in step S71, the CPU 149 determines whether connection of some device to the terminal panel 41 or reception of some command from the IEEE1394 interface 153 or the IR receiver 155 has occurred as an event. If it is determined that no event has occurred, the process returns to step S71.

In the case in which it is determined in step S71 that connection of a device to the terminal panel 41 has occurred as an event, the process proceeds to step S72. In step S72, the CPU 149 performs authentication as will be described later with reference to FIG. 33. The process then returns to step S71.

To determine whether some device has been connected to the terminal panel 41, it is needed to detect connection of the device to the terminal panel 41. The detection may be performed, for example, in a similar manner to step S41 in FIG. 30 described earlier.

On the other hand, if it is determined in step S71 that reception of some command from the IEEE1394 interface 153 or the IR receiver 155 has occurred as an event, the process proceeds to step S73. In step S73, the slave device 2 performs processing corresponding to the received command. The process then returns to step S71.

Now, referring to a flow chart shown in FIG. 33, the authentication processing performed in step S72 in FIG. 32 by the slave device 2 is described below.

In the authentication performed by the slave device 2, verification as to whether the device newly connected to the terminal panel 41 (hereinafter, referred to simply as a connected device) is an authorized IEEE1394 device and verification as to whether that IEEE1394 device is a master device are performed.

That is, in the authentication performed by the slave device 2, first, in step S81, the CPU 149 determines whether an authentication request command for performing authentication has been received from the connected device. If it is determined that the authentication request command has not been received, the process proceeds to step S82.

In step S82, the CPU 129 determines whether a timeout has occurred, that is, whether a predetermined period of time has elapsed since the authentication process was started.

If it is determined in step S82 that a timeout has occurred, that is, if the authentication request command has not been received from the connected device within a predetermined period of time after starting the authentication process, the process proceeds to step S83. In step S83, the CPU 149 determines that the authentication has failed because the connected device is not an authorized IEEE1394 device. In this case, the CPU 149 sets the operation mode to a single device mode in which data transmission with the connected device is not performed. The process then returns from the present routine.

In this case, not only IEEE1394 communication but also any other data transmission with the connected device, which is not an authorized IEEE1394 device, is not performed thereafter.

On the other hand, in the case in which it is determined in step S82 that timeout has not occurred, the process flow returns to step S81 to repeat the process described above.

Figure 31:
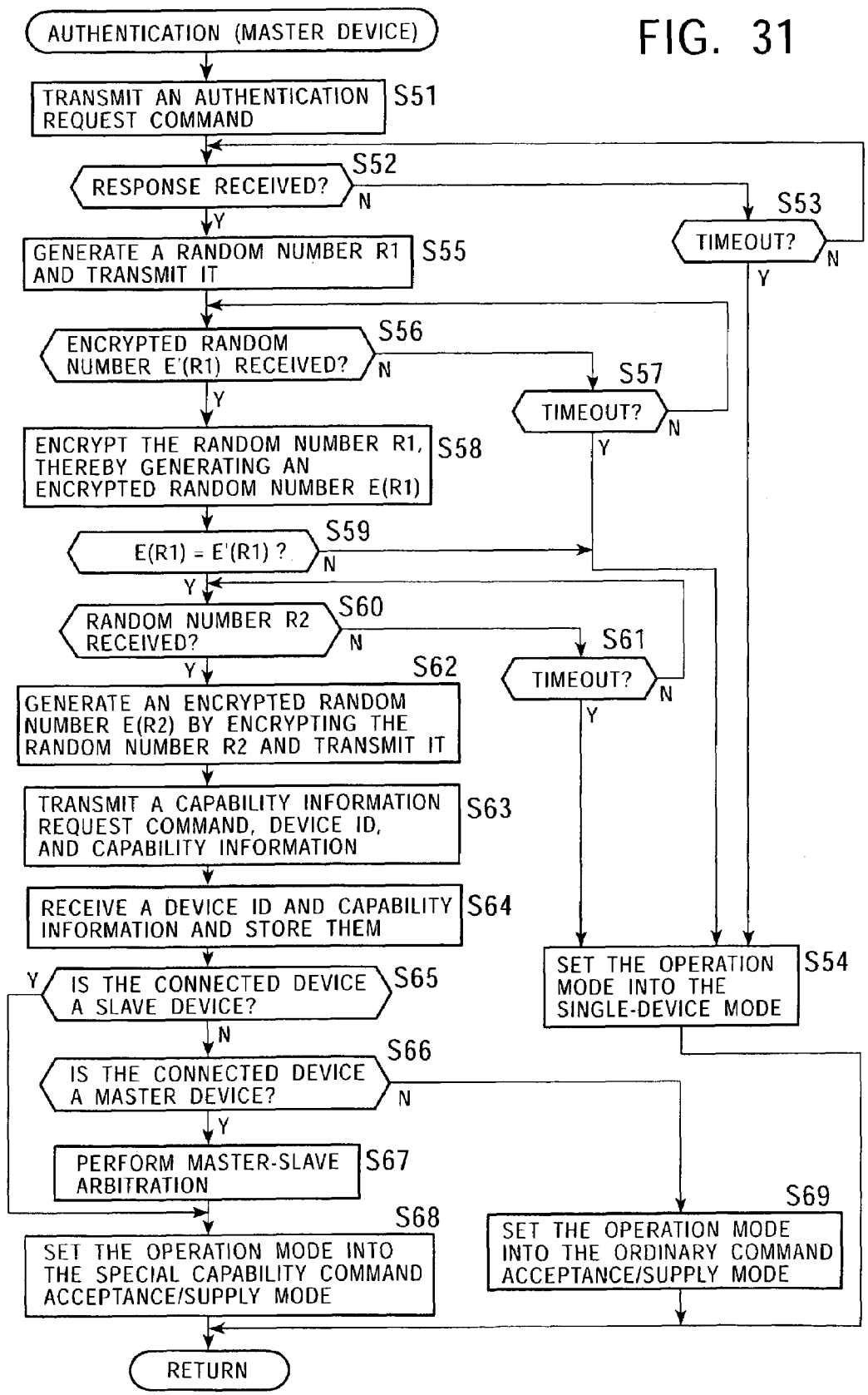
FIG. 31 is a flow chart showing an authentication process performed by the master device.

On the other hand, if it is determined in step S81 that the authentication request command transmitted from the connected device has been received, that is, if the authentication request command transmitted in step S51 in FIG. 31 by the master device 1 serving as the connected device has been received by the IEEE1394 interface 153 and then transferred to the CPU 149, the process proceeds to step S84. In step S84, the CPU 149 controls the IEEE1394 interface 153 so as to transmit a response to the authentication request command to the connected device.

Figure 33:
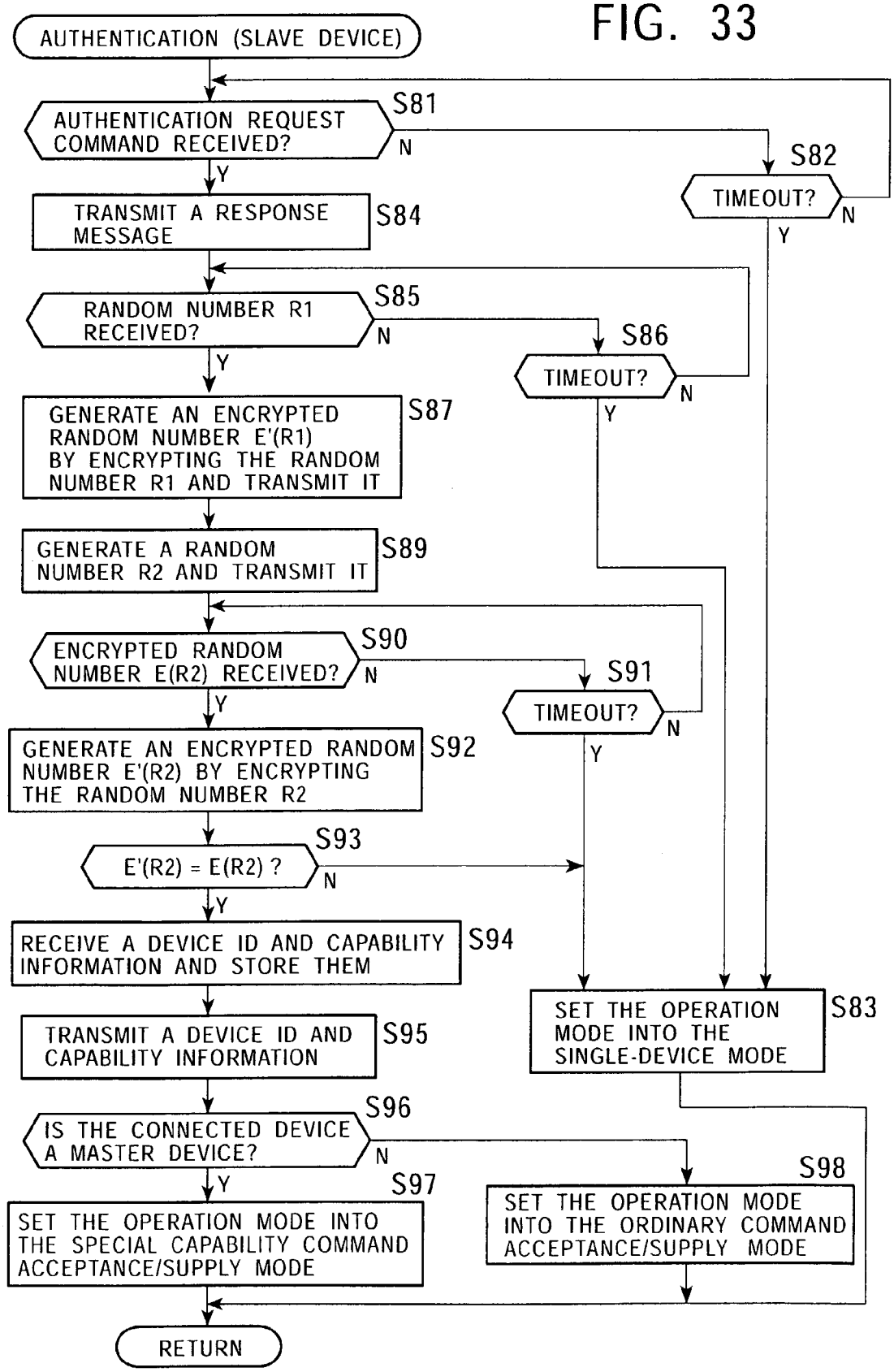
FIG. 33 is a flow chart showing an authentication process performed by the slave device.

Although in the present embodiment, steps S51 to S53 in FIG. 31 are performed by the master device 1 and steps S81, S82, and S84 in FIG. 33 are performed by the slave device 2, steps S51 to S53 in FIG. 31 may be performed by the slave device 2 and steps S81, S82, and S84 in FIG. 33 may be performed by the master device 1.

The process then proceeds to step S85. In step S85, the CPU 149 determines whether a random number R1 has been received from the connected device. If it is determined that the random number R1 has not been received, the process proceeds to step S86.

In step S86, the CPU 149 determines whether a timeout has occurred, that is, whether a predetermined period of time has elapsed since the response to the authentication request command was transmitted in step S84.

If it is determined in step S86 that a timeout has occurred, that is, if the random number R1 has not been received within a predetermined period of time after the transmission of the response to the authentication request command, the process proceeds to step S83. In step S83, the CPU 149 determines that the connected device is not an authorized IEEE1394 device. In this case, the CPU 129 sets the operation mode to a single device mode in which no data is transmitted between the master device 1 and the connected device. The process then returns from the present routine.

On the other hand, in the case in which it is determined in step S86 that timeout has not occurred, the process flow returns to step S85 to repeat the process described above.

On the other hand, if it is determined in step S85 that the random number R1 transmitted from the connected device has been received, that is, if the random number R1 transmitted in step S55 in FIG. 31 by the master device 1 serving as the connected device has been received by the IEEE1394 interface 153 and then transferred to the CPU 149, the process proceeds to step S87. In step S87, the CPU 149 encrypts the random number R1 according to a predetermined encryption algorithm thereby generating an encrypted random number E' (R1). Furthermore, in this step S87, the CPU 149 controls the IEEE1394 interface 153 so as to transmit the encrypted random number E' (R1) to the connected device. Thereafter, the process proceeds to step S89.

In step S89, the CPU 149 generates a random (pseudorandom) number R2 and controls the IEEE1394 interface 153 so as to transmit the generated random number R2 to the connected device. The process then proceeds to step S90.

In step S90, the CPU 149 determines whether an encrypted random number E(R2) produced, in step S62 in FIG. 31, by the master device 1 serving as the connected device by encrypting a random number R2 has been received from the connected device.

If it is determined in step S90 that the encrypted random number E(R2) transmitted from the connected device has not been received, the process proceeds to step S91. In step S91, the CPU 149 determines whether a timeout has occurred, that is, whether a predetermined period of time has elapsed since the random number R2 was transmitted.

If it is determined in step S91 that a timeout has occurred, that is, if the encrypted random number E(R2) has not been received within a predetermined period of time after the transmission of the random number R2 to the connected device, the process proceeds to step S83. In step S83, the CPU 149 determines that the connected device is not an authorized IEEE1394 device, and the CPU 149 sets the operation mode to the single-device mode. The process then returns from the present routine.

On the other hand, in the case in which it is determined in step S91 that timeout has not occurred, the process flow returns to step S90 to repeat the process described above.

On the other hand, if it is determined in step S90 that the encrypted random number E(R2) transmitted from the connected device has been received, that is, if the encrypted random number E(R2) transmitted from the connected device has been received by the IEEE1394 interface 153 and then transferred to the CPU 149, the process proceeds to step S92. In step S92, the CPU 149 encrypts the random number R2 generated in step S89 according to a predetermined encryption algorithm thereby generating an encrypted random number E' (R2). The process then proceeds to step S93.

In step S93, the CPU 149 determines whether the encrypted random number E(R2) received from the connected device is identical to the encrypted random number E' (R2) generated, in step S92, by the slave device.

If it is determined in step S93 that the encrypted random numbers E(R2) and E' (R2) are not identical to each other, that is, if the encryption algorithm (and also the private key used in the encryption, if necessary) employed by the connected device is different from the encryption algorithm encrypted by the CPU 149, the process proceeds to step S83. In step S83, the CPU 149 determines that the connected device is not an authorized IEEE1394 device, and the CPU 149 sets the operation mode to the single-device mode. The process then exits the authentication routine.

On the other hand, if it is determined in step S93 that the encrypted random numbers E(R2) and E' (R2) are identical to each other, that is, when the encryption algorithm employed by the connected device is identical to the encryption algorithm encrypted by the CPU 149 and thus the connected device has been authenticated as an authorized IEEE1394 device, the process proceeds to step S94. In step S94, the CPU 149 receives, via the IEEE1394 interface 153, a device ID and capability information transmitted together with a capability information request command transmitted in step S63 in FIG. 31 by the master device 1 serving as the connected device. The received device ID and capability information are stored in the EEPROM 150.

The process then proceeds to step S95. In step S95, in response to the capability information request command received in step S94 from the connected device, the CPU 149 controls the IEEE1394 interface 153 so as to transmit the device ID and the capability information of the slave device 2 to the connected device. The process then proceeds to step S96.

In the slave device 2, as with the master device 1 described earlier with reference to FIG. 31, the device ID and the capability information may be stored in the EEPROM 150 or vendor_dependent_information of the configuration ROM shown in FIG. 15.

In step S96, the CPU 149 determines whether the connected device is a master device, on the basis of the capability information stored in the EEPROM 150. If it is determined in step S96 that the connected device is a master device, that is, if the connected device is authenticated as a master device, the process proceeds to step S97. In step S97, the CPU 149 sets the operation mode into the special-capability-available mode in which the special capability is enabled, that is, a control command transmitted from the master device serving as the connected device is acceptable and a process specified by the command can be performed. The process then returns from the present routine.

If the operation mode of the slave device 2 is set to the special-capability-available mode, commands input via the front panel 154 or the IR receiver 155 of the slave device 2 are basically ignored, and only commands received from the master device 1 via the IEEE1394 interface 153 are accepted. For example, the channel selection or the sound volume control in the slave device 2 is performed in accordance with a command issued by the master device 1. In this sense, the scalable TV system can be regarded as a centralized control system in which all slave devices 2 in the scalable TV system are controlled by the master device 1.

Transmission of a command from the master device 1 (FIG. 10) to a slave device 2 may be performed in response to inputting via the front panel 134 or the IR receiver 135, or may be performed in such a manner that a command input via the front panel 154 or the IR receiver 155 of the slave device 2 is transferred to the master device 1 via the IEEE1394 interface 153 and further transferred from the master device 1 back to the slave device 2.

On the other hand, if it is determined in step S96 that the connected device is not a master device, that is, if authentication of the connected device as a master device fails, the process proceeds to step S98. In step S98, the CPU 149 sets the operation mode into an ordinary-capability-only mode in which control commands for performing operations of special capability are not allowed although ordinary AV/C commands can be transmitted between the master device and slave devices. The process then returns from the present routine.

In this case, because the device connected to the slave device 2 is not a master device, the connection does not cause the special capability to be provided. That is, when a slave device is connected to the slave device 2, the special capability is not provided. However, in this case, because the connected device is an authorized IEEE1394 device, transmission of ordinary AV/C commands between the slave device 2 and the connected device is allowed. That is, in this case, any one of the slave device 2 and the connected device (and also other slave devices) can be controlled by the other device using an ordinary AV/C command.

If the authentication described above with reference to FIGS. 31 and 33 are successful in the master device 1 and the slave device 2, and if the operation mode of the master device 1 and that of the slave device 2 are set to the special-capability-available mode, processes by means of the special capability of the scalable TV system are performed in step S43 in FIG. 30 and in S73 in FIG. 32, in the master device 1 and the slave device 2, respectively, as described below.

In the master device 1, as described earlier with reference to FIG. 10, an image and a sound/voice of a television broadcast program are output (that is, the image is displayed and the sound/voice is output). When such an image and a sound/voice are being output in the master device 1, if a user presses a guide button switch 63 of the remote commander 15 (FIG. 7) (or a guide button switch 93) of the remote commander 35 (FIG. 8)), a infrared ray is emitted from the remote commander 15 in response to the operation performed by the user. The infrared ray is received by the IR receiver 135 of the master device 1 (FIG. 10), and a command corresponding to the operation performed on the guide button switch 63 (hereinafter, referred to as a caption display command) is supplied to the CPU 129.

Although the infrared ray emitted from the remote commander 15 is also received by the IR receiver 155 of the slave device 2 (in FIG. 11), the slave device 2 ignores the received infrared ray.

Figure 34:
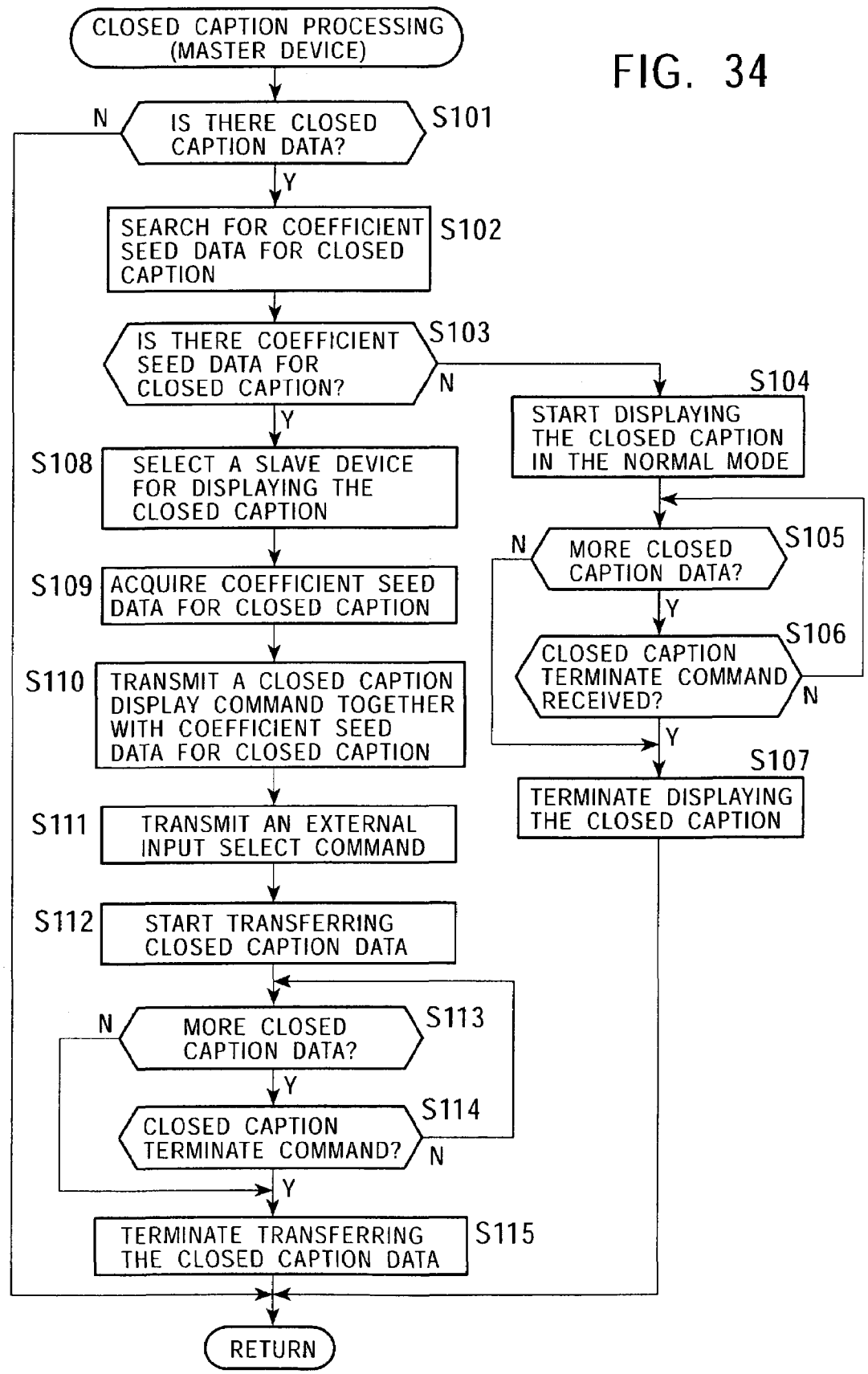
FIG. 34 is a flow chart showing a process, performed by the master device, on a closed caption.

If the CPU 129 of the master device 1 (FIG. 10) receives the caption display command, the CPU 129 of the master device 1 performs processing associated with the closed caption in accordance with the algorithm shown in the flow chart of FIG. 34.

That is, first, in step S101, the CPU 129 determines whether the transport stream being supplied to the demultiplexer 124 includes closed caption data.

When closed caption data is incorporated into an MPEG video stream, the closed caption data is placed, for example, as MPEG user data (MPEG-2 user data) in the sequence layer of the MPEG video stream. In this case, in step S101, the CPU 129 examines the transport stream being supplied to the demultiplexer 124 to determine whether closed caption data is included in the transport stream.

If it is determined in step S101 that the transport stream does not include closed caption data, the closed caption processing is terminated without performing the following process.

However, if it is determined in step S101 that the transport stream includes closed caption data, the process proceeds to step S102, and the CPU 129 checks the capability information, stored in the EEPROM 130, of the master device 1 and the slave devices included in the scalable TV system to detect a television set having coefficient seed data for closed caption from those of the scalable TV system. As described earlier, the capability information includes information indicating the type of coefficient seed data of each television set of the scalable TV system, and thus, in the present step S102, a television set having coefficient seed data for closed caption is retrieved by checking the capability information.

The coefficient seed data for closed caption refers to coefficient seed data obtained by means of learning in which video data of a closed caption displayed in accordance with closed caption data is used as teacher data while video data obtained by reducing the resolution of the teacher data, video data obtained by adding noise to the teacher data, or video data obtained by reducing the image size of the teacher data is used as student data. The coefficient seed data obtained via such learning is suitable for improving the resolution, removing noise, or enlarging the image size of a closed caption image.

The process proceeds to step S103. In step S103, the CPU 129 determines whether there is a television set having coefficient seed data for use in dealing with closed captions, on the basis of the result of the retrieval in step S102.

If it is determined in step S103 that there is no television set having coefficient seed data dedicated to usage in dealing with closed captions, the process proceeds to step S104. In step S104, the CPU 129 controls the signal processor 137 so as to start displaying closed captions in a normal mode.

The signal processor 137 also has the capability of operating as an ordinary closed caption decoder. Thus, the CPU 129 requests the demultiplexer 124 to supply closed caption data included in the transport stream and transfers the closed caption data, supplied by the demultiplexer 124 in response to the request, to the signal processor 137. The signal processor 137 decodes the closed caption data received from the CPU 129 and superimposes the obtained closed caption on the video data stored in the frame memory 127, at a specified location of the video data. As a result, video data including the video data decoded by the MPEG video decoder 125 and the closed caption superimposed thereon is displayed on the CRT 11.

Thus, in this case, a content image and a corresponding closed caption superimposed on the content image are displayed on the CRT 11 of the master device 1, as with a usual television set having a built-in closed caption decoder.

If the displaying of the closed caption is started, the process proceeds to step S105. In step S105, as in step S101, the CPU 129 determines whether the transport stream being supplied to the demultiplexer 124 includes more closed caption data to be displayed.

If it is determined in step S105 that no closed caption data is included, the process jumps to step S107 without performing step S106. In step S107, the CPU 129 controls the signal processor 137 so as to stop the decoding of the closed caption data. Thus, the process exits the closed caption processing routine.

On the other hand, if it is determined in step S105 that the transport stream being supplied to the demultiplexer 124 includes more closed caption data to be displayed, the process proceeds to step S106. In step S106, the CPU 129 determines whether a command to terminate displaying the closed caption (hereinafter, referred to as a closed caption display terminate command) has been received.

If it is determined in step S106 that the closed caption display terminate command has not been received, the process flow returns to step S105 to repeat the process described above. That is, in this case, displaying of the closed caption is continued.

On the other hand, if it is determined in step S106 that the closed caption display terminate command has been received, that is, if the IR receiver 135 has received an infrared ray, corresponding to the closed caption display terminate command, emitted from the remote commander 15 in response to a turning-off operation, performed by a user, on the guide button switch 63 of the remote commander 15 (FIG. 7) (or the guide button switch 93 of the remote commander 35 (FIG. 8)), the process proceeds to step S107. In step S107, the CPU 129 controls the signal processor 137, as described above, so as to stop the decoding of the closed caption data. Thus, the process exits the closed caption processing routine.

On the other hand, if it is determined in step S103 that there is a television set serving as a slave device and having coefficient seed data for use in dealing with closed captions (hereinafter, such a device will be referred to as a slave device having caption coefficient seed data), the process proceeds to step S108. In step S108, the CPU 129 selects a slave device to be used to display closed captions from television sets serving as slave devices in the scalable TV system.

For example, the CPU 129 selects a slave device $2_{23}$ located on the left side of the master device 1 or a slave device $2_{32}$ located on the lower side of the master device 1 as the slave device used to display closed captions (hereinafter, such a slave device will be referred to as a slave device for displaying captions). As described above, the master device 1 has information about the locations of respective slave devices $2_{ij}$ relative to the location of the master device 1, and the master device 1 identifies the slave devices such as a slave device $2_{23}$ located on the left side of the master device 1, a slave device $2_{32}$ located under the master device 1, and so on, on the basis of the information about the locations of slave devices $2_{ij}$.

The process then proceeds to step S109. In step S109, the CPU 129 transmits, via the IEEE1394 interface 133, a command to the slave device having the caption coefficient seed data to request it to return the coefficient seed data dedicated to usage in dealing with closed captions.

In the above process, the CPU 129 identifies the slave device having caption coefficient seed data by its device ID stored, together with capability information, in the EEPROM 130 and the CPU 129 specifies the destination of transmission of the command to request the coefficient seed data for use in dealing with closed captions (hereinafter, such a command will be referred to as a coefficient seed data request command) by the device ID. Note that when the CPU 129 transmits other commands to a slave device, the CPU 129 identifies the slave device by its device ID and specifies the destination by the device ID.

In step S109, the CPU 129 receives, via the IEEE1394 interface 133, the coefficient seed data for use in dealing with closed captions transmitted from the slave device having the caption coefficient seed data in response to the coefficient seed data request command, thereby acquiring the coefficient seed data for use in dealing with closed captions.

In a case in which the coefficient seed data for use in dealing with closed captions is stored in the EEPROM 137B of the signal processor 137 of the master device 1 itself, the acquisition of the coefficient seed data for use in dealing with closed captions in step S109 is performed by the CPU 129 by reading it from the EEPROM 137B.

Even when coefficient seed data for use in dealing with closed captions is not stored in any television set of the scalable TV system, if coefficient seed data dedicated to usage in dealing with closed caption is available from a coefficient seed data server (not shown), the CPU 129 may acquire the coefficient seed data for use in dealing with closed captions by accessing the coefficient see data server via the modem 136.

Not only such coefficient seed data dedicated to usage in dealing with closed caption but also coefficient seed data for use in other processes (video data conversion) descried later may also be acquired in a similar manner.

Providing of coefficient seed data from the coefficient seed data provider may or may not be free of charge.

After acquiring the coefficient seed data for use in dealing with closed captions in step S109, the CPU 129 controls, in next step S110, the IEEE1394 interface 133 so as to transmit closed caption display command, together with the coefficient seed data for use in dealing with closed captions, to the slave device for displaying closed captions to command it to display the closed caption. The process then proceeds to step S111.

In step S111, the CPU 129 transmits, via the IEEE1394 interface 133, an external input select command to the slave device for displaying captions to command it to select data input to the IEEE1394 interface 153 (FIG. 11) and display the input data on the CRT 31. The process then proceeds to step S112.

In step S112, the CPU 129 starts transferring closed caption data to the slave device for displaying captions.

That is, the CPU 129 requests the demultiplexer 124 to supply closed caption data included in the transport stream. In response to the request, closed caption data is supplied from the demultiplexer 124 to the CPU 129. The CPU 129 controls the IEEE1394 interface 133 so as to transfer closed caption data received to the demultiplexer 124 to the slave device for displaying captions.

If the transferring of closed caption data to the slave device for displaying captions is started as described, the process proceeds to step S113. In step S113, as in step S101, the CPU 129 determines whether the transport stream being supplied to the demultiplexer 124 includes more closed caption data to be displayed.

If it is determined in step S113 that no closed caption data is included, the process jumps to step S115 without performing step S114. In step S114, the CPU 129 controls the IEEE1394 interface 133 so as to stop the transfer of the closed caption data. Thus, the process exits the closed caption processing routine.

On the other hand, if it is determined in step S113 that the transport stream being supplied to the demultiplexer 124 includes more closed caption data to be displayed, the process proceeds to step S114. In step S114, the CPU 129 determines whether a command to terminate displaying the closed caption (a closed caption display terminate command) has been received.

If it is determined in step S114 that the closed caption display terminate command has not been received, the processing flow returns to step S113 to repeat the process described above. That is, in this case, transferring of closed caption data to the slave device for displaying captions is continued.

On the other hand, if it is determined in step S114 that the closed caption display terminate command has been received, that is, if the IR receiver 135 has received an infrared ray, corresponding to the closed caption display terminate command, emitted from the remote commander 15 in response to a turning-off operation, performed by a user, on the guide button switch 63 of the remote commander 15 (FIG. 7) (or the guide button switch 93 of the remote commander 35 (FIG. 8)), the process proceeds to step S115. In step S115, the CPU 129 controls the IEEE1394 interface 133 so as to stop the transfer of the closed caption data. Thus, the process exits the closed caption processing routine.

Figure 35:
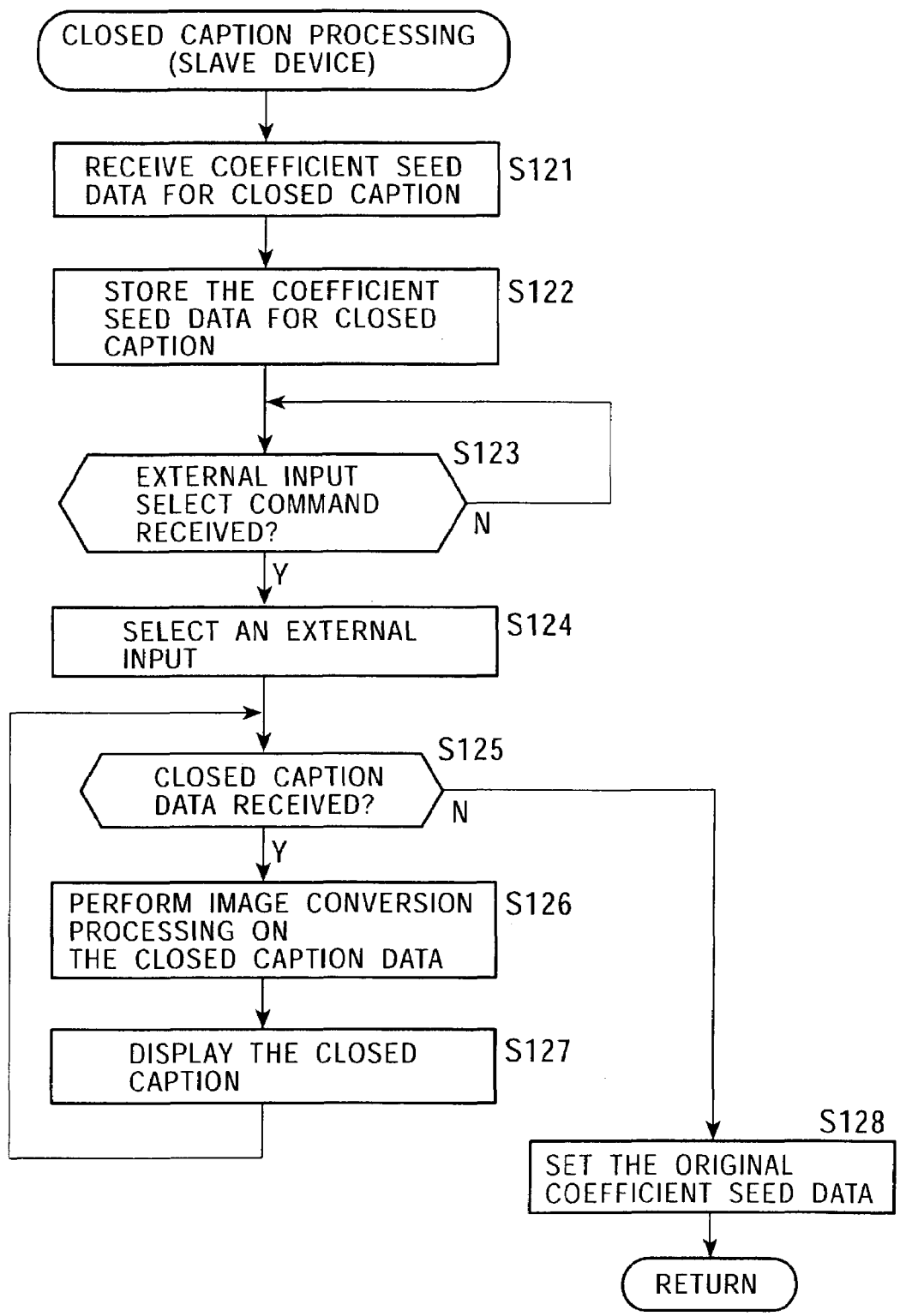
FIG. 35 is a flow chart showing a process, performed by the slave device, on a closed caption.

If the closed caption processing shown in FIG. 34 is performed in the master device 1, and if, as a result, the closed caption display command is transmitted in step S110 and received by the slave device 2 specified as the caption displaying slave device (received by the IEEE1394 interface 153 of the slave device 2 (FIG. 11) and transferred to the CPU 149), the slave device 2 performs closed caption processing in accordance with an algorithm shown in a flow chart of FIG. 35.

That is, in the slave device 2 (FIG. 11) serving as a slave device for displaying captions, first in step S121, the IEEE1394 receives coefficient seed data for use in dealing with closed captions transmitted in step S110 in FIG. 34, together with the closed caption display command, by the master device 1. The received coefficient seed data for use in dealing with closed captions and the closed caption display command are transferred to the CPU 149. The process then proceeds to step S122.

In step S122, the CPU 149 transfers the coefficient seed data for use in dealing with closed captions to the signal processor 157, which sets (stores) the received coefficient seed data for use in dealing with closed captions in the coefficient seed data memory 207 (FIG. 29). In the above process, coefficient seed data existing in the coefficient seed data memory 207 is transferred to the EEPROM 157B and saved therein before the coefficient seed data for use in dealing with closed captions is stored in the coefficient seed data memory 207.

In a case in which the slave device 2 serving as the slave device for displaying captions has caption coefficient seed data, that is, if coefficient seed data for use in dealing with closed caption is initially stored in the coefficient memory 207 in the signal processor 157 of the slave device 2, steps S121 and S122 and also step S128 which will be described later may be skipped.

The process then proceeds to step S123. In step S123, the CPU 149 determines whether the external input select command transmitted in step S111 in FIG. 34 by the master device 1 has been received. If it is determined that the command has not been received, the process returns to step S123.

However, if it is determined in step S123 that the external input select command transmitted from the master device 1 has been received, that is, if the external input select command transmitted from the master device 1 has been received by the IEEE1394 interface 153 and then transferred to the CPU 149, the process proceeds to step S124. In step S124, the CPU 149 makes selection of input so that the closed caption data received by the IEEE1394 interface 153 is supplied to the signal processor 157. The process then proceeds to step S125.

In step S125, the CPU 149 determines whether closed caption data, whose transmission from the master device 1 is started in step S112 in FIG. 34, has been received.

On the other hand, if it is determined in step S125 that the closed caption display terminate command transmitted from the master device 1 has been received, that is, if the closed caption data transmitted from the master device 1 has been received by the IEEE1394 interface 153 and then transferred to the CPU 149, the process proceeds to step S126. In step S126, the CPU 149 supplies the closed caption data to the signal processor 157. The signal processor 157 performs video data conversion on the received closed caption data, using the coefficient seed data for use in dealing with closed caption, stored in step S122 in the coefficient seed data memory 207 (FIG. 29).

More specifically, in this case, the signal processor 157 decodes the closed caption data received from the CPU 149 and performs video data conversion on the closed-caption video data obtained via the decoding process, using tap coefficients generated from the coefficient seed data for use in dealing with closed captions, stored in the coefficient seed data memory 207, so as to convert the closed-caption data into high-resolution form.

In step S127, the high-resolution closed-caption video data is supplied to the CRT 31 via the frame memory 147 and the NTSC encoder 148 and displayed on the CRT 31. The process then returns to step S125, and steps S125 to S127 are performed repeatedly until it is determined in step S125 that no further closed caption data is received from the master device.

If it is determined in step S125 that no further closed caption data is received from the master device 1, that is, if the IEEE1394 interface 153 cannot receive further closed caption data, the process proceeds to step S128. In step S128, the signal processor 157 resets (by means of overwriting) the original coefficient seed data saved in the EEPROM 157B into the coefficient seed data memory 207 (FIG. 29). The process then exits the closed caption processing routine.

Thus, in the closed caption processing routine performed by the master device according to the flow shown in FIG. 34 and the closed caption processing routine performed by the slave device according to the flow shown in FIG. 35, when any television set in the scalable TV system does not have coefficient seed data for use in dealing with closed captions, the master device 1 displays an image in such a manner that video data of a given television broadcast program and video data of a closed caption superimposed on the former video data are displayed on the CRT 11 in a similar manner to a conventional television set having a built-in closed caption decoder.

On the other hand, in the case in which some television set in the scalable TV system has coefficient seed data for use in dealing with closed captions, only video data of a television broadcast program is displayed on the CRT 11 of the master device 1. In this case, closed-caption video data corresponding to the video data displayed on the CRT 11 of the master device 1 is converted into high-resolution video data and displayed on the CRT 31 of the slave device 2 serving as the slave device for displaying captions.

This allows a user to view the video data of television broadcast programs without being disturbed by the video data of closed captions. Furthermore, the user can view video data of closed captions with the high resolution.

Even in the case in which any television set in the scalable TV system does not have coefficient seed data for use in dealing with closed captions, the video data of closed captions can be displayed on the CRT 31 of the slave device 2 serving as the slave device for displaying captions separately from the video data of television broadcast programs. In this case, although the video data of closed captions displayed does not have a high resolution, the user can view video data of television broadcast programs without being disturbed by video data of closed captions.

Although in the example described above, closed-caption video data is displayed only one slave device 2 specified as the slave device for displaying captions, closed-caption video data may be displayed on two or more slave devices in the scalable TV system. For example, when there are two or more closed caption data corresponding to two or more languages, closed-caption video data of respective languages may be displayed separately on different slave devices.

The scalable TV system has a special capability of displaying a part of video data in an enlarged fashion. This special capability is achieved by a partial-image enlarging process performed by the master device 1 and the slave device 2.

A command to perform the partial-image enlarging process may be issued, for example, via a menu screen.

More specifically, if a user operates the menu button switch 54 of the remote commander 15 (FIG. 7) (or the menu button switch 84 of the remote commander 35 (FIG. 8)), a menu screen is displayed on the CRT 11 of the master device 1 (or the CRT 31 of the slave device 2). An icon indicating the partially enlarge command (hereinafter, referred to as a partially enlarge icon) is displayed on the menu screen. If a user clicks on the partially enlarge icon by operating the remote commander 15, the partial-image enlarging process is started in the master device 1 and the slave device 2.

Referring to a flow chart shown in FIG. 36, the partial-image enlarging process performed by the master device is described below.

When video data of a television broadcast program (hereinafter, referred to as program video data) is being displayed on the CRT 11 of the master device 1, if the partially enlarge icon is clicked, the following process is started. That is, first, in step S131, the CPU 129 selects a slave device for displaying the full image of program video data (hereinafter, referred to as a full-image displaying slave device) which is currently being displayed on the CRT 11 of the master device 1, from television sets in the scalable TV system. The process then proceeds to step S132.

Herein, the CPU 129 may select only one television set or two or more television sets serving as slave devices (or all television sets serving as slave devices) as full-image displaying slave devices from slave devices in the scalable TV system.

In step S132, the CPU 129 communicates with the full-image displaying slave device via the IEEE1394 interface 133 to determine whether the electric power of the full-image displaying slave device is in an on-state.

If it is determined in step S132 that the electric power of the full-image displaying slave device is not in the on-state, the process proceeds to step S133. In step S133, the CPU 129 transmits, via the IEEE1394 interface 133, a power-on command to the full-image displaying slave device to turn on the power of the full-image displaying slave device. The process then proceeds to step S134.

On the other hand, if it is determined in step S132 that the full-image displaying slave device is in the on-state, the process jumps to step S134 without performing step S133. In step S134, the CPU 129 controls the signal processor 137 so as to display a message on the CRT 11, for example, in the OSD fashion to prompt a user to specify which part of the image being displayed on the CRT 11 should be enlarged (hereinafter, such a message will be referred to as a message requesting specifying a part to be enlarged).

That is, in this case, under the control of the CPU 129, the signal processor 137 generates OSD data of the message requesting specifying a part to be enlarged and superimposes it on the program video data stored in the frame memory 127. The program video data including the superimposed OSD data of the message requesting specifying a part to be enlarged is supplied from the frame memory 127 to the CRT 11 via the NTSC encoder 128. The CRT 11 displays, in the OSD manner, the message requesting specifying a part to be enlarged, together with the program video data.

In the next step S135, the CPU 129 determines whether the user has specified a part to be enlarged in response to the message requesting specifying a part to be enlarged. If a part to be enlarged has not been specified, the process returns to step S135.

However, if it is determined in step S135 that the user has specified a part to be enlarged, that is, if the IR receiver 135 has received an infrared ray transmitted in response to an operation performed by the user on the remote commander 15 (or the remote commander 35) to specify a part of an image displayed on the display screen of the CRT 11, and if the signal corresponding to the infrared ray has been supplied to the CPU 129, the CPU 129 determines that the part to be enlarged has been specified. The process then proceeds to step S136.

In step S136, the CPU 129 transmits, via the IEEE1394 interface 133, an external input select command to the full-image displaying slave device to command it to select the input applied to the IEEE1394 interface 153 (FIG. 11) of the full-image displaying slave device and display the selected input on the CRT 31. The process then proceeds to step S137.

In step S137, the CPU 129 starts transferring the program video data to the full-image displaying slave device.

More specifically, the CPU 129 requests the demultiplexer 124 to supply TS packets included in the transport streams and being supplied to the MPEG video decoder 125. In response to the request, the demultiplexer 124 supplies the TS packets to the CPU 129. Furthermore, the CPU 129 transfers, via the IEEE1394 interface 133, the TS packets received from the demultiplexer 124 to the full-image displaying slave device. Thus, TS packets corresponding to the program video data displayed on the CRT 11 of the master device 1 are transferred to the full-image displaying slave device, which performs the partial-image enlarging process as will be described later with reference to FIG. 37, thereby displaying the program video data corresponding to the TS packets. That is, the full image of the program video data previously displayed on the master device 1 is displayed on the full-image displaying slave device.

Alternatively, the CPU 129 may read, via the signal processor 137, MPEG-decoded program video data from the frame memory 127 and may transfer it, instead of the TS packets, to the full-image displaying slave device. In this case, the full-image displaying slave device can display the program video data without having to perform MPEG-decoding.

After starting the transferring of the TS packets to the full-image displaying slave device, the process proceeds to step S138. In step S138, the CPU 129 controls the signal processor 137 so as to perform video data conversion on the program video data stored in the frame memory 127 such that a specified area of the program video data is enlarged using coefficient seed data for use in resizing stored in the coefficient seed data memory 167 (FIG. 22).

That is, in the present embodiment, the coefficient seed data memory 167 in the signal processor 137 (FIG. 22) of the master device 1 stores at least the coefficient seed data for use in resizing, and the signal processor 137 performs the video data conversion on the specified enlarging area of the program video data stored in the frame memory 127 so that the enlarging area of the program video data is enlarged (resized) by a specified factor, using tap coefficients generated from the coefficient seed data for use in resizing stored in the coefficient seed data memory 167, thereby producing partial enlarged video data.

In step S138, the resultant partial enlarged video data is supplied via the frame memory 127 and the NTSC encoder 128 to the CRT 11 and displayed thereon.

That is, in this case, an enlarging area, centered at an enlarging point specified by a user, of the program video data is enlarged and resultant partial enlarged video data is displayed on the CRT 11 of the master device 1.

The enlarging area may be specified, for example, by an enlargement factor.

In the partially enlarging process, a default value of the enlargement factor (default enlargement factor) is preset. The CPU 129 sets a parameter corresponding to the default enlargement factor into the parameter memory 168 in the signal processor 137 (FIG. 22). The signal processor 137 performs resizing of given program video data according to the default enlargement factor.

On the other hand, the size of image displayed on the CRT 11, that is, the size of the display screen has a predetermined value.

Thus, the CPU 129 calculates the enlarging area so that if the enlarging area, centered at a specified enlarging point, of given video data is enlarged by the default enlargement factor, the size of resultant enlarged video data has a size equal to the size of the display screen of the CRT 11.

The enlargement factor employed in the video data conversion performed in step S138 may be specified by a user.

For example, the CPU 129 controls the signal processor 137 so as to display, on the CRT 11, a lever which can be operated by the user by operating the remote commander 15 (or the remote commander 35) to specify the enlargement factor (hereinafter, such a lever displayed on the CRT 11 will be referred to as an enlargement factor specifying lever). The enlargement factor may be specified by the position of the enlargement factor specifying lever.

In this technique, if the user moves the position of the enlargement factor specifying lever by operating the remote commander 15, the CPU 129 detects the position to which the lever has been moved, and the CPU 129 sets the parameter indicating the enlargement factor corresponding to the detected position into the parameter memory 168 in the signal processor 137 (FIG. 22). Furthermore, the CPU 129 specifies the enlarging area centered at the enlarging point in accordance with the enlargement factor corresponding to the position of the enlargement factor specifying lever in a similar manner as in the above-described case in which the default enlargement factor is employed. The CPU 129 then commands the signal processor 137 to perform video data conversion (resizing) on the specified enlarging area of given program video data.

Thus, a partial enlarged video data obtained by enlarging the enlarging area, centered at the enlarging point, of the given program video data by an enlargement factor specified by the user by operating the remote commander 15 is displayed on the CRT 11.

The enlargement factor specifying lever may be displayed, in the OSD fashion, on the CRT 11 of the master device 1 or on another television set other than the master device 1 in the scalable TV system.

The process then proceeds to step S140. In step S140, the CPU 129 determines whether a command to terminate displaying the partial enlarged video data (hereinafter, referred to as a partial enlargement terminate command) has been received.

If it is determined in step S140 that the partial enlargement terminate command has not been received, the processing flow returns to step S133 to repeat the process described above.

On the other hand, if it is determined in step S140 that the partial-image enlarging terminate command has been received, that is, if a user operates the remote commander 15 (FIG. 7) so as to display a menu screen on the CRT 11 and re-click on the partially enlarge icon on the menu screen thereby causing an infrared ray corresponding to the partially enlarge command to be emitted from the remote commander 15 and received by the IR receiver 135 and finally transferred to the CPU 129, the process proceeds to step S141. In step S141, the CPU 129 controls the IEEE1394 interface 133 so as to terminate the transferring of program video data to the full-image displaying slave device.

The process then proceeds to step S142. In step S142, the CPU 129 controls the signal processor 137 so as to stop the resizing process. Thus, the processing flow exits the partially enlarging routine. Thereafter, an image with a normal size is displayed on the CRT 11.

Now, referring to a flow chart shown in FIG. 37, a partially enlarging process performed by a slave device specified as operating as a full-image displaying slave device is described below.

Figure 36:
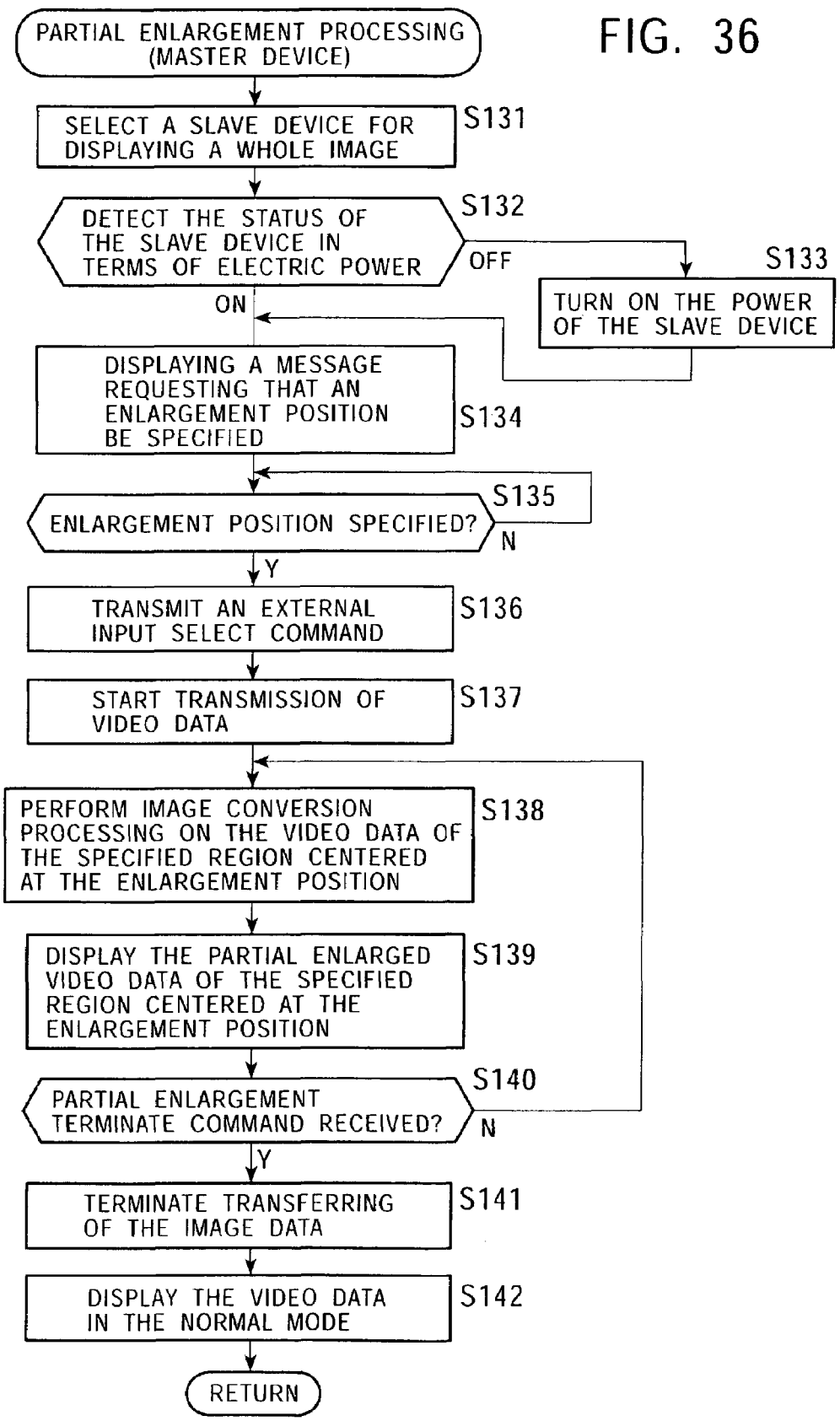
FIG. 36 is a flow chart showing a partial enlarging process performed by the master device.

In the slave device 2 serving as the full-image displaying slave device, first, in step S151, the CPU 149 determines whether an external input select command transmitted, in step S136 in FIG. 36, by the master device 1 has been received. If the command has not been received, the process returns to step S151.

If it is determined in step S151 that the external input select command transmitted from the master device 1 has been received, that is, if the external input select command transmitted from the master device 1 has been received by the IEEE1394 interface 153 and then transferred to the CPU 149, the process proceeds to step S152. In step S152, the CPU 149 makes selection of input so that program video data received by the IEEE1394 interface 153 is supplied to the MEPG video decoder 145 via the demultiplexer 144. The process then proceeds to step S153.

In step S153, the CPU 149 determines whether program video data, whose transmission from the master device 1 is started in step S137 in FIG. 36, has been received.

On the other hand, if it is determined in step S153 that the video program data transmitted from the master device 1 has been received, that is, if the program video data transmitted from the master device 1 has been received by the IEEE1394 interface 153 and then transferred to the CPU 149, the process proceeds to step S154. In step S154, the CPU 149 displays the received program vide data on the CRT 31.

More specifically, in the present embodiment, in step S137 in FIG. 36, the master device 1 starts transmission of program video data in the form of TS packets to the slave device 2 serving as the full-image displaying slave device. After transmission of the program video data is started, the CPU 149 supplies the TS packets received from the master device 1 via the IEEE1394 interface 153 to the MPEG video decoder 145 via the demultiplexer 144. The MPEG video decoder 145 performs MPEG-decoding on the TS packets thereby acquiring program video data. The resultant program video data is stored into the frame memory 147. The program video data is then supplied from the frame memory 147 to the CRT 31 via the NTSC encoder 148.

The process then returns to step S153, and steps S153 and to S154 are performed repeatedly until it is determined in step S153 that no further program video data is received from the master device 1.

If it is determined in step S153 that program video data is not received from the master device 1, that is, if the IEEE1394 interface 153 cannot receive further program video data, the partially enlarging process is ended.

Figure 37:
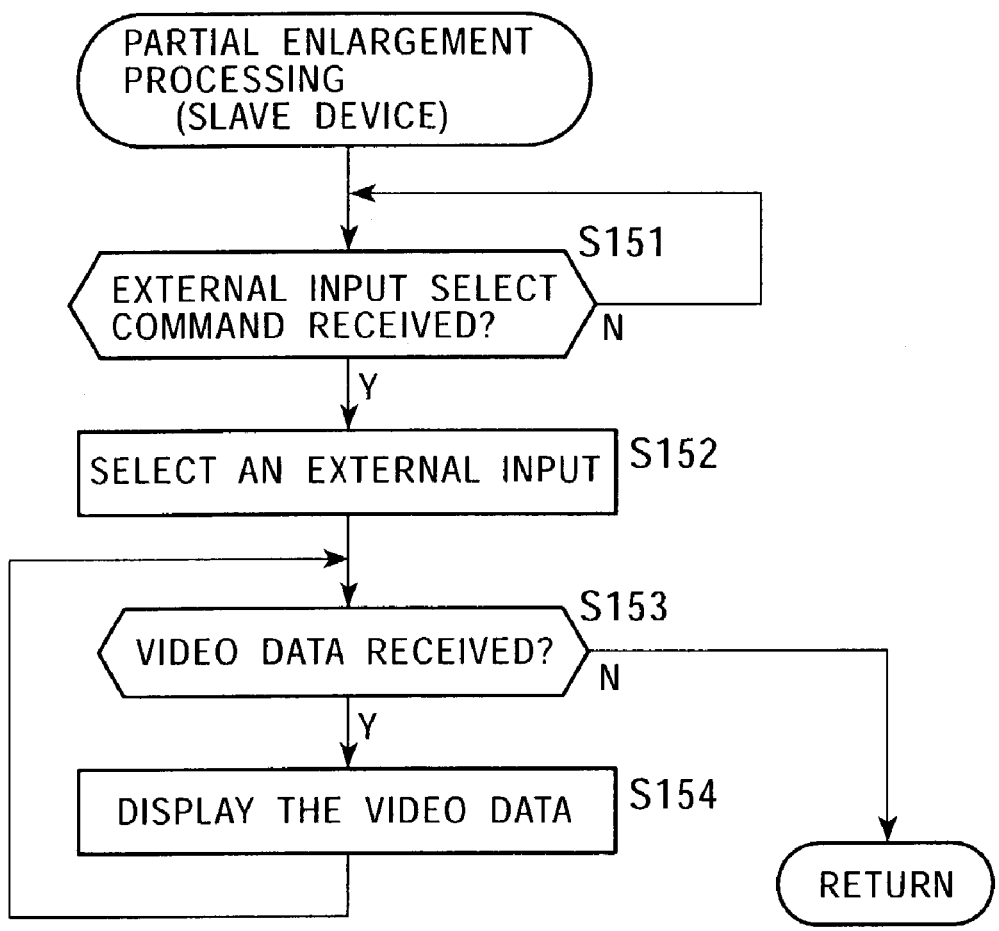
FIG. 37 is a flow chart showing a partially enlarging process performed by the slave device.
Figure 38A:
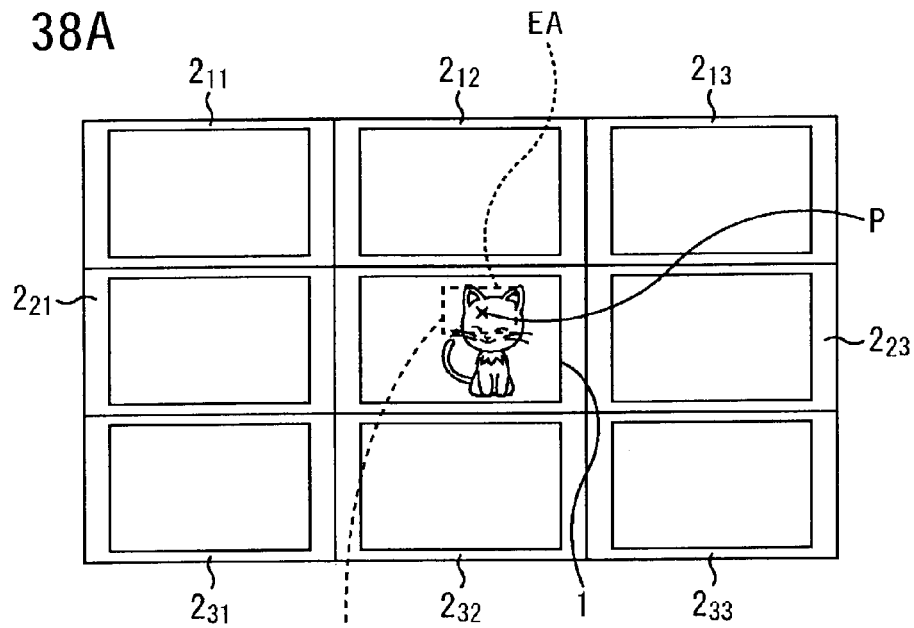
FIGS. 38A and 38B are diagrams showing an example of a manner of displaying a partially enlarged image in a scalable TV system.
Figure 38B:
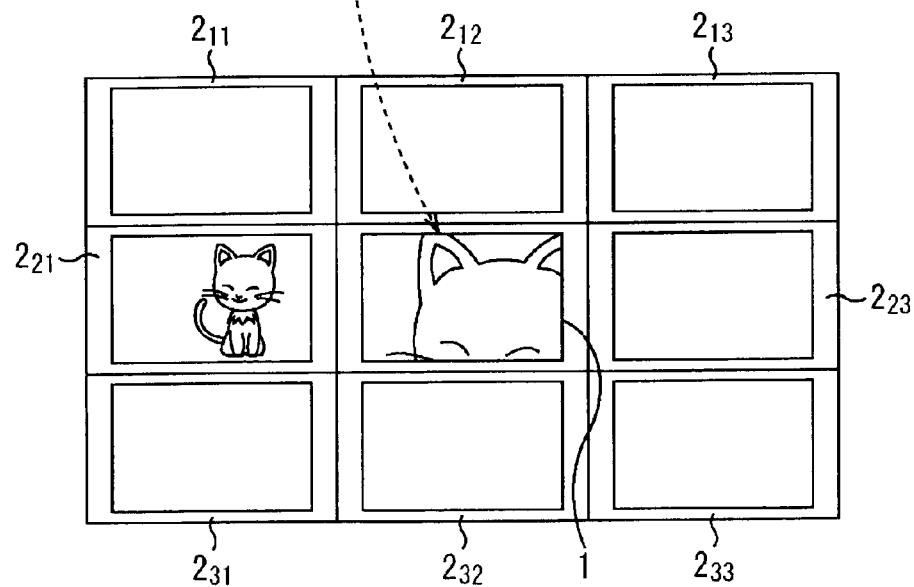

In the partial-image enlarging process performed by the master device according to the flow shown in FIG. 36 and the partial-image enlarging process performed by the slave device according to the flow shown in FIG. 37, for example, when program video data is being displayed on the master device 1 located in the second row and in the second column in the arrangement of the scalable TV system as shown in FIG. 38A, if a certain point P in the program video data is specified as the enlarging point, a rectangular area (represented by a broken line in FIG. 38A) centered at the enlarging point P (the center of gravity of the rectangular area) is set as the enlarging area EA, and an enlarged partial image obtained by enlarging the program video data in the enlarging area EA is displayed, instead of the program video data, on the master device 1 as shown in FIG. 38B.

Furthermore, for example, in the case in which a slave device $2_{21}$ located on the left side of the master device 1 is selected as the full-image displaying slave device, the full image of the program video data initially displayed on the master device 1 is displayed on the slave device 2₂₁ specified as the full-image displaying slave device.

This allows the user to view details of a desired part of program video data on the master device 1. The user can also view the whole image of the program video data on the slave device 2. Furthermore, in the present embodiment, as described above, the user is allowed to specify the enlargement factor in the partially enlarging of the video data by operating the remote commander 15, and thus the user can view the details of a desired part of the program video data by enlarging it by an arbitrary desired factor.

In the signal processor 137 (FIG. 22) of the master device 1 (FIG. 10), video data conversion is performed such that the program video data in the enlarging area is converted into enlarged partial video data, using the tap coefficients $w_n$ produced from the coefficient seed data in accordance with equation (1). When only equation (1) is viewed, the video data conversion seems as if it were performed by means of simple interpolation. However, in reality, the tap coefficients $w_n$ in equation (1) are produced on the basis of coefficient seed data which is obtained via learning using teacher data and student data as described earlier with reference to FIGS. 24 to 28, and thus the video data conversion using the tap coefficients $w_n$ produced such coefficient seed data allows components included in the teacher data to be reproduced. More specifically, for example, when coefficient seed data for use in resizing is used, details, which are not included in the original image, are reproduced in an enlarged image obtained using tap coefficients $w_n$ produced on the basis of the coefficient seed data. This means that the resizing by means of the video data conversion according to equation (1) using the coefficient seed data obtained via learning is quite different from the enlarging process by means of simple interpolation.

However, enlargement of program video data in a specified enlarging area to an enlarged partial video data may be performed by means of simple interpolation without using the tap coefficients produced on the basis of the coefficient seed data. In this case, details which are not included in the original program video are not reproduced in the resultant enlarged image, and the enlarged image becomes blurred and a block-like pattern appears, as the enlargement factor increases.

Although in the present embodiment, a partial enlarged image of video data is displayed on the master device 1 and a full image of program video data is displayed on the slave device 2, the partial enlarged image may be displayed on the slave device 2 while the program video data is still displayed on the master device 1.

Although in the present embodiment, a partial enlarged image of video data is displayed on the master device 1 and a full image of program video data is displayed on a slave device 2 specified as the full-image displaying slave device, in addition to those images, an enlarged partial image or a full image of program video data may be displayed on another television set in the scalable TV system.

In the scalable TV system, the full image may be displayed on the master device 1, while partial video data enlarged by various different factors may be displayed on other television sets serving as slave devices 2₁₁ to 2₃₃. In this case, partial video data enlarged by different factors may all be produced by the signal processor 137 of the master device 1 and supplied to the respective television sets serving as slave device 2₁₁ to 2₃₃, or partial enlarged video data may be produced by the signal processor 157 of each of the television sets serving as slave device 2₁₁ to 2₃₃.

In the present embodiment, the coefficient seed data for use in resizing is assumed to be stored in the master device 1. However, when the coefficient seed data for use in resizing is not stored in the master device 1, if the coefficient seed data for use in resizing is stored in another television set in the scalable TV system, the master device 1 may acquire the coefficient seed data for use in resizing from that television set. The coefficient seed data for use in resizing may also be acquired from a coefficient seed data server.

Although in the above-described example, resizing of program video data is performed such that the image size is increased, resizing may also be performed such that the image size is reduced.

Although in the above-described example, video data of a television broadcast program (program video data) is enlarged, the partially enlarging process may also be performed on other video data such as a that supplied from an external device (such as an optical-disk storage device, a magnetooptical-disk storage device, or a VTR).

Furthermore, partially enlarging may be performed not only in such a manner that a part of program video data is enlarged by the same factor in both horizontal and vertical directions but also in such a manner that a part of program video data is enlarged by different factors in horizontal and vertical directions.

Although in the present embodiment, only a part of program video data is enlarged such that the resultant enlarged image can be displayed on the display screen of the CRT 11, enlargement may also be performed such that the whole image is enlarged. In this case, only a part of the resultant enlarged image is displayed but the whole enlarged image cannot be displayed on a single CRT 11. However, a user may change the part displayed on the CRT 11 by operating the remote commander 15 so that a desired part of the program video data is displayed.

In addition to the capability of enlarging a part of video data, the scalable TV system also has a special capability of enlarging the full image. This special capability is achieved by a full-image enlarging process performed by the master device 1 and slave devices 2.

A full-image enlarge command can be issued via the menu screen, as in the case of the partially enlarge command.

More specifically, if a user operates the menu button switch 54 of the remote commander 15 (FIG. 7) (or the menu button switch 84 of the remote commander 35 (FIG. 8)), a menu screen is displayed on the CRT 11 of the master device 1 (or the CRT 31 of the slave device 2). An icon indicating the full image enlarge command (hereinafter, referred to as a full image enlarge icon) is displayed on the menu screen. If a user clicks on the full image enlarge icon by operating the remote commander 15, the full image enlarging process is started in the master device 1 and the slave device 2.

Referring to a flow chart shown in FIG. 39, the full image enlarging process performed by the master device is described below.

When video data of a television broadcast program (program video data) is being displayed on the CRT 11 of the master device 1, if the full image enlarge icon is clicked, the following process is started That is, first, in step S161, the CPU 129 of the master device 1 (FIG. 10) transmits, via the IEEE1394 interface 133, coefficient seed data for use in resizing to all slave devices in the scalable TV system.

In the present embodiment, it is assumed that coefficient seed data for use in resizing is stored in the coefficient seed data memory 167 in the signal processor 137 (FIG. 22) of the master device 1. Thus, in step S161, the CPU 129 reads the coefficient seed data for use in resizing from the signal processor 137 and transmits it.

In the case in which the coefficient seed data for use in resizing is not stored in the master device 1, the coefficient seed data for use in resizing may be acquired from another television set, having the coefficient see data for use in resizing, in the scalable TV system or from a coefficient seed data server, as in the case of the partially enlarging process.

The process then proceeds to step S162. In step S162, the CPU 129 communicates with all slave device $2_{11}$ to $2_{33}$ in the scalable TV system via the IEEE1394 interface 133 to determine whether there is a slave device $2_{ij}$ which is in a power-off state.

If it is determined in step S162 that there is a slave device $2_{ij}$ which is in the power-off state, the process proceeds to step S163. In step S163, the CPU 129 transmits, via. the IEEE1394 interface 133, a power-on command to the slave device $2_{ij}$ thereby turning on the power of the slave device $2_{ij}$. The process then proceeds to step S164.

However, if it is determined in step S162 that there is no slave device $2_{ij}$ which is in the power-off state, the process jumps to step S164 without performing step S163. In step S164, the CPU 129 transmits, via the IEEE1394 interface 133, an external input select command to all slave devices $2_{11}$ to $2_{33}$ to command them to select data input to the IEEE1394 interface 153 (FIG. 11) thereof and display the input data on the CRT 31. The process then proceeds to step S165.

In step S165, the CPU 129 initializes the enlargement factor N, by which program video data is to be enlarged, to a value of 1. The CPU 129 further sets the maximum enlargement factor $N_{max}$ and the enlargement pitch α.

In the full image enlarging process performed in the scalable TV system including, for example, 3×3 television sets as shown in FIG. 1A, the full image of program video data currently displayed on the master device 1 is gradually enlarged over the screens of the slave devices $2_{11}$ to $2_{33}$ while a central part of the full image is displayed on the screen of the master device 1, until the enlarged full image of the program video data is displayed over the total of display screens of 3×3 television sets.

Thus, the full image of program video data initially displayed on the master device 1 is finally enlarged to a size equal to the total size of screens including all screens of television sets of the scalable TV system. The ratio of the size of the final enlarged full image to the size of the initial program video data (initially displayed on the master device 1) is set as the maximum enlargement factor $N_{max}$. That is, in the present embodiment, the full image of program video data initially displayed on the master device 1 is enlarged into the full image with the size equal to the total screen size including display screens of 3×3 television sets, and thus the image is enlarged by a factor of 3 as can be understood by a simple calculation of the enlargement factor in terms of, for example, a diagonal line. Therefore, the maximum enlargement factor $N_{max}$ is set to 3.

In the full image enlarging process, as described above, the initial full image of program video data displayed on the master device 1 is gradually enlarged. This can be achieved, for example, the program video data is enlarged while gradually increasing the enlargement factor N until the enlargement factor N becomes equal to the maximum enlargement factor $N_{max}$. In the above process, when the enlargement factor N is gradually increased from 1 to $N_{max}$, increasing is performed at enlargement pitches α. For example, the enlargement pitch α is set to a value obtained by dividing ($N_{max}$−1) by a particular value greater than 1 (hereinafter, the particular value will be referred to as the number of times enlargement is performed).

The number of times enlargement is performed may be set, in advance, in the master device 1 or a user may set it by operating the remote commander 15 (or the remote commander 35). When the number of times enlargement is performed is set to a small value, the initial program video data displayed on the master device 1 is quickly enlarged to a final enlarged full image. In contrast, when the number of times enlargement is performed is set to a large value, the initial program video data displayed on the master device 1 is gradually enlarged to a final enlarged full image.

After completion of initializing the enlargement factor N and setting the maximum enlargement factor $N_{max}$ and the enlargement pitch α in step S165, the process proceeds to step S166. In step S166, the CPU 129 resets the enlargement factor N to N+α. The process then proceeds to step S167.

If the new enlargement factor N set in step S166 is greater than the maximum enlargement factor $N_{max}$, the CPU 129 sets the enlargement factor N to the maximum enlargement factor $N_{max}$.

In step S167, the CPU 129 determines an enlarging area of the program video data initially displayed on the master device 1, which is to be enlarged by the signal processor 137 of the master device 1 and also determines enlarging areas to be enlarged by the signal processors 157 of the respective slave devices $2_{ij}$ (FIG. 11), on the basis of the enlargement factor N set in step S165. The process then proceeds to step S168. In step S168, the CPU 129 determines displaying areas of the enlarged program video data, to be displayed on the CRT 11 of the master device 1 and CRTs 31 of the respective slave devices $2_{ij}$ (FIG. 11) (each enlarged video data displayed on each CRT will also be referred to as partial enlarged video data) on the basis of the enlargement factor N set in step S165. The process then proceeds to step S169.

Now, referring to FIG. 40, the method of calculating the enlarging area associated with the master device 1 (the enlarging area to be enlarged by the signal processor 137 of the master device 1), the enlarging areas associated with slave devices $2_{ij}$ (the enlarging areas to be enlarged by the signal processors 157 of slave devices $2_{ij}$), and the displaying area associated with slave devices $2_{ij}$ (areas of respective partial enlarged video data produced by enlarging the enlarging areas of the program video data, to be displayed on CRTs 31 of the respective slave devices $2_{ij}$) on the basis of the enlargement factor N is described below.

Figure 40A:
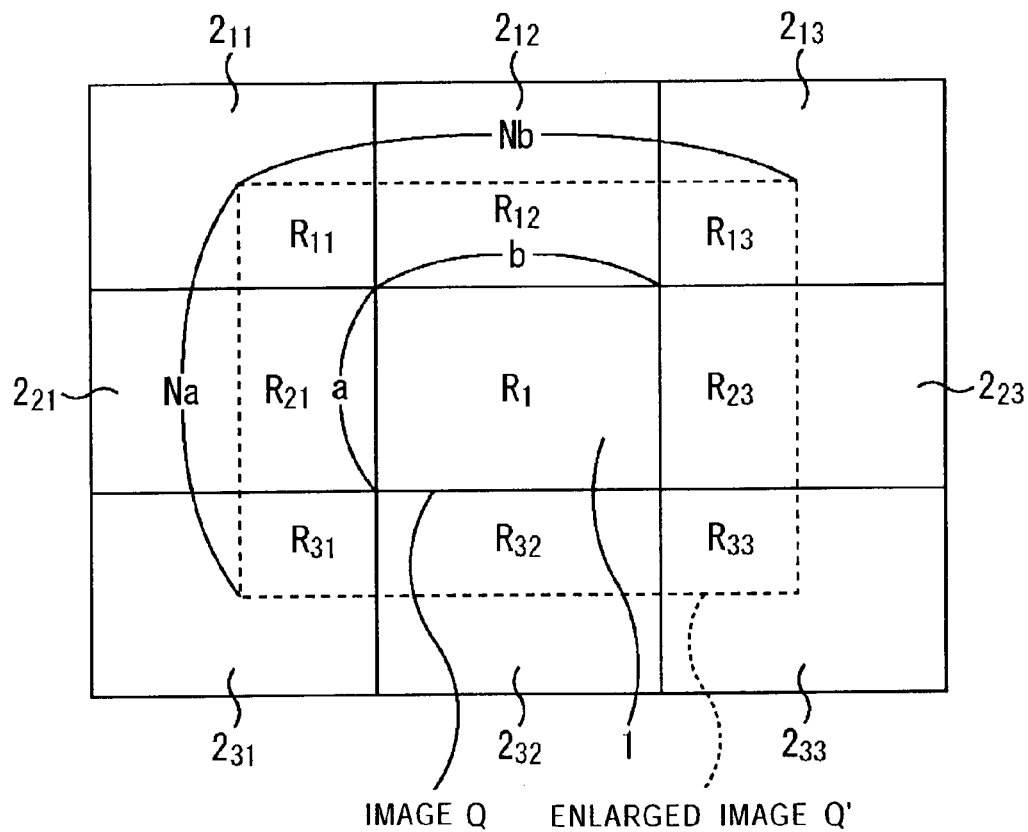
FIGS. 40A and 40B are diagrams showing a method of determining a displaying area and an enlarging area.

FIG. 40A shows the total display screen including display screens of 3×3 television sets of the scalable TV system.

More specifically, the total display screen of the scalable TV system includes the display screen of the CRT 11 of the master device 1 and display screens of CRTs 31 of eight slave devices $2_{11}$ to $2_{33}$. That is, the total display screen includes display screens of a total of nine CRTs. As described earlier, the screen sizes are identical for the master device 1 and all slave devices $2_{ij}$.

In the full image enlarging process in which, as described above, the full image of the program video data initially displayed on the master device 1 is gradually enlarged, the program video data initially displayed on the master device 1 is denoted by video data Q, and the enlarged full video data obtained by enlarging the video data Q by a factor of N is denoted by video data Q'.

Herein, if the vertical screen size of the master device 1 and the horizontal screen size are denoted by a and b, respectively, the vertical and horizontal image sizes of the program video data Q are equal to a and b, respectively.

Because the enlarged full video data Q' is obtained by enlarging the program video data Q by the factor of N in both vertical and horizontal directions, the vertical and horizontal sizes of the enlarged full video data Q are Na and Nb, respectively.

In the full image enlarging process, as described above, the enlarged full video data Q' obtained by enlarging the full program video data Q initially displayed on the master device 1 is displayed such that the central part thereof is displayed on the master device 1. In order to display the enlarged full video data Q' over the entire total screen including the display screens of the master device 1 and the slave devices $2_{11}$ to $2_{33}$ such that the central part of the enlarged full video data Q' is displayed on the display screen of the master device 1, it is required that the master device 1 should display assigned partial enlarged video data in the area, denoted by $R_1$ in FIG. 40A, of the total display screen, and slave devices $2_{ij}$ should display assigned partial enlarged video data in the respective areas denoted by $R_{ij}$ in FIG. 40A.

To meet the above requirement, in step S168 in FIG. 39, the area $R_1$ is determined as the displaying area of the master device 1 and the areas $R_{ij}$ are determined as the displaying areas of the slave devices $2_{ij}$.

That is, as for the master device 1, the full screen area is employed as the displaying area $R_1$. In the case of a slave device $2_{11}$ at the upper left location relative to the location of the master device 1, a rectangular area with a size of ((Nb−b/2)×((Na−a)/2) (horizontal length×vertical length) at the lower right corner of the display screen is employed as the displaying area. For a slave device $2_{12}$ at the upper location relative to the location of the master device 1, a rectangular area with a size of b×((Na−ca)/2) (horizontal length×vertical length) on the lower side of the display screen is employed as the displaying area $R_{12}$. For a slave device $2_{13}$ at the upper right location relative to the location of the master device 1, a rectangular area with a size of ((Nb−b/2)×((Na−a)/2) (horizontal length×vertical length) at the lower left corner of the display screen is employed as the displaying area $R_{13}$. For a slave device $2_{21}$ on the left side of the master device 1, a rectangular area with a size of ((Nb−b/2)×a (horizontal length×vertical length) on the right side of the display screen is employed as the displaying area $R_{21}$. For a slave device $2_{23}$ on the right side of the master device 1, a rectangular area with a size of ((Nb−b/2)×a (horizontal length×vertical length) on the left side of the display screen is employed as the displaying area $R_{23}$. For a slave device $2_{31}$ at the lower left location relative to the location of the master device 1, a rectangular area with a size of ((Nb−b/2)×((Na−a)/2) (horizontal length×vertical length) at the upper right corner of the display screen is employed as the displaying area $R_{31}$. For a slave device $2_{32}$ at the lower location relative to the location of the master device 1, a rectangular area with a size of b×((Na−a)/2) (horizontal length×vertical length) on the upper side of the display screen is employed as the displaying area $R_{32}$. For a slave device $2_{33}$ at the lower right location relative to the location of the master device 1, a rectangular area with a size of ((Nb−b/2)×((Na−a)/2) (horizontal length×vertical length) at the upper left corner of the display screen is employed as the displaying area $R_{33}$.

Herein, if the total area including the displaying area $R_1$ of the master device 1 and the displaying areas $R_{ij}$ of the slave devices $2_{ij}$ shown in FIG. 40A is regarded as the area of the enlarged full image of video data Q', the respective video data of the areas $R_1$ and $R_{ij}$ should be partial enlarged video data enlarged from corresponding parts of the original program video data Q. Thus, it is required to determine respective enlarging areas of the program video data Q from which the corresponding partial enlarged video data, which are to be displayed in the displaying area $R_1$ of the master device 1 and the displaying areas $R_{ij}$ of the slave devices $2_{ij}$, are enlarged.

Figure 40B:
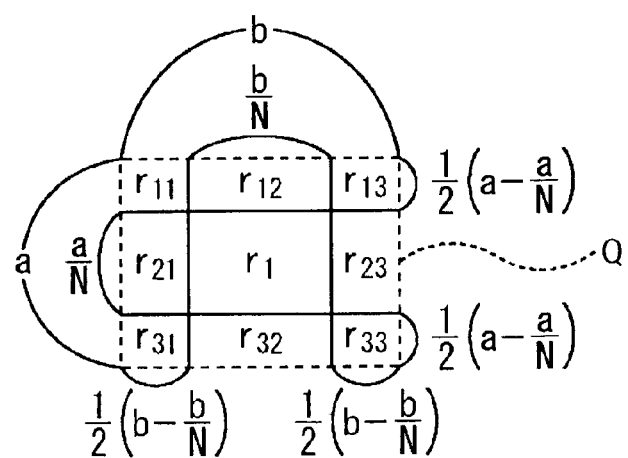

Thus, in step S167, as shown in FIG. 40B, areas $r_1$ and $r_{ij}$ of the image of the original program video data Q corresponding to the areas $R_1$ and $R_{ij}$, respectively, of the enlarged full image of video data Q' are determined as the enlarging area associated with the master device 1 and the enlarging areas associated with the slave devices $2_{ij}$, respectively.

Because the enlarged full image of the video data Q' with a size of Nb×Na is obtained by enlarging, by a factor of N, the image of the program video data Q with a size of b×a, the areas $r_1$ and $r_{ij}$ of the image of the program video data Q can be calculated by multiplying the areas $R_1$ and $R_{ij}$ of the enlarged full image of the video data Q' by a factor of 1/N, and the calculated areas $r_1$ and $r_{ij}$ can be employed as the enlarging areas associated with the master device 1 and the slave devices $2_{ij}$.

More specifically, a central area of the image of the program video data Q with a size of b/N×a/N (horizontal length×vertical length) is employed as the enlarging area $r_1$ associated with the master device 1. An area of the image of the program video data Q with a size of (b−b/N)/2 Z×(a−a/N)/2 (horizontal length×vertical length) is employed as the enlarging area $r_{11}$ associated with the slave device $2_{11}$ at the upper left location relative to the location of the master device 1. An area of the image of the program video data Q with a size of b/N×(a−a/N)/2 (horizontal length×vertical length) is employed as the enlarging area $r_{12}$ associated with the slave device $2_{12}$ located on the upper side of the master device 1. An area of the image of the program video data Q with a size of (b−b/N)/2×(a−a/N)/2 (horizontal length×vertical length) is employed as the enlarging area $r_{13}$ associated with the slave device $2_{13}$ at the upper right location relative to the location of the master device 1. An area of the image of the program video data Q with a size of (b−b/N)/2×a/N (horizontal length×vertical length) is employed as the enlarging area $r_{21}$ associated with the slave device $2_{21}$ located on the left side of the master device 1. An area of the image of the program video data Q with a size of (b−b/N)/2×a/N (horizontal length×vertical length) is employed as the enlarging area $r_{23}$ associated with the slave device $2_{23}$ located on the right side of the master device 1. An area of the image of the program video data Q with a size of (b−b/N)/2×(a−a/N)/2 (horizontal length×vertical length) is employed as the enlarging area $r_{31}$ associated with the slave device $2_{31}$ at the lower left location relative to the location of the master device 1. An area of the image of the program video data Q with a size of b/N×(a−a/N)/2 (horizontal length×vertical length) is employed as the enlarging area $r_{32}$ associated with the slave device $2_{32}$ located on the lower side of the master device 1. An area of the image of the program video data Q with a size of (b−b/N)/2×(a−a/N)/2 (horizontal length×vertical length) is employed as the enlarging area $r_{33}$ associated with the slave device $2_{33}$ at the lower right location relative to the location of the master device 1.

Referring again to FIG. 39, in step S169, the CPU 129 transmits, via the IEEE1394 interface 133, an enlarge-and-display command together with program video data, the enlargement factor N, the enlarging areas, and the displaying areas to the respective slave devices $2_{ij}$ to request them to enlarge (resize) the video data using the coefficient seed data transmitted in step S161 and display the enlarged video data.

In the above process, the CPU 129 acquires the program video data by requesting the demultiplexer 124 to supply TS packets included in the transport stream being supplied to the MPEG video decoder 125. In response to the request, the demultiplexer 124 transmits the TS packets to the CPU 129. The CPU 129 transmits the received TS packets to the respective slave devices $2_{ij}$.

As for the enlarging areas and displaying areas, the CPU 129 transmits the enlarging areas and displaying areas determined for respective slave devices $2_{ij}$ to the corresponding slave devices $2_{ij}$.

Instead of transmitting TS packets, the CPU 129 may transmit MPEG-decoded program video data, read via the signal processor 137 from the frame memory 127, to the respective slave devices $2_{ij}$. This makes unnecessary for each slave device $2_{ij}$ to perform MPEG-decoding on the program video data.

In the case in which MPEG-decoded program video data is transmitted to slave devices $2_{ij}$, part of the program video data corresponding to the enlarging area assigned to each slave device $2_{ij}$ may be transmitted instead of transmitting the whole program video data.

The process then proceeds to step S170. In step S170, the CPU 129 sets the parameter z corresponding to the enlargement factor N, determined in step S166, into the parameter memory 168 of the signal processor 137 (FIG. 22). The process then proceeds to step S171.

In step S171, the CPU 129 controls the signal processor 137 (FIG. 22) so as to perform video data conversion on the program video data which is stored in the frame memory 127 and which is the same as that transmitted, in step S169, to the respective slave devices $2_{ij}$ so that the enlarging area $r_1$ (FIG. 40B) assigned to the master device 1 is enlarged.

More specifically, in the present embodiment, the coefficient seed data for use in resizing is stored in the coefficient seed data memory 167 in the signal processor 137 (FIG. 22) of the master device 1, and the signal processor 137 performs video data conversion on the enlarging area $r_1$ of the program video data stored in the frame memory 127, using the coefficient seed data for use in resizing stored in the coefficient seed data memory 167 and using the tap coefficient generated from the parameter z stored in the parameter memory 168, so as to convert the enlarging area $r_1$ of the program video data into a partial enlarged video data (enlarged (resized) by the enlargement factor of N).

In the above process, the CPU 129 controls the signal processor 137 so that the resultant partial enlarged video data is stored in the displaying area $R_1$ (FIG. 40A) assigned to the master device 1, of the display screen of the CRT 11. That is, the signal processor 137 adjusts the displaying position so that the partial enlarged video data is displayed in the displaying area $R_1$ (FIG. 40A), assigned to the master device 1, on the display screen of the CRT 11.

Note that in the case of the master device 1, as described earlier with reference to FIG. 40, the displaying area $R_1$ is identical to the size of the display screen of the CRT 11, and thus, in practice, the adjustment of the displaying position is not necessary.

In step S172, the signal processor 137 supplies the partial enlarged video data obtained in step S171 to the CRT 11 via the frame memory 127 and the NTSC encoder 128. The CRT 11 displays the received partial enlarged video data.

Thus, in this case, the partial enlarged video data obtained by enlarging the enlarging area $r_1$ of the initial program video data by the enlargement factor N is displayed over the whole area of the display screen of the CRT 11 of the master device 1.

The process then proceeds to step S173. In step S173, the CPU 129 determines whether the enlargement factor N is smaller than the maximum enlargement factor $N_{max}$. If it is determined in step S173 that the enlargement factor N is smaller than the maximum enlargement factor $N_{max}$, the processing flow returns to step S166 to repeat the process described above.

On the other hand, if it is determined in step S173 that the enlargement factor N is not smaller than the maximum enlargement factor $N_{max}$, that is, in the case in which the enlargement factor N has been set, in step S166, to the maximum enlargement factor $N_{max}$, the process proceeds to step S174. In step S174, as in step S169, the CPU 129 transmits, via the IEEE1394 interface 133, the enlarge-and-display command together with the program video data, the enlargement factor N, the enlarging area, and the displaying area to each slave device $2_{ij}$. The process then proceeds to step S175.

In step S175, the CPU 129 controls the signal processor 137 (FIG. 22) so as to perform video data conversion on the program video data which is stored in the frame memory 127 and which is the same as that transmitted, in step S174, to the respective slave devices $2_{ij}$ so that the enlarging area $r_1$ (FIG. 40B) assigned to the master device 1 is enlarged.

More specifically, in this step S175, as in step S169, the signal processor 137 performs video data conversion on the enlarging area $r_1$ of the program video data stored in the frame memory 127, using the coefficient seed data for use in resizing stored in the coefficient seed data memory 167 and using the tap coefficient generated from the parameter z stored in the parameter memory 168, so as to convert the enlarging area $r_1$ of the program video data into a partial enlarged video data (enlarged (resized) by the enlargement factor of N).

In step S176, as in step S172, the resultant partial enlarged video data is supplied via the frame memory 127 and the NTSC encoder 128 to the CRT 11 and is displayed thereon.

Herein, the enlargement factor N, the enlarging areas, and the displaying areas transmitted in step S174 to the respective slave devices $2_{ij}$ are those determined in steps S166 to S168, and thus the enlargement factor N is equal to the maximum enlargement factor $N_{max}$, and the enlarging areas and the displaying areas are those determined on the basis of the enlargement factor N equal to the maximum enlargement factor $N_{max}$.

Therefore, at this stage, the enlarging area and the displaying area assigned to the master device 1 are also those determined on the basis of the enlargement factor N equal to the maximum enlargement factor $N_{max}$.

When video data conversion is performed in step S175, the parameter z stored in the parameter memory 168 of the signal processor 137 (FIG. 22) is that determined in step S170 so as to correspond to the maximum enlargement factor $N_{max}$.

Thus, in step S176, the partial enlarged video data, obtained by enlarging, by a factor equal to the maximum enlargement factor $N_{max}$, the program video data in the enlarging area $r_1$ determined on the basis of the enlargement factor N equal to the maximum enlargement factor $N_{max}$, is displayed in the displaying area $R_1$ determined on the basis of the enlargement factor N equal to the maximum enlargement factor $N_{max}$ (as for the master device 1, the displaying area $R_1$ is identical to the display screen of the CRT 11).

The process then proceeds to step S177. In step S177, the CPU 129 determines whether a command to terminate displaying the enlarged full-image video data (hereinafter, referred to as a full-image enlarging terminate command) has been received.

If it is determined in step S177 that the full-image enlarging terminate command has not been received, the processing flow returns to step S174 to repeat the process described above. Thus, in this case, in the master device 1, displaying of the partial enlarged video data enlarged by a factor equal to the maximum enlargement factor $N_{max}$ is continued.

On the other hand, if it is determined in step S177 that the full-image enlarging terminate command has been received, that is, if a user operates the remote commander 15 (FIG. 7) so as to display a menu screen on the CRT 11 and re-click on the full image enlarge icon on the menu screen thereby causing an infrared ray corresponding to the full image enlarge command to be emitted from the remote commander 15 and received by the IR receiver 135 and finally transferred to the CPU 129, the process proceeds to step S178. In step S178, the video data conversion by the signal processor 137 is terminated and thus the full image enlarging process by the master device 1 is terminated. Thereafter, the program video data stored in the frame memory 127 is directly supplied to the CRT 11 via the NTSC encoder 128, and the program video data with a normal image size is displayed on the CRT 11.

Referring to a flow chart shown in FIG. 41, the full image enlarging process performed by each slave device $2_{ij}$ of the scalable TV system is described below.

In each slave device $2_{ij}$ (FIG. 11), first, in step S181, the CPU 149 receives, via the IEEE1394 interface 153, coefficient seed data for use in resizing transmitted in step S161 in FIG. 39 from the master device 1. Furthermore, in this step S181, the CPU 149 transfers the received coefficient seed data for use in resizing to the signal processor 157 (FIG. 29), which in turn stores the received coefficient seed data for use in resizing into the coefficient seed data memory 207. In this process, the signal processor 157 saves initial coefficient seed data already existing in the coefficient seed data memory 207 into the available storage space of the EEPROM 157B before storing the received coefficient seed data for use resizing.

In a case in which coefficient seed data for use in resizing already exists in the coefficient memory 207 in the signal processor 157 of a slave device $2_{ij}$ step S181 and also step S188 which will be described later may be skipped.

The process then proceeds to step S182. In step S182, the CPU 149 determines whether the external input select command transmitted in step S164 in FIG. 39 by the master device 1 has been received. If the command has not been received, the process returns to step S182.

However, if it is determined in step S182 that the external input select command transmitted from the master device 1 has been received, that is, if the external input select command transmitted from the master device 1 has been received by the IEEE1394 interface 153 and then transferred to the CPU 149, the process proceeds to step S183. In step S183, the CPU 149 makes selection of input so that program video data received by the IEEE1394 interface 153 is supplied to the MEPG video decoder 145 via the demultiplexer 144. The process then proceeds to step S184.

In step S184, the CPU 149 the enlarge-and-display command has been received, together with the program video data, the enlargement factor N, the enlarging area $r_{ij}$, and the displaying area $R_{ij}$, from the master device 1.

If it is determined in step S184 that the enlarge-and-display command has been received, together with the program video data, the enlargement factor N, the enlarging area $r_{ij}$, and the displaying area $R_{ij}$, from the master device 1, that is, if the enlarge-and-display command, the program video data, the enlargement factor N, the enlarging area $r_{ij}$, and the displaying area $R_{ij}$, transmitted from the master device 1 have been received by the IEEE1394 interface 153 and then transferred to the CPU 149, the CPU 149 performs processing in accordance with the enlarge-and-display command such that the enlarging area $r_{ij}$ of the program video data received together with the enlarge-and-display command is enlarged by a factor equal to the enlarging factor N, and the resultant partial enlarged video data is displayed in the displaying area $R_{ij}$ of the display screen of the CRT 31.

More specifically, in step S185 after step S184, the CPU 149 stores the parameter z, having a value corresponding to the enlarging factor N received together with the enlarge-and-display command, into the parameter memory 208 of the signal processor 157 (FIG. 29) The process then proceeds to step S186.

In step S186, the CPU 149 controls the signal processor 157 (FIG. 29) so as to perform video data conversion on the enlarging area $r_{ij}$ of the program video data which has been received together with the enlarge-and-display command and which is stored in the frame memory 147 so that the enlarging area $r_{ij}$ (FIG. 40B) assigned to the slave device $2_{ij}$ is enlarged.

More specifically, in the present embodiment, if the CPU 149 receives, via the IEEE1394 interface 153, TS packets of program video data together with the enlarge-and-display command transmitted, in steps 169 and S174 in FIG. 39, from the master device 1 to the slave devices $2_{ij}$, the CPU 149 supplies the TS packets to the MPEG video decoder 145 via the demultiplexer 144. The MPEG video decoder 145 performs MPEG-decoding on the TS packets to obtain program video data. The obtained program video data is stored in the frame memory 147.

The coefficient seed data memory 207 of the signal processor 157 (FIG. 29) of the slave device $2_{ij}$ has coefficient seed data for use in resizing, stored in step S181, and the signal processor 157 performs video data conversion on the enlarging area $r_{ij}$ of the program video data stored in the frame memory 147, using the coefficient seed data for use in resizing stored in the coefficient seed data memory 207 and using the tap coefficient generated from the parameter z stored in the parameter memory 208, so as to convert the enlarging area $r_{ij}$ of the program video data into a partial enlarged video data (enlarged (resized) by the enlargement factor of N).

In the above process, the CPU 149 controls the signal processor 157 so that the resultant partial enlarged video data is stored in the displaying area $R_{ij}$ (FIG. 40A) assigned to the slave device $2_{ij}$, of the display screen of the CRT 31. That is, the signal processor 157 adjusts the displaying position so that the partial enlarged video data is displayed in the displaying area $R_{ij}$ (FIG. 40A), assigned to the slave device $2_{ij}$, on the display screen of the CRT 31.

More specifically, for example, in the case of the slave device $2_{11}$, the displaying position is adjusted so that the partial enlarged video data is displayed in the displaying area $R_{11}$ in the bottom right corner of the display screen of the CRT 31 as shown in FIG. 40A.

In this example, the video data associated with the area of the display screen of the CRT 31 of the slave device $2_{11}$ other than the displaying area $R_{11}$ is set to the black level. In the other slave devices $2_{ij}$, the displaying position is adjusted in a similar manner.

In step S187, the signal processor 157 supplies the partial enlarged video data obtained in step S186 to the CRT 31 via the frame memory 147 and the NTSC encoder 148. The CRT 31 displays the received partial enlarged video data.

The processing flow then returns to step S184 to repeat the process from step S184 to step S187.

On the other hand, if it is determined in step S184 that the enlarge-and-display command, the program video data, the enlargement factor N, the enlarging area $r_{ij}$, and the displaying area $R_{ij}$ have not been received from the master device 1, that is, if the IEEE1394 interface 153 can receive no further enlarge-and-display command, program video data, enlargement factor N, enlarging area $r_{ij}$, and displaying area $R_{ij}$ from the master device 1, the process proceeds to step S188. In step S188, the signal processor 157 resets (by means of overwriting) the original coefficient seed data saved in the EEPROM 157B into the coefficient seed data memory 207 (FIG. 29). Thus the full image enlarging process by the slave device is ended.

Figure 41:
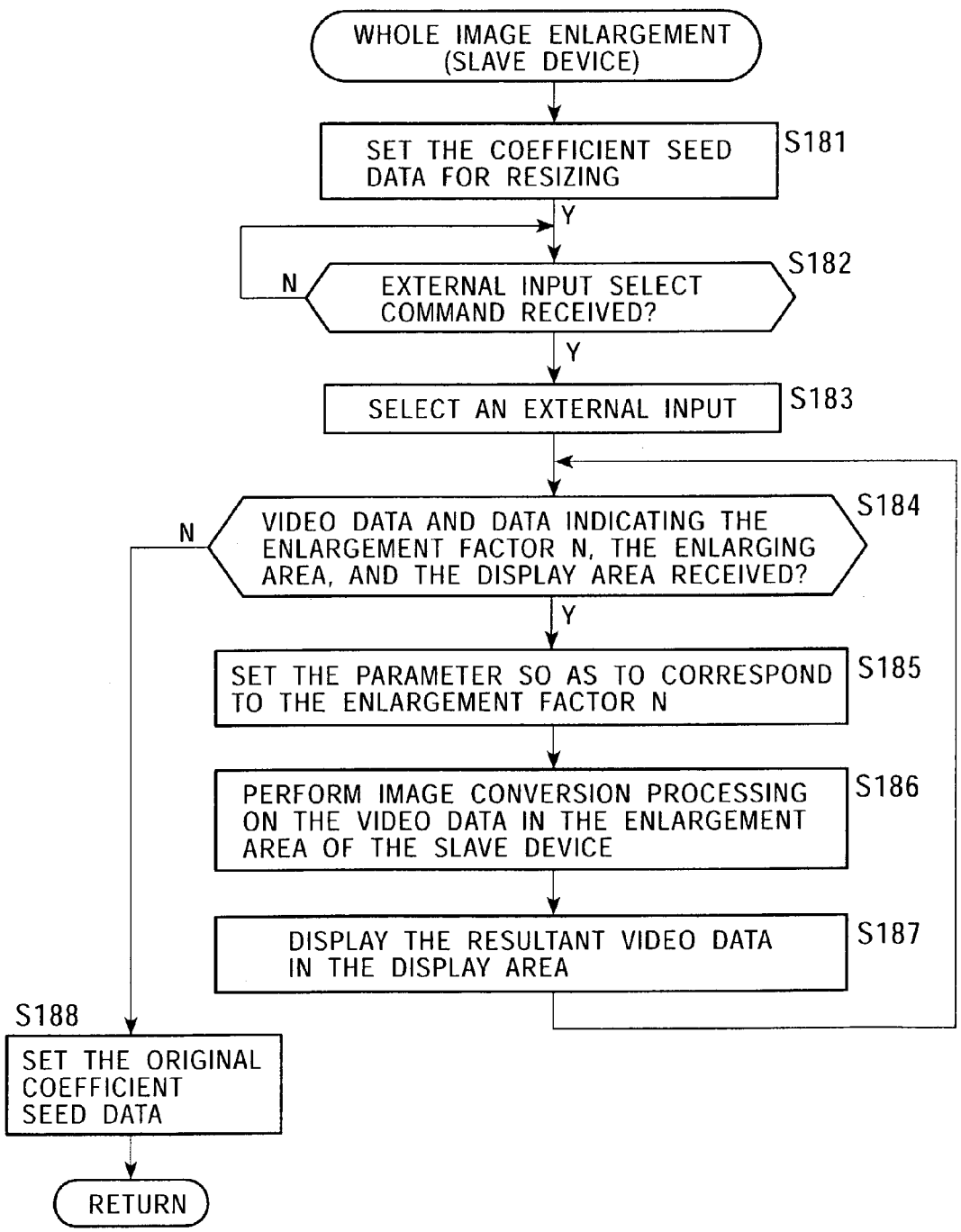
FIG. 41 is a flow chart showing a full-image enlarging process performed by the slave device.
Figure 42A:
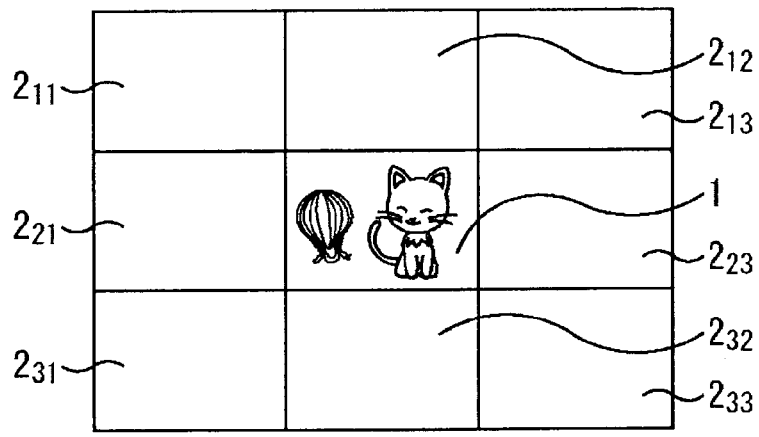
FIGS. 42A to 42C are diagrams showing examples of manners of enlarging a full image in the scalable TV system.
Figure 42B:
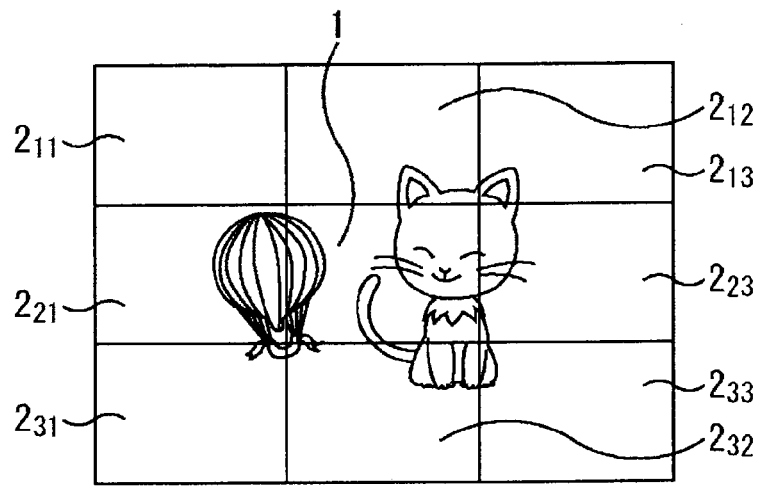
Figure 42C:
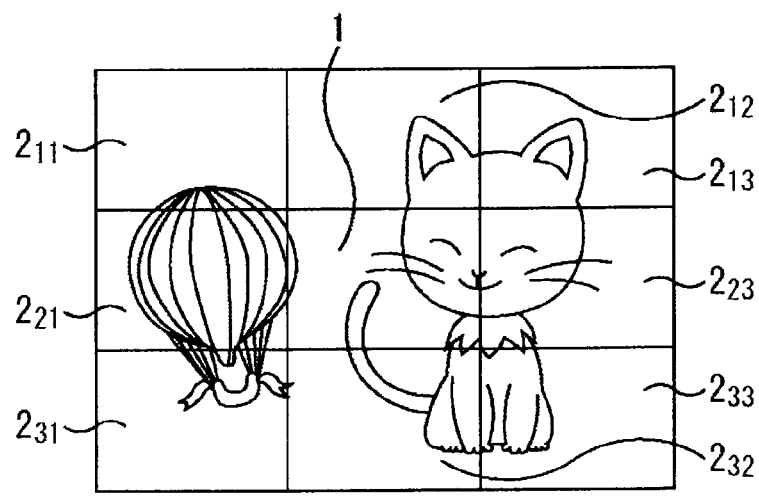

In the full image enlarging process performed by the master device shown in FIG. 39 and the slave devices shown in FIG. 41, if the full image enlarging process is started when program video data is being displayed on the master device 1 located, for example, in the second row in the second column of the array of television sets of the scalable TV system as shown in FIG. 42A, the full image of the program video data displayed on the master device 1 is gradually enlarged over the screens of the slave devices $2_{11}$ to $2_{33}$ while a central part of the full image is displayed on the screen of the master device 1 as shown in FIG. 42B, until an enlarged full image of the program video data is displayed over the whole area of the composite screen consisting of display screens of 3×3 television sets including the master device 1 and slave devices $2_{11}$ to $2_{33}$ as shown in FIG. 42C.

This allows a user to view the full image of the program video data in the enlarged form and thus to view details of the program video data.

However, in a practical scalable TV system, adjacent display screens of television sets are separated by frames of the cases of the respective television sets, and thus no image is displayed in the frame zones, although the frame zones between adjacent television sets are not shown in FIG. 42 for the purpose of simplicity. Thus, in practical scalable TV systems, the full image of enlarged video data is separated by such zones in which no image is displayed.

However, human eyes have a capability of interpolate a part of an image hidden by a stripe zone with a small width from a displayed part of the image near the stripe zone, and thus the existence of stripe zone does not cause a serious problem in viewing the full image of program video data.

In the full-image enlarging process, instead of obtaining an enlarged full image of video data by performing video data conversion using the coefficient see data for use in resizing, an enlarged full image of video data may also be obtained by means of simple interpolation, as in the case of the partial-image enlarging process.

When an enlarged full image of program video data is displayed, details are represented in the displayed image only in the case in which the video data conversion is performed in steps 137 and 157 by the signal processor 137 using the coefficient seed data for use in resizing. In a case in which program video data is enlarged by means of simple interpolation, details are not represented, although an enlarged full image can be displayed. That is, the image quality of the enlarged full image produced by means of simple interpolation is not good compared with that of the enlarged full image produced using the coefficient seed data for use in resizing.

Although in the present embodiment the special capability is provided only when authentication described above with reference to FIGS. 31 and 33 has been successfully passed, a limited version of special capability may be provided even when authentication fails.

For example, an enlarged full image of video data produced by means of video data conversion using the coefficient seed data for use in resizing is provided when authentication has been passed, while an enlarged full image produced by means of simple interpolation is provided if authentication fails.

In a case in which a scalable TV system is constructed using television sets which do not have capability of serving as either a master device or slave devices, although an enlarged full image produced by means of simple interpolation can be displayed, the image quality is not good compared with that produced by means of the video data conversion using the coefficient seed data for use in resizing.

In contract, in the scalable TV system constructed using television sets capable of serving as a master device or slave devices, an enlarged full image having high quality produced by means of the video data conversion using the coefficient seed data for use resizing is displayed.

This causes users, having a scalable TV system constructed using television sets incapable of operating as either a master device or slave devices, to have an incentive to purchase television sets capable of operating as a master device or slave devices to view an enlarged full image with high quality.

Although in the embodiment described above, the maximum enlargement factor $N_{max}$ is set such that when the full image of program video data initially displayed on the master device 1 is enlarged by a factor equal to the maximum enlargement factor $N_{max}$, the resultant enlarged image has a size equal to the size of the total screen made up of screens of respective television sets in the scalable TV system, the maximum enlargement factor $N_{max}$ may also be set by a user to an arbitrary value by operating the remote commander 15 (or the remote commander 35).

In this case, there is a possibility that the maximum enlargement factor $N_{max}$ is set to a value which causes the enlarged full image of program video data to have a size greater than the size of the total screen made up of screens of respective television sets in the scalable TV system. Hereinafter such a value will be referred to as an oversized enlargement factor. If program video data is enlarged by an oversized enlargement factor, the whole of the resultant enlarged full image cannot be displayed within the total screen size of the scalable TV system. In other words, only some part of such an enlarged full image can be displayed. In this case, a user can specify which part of the full image obtained by enlargement by an oversized enlargement factor should be displayed, by operating the remote commander 15 (or the remote commander 35)

Although in the example described above, each of television sets in the scalable TV system generates video data of a partial enlarged image to be displayed on each television set, video data of all partial enlarged images to be displayed on the respective television sets in the scalable TV system may be generated by one television set such as the master device 1 or two or more particular television sets. For example, the master device 1 may generate video data of an enlarged full image and may transmit video data of partial enlarged images, which are particular parts of the video data of the enlarged full image, to the corresponding slave devices $2_{ij}$ via the IEEE1394 interface 133. However, in this case, the master device 1 has to perform a greater amount of processing to generate video data of partial enlarged images to be displayed on the respective slave devices $2_{ij}$ in addition to the video data of a partial enlarged image to be displayed on the master device 1.

Furthermore, in the example described above, video data of television broadcast program (program video data) is enlarged, video data input from an external device may also be enlarged in the full-image enlarging process as in the case of the partial-image enlarging process.

Furthermore, the full image enlarging process may be performed, as with the partial image enlarging process, not only in such a manner that original program video data is enlarged by the same factor in both horizontal and vertical directions but also in such a manner that the original program video data is enlarged by different factors in horizontal and vertical directions.

Although in the example described above, video data initially displayed on the master device 1 located at the center of the 3×3 arrangement of television sets of the scalable TV system is enlarged (in a total eight directions including an upper-leftward direction, a leftward direction, a lower-leftward direction, a downward direction, an upper-rightward direction, a rightward direction, and a lower-rightward direction) toward the respective slave devices $2_{ij}$ surrounding the master device 1, video data initially displayed on another television set such as the slave device $2_{31}$ at the lower left location may be enlarged may be enlarged toward the slave device $2_{21}$ at the upper location, the master device 1 at the upper right location, the slave device $2_{32}$ at the right-side location and so on until the enlarged full image is displayed.

In the example described above, video data of an enlarged full image (video data of partial enlarged images forming the enlarged full image) is generated by the master device 1 or a slave device $2_{ij}$ in response to a full-image enlarge command issued by a user by operating the remote commander 15, the master device 1 and the respective slave device $2_{ij}$ may always generate video data of full images enlarged by factors of N equal to 1+α, 1+2α, 1+3α, . . . , $N_{max}$ so that full images enlarged by factors of 1+α, 1+2α, 1+3α, . . . , $N_{max}$ are sequentially displayed in immediate response to an full-image enlarge command.

The scalable TV system also has a special capability of displaying video data such that a single full image is displayed over all television sets of the scalable TV system. This special capability is herein referred to as on-multi-screen displaying. That is, this special capability is achieved by performing an on-multiscreen displaying process using the master device 1 and the slave devices 2.

An on-multiscreen display command can also be issued via the menu screen, as with the partial-image enlarge command and the full-image enlarge command.

More specifically, if a user operates the menu button switch 54 of the remote commander 15 (FIG. 7) (or the menu button switch 84 of the remote commander 35 (FIG. 8)), a menu screen is displayed on the CRT 11 of the master device 1 (or the CRT 31 of the slave device 2). An icon indicating an on-multiscreen display command (hereinafter, referred to as an on-multiscreen display icon) is displayed on the menu screen. If a user clicks on the on-multiscreen display icon by operating the remote commander 15, the on-multiscreen displaying process is started in the master device 1 and the slave devices 2.

Figure 43:
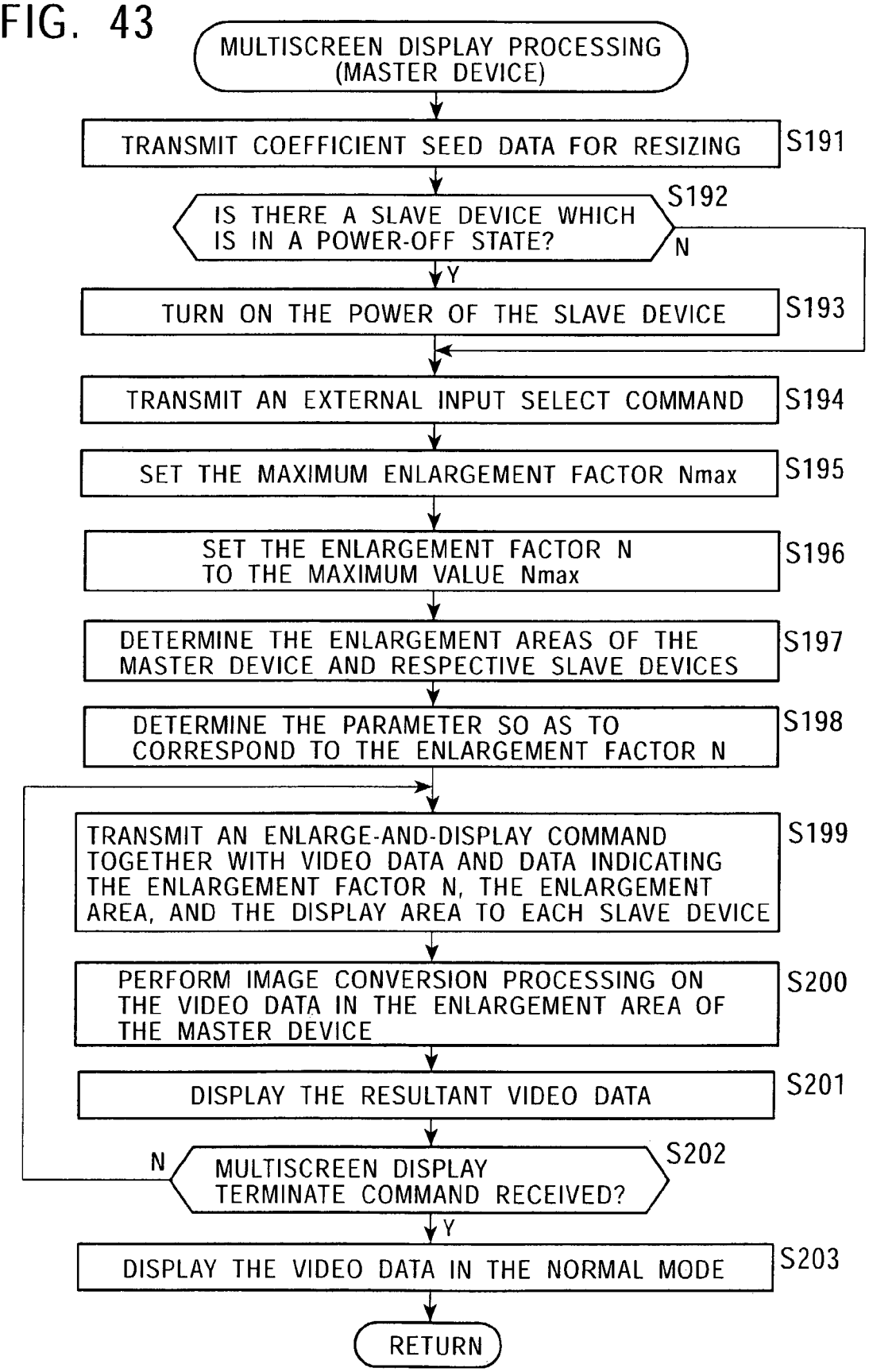
FIG. 43 is a flow chart showing an on-multiscreen displaying process performed by the master device.

The on-multiscreen displaying process performed by the master device is described below with reference to a flow chart shown in FIG. 43.

In the on-multiscreen display mode, as described in FIG. 42C, a single image of program video data is displayed over the television sets of the scalable TV system. Therefore, the on-multiscreen displaying process performed by the master device 1 is substantially the same as the full image enlarging process shown in FIG. 39 except that the enlargement factor N is fixed to the maximum enlargement factor $N_{max}$ and the enlarging pitch α is ignored.

Thus, in the on-multiscreen displaying process performed by the master device 1, steps S191 to 194 are performed in similar manner to steps S161 to S164 in the full image enlarging process shown in FIG. 39.

Thereafter, the process proceeds to step S195. In step S195, the maximum enlargement factor $N_{max}$ is set in a similar manner as in step S165 in FIG. 39. The process then proceeds to step S196. In step S196, the CPU 129 of the master device 1 sets the enlargement factor N to the maximum enlargement factor $N_{max}$. The process then proceeds to step S197.

In step S197, the CPU 129 determines the enlarging area $r_1$, assigned to the master device 1, of the program video data, and the enlarging areas $r_{ij}$, assigned to respective slave devices $2_{ij}$, of the program video data on the basis of the enlargement factor N set to the maximum enlargement factor $N_{max}$, in a similar manner as in step S167 shown in FIG. 39. The process then proceeds to step S198.

In the case of the full image enlarging process shown in FIG. 39, the enlarging area is determined in step S167 and the displaying area is determined in step S168. However, when the enlargement factor N is equal to the maximum enlargement factor $N_{max}$, the displaying area $R_1$ of the master device 1 is the whole area of the display screen of the CRT 11, and the displaying area $R_{ij}$ of each slave device $2_{ij}$ is also the whole area of the display screen of the CRT 31. Thus, in this case, the displaying areas are already known and it is not required to determine them (the displaying areas can be regarded as having already been determined). Therefore, the on-multiscreen displaying process does not include the steps of determining the displaying area $R_1$ of the master device 1 and the displaying areas $R_{ij}$ of the slave devices $2_{ij}$.

In step S198, the CPU 129 sets the parameter z corresponding to the enlargement factor N set to the maximum enlargement factor $N_{max}$ in a similar manner to step S170 in FIG. 39 and stores it into the parameter memory 168 of the signal processor 137 (FIG. 22).

Thereafter, steps 199 to S201 are performed in a similar manner as in steps S174 to S176 in FIG. 39. As a result, partial enlarged video data enlarged by a factor equal to the maximum enlargement factor $N_{max}$ is displayed on the master device 1.

The process then proceeds to step S202. In step S202, the CPU 129 determines whether a command to terminate the on-multiscreen displaying process (hereinafter, referred to as a on-multiscreen display terminate command).

If it is determined in step S202 that the on-multiscreen display terminate command has not been received, the processing flow returns to step S199 to repeat the process described above. Thus, in this case, in the master device 1, displaying of the partial enlarged video data enlarged by a factor equal to the maximum enlargement factor $N_{max}$ is continued.

On the other hand, if it is determined in step S202 that the on-multiscreen display terminate command has been received, that is, if a user operates the remote commander 15

(FIG. 7) so as to display a menu screen on the CRT 11 and re-click on the on-multiscreen display icon on the menu screen thereby causing an infrared ray corresponding to the on-multiscreen display command to be emitted from the remote commander 15 and received by the IR receiver 135 and finally transferred to the CPU 129, the process proceeds to step S203. In step S203, the video data conversion process by the signal processor 137 is terminated, and thus the on-multiscreen displaying process in the master device 1 is terminated. Thereafter, the program video data stored in the frame memory 127 is directly supplied to the CRT 11 via the NTSC encoder 128, and the program video data with a normal image size is displayed on the CRT 11.

The on-multiscreen displaying process performed by the slave devices $2_{ij}$ is similar to the full-image enlarging process performed by the slave devices $2_{ij}$, described above with reference to FIG. 41, and thus a further description is not given herein.

The scalable TV system also as a special capability of performing the same process in all television sets in the scalable TV system. This special capability is achieved by performing a simultaneous control process in the master device 1.

A simultaneous control command can also be issued via the menu screen, as with other commands such as the partial-image enlarge command.

More specifically, if a user operates the menu button switch 54 of the remote commander 15 (FIG. 7) (or the menu button switch 84 of the remote commander 35 (FIG. 8)), a menu screen is displayed on the CRT 11 of the master device 1 (or the CRT 31 of the slave device 2). An icon indicating the simultaneous control command (hereinafter, referred to as a simultaneous control icon) is displayed on the menu screen. If a user clicks on the simultaneous control icon by operating the remote commander 15, the master device 1 starts the simultaneous control process.

Figure 44:
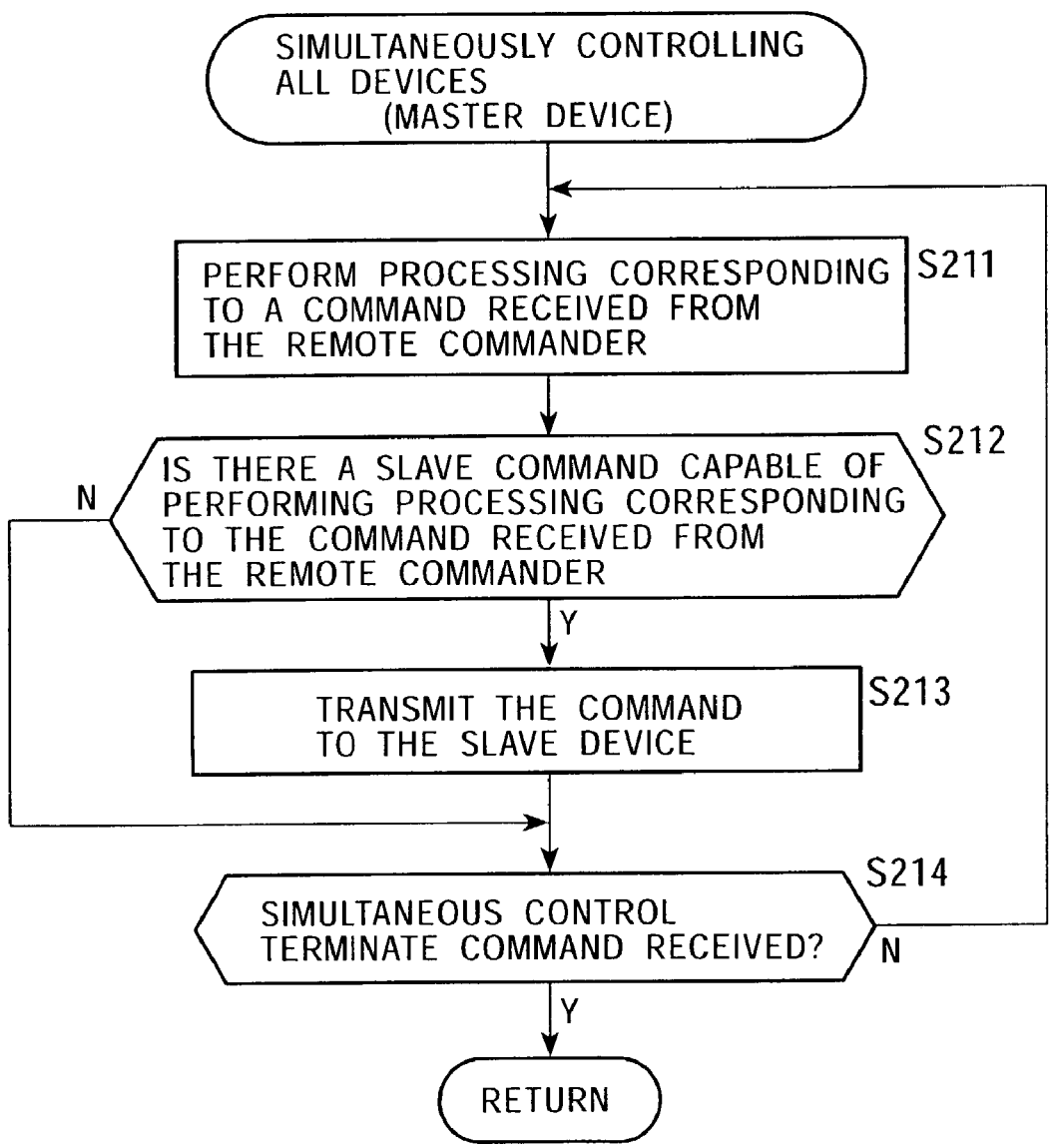
FIG. 44 is a flow chart showing a simultaneous control process performed by the master device.

Referring to a flow chart shown in FIG. 44, the simultaneous control process performed by the master device 1 is described below.

In the simultaneous control process, if a command is issued by operating the remote commander 15 (or the remote commander 25), an infrared ray carrying the command is emitted from the remote commander 15. The IR receiver 135 receives the infrared ray from the remote commander 15, and the command is transferred to the CPU 129 of the master device 1 (FIG. 10). Thus, in step S211, the CPU 129 performs a process specified by the received command. The process then proceeds to step S212.

In step S212, the CPU 129 determines whether the scalable TV system includes a slave device $2_{ij}$ capable of performing the process corresponding to the command which was issued by the remote commander 15 and which was received in step S211 (hereinafter, such a command will be referred to as a remote control command).

The determination in step S212 is performed by the CPU 129 on the basis of the capability information of the respective slave devices $2_{ij}$ stored in the EEPROM 130.

If it is determined in step S212 that there is a slave device $2_{ij}$ capable of performing the process corresponding to the remote control command, the process proceeds to step S213. In step S213, the CPU 129 transmits, via the IEEE1394 interface 133, the remote control command to all slave devices $2_{ij}$ capable of performing the process corresponding to the remote control command.

In a case in which all slave devices $2_{ij}$ in the scalable TV system are capable of performing the process corresponding to the remote control command, the remote control command is transmitted to all slave devices $2_{ij}$, and the respective slave devices $2_{ij}$ perform the process corresponding to the remote control command, that is, the same process as that performed by the master device 1 in step S211.

On the other hand, if it is determined in step S212 that there is no slave devices $2_{ij}$ capable of performing the process corresponding to the remote control command, the process jumps to step S214 without performing step S213. In step S214, the CPU 129 determines whether a command for terminating a simultaneous control process (a simultaneous control terminate command) has been received.

If it is determined in step S212 that the simultaneous control terminate command has not been received, the process waits for receiving a command of a particular process (remote control command) issued by the remote commander 15. If a remote control command is received, the process returns to step S211 to repeat the process described above.

On the other hand, if it is determined in step S212 that the simultaneous control terminate command has been received, that is, if a user operates the remote commander 15 (FIG. 7) so as to display a menu screen on the CRT 11 and re-click on the simultaneous control icon on the menu screen thereby causing an infrared ray corresponding to the simultaneous control command to be emitted from the remote commander 15 and received by the IR receiver 135 and finally transferred to the CPU 129, the simultaneous control process is terminated.

Figure 45A:
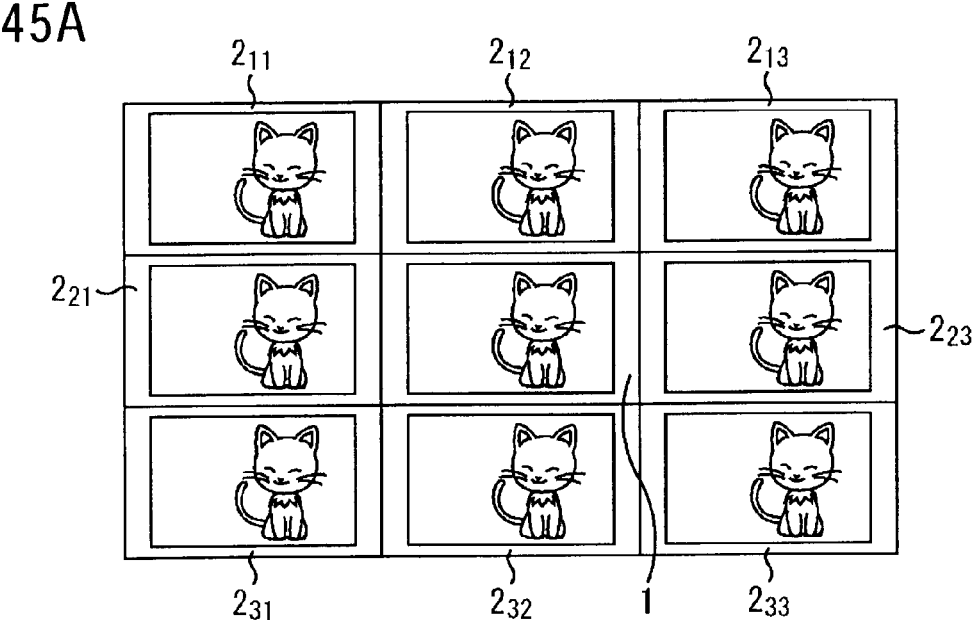
FIGS. 45A and 45B are diagrams showing examples of images displayed in the scalable TV system by means of the simultaneous control process.
Figure 45B:
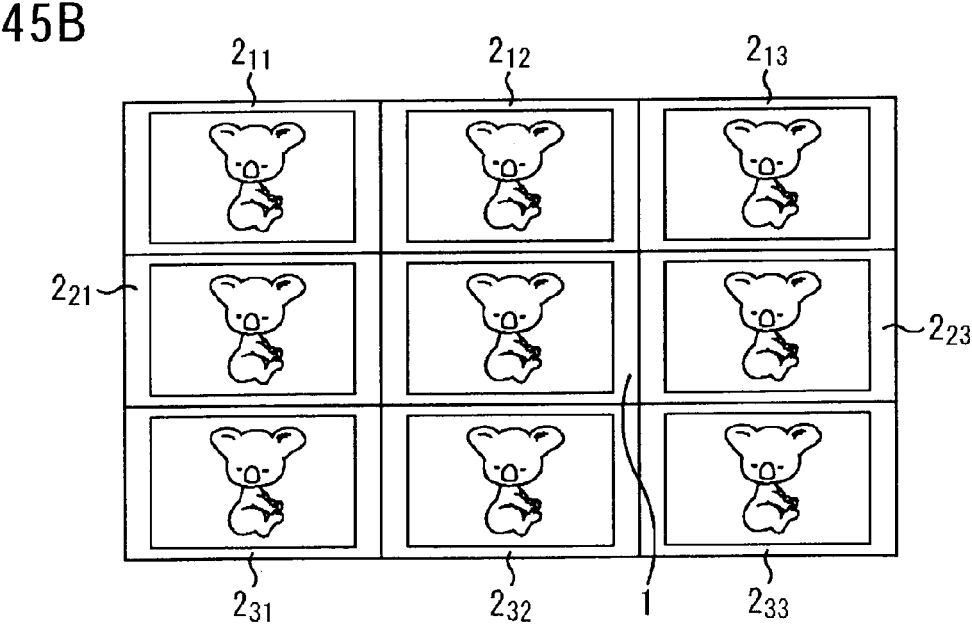

In the simultaneous control process, when all slave devices $2_{ij}$ in the scalable TV system are capable of performing a remote control command, if, for example, a command to select a particular channel is issued as a remote control command by operating the remote commander 15, video data of the specified channel is displayed on all television sets including the master device 1 and the slave devices 2 in the scalable TV system, as shown in FIG. 45A. If a user further operates the remote commander 15 to issue a remote control command to select another channel, the channel is switched in the master device 1 and all slave devices 2 in the scalable TV system, as shown in FIG. 45B.

Thus, the user can control simultaneously all television sets in the scalable TV system in the same way using a single remote commander 15.

As described earlier, the remote commander 15 may be assigned to the master device 1 and the remote commander 35 may be assigned to a slave device $2_{ij}$. The master device 1 can be controlled by both the remote controller 15 of the master device 1 and the remote commander 35 of the slave device $2_{ij}$, and the slave device $2_{ij}$ can be controlled by both the remote controller 35 of the slave device $2_{ij}$ and the remote commander 15 of the master device 1. Therefore, it is possible to control all television sets in the scalable TV system by using only a single remote commander 15 or 35.

One technique of controlling all television sets using only one remote commander 15 is to set device IDs of respective television sets in the remote commander 15 and specify a television set to be controlled by inputting a corresponding device ID before inputting a command. However, in this technique, a user has to do a troublesome job to identify a television set to be controlled.

An arbitrary television set can be controlled if the remote commander 15 assigned to the master device 1 is used to control the master device 1 and the remote commander 35 assigned to the slave device $2_{ij}$ is used to control the slave device $2_{ij}$.

However, in this technique, as many remote commanders as 9 are needed to control the television sets in the scalable TV system shown in FIG. 1A. Besides, it is not easy to recognize which remote commander can be used to control which television set.

The above problems can be solved if an arbitrary desired television set serving as a master device 1 or slave devices $2_{ij}$ in the scalable TV system can be controlled using an arbitrary one of remote commanders 15 or 35 without having to perform a special operation to identify a television set be controlled.

To meet the above requirement, the scalable TV system has a special capability of automatically recognizing which television set a user wants to control and controlling that television set in response to a command issued by the remote commander 15 (or the remote commander 35). This special capability is realized by an individual device control process performed by the master device 1 and slave devices 2.

A command to perform an individual device control can be issued via the menu screen.

More specifically, if a user operates the menu button switch 54 of the remote commander 15 (FIG. 7) (or the menu button switch 84 of the remote commander 35 (FIG. 8)), a menu screen is displayed on the CRT 11 of the master device 1 (or the CRT 31 of the slave device 2). An icon indicating the individual device control command (hereinafter, referred to as an individual device control icon) is displayed on the menu screen. If a user clicks on the individual device control icon by operating the remote commander 15, the individual device control process is started in the master device 1 and the slave devices 2.

First, the individual device control process performed by the master device 1 is descried below with reference to a flow chart shown in FIG. 46.

In the individual device control process performed by the master device 1 (FIG. 10), if the IR receiver 135 receives an infrared ray emitted from the remote commander 15 (or the remote commander 35), the CPU 129 detects, in step S221, the intensity of the infrared ray received by the IR receiver 135. That is, if a user operates the remote commander 15 to control a desired one of television sets in the scalable TV system, the remote commander 15 emits an infrared ray corresponding to the operation performed by the user. The infrared ray is received by the IR receiver 135 of the master device 1 and the IR receivers 155 of the respective slave devices $2_{ij}$ (FIG. 11). In step S221, the CPU 129 requests the IR receiver 135 to detect the intensity of the received infrared ray. In response, the IR receiver 135 returns data indicating the detected intensity to the CPU 129.

The process then proceeds to step S222. In step S222, the CPU 129 requests, via the IEEE1394 interface 133, the respective slave devices $2_{ij}$ to return data indicating the detected intensity of the infrared ray emitted from the remote commander 15. In response to the request, the respective slave devices $2_{ij}$ returns data indicating the detected intensity of the infrared ray, and the CPU 129 acquires (receives) the data via the IEEE1394 interface 133.

The infrared ray emitted from the remote commander 15 in response to the operation performed on the remote commander 15 by the user is received not only the master device 1 but also by the respective slave devices $2_{ij}$, as described above, and thus, in the present step S222, the CPU 129 acquires the infrared ray intensity detected by each slave devices $2_{ij}$.

The process then proceeds to step S223. In step S223, the CPU 129 detects a greatest infrared ray intensity among values of intensity including the intensity, detected in step S221, of the infrared ray received by the master device 1, the intensities, acquired in step S222, of the infrared ray received by the respective slave devices $2_{ij}$. The process then proceeds to step S224.

In step S224, the CPU 129 determines whether the greatest intensity is detected by the master device 1 or a slave device 2 (hereinafter, a television set which has received an infrared ray with a greatest intensity will be referred to as a greatest-intensity device).

In the case in which it is determined in step S224 that the greatest-intensity device is the master device 1, the process proceeds to step S225. In step S225, the CPU 129 determines that the command indicated by the infrared ray received by the IR receiver 135 has been issued to the master device 1, and the CPU 129 performs a process corresponding to the command.

On the other hand, if it is determined in step S224 that the greatest-intensity device is a slave device 2, the process proceeds to step S226. In step S226, the CPU 129 determines that the command indicated by the infrared ray received by the IR receiver 135 was issued in order to control the slave device $2_{ij}$ which detected the greatest intensity, and the CPU 129 transfers the command to the slave device $2_{ij}$ which detected the greatest intensity, via the IEEE1394 interface 133.

In response, the slave device $2_{ij}$ which detected the greatest intensity performs a process corresponding to the command indicated by the infrared ray emitted from the remote commander 15, as will be described later with reference to FIG. 47.

When a user wants to control a particular one of television sets in the scalable TV system by operating the remote commander 15 (or the remote commander 35), the user generally points the remote commander 15 toward the television set to be controlled.

In this case, if the directivity of the infrared ray emitted from the remote commander 15 (or the remote commander 35) is sharp enough, a television set aimed at by the principal axis of the infrared ray emitted from the remote commander 15 that is, a television set which detects the greatest infrared intensity, is a television set the user wants to control.

Therefore, if the greatest-intensity device performs a process in accordance with the command indicated by the infrared ray emitted from the remote commander 15, the operation intended by the user is performed by the television set intended by the user is correctly performed.

More specifically, for example, if a user issues a channel selection command or a sound volume control command by operating the remote commander 15 aimed at the master device 1, the master device 1 detects the greatest infrared ray intensity, and thus the channel selection control or sound volume control is performed for the master device 1. On the other hand, if a user issues a channel selection command or a sound volume control command by operating the remote commander 15 aimed at a slave device $2_{ij}$, the slave device $2_{ij}$ detects the greatest infrared ray intensity, and thus the channel selection control or sound volume control is performed for the slave device $2_{ij}$.

After completion of step S225 or S226, the process proceeds to step S227. In step S227, the CPU 129 determines whether a command to terminate the individual device control process (hereinafter, referred to as an individual device control terminate command).

On the other hand, if it is determined in step S227 that the individual device control terminate command has not been received, the process returns to step S221 after an infrared ray emitted from the remote commander 15 is next received by the IR receiver 135, to repeat the process described above.

On the other hand, if it is determined in step S227 that the individual device control terminate command has been received, that is, if a user operates the remote commander 15 (FIG. 7) so as to display a menu screen on the CRT 11 and re-click on the individual device control icon on the menu screen thereby causing an infrared ray corresponding to the individual device control command to be emitted from the remote commander 15 and received by the IR receiver 135 and finally transferred to the CPU 129, the process proceeds to step S228. In step S228, the CPU 129 transmits the individual device control terminate command to the respective slave devices $2_{ij}$ via the IEEE1394 interface 133 and terminates the individual device control process in the master device 1.

Figure 47:
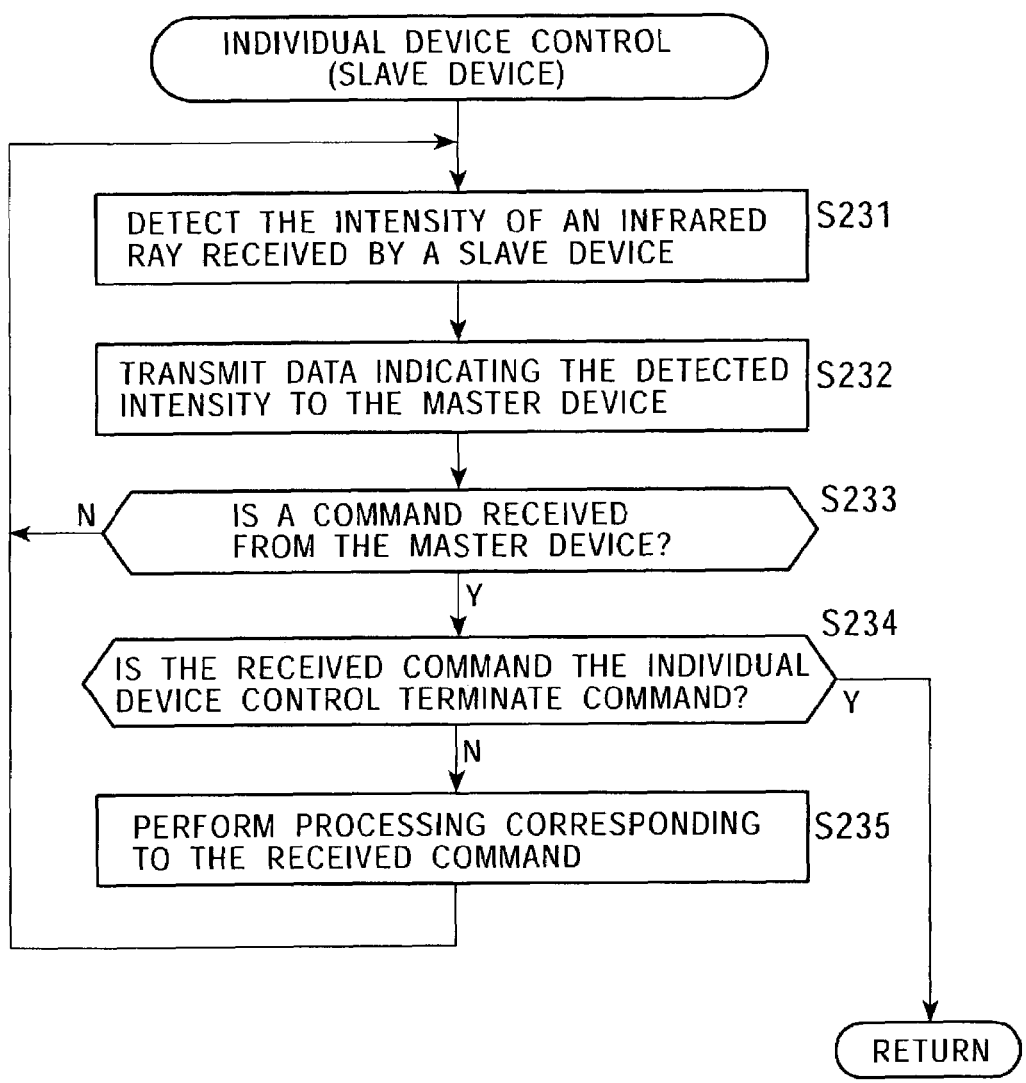
FIG. 47 is a flow chart showing an individual device control process performed by the slave device.

Now referring to a flow chart shown in FIG. 47, the individual device control process performed by a slave device is described.

In the individual device control process performed by the slave device 2 (FIG. 11), if the IR receiver 155 receives an infrared ray emitted from the remote commander 15 (or the remote commander 35), the CPU 149 detects, in step S231, the intensity of the infrared ray received by the IR receiver 155. That is, if a user operates the remote commander 15 to control a desired one of television sets in the scalable TV system, the remote commander 15 emits an infrared ray corresponding to the operation performed by the user. The infrared ray is received by the IR receiver 155 of the slave device 2, as described above. In step S23.1 described above, the CPU 149 requests the IR receiver 155 to detect the intensity of the received infrared ray. The detected intensity of the infrared ray is returned to the CPU 149.

The process then proceeds to step S232. In step S232, in response to receiving a request for the intensity of the infrared ray from the master device 1, the CPU 149 transmits data indicating the infrared ray intensity detected in step S231, via the IEEE1394 interface 153. The intensity of the infrared ray transmitted in this step S232 is acquired (received) in step S222 in the above-described process (FIG. 46) performed by the master device 1.

The process then proceeds to step S232. In step S233, the CPU 149 determines whether a command has been received from the master device 1. As described earlier, in step S226 or S228 shown in FIG. 46, a command is transmitted from the master device 1 to the slave device 2, and thus, in the present step S233, the CPU 149 determines whether such a command from the master device 1 has been received.

If it is determined in step S233 that a command has not been received from the master device 1, the process returns to step S233.

On the other hand, if it is determined in step S233 that a command has been received from the master device 1, that is, if the command transmitted from the master device 1 has been received by the IEEE1394 interface 153 and transferred to the CPU 149, the process proceeds to step S234. In step S234, the CPU 149 determined whether the received command is the individual device control terminate command.

If it is determined in step S234 that the command received from the master device 1 is not the individual device control terminate command, the process proceeds to step S235. In step S235, the CPU 149 performs a process corresponding to the command received from the master device 1. Thereafter, the process returns to step S233.

Thus, as described above with reference to FIG. 46, if a user operates the remote commander 15 aimed to a particular slave device 2, that slave device 2 performs a process (such as a channel selection or a volume control) corresponding to the operation of the remote commander 15 performed by the user.

On the other hand, if it is determined in step S234 that the command received from the master device 1 is the individual device control terminate command, the slave device 2 terminates the individual device control process.

If the directivity of the infrared ray emitted from the remote commander 15 (or the remote commander 35) used herein is sharp enough, the scalable TV system can detect which one of television sets receives the highest intensity of an infrared ray emitted from the remote commander 15 thereby determining (detecting) which one of television sets a user wants to control. This makes it possible for the user to control any desirable one of television sets serving as the master device 1 or slave devices $2_{ij}$ in the scalable TV system using the remote commander 15 of the master device 1 or an arbitrary one of remote commanders 35 of the slave devices $2_{ij}$ without necessitating the user to perform an additional operation to specify a television set the user wants to control.

The individual device control process makes it possible for a plurality of users to view different programs. For example, a user may view a certain desired program PGMA on a slave device $2_{ij}$ by selecting a channel using a remote commander 15, while another user may view another program PGMB on another slave device $2_{pq}$ by selecting a channel using a remote commander 35.

In this case, video data of different programs are displayed on the CRTs 31 of the slave devices $2_{ij}$ and $2_{pq}$ (FIG. 11). Even in a case in which the slave devices $2_{ij}$ and $2_{pq}$ are located adjacent to each other, displaying different video data on the slave devices $2_{ij}$ and $2_{pq}$ does not cause a significant problem.

When video data of a program PGMA is displayed on the slave device $2_{ij}$ and video data of a program PGMB is displayed on the slave device $2_{pq}$, both images are within the fields of vision of users A and B.

However, when the user A is viewing the video data of the program PGMA displayed on the slave device $2_{ij}$, the video data of the program PGMB displayed on the slave device $2_{pq}$ is masked. Similarly, for the user B viewing the video data of the program PGMB displayed on the slave device $2_{pq}$, the video data of the program PGMA displayed on the slave device $2_{ij}$ is masked.

Thus, for the user A viewing the video data of the program PGMA displayed on the slave device $2_{ij}$, the video data of the program PGMB displayed on the different slave device $2_{pq}$ does not result in significant disturbance. Similarly, for the user B viewing the video data of the program PGMB displayed on the slave device $2_{pq}$, the video data of the program PGMA displayed on the different slave device $2_{ij}$ does not result in significant disturbance.

However, the problem is in that different audio data associated with difference video data are output. That is, audio data of the program PGMA is output from speaker units 32L and 32R of the slave device $2_{ij}$, while different audio data of the program PGMB is output from speaker units 32L and 32R of the slave device $2_{pq}$.

Although human ears have the capability of listening only to a particular sound/voice when different sounds/voices are generated simultaneously, as known as the cocktail party effect, a sound/voice other than a desired sound/voice serves as noise which results in disturbance in listening to the desired sound/voice. In a case in which the power of a desired sound/voice is too low, it is masked by another sound/voice having higher power, and a user cannot hear the desired sound/voice.

To avoid the above problem, the scalable TV system has a special capability. That is, when different users are watching different television sets, such as a master device 1 and a slave device 2, the principal axis of directivity of speaker units 12L and 12R of the master device 1 (speakers thereof) is directed to a user watching the master device 1 so that the user can easily listen to a sound/voice output from the speaker units 12L and 12R, while the principal axis of directivity of speaker units 32L and 32R of the slave device 2 is directed to a user watching the slave device 2.

The speaker units 12L and 12R of the master device 1 (FIG. 10) are designed to have very sharp directivity, and the principal axis of directivity can be changed to a desired direction by mechanically changing the orientation of the speaker units 12L and 12R using the unit driver 138. Similarly, the speaker units 32L and 32R of the slave device 2 are also designed to have very sharp directivity, and the principal axis of directivity can be changed to a desired direction by mechanically changing the orientation of the speaker units 32L and 32R using the unit driver 158.

The speaker control can be performed only when the scalable TV system is operating in the individual device control mode described earlier with reference to FIGS. 46 and 47. That is, the speaker control process and the individual device control process are performed in parallel.

The speaker control process performed by the master device is described below with reference to a flow chart shown in FIG. 48.

In the speaker control process performed by the master device, if the IR receiver 135 receives an infrared ray emitted from the remote commander 15 (or the remote commander 35), the CPU 129 detects, in step S241, the intensity of the infrared ray received by the IR receiver 135. That is, if a user operates the remote commander 15 to control a desired one of television sets in the scalable TV system, the remote commander 15 emits an infrared ray corresponding to the operation performed by the user. The infrared ray is received by the IR receiver 135 of the master device 1 and the IR receivers 155 of the respective slave devices $2_{ij}$ (FIG. 11). In step S241, the CPU 129 requests the IR receiver 135 to detect the intensity of the received infrared ray. The detected intensity of the infrared ray is returned to the CPU 129.

The process then proceeds to step S242. In step S242, the CPU 129 requests, via the IEEE1394 interface 133, the respective slave devices $2_{ij}$ to return data indicating the detected intensity of the infrared ray emitted from the remote commander 15. In response to the request, the respective slave devices $2_{ij}$ returns data indicating the detected intensity of the infrared ray, and the CPU 129 acquires (receives) the data via the IEEE1394 interface 133.

The infrared ray emitted from the remote commander 15 in response to the operation performed on the remote commander 15 by the user is received not only the master device 1 but also by the respective slave devices $2_{ij}$, as described above, and thus, in the present step S242, the CPU 129 acquires the infrared ray intensity detected by each slave devices $2_{ij}$.

Figure 46:
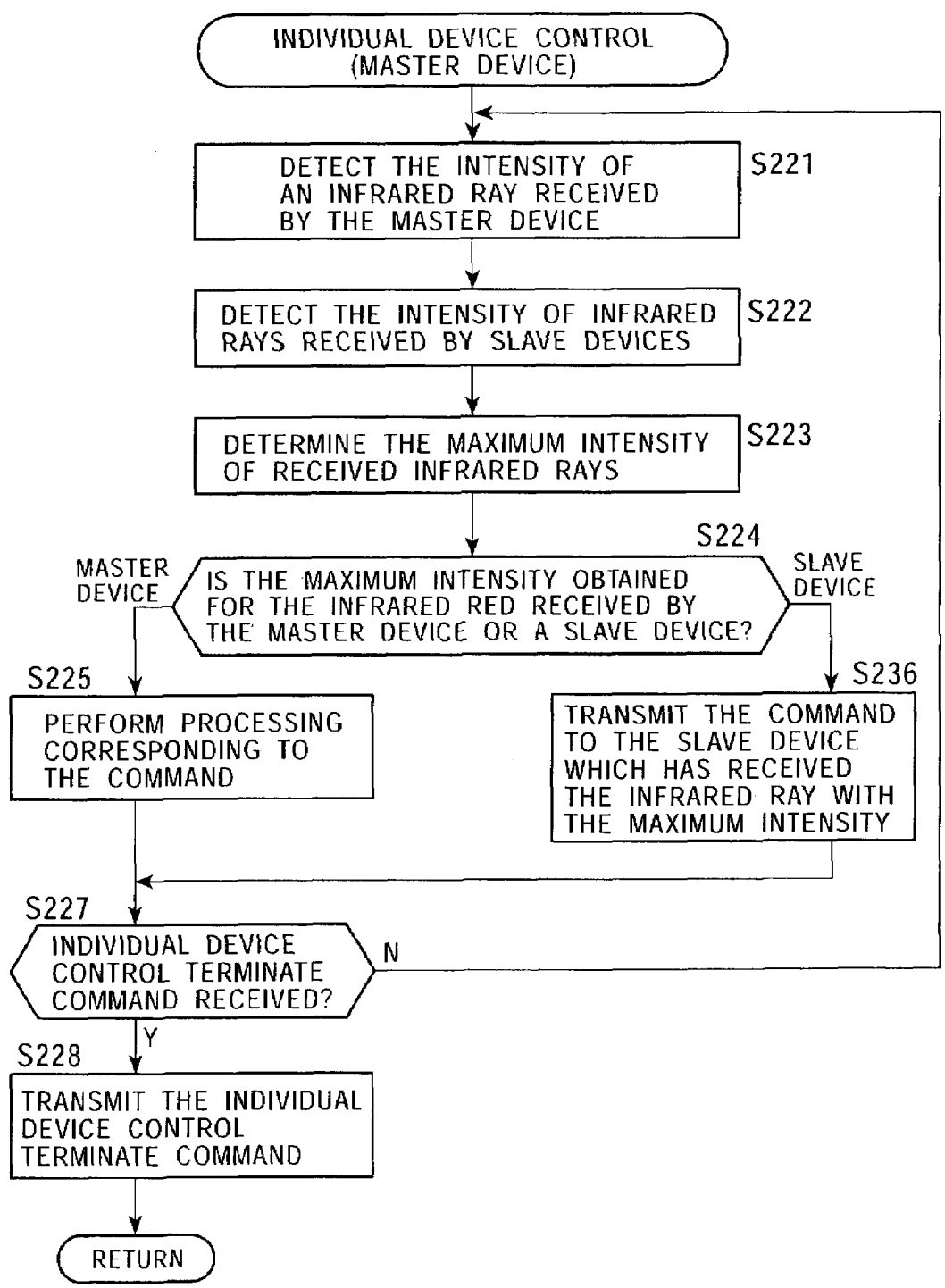
FIG. 46 is a flow chart showing an individual device control process performed by the master device.

Steps S241 and S242 in the speaker control process of the master device 1 are performed in a similar manner to steps S221 and S222, respectively, in the individual control process performed by the master device 1 shown in FIG. 46. Therefore, in the speaker control process of the master device 1, steps S241 and S242 may not be performed, and the infrared ray intensity detected in steps S221 and S222 in the individual device control process of the master device 1 may be employed.

The process then proceeds to step S243. In step S243, the CPU 129 select arbitrary three intensities from those including the intensity of the infrared ray detected in step S241 by the master device 1 and intensities detected in step S242 by the respective slave devices $2_{ij}$. For example, the CPU 129 selects first to third greatest intensities. The process then proceeds to step S244.

In step S244, the CPU 129 calculates the distance corresponding to each of the three intensities (first to third greatest intensities) selected step S243. The process then proceeds to step S245.

When the infrared ray emitted from the remote commander 15 is received by a certain television set, the intensity of the received infrared ray depends on the distance between the remote commander 15 and that television set (more precisely, the IR receiver 135 or 155 of the television set).

Figure 49:
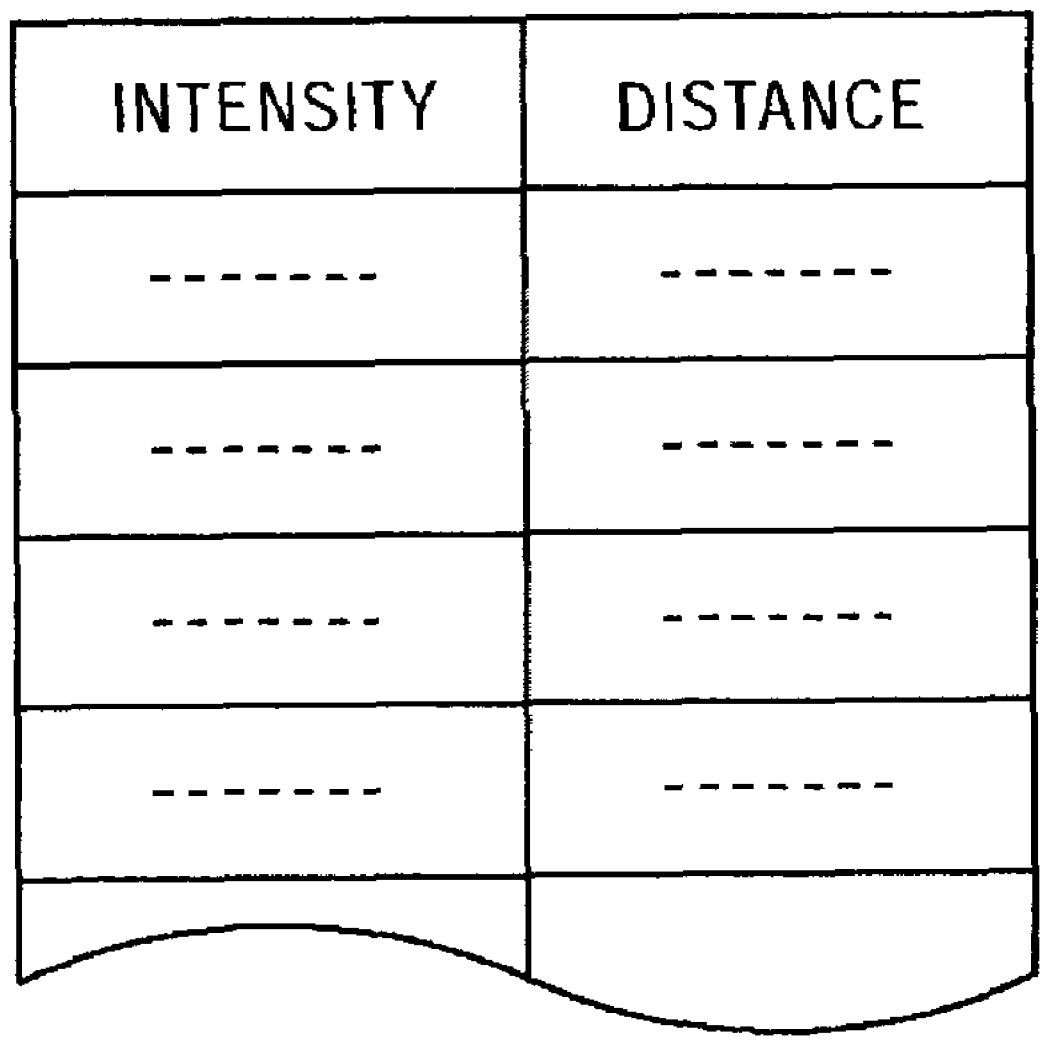
FIG. 49 shows an intensity-distance table.

The EEPROM 150 of the master device 1 (FIG. 10) stores an intensity-distance table, such as that shown in FIG. 49, indicating the correspondence between the intensity of the infrared ray transmitted from the remote commander 15 and received by a television set and the distance between the remote commander 15 and the television set. In step S244, the CPU 129 determines the distance corresponding to each of three intensities (first to third greatest intensities) by referring to the intensity-distance table.

The intensity-distance table can be produced by measuring the intensity of the infrared ray emitted from the remote commander 15 and received by a television set for various distances between the remote commander 15 and the television set.

Referring again to FIG. 48, in step S245, the CPU 129 determines the location of the remote commander 15 on the basis of the distances corresponding to the first to third greatest intensities of the infrared ray.

Figure 50:
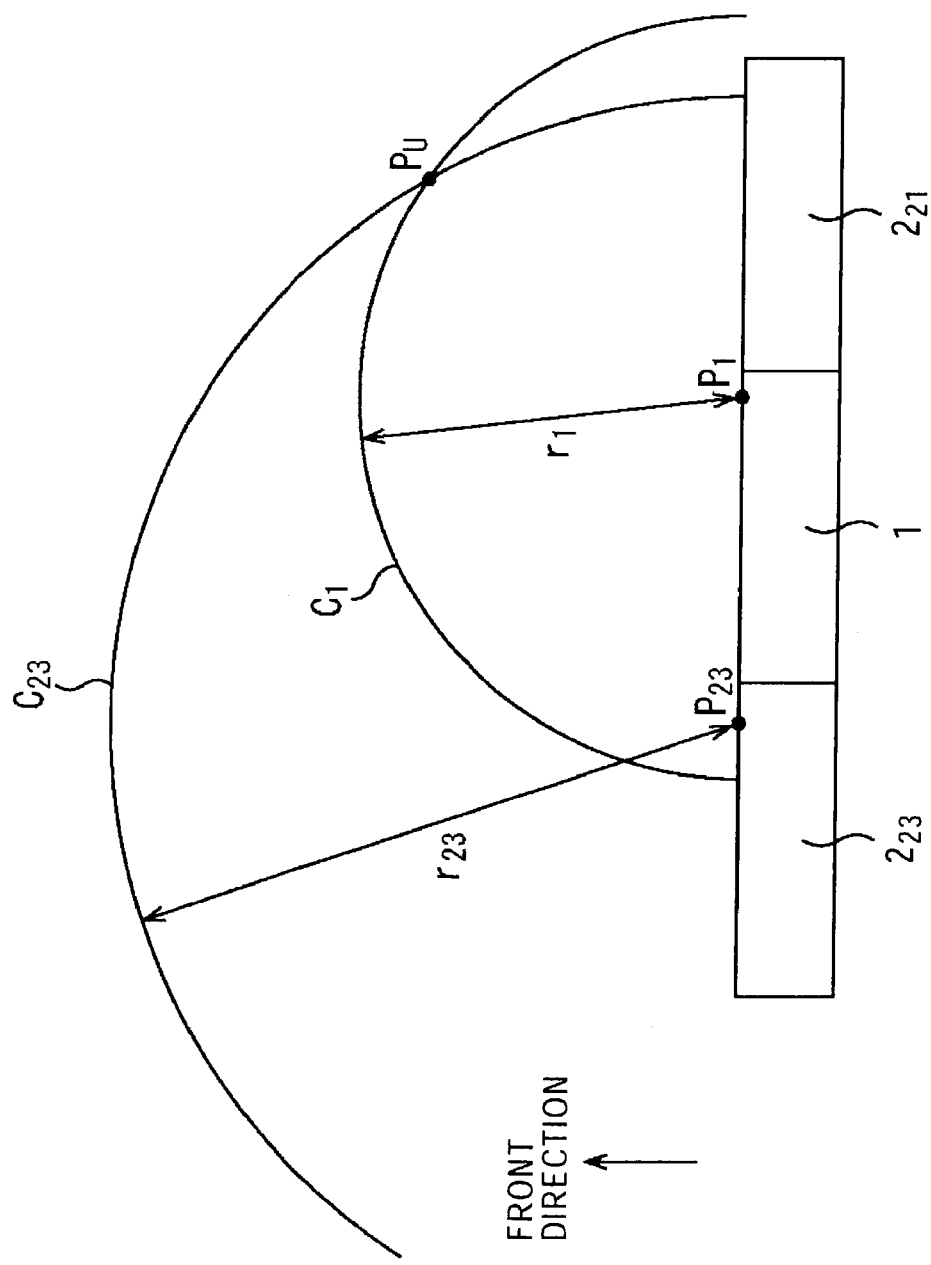
FIG. 50 is a diagram showing a method of calculating the distance to a remote commander.

Referring to FIG. 50, a method of determining the location of the remote commander 15 on the basis of the distances corresponding to the first to third greatest intensities of the infrared ray is described below. In the following description, for simplicity, it is assumed that the location is determined on the basis of the first and second greatest intensities.

Herein, let us assume that the master device 1 has detected the greatest intensity and a slave device $2_{23}$ located on the right side (as viewed from the front side of the scalable TV system) of the master device 1 has detected the next greatest intensity. Let $r_1$ denote the distance corresponding to the intensity detected by the master device 1 and let $r_{23}$ denote the distance corresponding to the intensity detected by the slave device $2_{23}$.

In a two-dimensional plane, as shown in FIG. 50, the remote commander 15 must locate on the perimeter of a circle $c_1$ whose radius is equal to $r_1$ and whose center is located at point $P_1$ at which the IR receiver 135 of the master device 1 detects the infrared ray, and the remote commander 15 must locate on the perimeter of a circle $c_{23}$ whose radius is equal to $r_{23}$ and whose center is located at a point $P_{23}$ at which the IR receiver 155 of the slave device $2_{23}$ detects the infrared ray.

As a result, the remote commander 15 must locate at the intersection $P_U$ of the perimeters of circles $c_1$ and $c_{23}$. Thus, the location of the remote commander 15 can be given by point $P_U$.

In the present example, the location of the remote commander 15 in the two-dimensional plane is determined from the two values of intensity. Similarly, the location, in a three-dimensional space, of the remote commander 15 can be determined from the intersection of the surfaces of three spheres with radii corresponding to three values of intensity.

Referring again to FIG. 48, after completion of detecting the location of the remote commander 15 in step S245, the process proceeds to step S246. In step S246, the CPU 129 detects the greatest intensity from the values of intensity including the intensity detected by the master device 1 in step S241 and intensities of the infrared ray detected by slave devices $2_{ij}$ and acquired in step S242. The detection of the greatest intensity of the infrared ray in step S246 may not be performed, and the result of detection of the greatest intensity in step S223 in FIG. 46 may be employed.

In step S246, the CPU 129 further determines whether the greatest intensity is detected by the master device 1 or a slave device 2 (that is, the CPU 129 detects a television set which has detected the greatest intensity).

If it is determined in step S246 that the greatest intensity was detected by the master device 1, the process proceeds to step S247. In step S247, the CPU 129 controls the unit driver 138 so as to adjust the positions of the speaker units 12L and 12R of the master device 1 so that the principal axis of the directivity is directed to the location of the remote commander 15 (the location of the user) detected in step S245. Thereafter, the process returns to step S241.

In step S247, described above, the unit driver 138 rotates, under the control of the CPU 129, the speaker units 12L and 12R in a panning or tilting direction so that the principal axis of directivity is directed to the location of the user.

On the other hand, if it is determined in step S246 that the greatest intensity was detected by a slave device 2, the process proceeds to step S248. In step S248, the CPU 129 transmits, via the IEEE1394 interface 133, a speaker control command to the slave device $2_{ij}$ to adjust the direction of the directivity of the speaker units 32L and 32R so that the principal axis of directivity is directed toward the location of a user. The process then returns to step S241.

In response, in this specific case, the slave device $2_{ij}$, which detected the greatest infrared ray intensity, rotates the speaker units 32L and 32R in the panning direction or in the tilting direction so that the principal axis of directivity of the speaker units 32L and 32R is directed toward the location of the user, as will be described later with reference to FIG. 51.

As described above, when a user wants to control a particular one of television sets in the scalable TV system by operating the remote commander 15 (or the remote commander 35), the user generally points the remote commander 15 toward the television set to be controlled.

In this case, if the directivity of the infrared ray emitted from the remote commander 15 (or the remote commander 35) is sharp enough, a television set aimed at by the principal axis of the infrared ray emitted from the remote commander 15 that is, a television set which detects the greatest infrared intensity, is a television set the user wants to control.

That is, a television set which detects the greatest infrared ray intensity can be regarded as a television set outputting video data and audio data of a program being watched and listened to by the user who operated the remote commander 15. Thus, the orientations of the speaker units 12L and 12R of the master device 1 or the speaker units 32L and 32R of a slave device 2, determined to be the greatest-intensity device, are adjusted so that the principal axis of directivity of speaker units is directed toward the user who operated the remote commander 15 thereby making it possible for the user to listen to the audio data more clearly.

The speaker control process performed by a slave device 2 is described below with reference to a flow chart shown in FIG. 51.

In the speaker control process performed the slave device 2 (FIG. 11), if the IR receiver 155 receives an infrared ray emitted from the remote commander 15 (or the remote commander 35), the CPU 149 detects, in step S251, the intensity of the infrared ray received by the IR receiver 155. That is, if a user operates the remote commander 15 to control a desired one of television sets in the scalable TV system, the remote commander 15 emits an infrared ray corresponding to the operation performed by the user. The infrared ray is received by the IR receiver 155 of the slave device 2, as described above. In step S251, the CPU 129 requests the IR receiver 155 to detect the intensity of the received infrared ray. In response, the IR receiver 155 returns data indicating the detected intensity to the CPU 129.

The process then proceeds to step S252. In step S252, in response to receiving a request for the intensity of the infrared ray from the master device 1, the CPU 149 transmits data indicating the infrared ray intensity detected in step S251, via the IEEE1394 interface 153. The data indicating the infrared ray intensity transmitted in this step S252 is acquired (received) in step S242 in FIG. 48, described earlier.

Steps S251 and S252 in the speaker control process of the slave device 2 are performed in a similar manner to steps S231 and S232, respectively, in the individual control process performed by the slave device 2 shown in FIG. 47. Therefore, in the speaker control process of the slave device 2, steps S251 and S252 may not be performed, and the infrared ray intensity detected in steps S231 and S232 in the individual device control process of the slave device 2 may be employed.

The process then proceeds to step S253. In step S253, the CPU 149 determines whether the speaker control command has been received from the master device 1. As described earlier, in step S248 shown in FIG. 48, the speaker control command is transmitted from the master device 1 to the slave device 2, and, in the present step S253, the CPU 149 determines whether the speaker control command transmitted from the master device 1 has been received.

If it is determined in step S253 that the speaker control command from the master device 1 has not been received, the process returns to step S251.

On the other hand, if it is determined in step S253 that a speaker control command has been received from the master device 1, that is, if the speaker control command transmitted from the master device 1 has been received by the IEEE1394 interface 153 and transferred to the CPU 149, the process proceeds to step S254. In step S254, in accordance with the speaker control command, the CPU 149 controls the unit driver 158 so as to adjust the positions of the speaker units 32L and 32R of the slave device 2 so that the principal axis of the directivity is directed to the location of the remote commander 15 (the location of the user) detected in step S245 shown in FIG. 48. Thereafter, the process returns to step S251.

In step S254, described above, the unit driver 158 rotates, under the control of the CPU 149, the speaker units 32L and 32R in a panning or tilting direction so that the principal axis of directivity is directed to the location of the user.

Thus, in this specific case, the slave device 2 adjusts the directivity of the speaker units 32L and 32R so that the principal axis of the directivity is directed to the location of the user who has operated the remote commander 15, that is, who is listening to audio data associated and viewing video data of a program being output by the slave device 2 thereby making it possible for the user to listen to the audio data more clearly.

Figure 48:
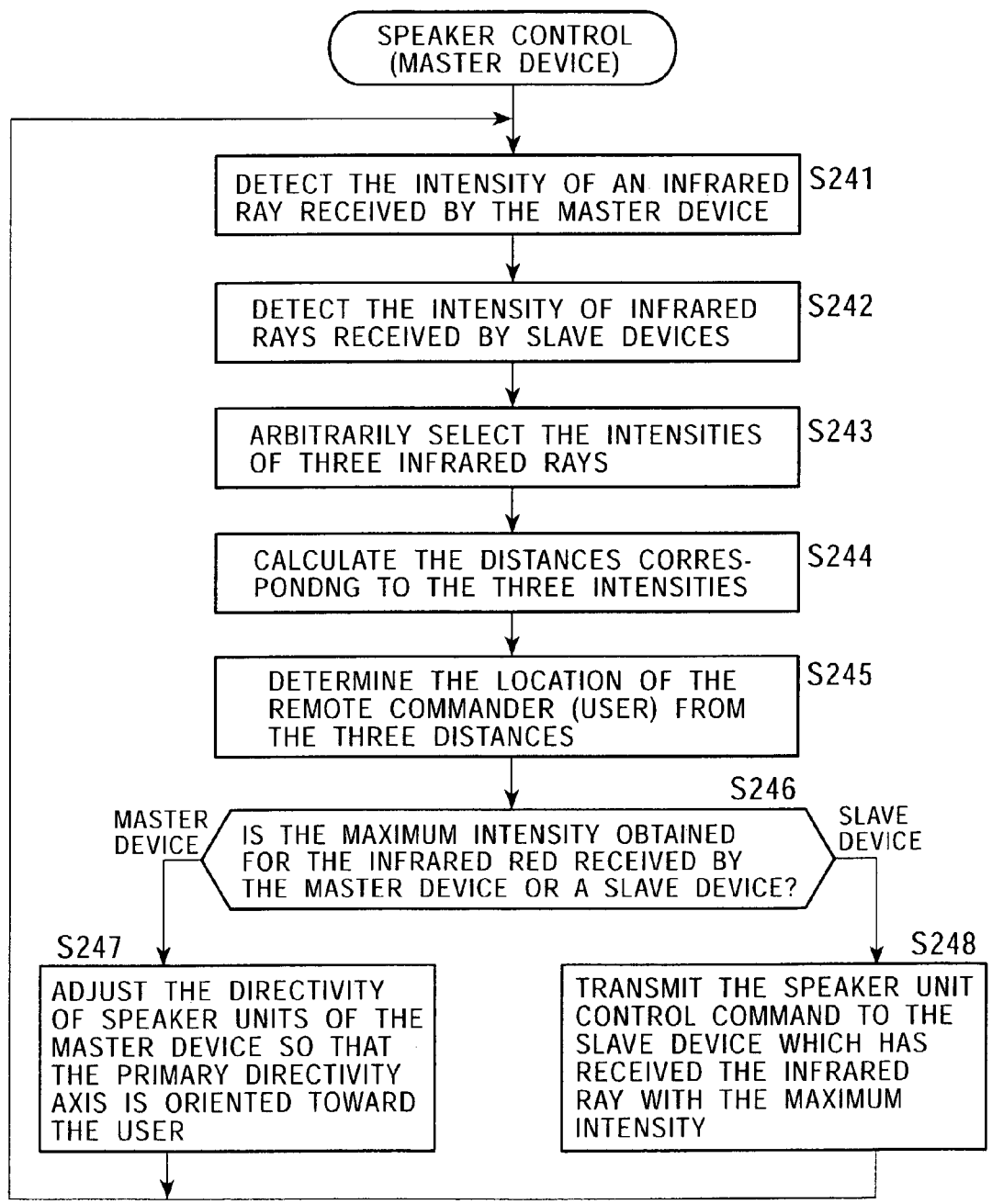
FIG. 48 is a flow chart showing a speaker control process performed by the master device.
Figure 51:
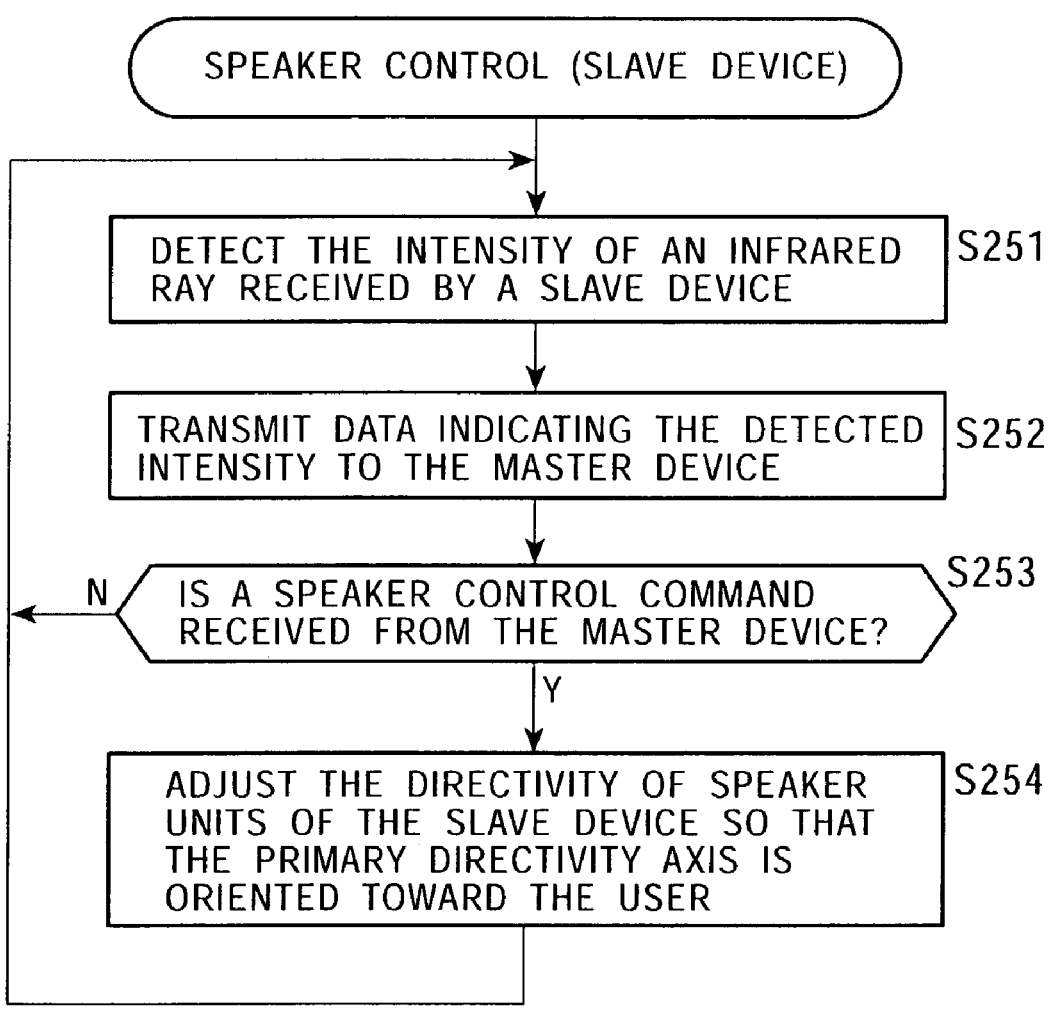
FIG. 51 is a flow chart showing a speaker control process performed by the slave device.

The speaker control process shown in FIG. 48 or 51 is ended when the individual device control process shown in FIG. 46 or 47 is ended.

Although in the embodiment described above, only the direction of the principal axis of the directivity of the speaker units 12L and 12R (or the speaker units 32L and 32R) is controlled depending on the location of a user, the sound volume of the speaker units 12L and 12R may also be controlled. For example, the volume of the sound output from the speaker units 12L and 12R may be increased with the distance between the user and the television set being viewed by the user.

Although in the embodiment described above, the location of the remote commander 15 (the location of a user) is determined on the basis of the intensities, detected by the television sets, of an infrared ray emitted from the remote commander 15, the location of the remote commander 15 may be detected by another method. An example is to use a GPS (Global Positioning System) and another example is to emit an ultrasonic wave from the respective television sets and detect an ultrasonic wave returned from the remote commander 15.

Although in the speaker control process according to the embodiment described above, speaker units 12L and 12R (and speaker units 32L and 32R) having sharp directivity are used, and the speaker units 12L and 12R are rotated in the panning direction or the tilting direction using the unit driver 138 (or the unit driver 158) so that the principal axis of the directivity is directed to a desirable direction (to the location of the user), the principal axis of directivity may also be controlled electronically.

Figure 52:
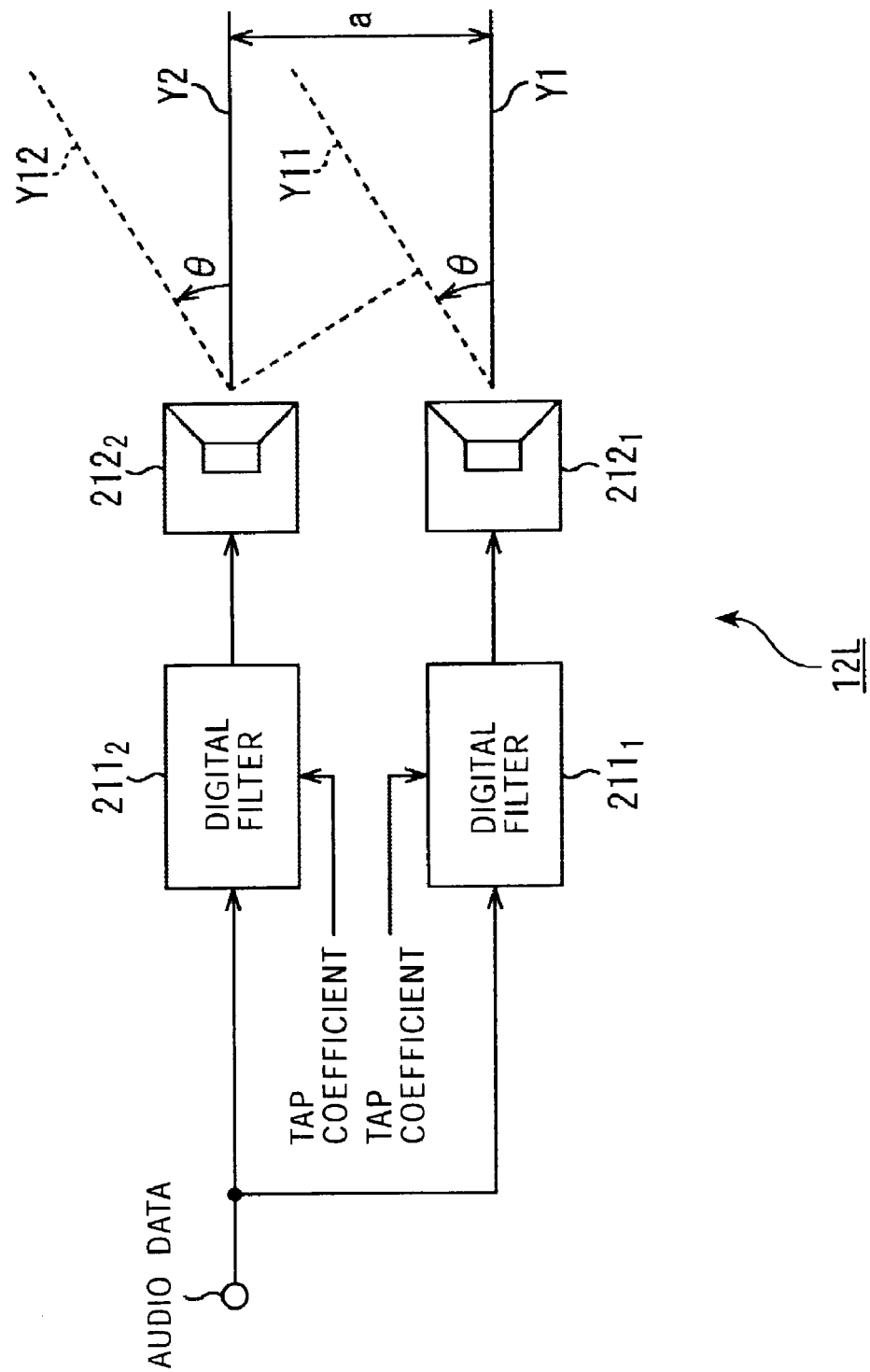
FIG. 52 is a block diagram showing an example of the configuration of a speaker unit.

FIG. 52 shows an example of a manner of electrically controlling the principal axis of directivity of a speaker unit 12L. The directivity of other speaker units 12R, 32L and 32R can also be controlled in a similar manner to the speaker unit 12L, and thus in the following description, only the control of the speaker unit 12L is discussed.

In the example shown in FIG. 52, audio data output from the MPEG audio decoder 126 (FIG. 10) is supplied to digital filters $211_1$ and $211_2$. The tap coefficients of the digital filters $211_1$ and $211_2$ are set by the unit driver 138 (FIG. 10), and the digital filters $211_1$ and $211_2$ filter the same audio data applied to the digital filters $211_1$ and $211_2$ by using the tap coefficients set by the unit driver 138 so as to delay the audio data by particular delay times for each frequency component of the audio data. The resultant delayed audio data output from the respective digital filters $211_1$ and $211_2$ are supplied to the speakers $212_1$ and $212_2$. The speakers $212_1$ and $212_2$ are both of the non-directional type, and they emit sounds in accordance with the audio data output from the digital filters $211_1$ and $211_2$, respectively.

Herein, let Y1 and Y2 be the principal axes of the two speakers $212_1$ and $212_2$, respectively, of the speaker unit 12L. The speakers $212_1$ and $212_2$ are placed so that the principal axes Y1 and Y2 extend in parallel in a two-dimensional plane (the page of the drawing, in this specific example) and so that cones (vibrating plates) of the respective speakers $212_1$ and $212_2$ are located in the same plane perpendicular to the axes Y1 and Y2.

Herein, let a denote the distance between the principal axes Y1 and Y2 (axis-to-axis distance) and let θ denote the angle (radiation angle) as measured in a counterclockwise direction in a two-dimensional plane with respect to the principal axis Y1 or Y2.

If audio data including only a single frequency component, such as a sinusoidal signal, is applied to the speaker unit 12L, the sinusoidal signal is filtered by the digital filters $211_1$ and $211_2$ thereby producing delays D1 and D2. The resultant sinusoidal signals delayed by D1 and D2 are applied to the speakers $212_1$ and $212_2$.

In this case, sound waves output from the respective speakers $212_1$ and $212_2$ interfere with each other. If $D2 \geq D1$, there is a time difference (delay time difference) equal to D2−D1 between the sound waves output from the respective speakers $212_1$ and $212_2$. On the other hand, sound waves propagating in the directions Y11 and Y12 with an angle θ with respect to the principal axes Y1 and Y2 of the respective speakers $212_1$ and $212_2$ experience a difference in propagation path length.

As a result, the phase difference between the two sound waves varies depending on the location (listening point) where a user receives the two sound waves originating from the speakers $212_1$ and $212_2$. The phase difference between the two sound waves can become zero at a certain listening point. In this case, the effective amplitude of the sound wave becomes twice that of the sound wave which would be obtained if the sound wave were output from a signal speaker (either the speaker $212_1$ or $212_2$). However, at a different listening point, the phase difference between the two sound waves can become 180°. In this case, the resultant amplitude becomes zero, and thus no sound is heard. This means that the total volume of sound generated by the speakers $212_1$ and $212_2$ has directivity.

Figure 53:
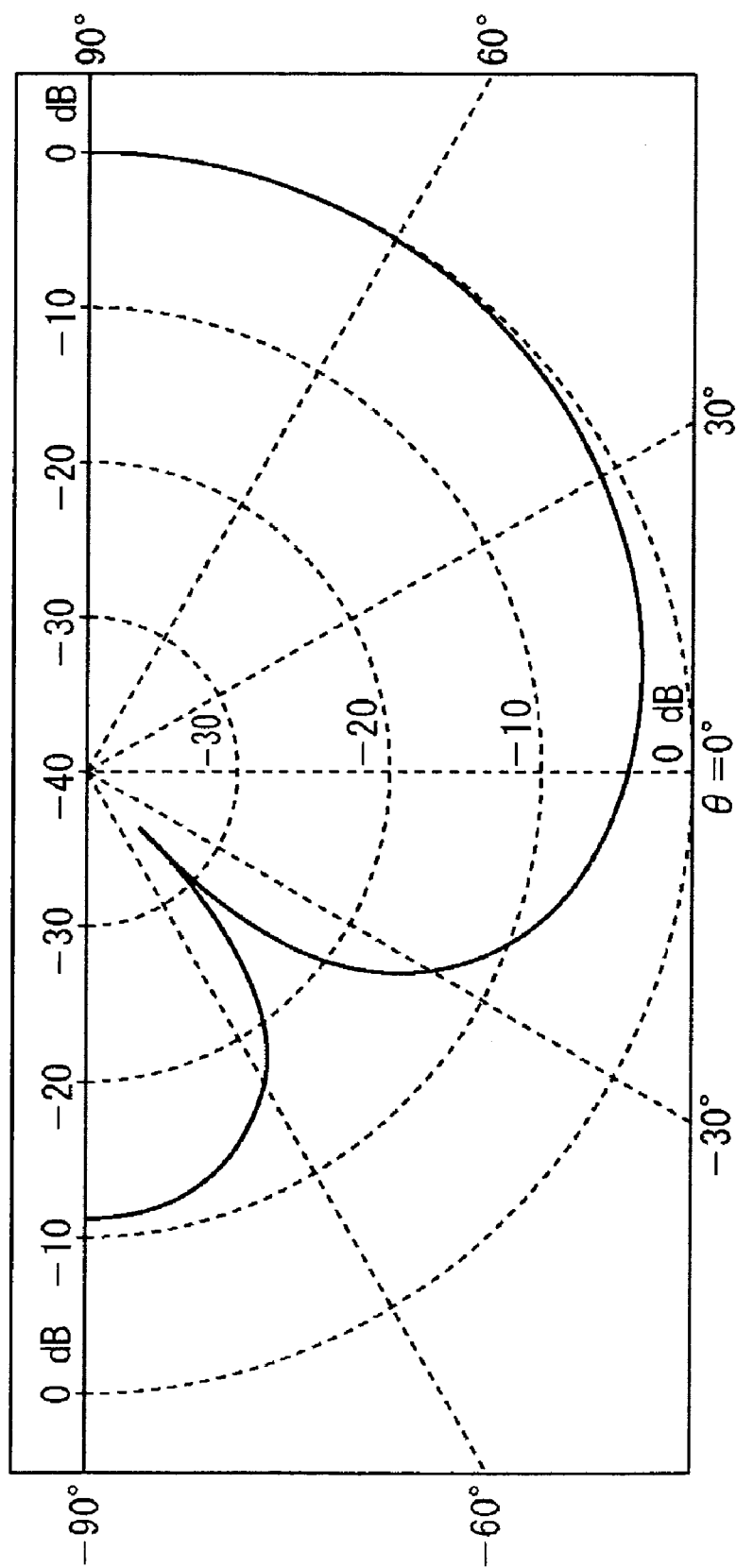
FIG. 53 is a diagram showing an example of directivity.
Figure 54:
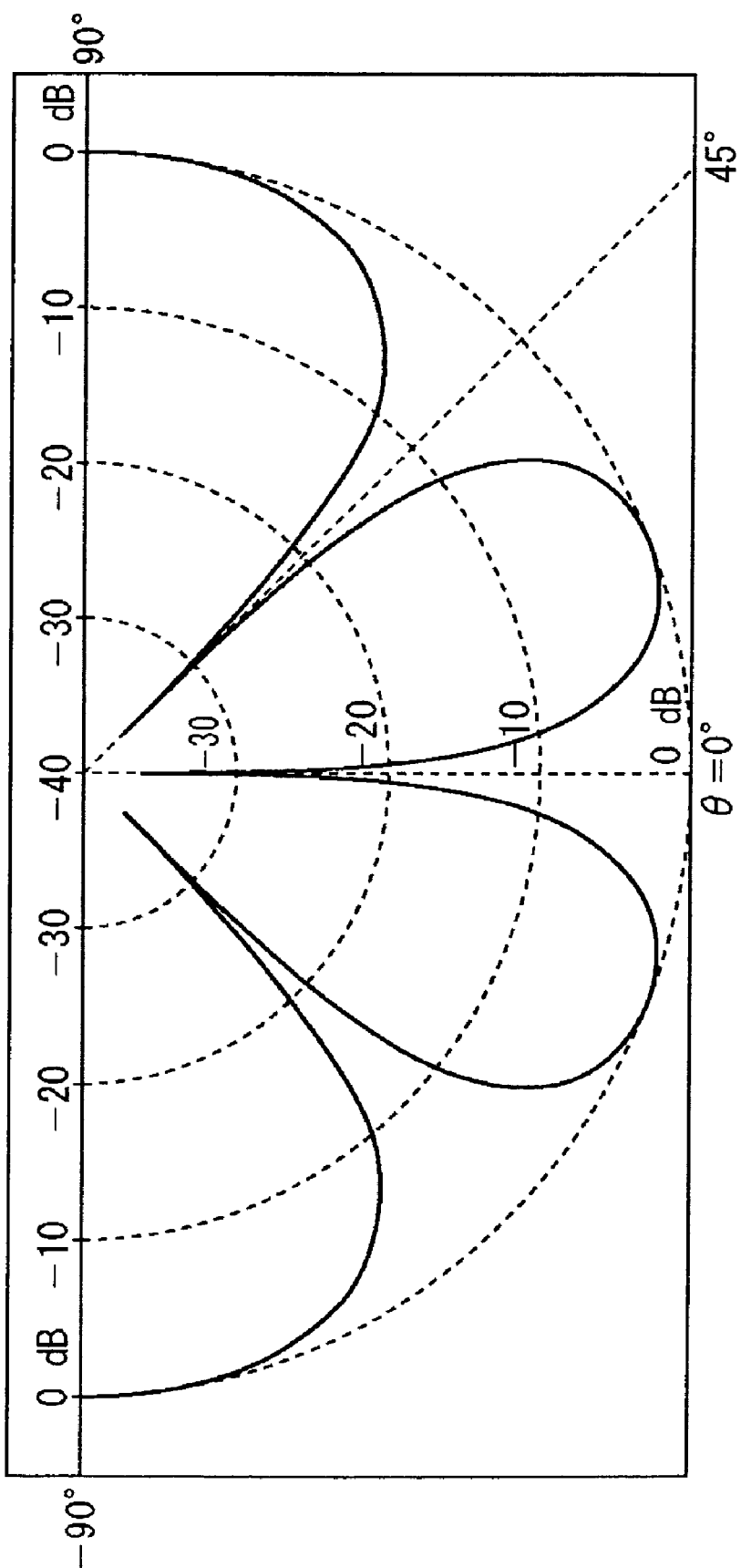
FIG. 54 is a diagram showing another example of directivity.

FIGS. 53 and 53 show examples of directivity of the total volume of sound generated by the speakers $212_1$ and $212_2$. In FIGS. 53 and 54, the sound volume is normalized with respect to the maximum sound volume (0 dB).

FIG. 53 shows the directivity obtained when the axis-to-axis distance is set to 10 cm, the delay time difference D2−D1 is set to a/C, and a sinusoidal signal with a frequency of 1000 Hz is applied, where C denotes the acoustic velocity (assumed to be equal to 340 m/s).

In the example shown in FIG. 53, the maximum volume is obtained in a range in which the angle θ is greater than 30°. At a location at which the angle θ becomes equal to −45°, the sound volume becomes substantially zero (null).

FIG. 54 shows the sound directivity obtained for similar conditions to those employed in FIG. 53, except that a sinusoidal signal with a frequency of 5000 Hz is applied.

In the example shown in FIG. 54, a main beam appears in a range in which the angle θ is greater than 45°, and a sub beam (grating beam) with a magnitude similar to that of the main beam appears in a range in which the angle θ is 0 to 45°. The reason why such a sub beam appears is that the phase difference between two sound waves becomes equal to an integral multiple of the wavelength of the sinusoidal wave with a frequency of 5000 Hz, and thus two sound waves are added together in phase.

In general, when the distance of the listening point from the speaker $212_1$ and that from the speaker $212_2$ are much greater than the axis-to-axis distance a, if the following equation holds, two sound waves originating from the speakers $212_1$ and $212_2$ are added together in phase and a sub beam with a magnitude equal to that of the main beam appears.

$$a/C \times (1 - \cos\theta) = 1/f \times n \qquad (26)$$

where f is the frequency of an input signal, and n is an integer equal to or greater than 0.

In equation (26), a main beam occurs when n=0.

For example, if the frequency f is 1000 Hz, equation (26) is satisfied only when n=0. Therefore, in this case, only a main beam appears but no sub beam appears.

When n=1, the frequency which satisfies equation (26) is given by f=C/(a(1−cos θ)). That is, when the frequency is equal to this value, a sub beam appears. In the example shown in FIG. 53, this frequency is equal to about 1700 Hz, at which the axis-to-axis distance a becomes equal to one-half the wavelength of the sound wave.

In the speaker unit 12L shown in FIG. 52, as described above, input audio data is delayed by the digital filters 211₁ and 211₂ for respective frequency components, and audio data having delay time difference D2−D1 for respective frequency components is output from the speakers 212₁ and 212₂ so that the total sound volume characteristic of the speakers 212₁ and 212₂ has directivity. The direction of the main beam and the null direction for each frequency component can be changed by controlling the delay time difference at that frequency.

That is, the direction of the principal axis of directivity of the speaker unit 12L can be changed by changing the tap coefficients applied to the digital filters 211₁ and 211₂.

Therefore, by applying proper tap coefficients from the unit driver 138 to the digital filters 211₁ and 211₂, it is possible to direct the principal axis of directivity of the speaker unit 12L into a desired direction.

Although in the example described above, the principal axis of directivity is controlled by means of using interference between two sound waves emitted from the two speakers 212₁ and 212₂ disposed in the speaker unit 12L, each of speaker units 12L and 12R may be formed so as to include a single speaker, and the direction of the principal axis of directivity may be controlled by means of using interference between two sound waves emitted from the speaker of the speaker unit 12L and the speaker of the speaker unit 12R.

The speaker unit 12L may be formed as to include an array of three or more speakers so that the speaker unit 12L has sharper directivity.

In the embodiment described above, the location of the remote controller 15 (the location of a user) is determined on the basis of intensity, detected by the master device 1 and slave devices 2, of the infrared ray emitted from the remote controller 15, and the principal axis of directivity of the speaker units 12L and 12R or the speaker units 32L and 32R is directed toward the location of the remote commander 15. However, to adjust the positions of the set of speaker units 12L and 12R or the set of speaker units 32L and 32R so that the principal axis of directivity is directed toward the remote commander 15, it is not necessarily needed to detect the location of the remote commander 15 but it is needed only to detect the direction from the master device 1 or the slave device 2 to the remote commander 15.

Figure 55:
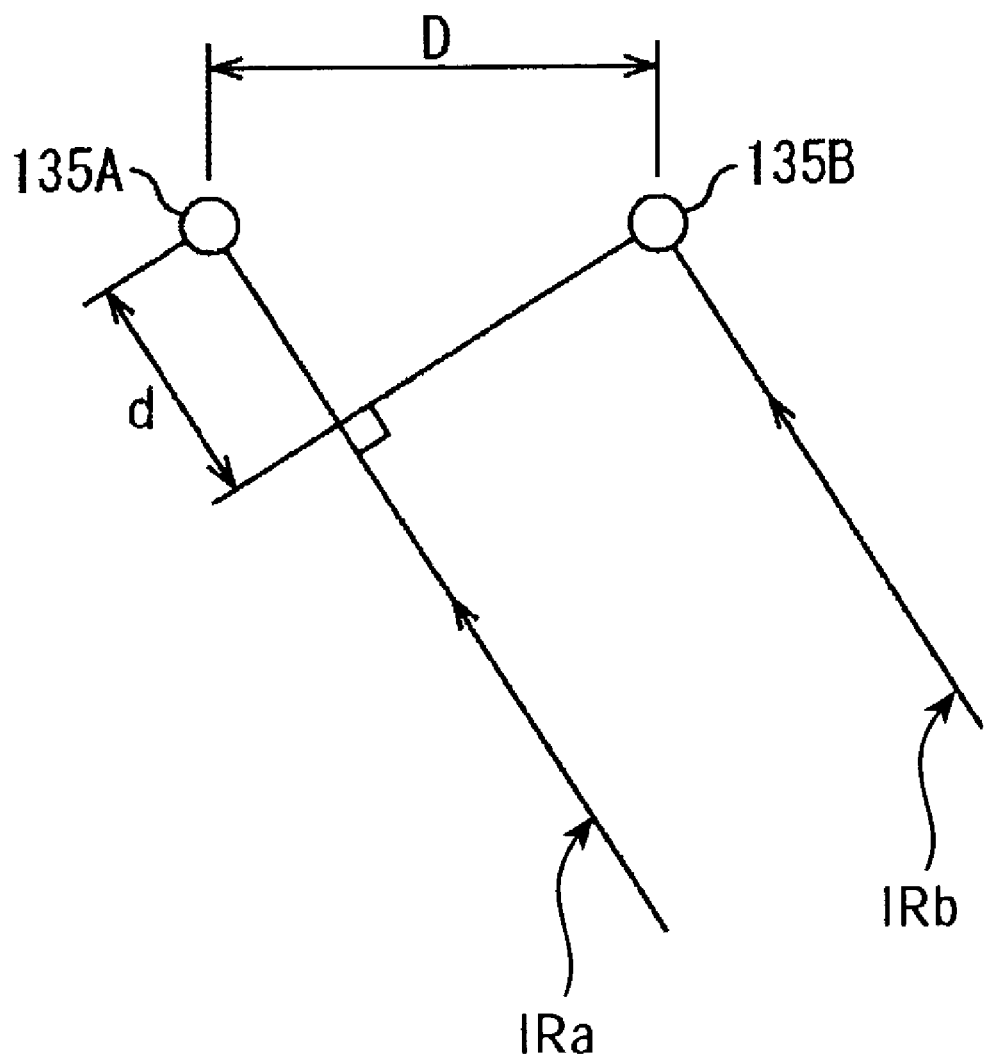
FIG. 55 is a diagram showing a method of detecting the direction of the remote commander.
Figure 56:
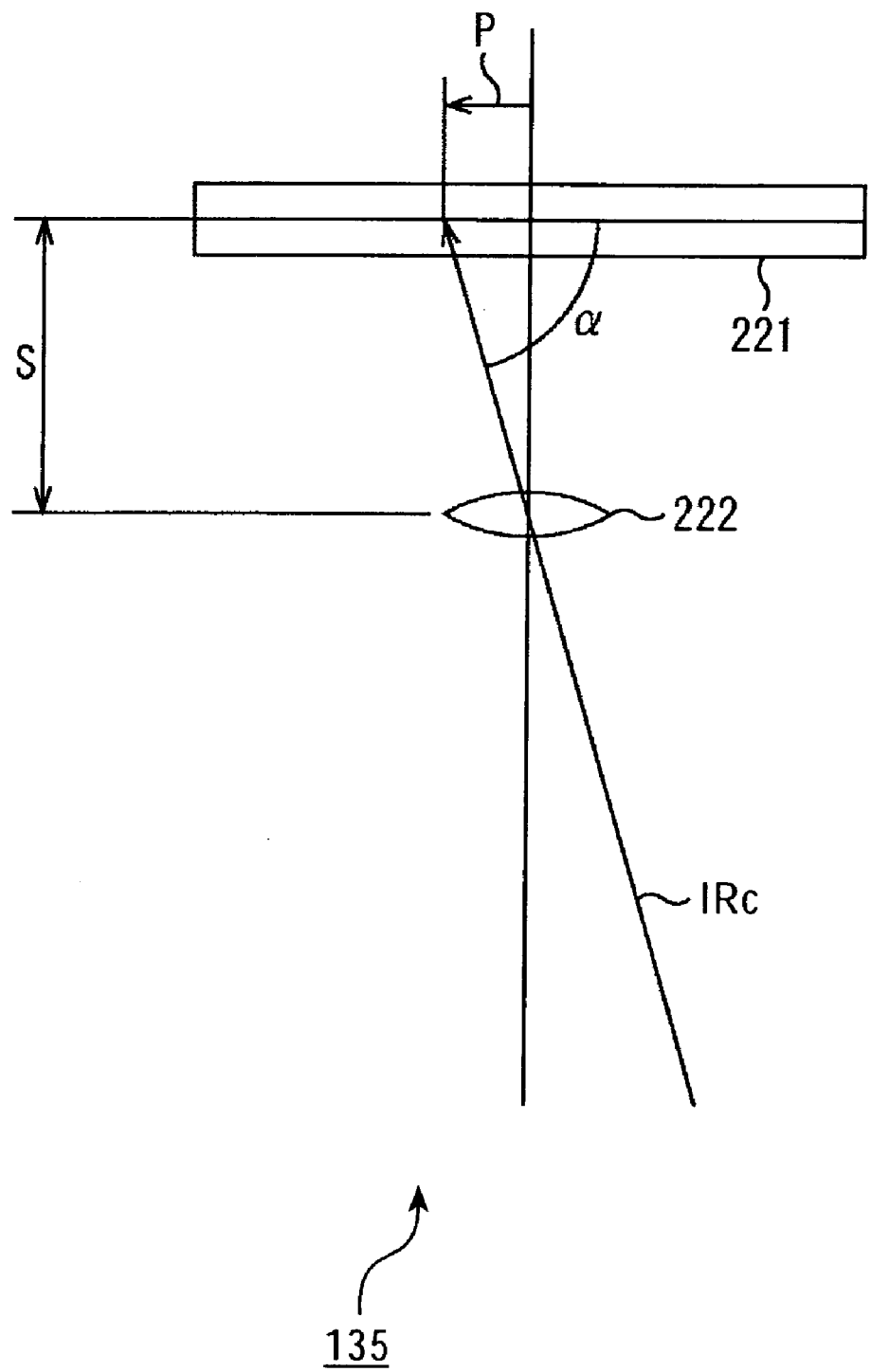
FIG. 56 is a diagram showing an example of the configuration of an IR receiver.

Referring to FIGS. 55 and 56, a method of detecting the direction of the remote commander 15 as viewed from the master device 1 (or a slave device 2) is described below.

As shown in FIG. 55, the direction of the remote commander 15 as viewed from the master device 1 can be detected on the basis of the infrared ray detected by two infrared detectors 135A and 135B, disposed on the IR receiver 135 of the master device 1 (FIG. 10) such that the infrared detectors 135 are spaced from each other by a particular distance D.

When the distance from the master device 1 to the remote commander 15 is much greater than the distance D between the infrared detectors 135A and 135B, an infrared ray IRa emitted from the remote commander 15 and incident on the infrared detector 135A and an infrared ray IRb emitted from the remote commander 15 and incident on the infrared detector 135B can be regarded as being parallel to each other.

Herein, as shown in FIG. 55, let φ be the angle of the infrared ray IRb emitted from the remote commander 15 and incident on the infrared detectors 135A and 135B with respect to a line passing though the infrared detectors 135A and 135B. The difference d in the propagation path between the infrared ray IRa emitted from the remote commander 15 and incident on the infrared detector 135A and the infrared ray IRb emitted from the remote commander 15 and incident on the infrared detector 135B is given by D cos φ.

If the velocity of light is denoted by c, and the difference between times at which the infrared detectors 135A and 135B receive the infrared rays IRa and IRb emitted from the remote commander 15 is denoted by τ, the difference d in propagation path is given by cτ.

Therefore, the angle φ, that is the direction of the remote commander 15 is given by arc cos(τc/D). That is, the direction φ of the remote commander 15 can be determined by measuring the difference τ in times at which the infrared detectors 135A and 135B receive the infrared rays IRa and IRb emitted from the remote commander 15.

The direction of the remote commander 15 as viewed from the master device 1 (or a slave device 2) can also be determined by constructing the IR receiver 135 (or the IR receiver 155) in such a manner as shown in FIG. 56.

That is, in the example shown in FIG. 56, the IR receiver 135 is made up of an infrared line sensor 221 having a plurality of pixels serving as infrared detectors and a lens 222 for focusing the infrared ray IRc onto the infrared line sensor 221.

The infrared line sensor 221 is placed on the optical axis of the lens 222.

In the IR receiver 135 constructed in the above-described manner, an infrared ray IRc emitted from the remote commander is incident on the infrared line sensor 221 via the lens 222 and detected by a pixel at a particular location on the infrared line sensor.

Which one of pixels on the infrared line sensor 221 detects the infrared ray IRc depends on the incidence angle α of the infrared ray incident on the infrared line sensor 221. That is, the detection position varies depending on the incidence angle α.

If the distance between the detection position and the intersection point of the infrared line sensor 221 and the optical axis of the lens 222 is denoted by r, and the distance between the infrared line sensor 221 and the lens 222 is denoted by S, the incidence angle α, that is, the angle of the remote commander 15, is given by arc tan(S/r).

Therefore, the direction α of the remote commander 15 can be determined by measuring the distance r between the pixel detecting the infrared ray IRc and the intersection of the infrared line sensor 221 and the optical axis of the lens 222.

Figure 57:
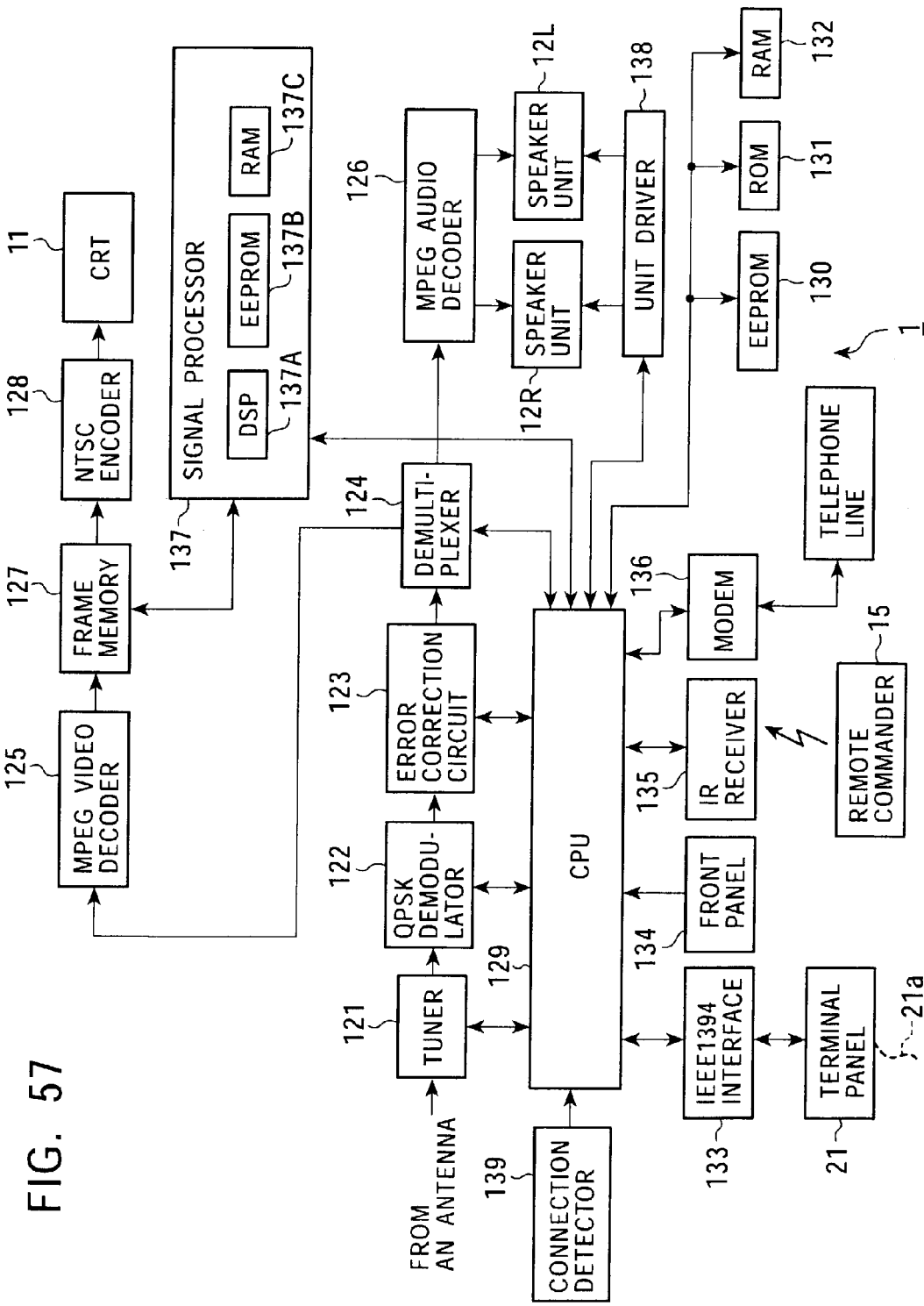
FIG. 57 is a block diagram showing another example of an electrical configuration of the master device.

FIG. 57 shows another example of the configuration of the master device 1. In FIG. 57, similar parts to those in FIG. 10 are denoted by similar reference numerals, and similar parts are not described herein in further detail. That is, the master device 1 shown in FIG. 57 is similar to that shown in FIG. 10 except that the master device 1 shown in FIG. 57 further includes a connection detector 139.

The connection detector 139 detects, electrically or mechanically, a connection of another television and informs the CPU 129 of the connection.

In the example shown in FIG. 57, instead of detecting a connection by detecting a change in voltage of the IEEE1394 terminal $21_{ij}$ (FIG. 3F) on the terminal panel 21, the connection with another television set is detected by the connection detector 139.

Figure 58:
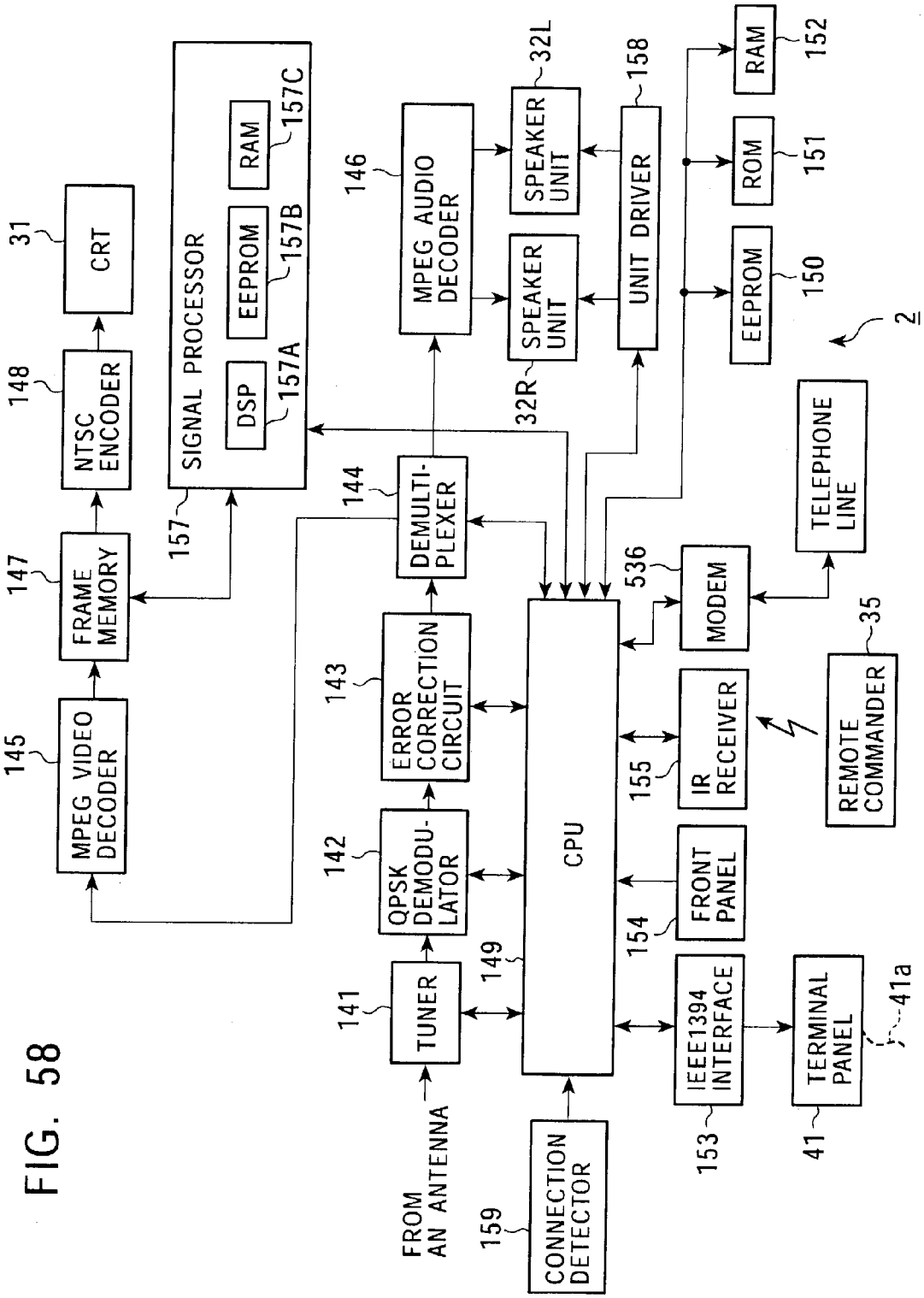
FIG. 58 is a block diagram showing another example of an electrical configuration of the slave device.

FIG. 58 shows another example of the configuration of the slave device 2. In FIG. 58, similar parts to those in FIG. 11 are denoted by similar reference numerals, and similar parts are not described herein in further detail. That is, the slave device 2 shown in FIG. 58 is similar to that shown in FIG. 11 except that the slave device 2 shown in FIG. 58 further includes a connection detector 159.

The connection detector 159 detects, electrically or mechanically, a connection of another television and informs the CPU 149 of the connection.

In the example shown in FIG. 58, as with the example shown in FIG. 57, the connection with another television set is detected by the connection detector 159, instead of detecting the connection by detecting a change in voltage of the IEEE1394 terminal $41_1$ (FIG. 5F) on the terminal panel 41.

The processing sequence described above may be executed by hardware or software. When the processes are performed by software, a software program is installed on a general-purpose computer or the like.

Figure 59:
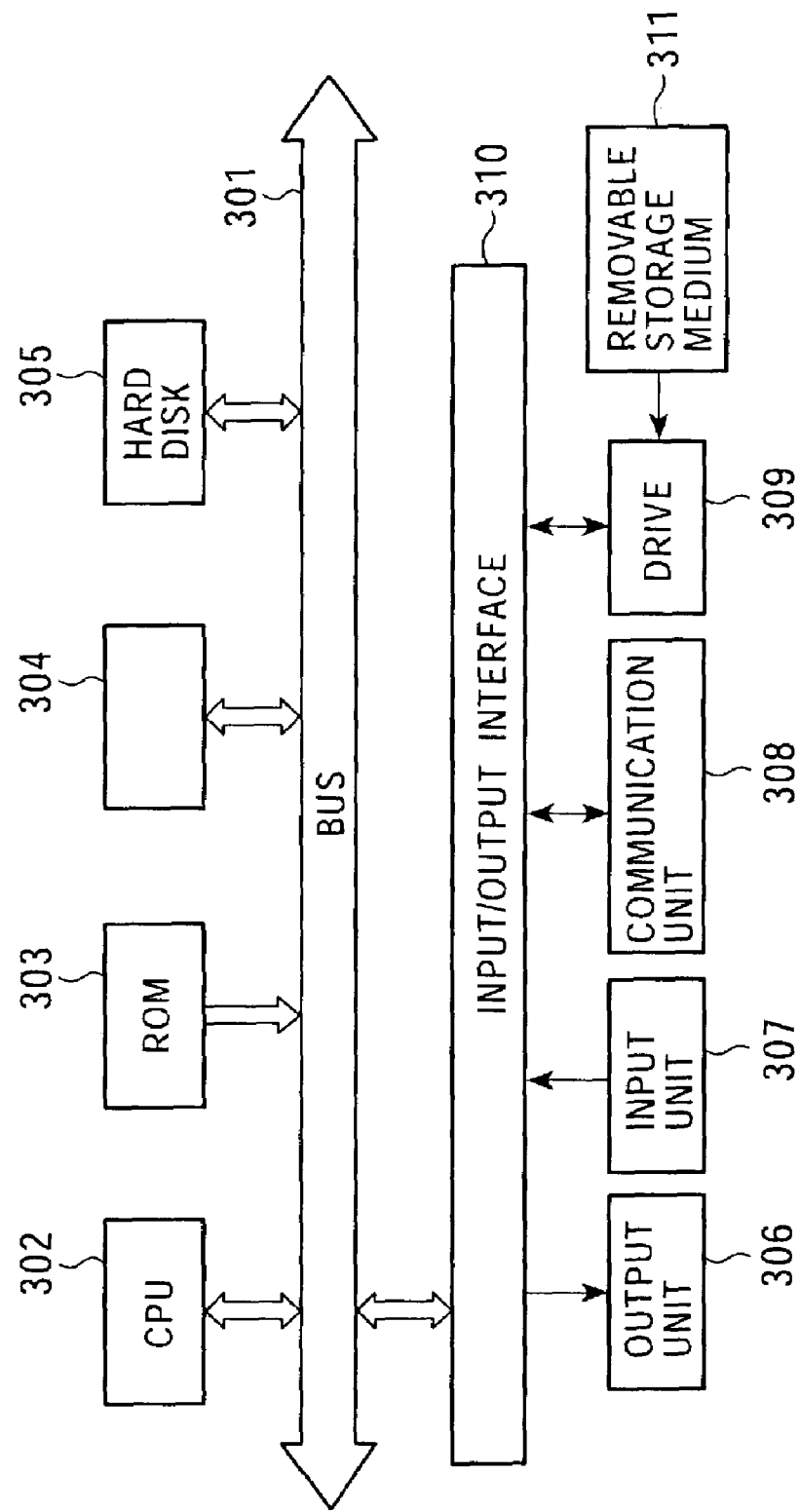
FIG. 59 is a block diagram showing an example of a construction of a computer according to an embodiment of the present invention.

FIG. 59 illustrates an embodiment of the invention in which a program used to execute the processes described above is installed on a computer.

The program may be stored, in advance, on a hard disk 305 or a ROM 303 serving as a storage medium, which is disposed inside the computer.

Alternatively, the program may be stored (recorded) temporarily or permanently on a removable storage medium 311 such as a floppy disk, a CD-ROM (Compact Disc Read Only Memory), an MO (Magnetooptical) disk, a DVD (Digital Versatile Disc), a magnetic disk, or a semiconductor memory. Such a removable storage medium 311 may be provided in the form of so-called package software.

Instead of installing the program from the removable storage medium 311 onto the computer, the program may also be transferred to the computer from a download site via a digital broadcasting satellite by means of radio transmission or via a network such as an LAN (Local Area Network) or the Internet by means of wire communication. In this case, the computer receives, using a communication unit 308, the program transmitted in the above-described manner and installs the program on the hard disk 305 disposed in the computer.

The computer includes a CPU (Central Processing Unit) 302. An input/output interface 310 is connected to the CPU 302 via a bus 301. If the CPU 302 receives, via the input/output interface 310, a command issued by a user using an input unit 307 including a keyboard, a mouse, microphone, or the like, the CPU 302 executes the a program stored in a ROM (Read Only Memory) 303. Alternatively, the CPU 302 may execute a program loaded in a RAM (Random Access Memory) 304 wherein the program may be loaded into the RAM 304 by transferring a program stored on the hard disk 305 into the RAM 304, or transferring a program which has been installed on the hard disk 305 after being received from a satellite or a network via the communication unit 308, or transferring a program which has been installed on the hard disk 305 after being read from a removable recording medium 311 loaded on a drive 309. By executing the program, the CPU 302 performs the process described above with reference to the flow charts or the block diagrams. The CPU 302 outputs, via an input/output interface 310, the result of the process, as required, to an output unit 306 including an LCD (Liquid Crystal Display) and/or a speaker thereby outputting the result of the process from the output unit 306. The result of the process may also be transmitted via the communication unit 308 or may be stored on the hard disk 305.

In the present invention, the processing steps described in the program to be executed by a computer to perform various kinds of processing are not necessarily required to be executed in time sequence according to the order described in the flow chart. Instead, the processing steps may be performed in parallel or separately (by means of parallel processing or object processing).

The program may be executed either by a single computer or by a plurality of computers in a distributed fashion. The program may be transferred to a computer at a remote location and may be executed thereby.

The television sets constituting the scalable TV system may be of the digital type or analog type.

The sales prices of the television sets constituting the scalable TV system may be set depending on whether the television set is a master device or a slave device and, in the case of slave devices, further depending on the number of slave devices.

In the scalable TV system, a master device is necessary to achieve the special capabilities described earlier, and thus the sales price of the master device may be set to a high value.

After a user purchased a master device, the user is expected to purchase a certain number of slave devices at a first time and then an additional number of slave devices at an another time, and so on. The sales prices for a certain number of slave devices purchased for the first time may be set to a value which is lower than the price of the master device and higher than the price of a conventional television set. The prices for additional slave devices may be set to a lower value.

A television set capable of serving as a master device in the scalable TV system may be constructed, for example, by adding the signal processor 137 to an ordinary digital television set and modifying the program executed by the CPU 129 This means that television sets for use as a master device in the scalable TV system can be easily produced on the basis of ordinary television sets, and thus a high cost merit (cost performance) can be achieved, if the special capabilities provided by the scalable TV system are taken into account. High cost merit is also achieved for television sets for use as slave devices.

The present invention can be applied not only to television sets having a built-in tuner but also displays which include no tuner and which are designed to display an image and output a sound/voice in according with video and audio signals supplied from the external.

What is claimed is:

1. A display apparatus, connectable with one or more other display apparatuses and having display means for displaying an image in accordance with an input video signal, comprising:

classifying means for determining a class corresponding to a pixel of interest such that plural class reference pixels in the vicinity of the pixel of interest to be predicted are extracted from the input video signal and the class corresponding to the pixel of interest is determined from the extracted class reference pixels;

prediction coefficient generation means for generating a prediction coefficient corresponding to the class determined by the classifying means;

pixel prediction means for predicting the pixel of interest such that plural prediction reference pixels in the vicinity of the pixel of interest are extracted from the input video signal, and the pixel of interest is predicted by means of a prediction operation using the extracted plural prediction reference pixels and the prediction coefficient; and display control means for displaying an image including at least the pixel of interest on display means such that images displayed on the present display apparatus and said one or more other display apparatuses form, as a whole, a complete enlarged image of the image corresponding to the input video signal.

2. A display apparatus according to claim 1, wherein the display control means comprises:

video signal generation means for generating a video signal to be used to display an enlarged image corresponding to the input video signal, using the input video signal and the predicted pixel of interest; and video signal output means for outputting at least a part of the video signal, to be used to display the enlarged image, to said one ore more other display apparatuses.

3. A display apparatus according to claim 1, wherein the classifying means determines the class of the pixel of interest on the basis of the level distribution pattern of the class reference pixels.

4. A display apparatus according to claim 1, wherein the prediction reference pixels and the class reference pixels are the same.

5. A display apparatus according to claim 1, further comprising authentication means for performing mutual authentication with said one ore more other display apparatuses; and at least the part of the enlarged image is displayed on said other display apparatuses only if the authentication has been successfully passed.

6. A display apparatus according to claim 1, further comprising enlargement factor setting means for setting the enlargement factor to be employed to enlarge the input video signal to produce the enlarged video signal to be displayed.

7. A display apparatus according to claim 6, further comprising parameter setting means for setting a parameter depending on the enlargement factor set by the enlargement factor setting means, wherein the prediction coefficient generation means generates the prediction coefficient on the basis of coefficient seed data obtained in advance by means of learning.

8. A display apparatus according to claim 6, wherein the enlargement factor setting means sets the enlargement factor such that the enlargement factor gradually increases after displaying the image corresponding to the input video signal.

9. A display apparatus according to claim 6, further comprising:

enlarging area detection means for determining an enlarging area of the image corresponding to the input video signal, to be enlarged by a factor equal to the enlargement factor into an enlarged video signal to be displayed on said one or more other display apparatuses;

displaying area detection means for determining a displaying area of a screen of each of said one or more other display apparatuses, in which the corresponding enlarged image is to be displayed; and transmission means for transmitting data indicating the enlarging area, the displaying area, and the enlargement factor to said one or more other display apparatuses.

10. A display apparatus according to claim 1, further comprising:

enlargement factor input means for inputting an enlargement factor transmitted from one of said other display apparatuses; and parameter setting means for setting a parameter in accordance with the enlargement factor received from said one of other display apparatuses, wherein the prediction coefficient generation means generates the prediction coefficient on the basis of coefficient seed data obtained in advance by means of learning.

11. A display apparatus according to claim 10, further comprising:

input means for inputting an enlarging area of an image corresponding to the input video signal transmitted from one of said other display apparatuses and for inputting a displaying area in which an enlarged image obtained by enlarging the image in the enlarging area is to be displayed, wherein the display means displays the enlarged image obtained by enlarging the image corresponding to the input video signal such that the enlarged image is displayed in the displaying area.

12. A display method for a display apparatus, connectable with one or more other display apparatuses, to display an image in accordance with an input video signal, comprising:

a classification step, of determining a class corresponding to a pixel of interest such that plural class reference pixels in the vicinity of the pixel of interest to be predicted are extracted from the input video signal and the class corresponding to the pixel of interest is determined from the extracted class reference pixels;

a prediction coefficient generation step for generating a prediction coefficient corresponding to the class determined in the classification step;

a pixel prediction step for predicting the pixel of interest such that plural prediction reference pixels in the vicinity of the pixel of interest are extracted from the input video signal, and the pixel of interest is predicted by means of a prediction operation using the extracted plural prediction reference pixels and the prediction coefficient; and a display control step, of displaying an image including at least the pixel of interest on display means such that images displayed on the present display apparatus and said one or more other display apparatuses form, as a whole, a complete enlarged image of the image corresponding to the input video signal.

13. A display method according to claim 12, wherein the display control step includes:

a video signal generation step, of generating a video signal to be used to display an enlarged image corresponding to the input video signal, using the input video signal and the predicted pixel of interest; and a video signal output step for outputting at least a part of the video signal, to be used to display the enlarged image, to said one or more other display apparatuses.

14. A program for causing a computer to control a display apparatus, which is connectable with one or more other display apparatuses, so as to display an image in accordance with an input video signal, said program comprising:

a classification step, of determining a class corresponding to a pixel of interest such that plural class reference pixels in the vicinity of the pixel of interest to be predicted are extracted from the input video signal and the class corresponding to the pixel of interest is determined from the extracted class reference pixels;

a prediction coefficient generation step for generating a prediction coefficient corresponding to the class determined in the classification step;

a pixel prediction step for predicting the pixel of interest such that plural prediction reference pixels in the vicinity of the pixel of interest are extracted from the input video signal, and the pixel of interest is predicted by means of a prediction operation using the extracted plural prediction reference pixels and the prediction coefficient; and a display control step, of displaying an image including at least the pixel of interest on display means such that images displayed on the present display apparatus and said one or more other display apparatuses form, as a whole, a complete enlarged image of the image corresponding to the input video signal.

15. A storage medium including a program stored thereon for causing a computer to control a display apparatus so as to display an image in accordance with an input video signal input from the outside, said program comprising:

a classification step, of determining a class corresponding to a pixel of interest such that plural class reference pixels in the vicinity of the pixel of interest to be predicted are extracted from the input video signal and the class corresponding to the pixel of interest is determined from the extracted class reference pixels;

a prediction coefficient generation step for generating a prediction coefficient corresponding to the class determined in the classification step;

a pixel prediction step for predicting the pixel of interest such that plural prediction reference pixels in the vicinity of the pixel of interest are extracted from the input video signal, and the pixel of interest is predicted by means of a prediction operation using the extracted plural prediction reference pixels and the prediction coefficient; and a display control step, of displaying an image including at least the pixel of interest on display means such that images displayed on the present display apparatus and said one or more other display apparatuses form, as a whole, a complete enlarged image of the image corresponding to the input video signal.

16. A display system including at least a first display apparatus and a second display apparatus connected with each other, the first display apparatus comprising:

display means for displaying an image;

classifying means for determining a class corresponding to a pixel of interest such that plural class reference pixels in the vicinity of the pixel of interest to be predicted are extracted from the input video signal and the class corresponding to the pixel of interest is determined from the extracted class reference pixels;

prediction coefficient generation means for generating a prediction coefficient corresponding to the class determined by the classifying means;

pixel prediction means for predicting the pixel of interest such that plural prediction reference pixels in the vicinity of the pixel of interest are extracted from the input video signal, and the pixel of interest is predicted by means of a prediction operation using the extracted plural prediction reference pixels and the prediction coefficient;

display control means for displaying an image including at least the pixel of interest such that images displayed on the present display apparatus and the second display apparatus form, as a whole, a complete enlarged image of the image corresponding to the input video signal; and transmission means for transmitting at least part of the predicted pixel of interest;

the second display apparatus comprising:

input means for inputting at least part of the predicted pixel of interest; and display means for displaying the enlarged image including at least the pixel of interest.

17. A display apparatus, connectable with one or more other display apparatuses and including display means for displaying an image, comprising:

input means for inputting video signal output from one of other display apparatuses;

image enlarging means for generating, from the input video signal, an enlarged image of the image corresponding to the input video signal;

authentication means for performing mutual authentication with said one of other display apparatuses; and display control means for, if the authentication has been successfully passed, displaying an enlarged image generated by the image enlarging means on the display means such that images displayed on the display apparatus and said one or more other display apparatuses form, as a whole, a complete enlarged image, classifying means for determining a class corresponding to a pixel of interest such that plural class reference pixels in the vicinity of the pixel of interest to be predicted are extracted from the input video signal and the class corresponding to the pixel of interest is determined from the extracted class reference pixels;

prediction coefficient generation means for generating a prediction coefficient corresponding to the class determined by the classifying means; and pixel prediction means for predicting the pixel of interest such that plural prediction reference pixels in the vicinity of the pixel of interest are extracted from the input video signal, and the pixel of interest is predicted by means of a prediction operation using the extracted plural prediction reference pixels and the prediction coefficient; and wherein the image enlarging means generates the enlarged image using the input video signal and the predicted pixel of interest.

18. A display apparatus according to claim 17, further comprising enlargement factor setting means for setting the enlargement factor to be employed to enlarge the input video signal to produce the enlarged video signal to be displayed.

19. A display apparatus according to claim 18, further comprising parameter setting means for setting a parameter depending on the enlargement factor set by the enlargement factor setting means, wherein the prediction coefficient generation means generates the prediction coefficient on the basis of coefficient seed data obtained in advance by means of learning.

20. A display apparatus according to claim 18, wherein the enlargement factor setting means sets the enlargement factor such that the enlargement factor gradually increases after displaying the image corresponding to the input video signal.

21. A display apparatus according to claim 18, further comprising:

enlarging area detection means for determining an enlarging area of the image corresponding to the input video signal, to be enlarged by a factor equal to the enlargement factor into an enlarged video signal to be displayed on said one or more other display apparatuses;

displaying area detection means for determining a displaying area of a screen of each of said one or more other display apparatuses, in which the corresponding enlarged image is to be displayed; and transmission means for transmitting data indicating the enlarging area, the displaying area, and the enlargement factor to said one or more other display apparatuses.

22. A display apparatus according to claim 18, further comprising:

enlargement factor input means for inputting an enlargement factor transmitted from one of said other display apparatuses;

parameter setting means for setting a parameter in accordance with the enlargement factor received from one of said other display apparatuses, wherein the prediction coefficient generation means generates the prediction coefficient on the basis of coefficient seed data obtained in advance by means of learning.

23. A display apparatus according to claim 22, further comprising input means for inputting an enlarging area of an image corresponding to the input video signal transmitted from one of said other display apparatuses and for inputting a displaying area in which an enlarged image obtained by enlarging the image in the enlarging area is to be displayed, wherein the display means displays the enlarged image obtained by enlarging the image corresponding to the input video signal such that the enlarged image is displayed in the displaying area.

24. A display apparatus according to claim 17, further comprising transmission means for transmitting a part of the enlarged image to be displayed on each of said one or more other display apparatuses to corresponding each of said one or more other display apparatuses.

25. A display apparatus according to claim 17, wherein the image enlarging means generates the enlarged image from the input video signal by means of simple interpolation.

26. A display apparatus, connectable with one or more other display apparatuses and having display means for displaying an image in accordance with an input video signal, comprising:

input means for inputting the input video signal;

prediction coefficient generation means for generating a prediction coefficient;

pixel prediction means for predicting the pixel of interest such that plural pixels in the vicinity of the pixel of interest are extracted from the input video signal, and the pixel of interest is predicted by means of a prediction operation using the extracted plural pixels and the prediction coefficient; and display control means for displaying an image including at least the pixel of interest on the display means such that images displayed on the present display apparatus and said one or more other display apparatuses form, as a whole, a complete enlarged image of the image.

27. A display apparatus according to claim 26, wherein the display control means includes video signal generation means for generating a video signal to be used to display an enlarged image corresponding to the input video signal, using the input video signal and the predicted pixel of interest; and video signal output means for outputting at least a part of the video signal, to be used to display the enlarged image, to said one ore more other display apparatuses.

* * * * *